US011447269B2

(12) United States Patent
Seeley

(10) Patent No.: US 11,447,269 B2
(45) Date of Patent: *Sep. 20, 2022

(54) QUIET URBAN AIR DELIVERY SYSTEM

(71) Applicant: Brien Aven Seeley, Santa Rosa,, CA (US)

(72) Inventor: Brien Aven Seeley, Santa Rosa,, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/548,551

(22) Filed: Dec. 12, 2021

(65) Prior Publication Data

US 2022/0169400 A1 Jun. 2, 2022

Related U.S. Application Data

(63) Continuation-in-part of application No. 17/266,451, filed as application No. PCT/US2020/045686 on Aug. 11, 2020, now Pat. No. 11,198,519.

(51) Int. Cl.
*B64F 1/36* (2017.01)
*B64C 9/04* (2006.01)
(Continued)

(52) U.S. Cl.
CPC ............ *B64F 1/36* (2013.01); *B60L 53/80* (2019.02); *B64C 3/56* (2013.01); *B64C 5/02* (2013.01);
(Continued)

(58) Field of Classification Search
CPC .. B64F 1/362; B64F 1/322; B64F 1/30; B64F 1/31; B64C 3/14; B60L 53/30; B61B 1/02; B61B 3/02
See application file for complete search history.

(56) References Cited

U.S. PATENT DOCUMENTS 8,459,592 B2 * 6/2013 Pahl .................. B64C 1/1415
244/129.4
10,415,581 B1 9/2019 Seeley
(Continued)

FOREIGN PATENT DOCUMENTS

GB 2573383 A 11/2019
WO WO-2018122821 A2 * 7/2018 ........... B64C 39/026
WO WO-2019025872 A2 * 2/2019 ................ B60F 5/00

OTHER PUBLICATIONS https://insideclimatenews.org/news/23082018/extreme-wildfires-climate-change-global-warming-air-pollution-fire-management-black-carbon-CO2 "A description of the climate effects of wildfire" Inside Climate News.
(Continued)

*Primary Examiner* — Philip J Bonzell
(74) *Attorney, Agent, or Firm* — Invention To Patent Services; Alex Hobson

(57) ABSTRACT

A public transportation system combines a unique combination of components that includes interoperable electric-powered vehicles, facilities, hardware and software having specifications, standards, processes, capabilities, nomenclature, and concepts of operations that together include a concerted, comprehensive, multi-modal, future system for moving people and goods that is herein named Quiet Urban Air Delivery (QUAD) and in which uniquely-capable, ultra-quiet, one to six-seat, electrically-powered, autonomous aircraft (SkyQarts) fly sub-193 kilometer trips on precise trajectories with negligible control latency and perform extremely short take-offs and landings (ESTOL) with curved traffic patterns at a highly-distributed network of very small, airports ("SkyNests") that themselves have standardized compatible facilities that interoperate with SkyQarts as well as with versatile, autonomous electric-powered payload carts (EPCs) and robotic delivery carts (RDCs) to provide
(Continued)

safe, fast, on-demand, community-acceptable, environmentally friendly, high-capacity, affordable door-to-door delivery of both passengers and cargo across urban, suburban and rural settings across the globe.

19 Claims, 46 Drawing Sheets

(51) Int. Cl.
    *B64C 25/26* (2006.01)
    *B64C 39/04* (2006.01)
    *B64C 5/02* (2006.01)
    *B64C 5/06* (2006.01)
    *B64C 11/00* (2006.01)
    *B64F 1/12* (2006.01)
    *B64F 1/31* (2006.01)
    *B64F 1/32* (2006.01)
    *B64D 27/24* (2006.01)
    *B60L 53/80* (2019.01)
    *B64C 3/56* (2006.01)

(52) U.S. Cl.
    CPC .................. *B64C 5/06* (2013.01); *B64C 9/04* (2013.01); *B64C 11/00* (2013.01); *B64C 25/26* (2013.01); *B64C 39/04* (2013.01); *B64D 27/24* (2013.01); *B64F 1/12* (2013.01); *B64F 1/31* (2013.01); *B64F 1/32* (2013.01); *B60L 2200/10* (2013.01)

(56) References Cited

U.S. PATENT DOCUMENTS

| | | | |
|---|---|---|---|
| 2016/0236790 | A1 | 8/2016 | Knapp et al. |
| 2018/0320402 | A1* | 11/2018 | Evans ................... B64C 39/024 |
| 2019/0039712 | A1 | 2/2019 | Moore et al. |
| 2020/0120214 | A1 | 4/2020 | Yan et al. |
| 2020/0361324 | A1* | 11/2020 | Evans ..................... B60P 3/007 |
| 2021/0107684 | A1* | 4/2021 | Le Lann ............ B65D 90/0073 |

OTHER PUBLICATIONS https://www.propublica.org/article/they-know-how-to-prevent-megafires-why-wont-anybody-listen. "They Know How to Prevent Megafires Why Wont Anybody Listen?" ProPublica.
https://graphics.reuters.com/CALIFORNIA-WILDFIRE/AIRCRAFT/bdwpkzmyyvm/ "Air Attack How California uses Dozens of Aircraft to Battle Wildfires" Reuters, Marco Hernandez , Simon Scarr and Manas Sharma Published Sep. 9, 2020.
https://www.stryker.com/us/en/portfolios/medical-surgical-equipment/emergency-patient-transport.html "Emergency patient transport More power to you" Stryker 1998-2021.
http://donsnotes.com/reference/size-humans.html "Anthropometric Dimensions for humans" Oct. 16, 2011.
http://payload.eaa62.org/technotes/tail.htm "The formulae for calculating tail volumes" EAA The Spirit of Aviation, Chapter 62, Reid-Hill View Airport, San Jose, CA.
https://www.mcmaster.com/6603a33. "Heavy Duty Slides" Accuride International Inc. 2021.
https://graphics.reuters.com/CALIFORNIA-WILDFIRE/AIRCRAFT/bdwpkzmyyvm/ Air attack How California uses dozens of aircraft to battle wildfires.
https://www.fs.fed.us/rm/fire/pubs/pdfpubs/pdf00572852/pdf00572852.pdf. The drop patterns and coverages of fire-retardant dropped from the air.

* cited by examiner

QUIET URBAN AIR DELIVERY SYSTEM

CROSS REFERENCE TO RELATED APPLICATIONS

This application is a continuation in part of U.S. application No. 17/266,451, filed on Feb. 5, 2021, and currently pending, which is a national stage application of PCT application No. PCT/US2020/045686, filed on Aug. 11, 2020 and currently pending, the entirety of both applications are hereby incorporated by reference herein.

BACKGROUND OF THE INVENTION

Field of the Invention

The present invention is comprised of a public transportation system consisting of a unique combination of components that includes interoperable electric-powered vehicles, facilities, hardware and software along with their range of specifications, standards, processes, capabilities, nomenclature, and concepts of operations that together comprise a concerted, comprehensive, multi-modal, future system for moving people and goods that is hereby named Quiet Urban Air Delivery (QUAD) and in which uniquely-capable, ultra-quiet, one to six-seat, electrically-powered, autonomous robotic aircraft ("SkyQarts") can fly sub-193 km trips on precise trajectories with negligible control latency and perform extremely short take-offs and landings (ESTOL) with curved traffic patterns at a highly-distributed network of very small, airports ("SkyNests") that themselves have standardized compatible facilities, as defined herein, that interoperate with SkyQarts as well as with versatile, autonomous robotic electric-powered payload carts (EPCs) and electric-powered autonomous robotic delivery carts (RDCs) to provide safe, fast, on-demand, community-acceptable, environmentally friendly, high-capacity, affordable door-to-door delivery of both passengers and cargo across urban, suburban and rural settings in both developed and undeveloped countries across the globe.

Background

The surface transportation system in urban regions of the USA in 2019 is fraught with ever-worsening traffic congestion that entails enormous amounts of wasted time and fuel, high levels of greenhouse gas emissions as well as unsustainable infrastructure costs. US Department of Transportation (DOT) data show that these ills are worsening each year and appear headed for an untenable future. The waiting time between buses and trains and their sparse destinations have caused the ridership on public transit to remain at around 5% for the last four decades, making it insufficient to solve transportation's ills. The recent pandemic and the concern about acquiring infectious disease from other passengers has reduced ridership on public transit even further. The growing demand for expeditious same day delivery by the US Postal Service, UPS, FedEx, Amazon and other shippers of important and essential supplies, food, parts, equipment and documents cannot be met due to transportation's ills. Commercial airline service has similar limitations. Valiant efforts to stimulate shared public transportation have not solved the problem of surface congestion. Public rail transit is inherently very limited in its number of destinations and its infrastructure is very expensive to build. It typically requires fare subsidies in order to win meaningful levels of ridership. Gridlocked freeways compel recurring expenditures to acquire more land on which to build more freeway lanes, at enormous expense and with no apparent end to the need for such expansion.

SUMMARY OF THE INVENTION

This invention comprises a system. A system is a collection of components that are organized for a common purpose. Systems rely upon each of their components to fulfill its important role to make the system work. Such components may have little or no meaning or value as stand-alone items; only when combined and integrated into a system do such components become valuable. For example, a keyboard alone without a computer and monitor has little or no value.

A recent convergence of technologies, including the development of more advanced energy storage devices and driverless electric cars, along with the ever-worsening surface gridlock in metropolitan areas has opened the possibility for a new, multi-modal type of public transportation system that uses autonomous robotic electric-powered, low-emissions air and land vehicles to provide trips across distances of up to 220 km with many trips as short as 16 km (10 miles) or less across urban, suburban and rural areas to and from very small airports that have high proximity to where people live and work. To be publicly acceptable and to succeed in achieving mass transportation volumes, these air vehicles need to be ultra-quiet, safe, easy to board and able to efficiently transport one to six passengers for hire while operating expeditiously with negligible control latency on precise trajectories and with extremely short take-offs and landings (ESTOL) at a highly-distributed network of very small, high-proximity, specially equipped airparks (SkyNests). No extant transportation system can fulfill all of these requirements. The necessary aircraft are enabled by the emergence of new, high-energy density batteries, ultra-quiet propellers and driverless vehicle technologies, which enable them to combine ultra-quiet electric propulsion, reduced emissions and adequate range with highly agile, precisely controlled flight and ground operations. These ultra-quiet, electric-powered aircraft are herein named SkyQarts and they are of a specialized new unique design that fulfills a uniform set of standards for consistent ESTOL performance, operational capabilities and size. The SkyQarts as embodied herein are fixed-wing ESTOL aircraft, but alternative embodiments may be vertical take-off and landing (VTOL) with tilt-wing, tilt rotor or wingless multi-rotor aircraft.

Throughout this disclosure, the word "autonomous" means a vehicle or machine that is driverless and sentient of position, destination and obstacles and that is navigated and maneuvered by a computer without a need for human control or intervention The word "robotic" as used herein means a vehicle or machine that is able to receive and perform commands or instructions, whether by human operated joystick or by autonomous capability.

It is noteworthy that all electric air and land vehicles described herein are both robotic and autonomous. They are robotic in that they perform the commands of a networked situational awareness system and a precision positioning system, such as where to go, where exactly to dock and when. They are autonomous in being sentient of position, destination and obstacles and able by their on-board computerized autonomous control system to self-navigate and maneuver past traffic and obstacles when enroute to their destinations.

All SkyQarts are uniquely capable of being precisely positioned and rapidly loaded and unloaded, in as little as 20 seconds, at a dock's aircraft service bay using standardized, pre-loaded, robotic autonomous electric-powered payload carts (EPCs). The autonomous robotic EPC is an innovation that enables one of this invention's several key components. The EPC saves time by reducing mode changes and prep-delays. The EPC is capable of hauling a variety of payloads including both people and goods, and it is designed to be carried not just inside the axisymmetric fuselage pod of the SkyQart aircraft, but also with a piggyback transportation function atop specially designed compatible electric-powered autonomous robotic delivery carts (RDCs), as well as atop or inside other vehicles such as small cars, pick-up trucks and commercial trucks. The RDC is also one of this invention's several key components. This combination of SkyNests, SkyNest docks, SkyQarts, EPCs, RDCs and the other components enumerated herein are expressly designed to comply with standards that allow them to interoperate as a multi-modal system of rapid delivery of people and goods from departing doorstep to destination doorstep. This new, aviation-based system offers what no extant transportation system can, i.e., quiet, safe, fast, zero-tail-pipe emissions, on-demand, multi-modal mass transportation and it is herein named the Quiet Urban Air Delivery (QUAD) system. Its working matrix of autonomous robotic electric-powered vehicles, facilities, hardware and software along with their range of specifications, standards, processes, capabilities, nomenclature, and concepts of operations together comprise a concerted, comprehensive, multi-modal, on-demand, mass transportation system to transport people and goods is the subject of this invention.

The main enabling vehicle for QUAD is its aircraft, the ultra-quiet, electric-powered, extremely short take-off and landing SkyQart. The nominal interoperable embodiment of the SkyQart presented herein is an autonomous robotic fixed-wing aircraft that is exemplary of an integrated design that can fulfill the performance requirements of the QUAD system and can be readily and affordably certificated by the Federal Aviation Administration and other regulatory bodies as safe to carry passengers for hire. This advantage does not exclude the use of alternative embodiments of the SkyQart, including those that employ tilt-wings or tilt-rotor or vertical multi-rotors for VTOL operation, if they can be designed to be certificated and compatible with community noise requirements as well as with the use of EPCs, RDCs and the cadenced coordinated operations at SkyNests and their docks. Cadenced coordinated operations require that the EPCs, RDCs and SkyQarts at a SkyNest interoperate both on-time and just-in-time. The nominal interoperable embodiment of the SkyQart is further distinguished by its unique combination of several enabling innovations into one aircraft, including the following components: the extremely low drag axisymmetric fuselage pod (AFP) that contains the SkyQart's interior cabin, the cargo axisymmetric fuselage pod, active main landing gear, ultra-quiet propellers that serve as spoilers, landing gear wheelmotors in its main landing gear, retractable nose wheel landing gear, a solenoid-actuated pin-latching system, a precision positioning system, a standardized swappable battery pack (SBP) with robotic battery swapping, Qusheat ride control seats, an autonomous control system, an community acceptable noise sphere, a closed-flotation system, the blown, double-slotted fast flap system, the automatic rear hatch, the peelable window frame for emergency exit, the DC fast-charging port, guided rate acceleration change execution (GRACE) and the Faraday cage around its battery pack. By virtue of this combination of innovative components, this patent is the first concerted system that addresses all of the transportation problems listed in the Background section above and it is the first aviation-based system designed to do so at meaningful scale. The maximum capacity of the QUAD system is predicated upon the use of autonomous robotic electric-powered vehicles, but the system can operate at lower capacity using human-piloted electric-powered vehicles during its initial years of demonstration start-up operations. The QUAD system, by using virtual highways in the sky, aims to complement the surface transportation system by minimizing the need for expensive new paved roads, bridges, tunnels and parking spaces, while preserving the prevalent personal preference for traveling in a private vehicle compartment with at least one or two seats.

The safety of the QUAD system is of paramount importance and all of its vehicles and its operations will ultimately have to comply with applicable safety regulations as well as with FAA and EASA certification standards. Some of those standards will evolve as the QUAD system is implemented. The goal is to have the QUAD transportation system provide 9-sigma safety, meaning an accident rate of one per one billion operations. The components of the QUAD transportation system and particularly those of its autonomous robotic SkyQart that are important to its safety are the following: runway crash cushions, a sentient, ever-vigilant, networked autonomous control system with fused multi-sensor see and avoid hardware and software coupled to automated flight controls with negligible control latency to detect and prevent air traffic conflicts and provide aerial agility, a networked situational awareness system, a ballistic recovery system consisting of a vehicular parachute, a closed flotation system for buoyancy in case of ditching in the water, an emergency locator transmitter (ELT), shoulder harnesses with built-in airbags, rescue lift-hooks on airframe hardpoints for helicopter rescue of entire vehicle, peelable round window frames as emergency exits on the sides of the AFP, a Faraday cage to limit voltage shock hazard and radio frequency interference leaks, an automated check-list and self-diagnostics including automatic pre-flight self-inspection before every flight, landing and take-off speeds limited to no more than 24 m/sec, an automatic fuel gauging and range protection, a fire-proof or fire-resistant materials in the SkyQart airframe, a smoke and carbon monoxide detectors in the SkyQart cabin, an automatic fire extinguisher system in the SkyQart cabin, a battery management system in all standard battery packs, a fire-proof container for all standard battery packs, regularly scheduled disinfecting/cleaning of SkyQarts, EPCs and RDCs, a nominal interoperable maximum glide ratio of more than 17:1 and a taxiing SkyQart that can taxi without using a propeller or a rotor. Negligible control latency is defined herein for the autonomous control systems of the electric-powered air and land vehicles described herein as a capability of determining and activating a controlled movement of said vehicle in less than one second.

A landing indicated airspeed that is limited to no more than 24 m/sec could have alternative embodiments wherein a landing speed is in a conceivable range of about 20 m/sec or more, about 22 m/sec or more, about 26 m/sec or more, about 27 m/sec or more or any value between and including the speed values provided, while the preferred range is 21.5 m/sec to 27 m/sec and the nominal interoperable landing speed is 24 m/sec as this provides a preferred combination of safety, low noise, shortened runway requirements enabling smaller airparks, adequate flight control authority during landing, expeditious airport traffic flow/capacity and sufficient cruise speeds without excessive wing area, susceptibility to flight turbulence or adverse energy efficiency.

It is clear that a new modal solution is urgently needed for transportation and QUAD proposes to be that solution. The several components that make QUAD a workable, high-capacity solution are interdependent because only together can they enable the core mission requirements and operational requirements of QUAD to be met. Therefore, these components, including said SkyQarts, electric-powered autonomous robotic delivery carts, autonomous robotic electric payload carts, facilities, processes, operations, components, capabilities, nomenclature and standards that comprise the concerted, interoperable, comprehensive, multimodal, on-demand future public transportation system that is the subject of this invention, herein described and called Quiet Urban Air Delivery (QUAD) are together what comprises this invention.

A fundamental and recurring principle in this invention is that the several components of QUAD are definable, interdependent, interoperable and system-enabling. This principle is valid because the dimensions, performance and energy requirements of human mobility are constrained within definable boundaries by combining the size of humans with immutable natural and social sciences including physics, human physiology, sociology, psychology and economics along with the culture, habits and built-environment of the extant surface transportation system. These sciences determine the workable, tolerable and acceptable parameters for a public transportation system in terms of its noise level, speeds, accelerations, size, weight, cost, ease-of-use and safety level. To be sustainable, the QUAD system must include defined, quantified and uniform standards for these parameters and others in a range that respects those laws of science. Such physics-compatible standards are important to achieving mass production, interoperability, parts commonality and economies of scale, all of which help enable a sustainable, affordable mass implementation of the QUAD system. For most parameters there is a magnitude that fulfills the need at a human scale with the physically correct size, weight, motion or user experience. The magnitudes of the parameters presented in the embodiments herein are of a physically correct human scale and are thereby interoperable.

It is important to note the following definitions regarding parameters, as nominal, nominal interoperable, or standard: In order for the QUAD system to be a transportation system, it follows that several workable, tolerable, interoperable dimensions, weights, forces, rates and other parameters must be specified in this patent for the embodiments of the vehicles, components and facilities contained herein. Accordingly, the definition intended by use herein of the descriptive term "nominal", is that definition given by Merriam-Webster "of, being, or relating to a designated or theoretical size [or magnitude] that may vary from the actual: e.g. approximate". The descriptive term "nominal interoperable" is herein defined as "being of a designated size that can interoperate with the other components described herein". In addition, the definition intended by use herein of the descriptive term "standard", is that definition meaning "something set up and established by authority, law, custom or consensus as the specific, uniform magnitude of a quantity, weight, extent, value, or quality". It is reasonable that the nominal, nominal interoperable, or standard magnitudes of many of the parameters specified herein could be changed in the future by some authority, consensus or enterprise with such change being across a conceivable range of feasible magnitudes and with commensurate changes to other interoperable components of this transportation system while still including such changed or alternative embodiments as legitimately encompassed by this patent. Consequently, a range of feasible and reasonable magnitudes are specified as the conceivable range following several of the nominal, nominal interoperable, or standard magnitudes specified in this specification/disclosure. In addition, a smaller or narrower preferred range that is within that conceivable range may be specified. The conceivable range and preferred range are not intended to be limiting and will, where applicable, be specified in metric units along with the nominal, nominal interoperable, or standard magnitudes that are specified herein in metric units. The reasons for the selection of these ranges will be given in light of the consequences of using magnitudes outside of these ranges. For most parameters, there is a declared nominal interoperable magnitude as well as the specified ranges of feasible alternatives. In instances where the magnitude is presented herein as either a specified standard or as a nominal interoperable embodiment, it is because such a specification is considered fundamental to fulfilling the interoperability and performance requirements of this transportation system.

The size of the cabin or people/payload compartment of the SkyQart aircraft to be used in the QUAD system has a direct effect on the aircraft's drag, power requirement and range; consequently this compartment must be of the minimum size that can still comfortably accommodate the most common sizes of people and payloads. The people/payload compartment of the embodiment of the SkyQart described herein is named the axisymmetric fuselage pod or AFP. The AFP has a circular cross section and a tapered shape that minimizes drag. To enlarge the size of the AFP by scaling it up above its nominal 160.02 cm diameter, even by a small amount, in an attempt to make it more spacious and luxurious would impose a significant cost and speed penalty that would apply on every flight and thus be multiplied by the billions of projected trips flown. Likewise, to change its cross-sectional shape from circular to square would also impose a cost, speed and compatibility penalty.

To limit its cost, the size of the land parcel needed for the SkyNest likewise should be as small as practicable for safe operations within community-acceptable noise limits. The nominal embodiments of the SkyNests presented herein all are of minimum parcel size. To minimize this parcel size ultimately requires that the SkyQart aircraft be autonomous (pilotless). With precise autonomous control, said SkyQart must fly consistently precise trajectories with curved traffic patterns with steep climb and descent profiles along with precise 4D approaches to precise landing touchdowns at each SkyNest. (The term 4D refers to an aircraft flight path whose approach and trajectory are specified by combining its three-dimensional (3D) path with the exact time at each location along that path, thus adding a $4^{th}$ dimension to 3D). The autonomous flight control systems of the SkyQart aircraft provide it with extreme reliability, aerial agility and negligible control latency and enable it to fly precise 4D trajectories. Extreme reliability can be defined as having a mechanical or software failure once in every one billion flight operations.

Aerial agility of the SkyQart is important to this patent because minimizing community noise impacts of flight operations will, at some SkyNests, demand extremely short take-off and landing (ESTOL) performance with extremes of acceleration rate change that approach but do not exceed levels that are tolerable to passengers of a public transportation system. The SkyQart must have extreme capabilities for brisk control of sink rate, climb rate, pitch, roll and yaw rates, thrust, lift and drag in order to operate at standardized small landing sites herein named SkyNests. Said SkyQarts must be highly agile and must consistently use an actuating principle that is particularly enabled in electric-powered servo-controlled aircraft with negligible control latency. That principle is herein named guided rate acceleration change execution (GRACE). The GRACE actuating principle involves the tailoring of the rate of actuation of movement across any range of motion or trajectory so that it is acceptable in a public transportation system. This means that the changes in acceleration which are called the jerk rate, across any range of motion, must rise and fall at controlled rates that remain within known tolerable jerk rates for human occupants while still achieving the necessary precise motion in time.

The speeds required for the different autonomous robotic vehicles used in the QUAD system are likewise constrained by operational and physical demands. The SkyQart's nominal interoperable lift-off and climb-out airspeed and landing airspeed is 24 m/sec, which is fast enough to ensure that the aircraft's control surfaces will have enough dynamic pressure to maintain brisk control in gusty or turbulent conditions. It is also fast enough to enable the cruise speed of the SkyQart aircraft to substantially out pace surface traffic even in high winds, while being slow enough to enable short take-offs and landing rolls at very small SkyNests, as well as to provide enough time for the autonomous control system to process and enact de-confliction with other air traffic that is on sovereign autonomous trajectories. Alternative embodiments of the SkyQart could use a landing speed that falls within a conceivable range that is 0 m/sec or more, 20 m/sec or more, 27 m/sec or more, or any value between and including the speed values provided, while it is preferred that the take-off and climb-out airspeed be a nominal interoperable 24 m/sec with a preferred range of 21.5 m/sec to 27 m/sec. This landing speed The QUAD system will thereby enable not only same day deliveries, but same hour deliveries for private users as well as for major shippers like the US Postal Service, UPS, FedEx, Amazon and others. Designing a SkyQart for a substantially slower take-off airspeed would reduce the expeditiousness of operations at the SkyNest and reduce its cruise speed, and this would not save significantly on land parcel size due to the concomitant need for containment of take-off noise within the SkyNest boundaries. The nominal interoperable 7.6 m/sec speed for taxiing of the SkyQart is fast enough to move with alacrity on the surface of the SkyNest while being slow enough to enable accurate autonomous trajectories, short stopping distances and tight turns. Alternative embodiments of the SkyQart may have a taxiing speed that is in a conceivable range of about 6 m/sec or more, about 8 m/sec or more, about 9 m/sec or more, or any value between and including the speed values provided, while it is preferred that the taxiing speed be 7.6 m/sec as this provides a preferred combination of safety, speed, maneuverability and expeditious traffic flow without excessive noise, braking distances or delays. The nominal interoperable 11 m/sec limit speed for the autonomous robotic delivery cart (RDC) on neighborhood streets is likewise fast enough to keep surface travel times short while slow enough to comply with safe speed limits for such neighborhood electric vehicles. In its use confined to the dock premises of a SkyNest, the autonomous robotic electric payload cart (EPC) has a battery pack sufficient to a maximum range of up to 4 km. The nominal maximum speed of the EPC is constrained to the speed of a fast walk, just 2.2 m/sec, so that it can safely and autonomously move short distances along the dock premises that are congested with pedestrians. Alternative embodiments of the EPC may have a maximum speed that is in a conceivable range of about 2 m/sec or more, about 2.5 m/sec or more, or any value between and including the speed values provided, while it is preferred that the EPC's maximum speed be 2.2 m/sec as this provides a preferred combination of safety, speed, maneuverability and expeditious traffic flow without delays or danger to pedestrians.

Other constraints affect the sizing of the components for QUAD. For example, the autonomous robotic delivery cart (RDC) must be small enough to qualify as a neighborhood electric vehicle[1] and fit in a bike lane yet large enough to carry two large people side-by-side or, alternatively, to carry a 122 cm wide cargo box or 122 cm×244 cm sheets of plywood or other building materials. Its nominal interoperable length should be less than 244 cm so that it can park perpendicular to the curb and thereby consume only 25% of a parallel parking space.

The nominal interoperable size of the standard swappable battery packs (SBP) carried by the SkyQart must be large enough to provide sufficient range for its market of short trips, while being small enough to be readily interchangeable between SkyQarts. However, because the SkyQart has no toilet, it is not necessary to provide it with the weight burden on every flight of a battery sufficient for a 2-hour flight. The battery packs must also be limited in size and weight such that they can be handled manually by a pair of strong adults and can be stackable and useable in parallel circuits for applications that demand extended range or power. The packs must also have provisions for tire and smoke containment, ventilation and cooling and a built-in battery management system, along with consensus standards for size and location of electrodes and latch points. The dimensions of the standard swappable battery pack (SBP) for the SkyQarts are chosen specifically to fit present day energy densities and the commonly available volumes in two-seat vehicles and should become a consistent industry standard much like the familiar 'D cell' flashlight battery. A 600-volt standard is anticipated for this SkyQart battery pack. Alternative embodiments of the SBP may have a pack voltage within a conceivable range of about 400 volts or more, about 700 volts or more or about 800 volts or more, or any value between and including the voltage values provided, while it is preferred that the nominal interoperable voltage be 600 volts with a preferred range of 550 to 650 volts as this provides a preferred combination of safety, weight savings and industry compatibility without excessive risk of shock, insulation breakdown, or internal shorting of higher voltages. The energy density of the SBP will increase in the future as new, more advanced battery chemistries evolve and this will allow its weight to be reduced while still fitting, latching and connecting inside the standard embodiment of the battery receptacle in a SkyQart.

The autonomous robotic electric payload cart (EPC) is an innovation to reduce boarding time and thereby turnaround time. The EPC has a nominal interoperable ground clearance of 2.54 cm in order to maximize the headroom for passengers seated on an EPC inside the SkyQart. Alternative embodiments of the EPC may have a ground clearance within a conceivable range of about 3 cm or more, about 5.1 cm or more, or any value between and including the ground clearance values provided, while it is preferred that the nominal interoperable ground clearance be 2.54 cm as this provides a preferred combination of passenger headroom, weight savings, latching security, ride height atop the RDC and cost savings. This 2.54 cm ground clearance means that off-loading an EPC onto the ground level from the lowest deck height of an autonomous robotic delivery cart (RDC), which is nominally 35.56 cm above the pavement, requires a specially shaped ramp whose slopes are gradual enough to not cause the undersurface of the EPC to scrape on the ramp during off-loading. The ramp's curved shape is customized such that it will fit EPC's small ground clearance at all positions along the ramp even with a 60 cm overhang at the front and rear of the EPC.

Aircraft noise emissions at all boundaries of a QUAD SkyNest are to be ≤55 dBA $LA_{eq}$, 5 s at a 40 m sideline, which would make it inaudible in the presence of ambient noise of 67 dBA. Moreover, such SkyQart noise emissions should be as low as possible, with ≤40 dBA at 40 m as an ideal noise level. Alternative embodiments of the SkyQart aircraft may have a noise emission at a 40 m sideline distance during full power take-off within a conceivable range of about 40 dBA $LA_{eq}$, 5 s or more, about 44 dBA $LA_{eq}$, 5 s or more, about 46 dBA $LA_{eq}$, 5 s or more, about 50 dBA $LA_{eq}$, 5 s or more, about 58 dBA $LA_{eq}$, 5 s or more or any value between and including the noise levels provided, while it is preferred that the nominal interoperable full-power take-off noise emissions be ≤55 dBA $LA_{eq}$, 5 s with a preferred range of 50-57 dBA LAeq, 5 s because this provides a preferred combination of community acceptability, achievable quietness, reduced size of the SkyNest, sufficient propeller tip speeds, low cabin noise and improved ridership. These noise requirements and the operational requirements for a very short runway combine to dictate the size of the standard SkyNest land parcels as being the smallest parcels that can safely fulfill both of these conflicted requirements.

The solenoid-actuated pin latching system depends upon use of solenoid-actuated latching pins made of high-strength, hardened steel. These pins each have a bullet-nose shape and are of a nominal interoperable 6.35 mm diameter. Alternative embodiments of the pin-latching system may have a latching pin diameter within a conceivable range of about 5 mm or more, about 7 mm or more, about 10 mm or more or any value between and including the diameter values provided, while it is preferred that the nominal interoperable pin diameter be 6.35 mm with a preferred range of 5.5-7 mm because this provides a sufficient strength, light weight, industry sizing compatibility, and mass sufficient for strong actuating forces. Since the QUAD standard embodiment calls for there to be a nominal gap of only 3.81 mm between the solenoid body block and the edge of the EPC surface deck at the location of the hole into which the pin inserts, these pins are loaded mainly in shear. Alternative embodiments of the pin-latching system may have a gap within a conceivable range of about 3.5 mm or more, about 5 mm or more, about 7 mm or more, or any value between and including the gap values provided, while it is preferred that the nominal interoperable gap value be 3.81 mm with a preferred range of 3.5-5 mm because this provides the minimum gap that offers sufficient clearance for rapid loading, light weight, avoidance of bending loads, and shear strength sufficient for the expected loads. The pin's shear strength of 896,324 kPa can enable each pin to withstand a shear load of over 26689N and thus provide highly weight-efficient fixation of movable loads.

This invention uses a comprehensive approach to fulfill the several requirements of on-demand mass transportation with a combination of specific technologic, operational and process innovations that, together, comprise a new, sustainable, environmentally friendly system. The several components of the QUAD system comprise a new and unique combination distinct from other models of urban air mobility by combining efficient, ultra-quiet, autonomous or optionally piloted ESTOL aircraft that haul either passengers or cargo or both with interoperable carts capable of rapid, automatic solenoid-actuated latching with pre-boarding of passengers and pre-loading of cargo. In its entirety, community acceptability, specificity, precision, interoperability, standards, affordability, environmental friendliness and mass capacity, this invention differs substantially and in numerous ways from all prior visions, models and proposals for urban on-demand aviation services.

QUAD can fulfill the need for an efficient, electric-powered public transportation system in which the entire trip from doorstep to doorstep is made as quickly and as safely as possible with a minimum of inconvenience or discomfort. The modal changes from walking to surface vehicle to air vehicle and back again must be facilitated by the adoption of four basic components of the QUAD transportation system: 1) its highly distributed network of accessible, small standardized airparks (SkyNests); 2) its autonomous robotic surface cart vehicles, the EPC and RDC; 3) its versatile ultra-quiet, V/ESTOL SkyQarts; and 4) the corollary standards and nominal magnitudes for its interoperable components. QUAD must provide these four components in a way that can fulfill the needs of everyone, including the disabled, injured, incapacitated, elderly and small children. QUAD must also provide these in a way that can fulfill the most common needs of commercial, public and private hauling of cargo, delivery parcels, building materials, equipment, tools and supplies.

Uncertain travel times happen mainly due to surface congestion, which is typically prevalent on freeways in urban and suburban areas. Uncertainty time is typically minimized on residential streets. The QUAD system minimizes uncertainty time by avoiding travel on freeways and by instead using small neighborhood electric vehicles called robotic delivery carts (RDC) that can use residential streets and bicycle lanes for what in the USA is called "last mile" connectivity, i.e. neighborhood delivery, thereby largely avoiding freeway and other congestion delays.

SkyNests must offer consistent standards in size, equipment and facilities in order to fit the cart vehicles defined herein and to efficiently achieve high capacities and safe operations. These standards are as important as those for the gauge of railroad tracks. For the sake of reducing costs and speeding implementation, these standards are intended to be international and are conceived to respect international cultural, dimensional and regulatory requirements. This invention includes the specifications and operational descriptions of these standards. SkyNests for QUAD must be small enough that they can be sited very near to where people live and work. Such high proximity siting also calls for operations at these SkyNests and the SkyQarts that fly there to fulfill three important but conflicted requirements, which are: 1) safe, high capacity and high proximity operations and 2) community-acceptable levels of aircraft noise and 3) precise, 4D steep approach and climb-out gradients. The simultaneous fulfillment of these three requirements distinguishes QUAD from all other prior art.

SkyNests must be sited with high proximity to where people live and work in highly distributed networks across urban/suburban areas as shared community assets. Such high-proximity siting means the SkyNest site can be reached in a minimum of ground travel time. This brief ground travel time is important to offering QUAD travelers the benefit of saving more than 30 minutes on flights as short as 16 km, a benefit that helps QUAD reach a meaningful mass-market size that can deliver its many societal benefits. In the example case, users can travel up to 4 km on non-gridlocked residential streets at an average of 40.2 km to reach a SkyNest in less than 6 minutes (i.e., $\frac{1}{10}^{th}$ of an hour). The vehicle used for that surface travel could be any of a number of specialized ground vehicles, including a bicycle, scooter, Low-Speed Vehicle (LSV), Neighborhood Electric Vehicle (NEV), modified golf cart as well as a Robotic Delivery Cart (RDC) as described herein. If communities allocate a nominal 1.28 ha land parcel for a SkyNest I to be sited at the center of every circle of 8 km diameter, each SkyNest I requires only 0.63% of the land area of the neighborhood that it serves. As a general guideline to the ideal ubiquity of SkyNests, a city should have about one SkyNest for every two of its high schools. From any SkyNest, commuters could save time and parking or bridge fees by riding a SkyQart to any of the widely distributed SkyNests in the QUAD system. SkyQart operations must be safe and quiet enough to cause minimal fear and noise annoyance to the neighbors living nearby the SkyNest. Vertical take-off and landing (VTOL), tilt-wing, tilt-rotor or multi-rotor (copter) aircraft are inherently noisier than fixed wing aircraft and so would require larger SkyNests in order to be community acceptable. The siting of these larger SkyNests would usually entail less proximity to where people live and so would adversely increase the ground travel time that is important to economic feasibility. In addition, VTOL tilt-wing, tilt-rotor or multi-rotor (copter) aircraft typically require more time for hovering approaches and departures that reduce operational capacity. Therefore, although VTOL, tilt-wing, tilt-rotor or multi-rotor (copter) designs as alternative embodiments could theoretically be used in the QUAD system if they offered compatible dock loading, the nominal interoperable and preferred embodiment of the SkyQart presented herein is that of a fixed-wing aircraft.

The multiple system and vehicle requirements of QUAD are irrevocably inter-dependent, and they constrain the actual design requirements of its SkyQart aircraft, its SkyNests and its operational components. The area needed for a SkyNest is within a conceivable range of between 0.4 and 5.0 ha, with a nominal area of 1.28 ha and a preferred range of 1.2-2.4 ha. SkyNest facilities must include compatible docking and processing equipment for both vehicles and passengers. There is a 'just-right' set of performance and capability requirements for the SkyQart aircraft that can provide high capacity operations and precise, 4D, steep flight paths at such SkyNests. These necessary aircraft performance capabilities can only be achieved by the combination of several innovations and technologies into the new category of aircraft named herein as the SkyQart. The fixed-wing SkyQart aircraft presented herein represent the nominal interoperable embodiments but not the only embodiments of the flight vehicles that can serve in the QUAD system.

The mission requirements of the aircraft necessary to QUAD are of a knowable range and they comprise an integral part of this invention. These mission requirements dictate that the SkyQart be a new and unique category of aircraft, the nominal interoperable embodiment of which will have the features, innovations and performance capabilities described herein.

The invention(s) in this patent are distinguished as unique because they define the detailed, specific, and concerted processes, ultra-quiet electric-powered vehicles, components, landing facilities and standards necessary for a sustainable, highly distributed, interoperable, comprehensive on-demand system of mass transportation and cargo delivery by air for urban mega-regions and beyond. In order to be sustainable at the scale necessary for mass transportation, with its automated, high-capacity operations at SkyNests, QUAD requires this strictly defined, comprehensive set of integrated standards, specifications, performance capabilities and concepts of operations for its SkyNests and its air and ground vehicles. The QUAD SkyQarts are integrated and networked with other specialized electric-powered surface vehicles, facilities and accessories that enable high-capacity operations at SkyNests. This invention is a public transportation system that includes the vehicles, facilities, accessories and operations as its important components. This invention employs electric aircraft technologies and their practical application to sustainable transportation solutions that can meaningfully benefit society and enhance productivity while reducing surface gridlock, infrastructure costs and greenhouse gas emissions.

The importance of interoperability of components in the QUAD system means that they are to be taken as an integrated system of components that are interdependent. The many components of the QUAD system enable one another so as to enhance the overall system efficiency, capacity and affordability. Their interdependency means that changing the magnitude of any one parameter of a component specified herein as the nominal interoperable magnitude, in terms of its size, weight or performance, will for the sake of interoperability, require the changing of related parameters on a number of other components of the QUAD system. In addition, this interdependency of the components of the QUAD system and their relative uselessness as stand-alone components affirms the need for these several components to be patented as a transportation system rather than as separate patents. Changes from the standards and nominal interoperable magnitudes presented in the embodiments herein that nevertheless remain within the conceivable ranges cited herein are therefore part of this invention. For all of the variants of SkyQarts and autonomous robotic electric vehicles described herein, the present invention is susceptible of embodiment in different forms. There is shown in the drawings and herein described in detail one or more specific embodiments, with the understanding that the present drawings, disclosure and claims are exemplary of the principles and concepts of operation of the system as an invention as comprising an article that is a complete, integrated and interoperable transportation system. These specific embodiments are not intended to limit the invention to only those specific embodiments that are shown and described. Moreover, while the representative embodiments herein have been described in specific detail with certain components in exemplary configurations that can demonstrate and serve as interoperable standards, it will be understood by one of ordinary skill in the art that other conceivable combinations of embodiments can be implemented using similar but different specifications, configurations and/or different components. For example, it will be understood by one of ordinary skill in the art that the size, shape, speed, operation or number of certain components can be altered without substantially impairing or changing the concept or functioning of this invention's interoperable transportation system, provided that such alterations are made interoperable. The representative embodiments and disclosed subject matter, which have been described in detail herein, are presented by way of example and illustration and not by way of limitation or exclusion of other variants, it will be understood by those skilled in the art that various changes may be made in the form and details of the described embodiments resulting in equivalent embodiments that remain within the scope of the appended claims.

The SkyNest Dock Standards include a 47 cm dock height. The dock height requires the adoption of a standard because it is deterministic of several other dimensional magnitudes in the QUAD transportation system. Alternative embodiments of the dock standards may have a dock height within a conceivable range of about 41 cm or more, about 44 cm or more, about 50 cm or more, about 61 cm or more or any value between and including the dock height values provided, while it is preferred that the nominal interoperable dock height be 47 cm with a preferred range of 45-50 cm because this provides a height low enough to fit a SkyQart's low-set cabin floor height (which is essential to its short take-off capability without wheelies) and to allow an adult human to climb up onto the dock as needed, while still being high enough to provide room underneath the dock for battery swapping equipment, service bays and parked main landing gear tires. The under-dock service bay is large enough to contain robotic battery swapping using SBP drawer slides and battery charging racks. The nominal interoperable dock width is 7.47 m. Alternative embodiments of the dock width may have a width within a conceivable range of about 6 m or more, about 9 m or more, about 12 mm or more or any value between and including the width values provided, while it is preferred that the nominal interoperable dock width be 7.47 m with a preferred range of 7-8 m as this provides sufficient room for bi-directional passenger walkways that preserve social distancing, along with adequate width for under-dock service bays and for EPC carts to safely maneuver on the dock surface, with a dock width that is still small enough to limit land parcel size and expedite passenger throughput.

The battery charging rack under the dock for robotic battery swapping.

The robotic battery swapping underneath the dock using a specialized robot arm that can swap an SBP in a SkyQart in under 1 minute and nominally in only 10 seconds.

The Axisymmetric Fuselage Pod (AFP)

The axisymmetric fuselage pod (AFP) is an important component to this invention because its shape enables two key capabilities of the SkyQart aircraft used in the QUAD system; longer flight range and rapid loading and unloading of payloads. The AFP is a streamlined shape with a nominal interoperable 160.02 cm (range is from 125 to 180 cm) maximum outside diameter. Alternative embodiments of the AFP may have a maximum outside diameter within a conceivable range of about 125 cm or more, about 150 cm or more, about 180 cm or more or any value between and including the diameter values provided, while it is preferred that the AFP diameter be the nominal interoperable size of 160.02 cm with a preferred range of 150-165 cm because this provides sufficient room for passengers, common cargo, battery pack and active landing gear while being small enough to minimize wetted area drag, weight, and cost. The AFP shape has a nominal 2.93 to 1 fineness ratio of length to width, giving the embodiment as presented herein a total length, $L_d$, of 4.69 m. It is a body shape whose computational fluid dynamics predict a very low form drag and it serves as the fuselage and cabin of the SkyQart. To minimize drag and maximize range for the SkyQart, the size of the AFP is chosen as the smallest that can adequately and comfortably enclose the most common types of payloads that need to be carried in QUAD. Those most common types of QUAD payloads are expected to be two adult people seated side-by-side or a cargo whose maximum horizontal dimensions are 121.92 cm by 243.84 cm. The rear portion of the AFP forms a hatch that is effectively a door that opens on a sturdy hinge and swings 90° to the side and upward at an 18° angle. With the nominal interoperable 2.54 cm wall thickness of the AFP, the open hatch provides a large, 151.7 cm opening that allows rapid loading and unloading at the dock of EPCs laden with various types of payloads. Alternative embodiments of the AFP may have a wall thickness within a conceivable range of about 1.27 cm or more, about 2 cm or more, about 3.81 cm or more or any value between and including the thickness values provided, while it is preferred that the wall thickness be the nominal interoperable 2.54 cm with a preferred range of 2-3.5 cm because this provides a preferred combination of strength, low weight, industry sizing compatibility, hatch opening size and internal space. The AFP's hatch opening also exposes a DC fast-charger interface plug that can be used for recharging the SkyQart's standard swappable battery pack (SBP). The rear portion of the AFP fuselage aft of the hatch also serves as a floatation device. Its internal volume, like that of other empty volume spaces in the SkyQart, is sealed and filled with buoyant rigid closed-cell foam. The sealed foam in the rear hatch is divided into three compartments, two of which are removable modules that, when removed, can provide additional space for passenger seats to recline or for outsized baggage and cargo. Flotation module #1 is nominally 55.9 cm L×114.3 cm H×122 cm W. It is nominally 122 cm wide at the fuselage waterline of the seat armrests, narrowing to 101.6 cm wide at the shoulder waterline. These dimensions would change for alternative embodiments within the size ranges given for the AFP. The bottom of module #1 is at the waterline of the cabin floor of the SkyQart. Module #1 fits into the rear hatch in a recess in the upper front surface of flotation module #2. The absence of this module #1 offers an empty volume of space in which the rear baggage bin and the upper rear portion of the rear seats of a two-seat EPC can recline rearward up to 30°, regardless of which of the four latching pin receptacles are used by the EPC. This empty volume of space is also large enough to contain the larger cargo that occurs when the Main Cargo Box includes both its forward and aft cargo extension boxes. This empty volume of space from module #1 is also useful to contain payload in the case of a three-seat EPC, though the space available for reclining the rear seats and smaller rear baggage bin are in that case more limited. The other removable flotation module, module #2, is much larger and is removed when carrying an EPC loaded with out-sized, extra-long cargo such as building materials. It has a carve-out on its forward face that exactly fits the shape of module #1 and provides a small strap fastener for joining module #1 to module #2. Excepting the volume of module #1, the volume of module #2 completely fills the interior volume that extends 96.52 cm aftward into the rear hatch from the hatch opening. All other internal volume space of the rear hatch, excluding that of Module #1 and Module #2, is likewise sealed and filled with buoyant rigid closed-cell foam.

The rear hatch of the pod can be displaced aftward by the insertion of a nominal 60.96 cm length of cylindrical fuselage extension to create a larger AFP with enough space to carry standard building materials. These building materials, when properly loaded, can be as large as 122 cm×244 cm sheets of plywood or 365.8 cm lengths of "two by twelve" lumber[3] that is 3.8 cm high×28.6 cm wide. These and other building materials can be stacked atop a special cargo hauling attachment that is a latching rack that pin-latches to the EPC's seat latching tracks. Alternatively, several other cargo hauling attachments for other types of cargo can pin-latch to the EPC's seat latching tracks. The surface of the special rack is a nominal 30.5 cm above the EPC's deck surface so that, when the building materials are securely strapped to this rack, they will be in an axial position inside the cargo AFP that offers a space of maximum length for the 365.8 cm long lumber.

The axisymmetric fuselage pod's scalable surface coordinates, relative to the total length, $L_t$ of its central axis, are given in the Table 1, below, and are designated as the fractions $X/L_t$ and $Y/L_t$. The parameter X/Lt is the longitudinal coordinate given as a fraction of the total length, $L_t$. The parameter $Y/L_t$ is the vertical or thickness coordinate given as a fraction of the total length, $L_t$. It will be noted that the diameter of the AFP, at any point $X/L_t$ along its central axis where $Y/L_t$ is known, is therefore equal to $(2 \times Y/L_t) \times L_t$. An example of this calculation of the diameter of the present standard embodiment, taken from Table 1, below, is that where $X/L_t = 0.471$ and $Y/L_t = 0.169$ and $L_t = 4.69$ m, the diameter at that longitudinal station of the AFP will be $(2 \times 0.169) \times 4.69$ m = 1.585 m.

TABLE 1

Axisymmetric Fuselage Pod Surface Coordinates

| $X/L_t$ | $Y/L_t$ | $X/L_t$ | $Y/L_t$ |
|---|---|---|---|
| 0.000 | 0.000 | 0.471 | 0.169 |
| 0.000 | 0.002 | 0.483 | 0.170 |
| 0.001 | 0.006 | 0.494 | 0.170 |
| 0.001 | 0.010 | 0.506 | 0.171 |
| 0.003 | 0.014 | 0.517 | 0.171 |
| 0.006 | 0.020 | 0.529 | 0.170 |
| 0.010 | 0.025 | 0.540 | 0.170 |
| 0.014 | 0.031 | 0.552 | 0.170 |
| 0.017 | 0.034 | 0.563 | 0.169 |
| 0.023 | 0.039 | 0.575 | 0.169 |
| 0.029 | 0.044 | 0.586 | 0.168 |
| 0.034 | 0.048 | 0.598 | 0.167 |
| 0.040 | 0.052 | 0.609 | 0.166 |
| 0.046 | 0.055 | 0.621 | 0.164 |
| 0.057 | 0.062 | 0.632 | 0.162 |
| 0.069 | 0.068 | 0.644 | 0.160 |
| 0.080 | 0.073 | 0.655 | 0.158 |
| 0.092 | 0.078 | 0.667 | 0.155 |
| 0.103 | 0.083 | 0.678 | 0.151 |
| 0.115 | 0.087 | 0.690 | 0.147 |
| 0.126 | 0.091 | 0.701 | 0.143 |
| 0.138 | 0.096 | 0.713 | 0.138 |
| 0.149 | 0.099 | 0.724 | 0.133 |
| 0.161 | 0.103 | 0.736 | 0.127 |
| 0.172 | 0.107 | 0.747 | 0.121 |
| 0.184 | 0.111 | 0.759 | 0.115 |
| 0.195 | 0.114 | 0.770 | 0.108 |
| 0.207 | 0.118 | 0.782 | 0.101 |
| 0.218 | 0.121 | 0.793 | 0.093 |
| 0.230 | 0.124 | 0.805 | 0.086 |
| 0.241 | 0.128 | 0.816 | 0.078 |
| 0.253 | 0.131 | 0.828 | 0.071 |
| 0.264 | 0.134 | 0.839 | 0.064 |
| 0.276 | 0.137 | 0.851 | 0.057 |
| 0.287 | 0.140 | 0.862 | 0.051 |
| 0.299 | 0.143 | 0.874 | 0.045 |
| 0.310 | 0.145 | 0.885 | 0.040 |
| 0.322 | 0.148 | 0.897 | 0.035 |
| 0.333 | 0.150 | 0.908 | 0.030 |
| 0.345 | 0.153 | 0.920 | 0.025 |
| 0.356 | 0.155 | 0.931 | 0.021 |
| 0.368 | 0.157 | 0.943 | 0.017 |
| 0.379 | 0.159 | 0.954 | 0.014 |
| 0.391 | 0.160 | 0.966 | 0.010 |
| 0.402 | 0.162 | 0.977 | 0.007 |
| 0.414 | 0.164 | 0.983 | 0.006 |
| 0.425 | 0.165 | 0.989 | 0.005 |
| 0.437 | 0.166 | 0.994 | 0.005 |
| 0.448 | 0.167 | 0.997 | 0.005 |
| 0.460 | 0.168 | 1.000 | 0.005 |

The smoothly curved continuity of the AFP's stressed composite skin is interrupted only for the openings for the rear hatch, the nosewheel landing gear well, the two main landing gear trunnion pillow block bearings, the rooftop monostrut attachment opening, the two windscreens and the two large circular side windows, which also serve as emergency exits. All openings are kept as small as possible to maintain the strength and smoothness of the AFP. The edges and gaps of all openings are faired to smoothly continue the AFP's external shape and their gaps are made as narrow as possible. Embedded into the nominal 2.54 cm thick composite sandwich that comprises the skin of the AFP are several reinforced carbon fiber ribs, bulkheads, spines, stringers, ribs and longerons, most of these with a cross-sectional shape that is a hat-section. The midline longitudinal roof spine that separates the two windshields is a nominal 8.9 cm in width, and it has a material thickness that bears major structural loads imposed by the nosegear and AFP rooftop monostrut main wing attachments. The AFP also has a mid-fuselage circular circumferential structural bulkhead that is embedded into the skin of the AFP and that reinforces its floorboards and its other spines, stringers, longerons and bulkheads, while also spreading the loads from the forward wing attachment onto the roof of the AFP. There is a diagonal embedded bulkhead that joins the lower portion of the mid-fuselage bulkhead to the more aftward circular hatch door bulkhead and spreads the loads from the main wing attachment on the roof of the AFP to the AFP's lower and forward structures. There is a long horizontal longeron that joins the rear bulkhead to the middle, diagonal and forward bulkheads and stiffens the side of the AFP. The circular rear bulkhead of the AFP stiffens its rear hatch opening and dissipates loads from both the wing and the main landing gear. The reinforced monostrut attachment points and other hard-points are molded into the composite structure of the AFP at the time of its manufacturing and cure, and they each have several smaller reinforced micro-ribs radiating outward from them in order to more widely spread the attachment loads organically onto the walls of the AFP. Some of the ribs, roof spine, bulkheads and longerons are structural items that may have wiring harnesses embedded inside them with outer shielding of those harnesses that dissipates and diffuses lightning and radio frequency interference (RFI) energy away from critical structures and components. In some embodiments, some of these structural items in the walls of the AFP may also contain flight control cables. The port and starboard side of the AFP each have a circular cabin side window of a nominal interoperable 71.12 cm diameter that serves as an emergency escape exit in accordance with FAR 23.807. Alternative embodiments of the emergency escape exit windows may have a diameter within a conceivable range of about 61 cm or more, about 81 cm or more, about 91.5 cm or more or any value between and including the diameter values provided, while it is preferred that the window diameter be the nominal interoperable 71.12 cm because this provides a preferred combination of sufficient size, lower weight, FAA compliance, outward field of view and minimized disruption of the AFP's stiffness and surface smoothness. Each emergency exit window has a window frame that is a structurally reinforced ring that itself serves as a bulkhead that adds to the strength and shape integrity of the AFP. The window frame on the AFP has a smoothly rounded cross-section so that it can safely serve as an emergency exit. The circular windows themselves are made of clear acrylic or polycarbonate and are of a nominal thickness of 4.76 mm. Each window has an internal perimeter flange that closely fits the window frame and that ensures that the window cannot be pushed or sucked out of the AFP at any time. The perimeter flange is indexed with dowel pins to ensure that the window is always correctly installed on the window frame. There are a number of finger-grip holes in the internal surface of the window's perimeter flange to facilitate gripping and pulling the window inward toward the SkyQart's cabin in the event that it is to be used as an emergency exit. Before doing so, the thin peelable sealing tape that seals the perimeter flange of the window to the inner wall of the AFP needs to be manually stripped away, and this can be readily performed by a person of ordinary strength and dexterity. Peeling this tape is facilitated by the provision of small grip rolls at the ends of the tape. Both the window perimeter flange and the window frame are equipped with specially located narrow grooves that run entirely around the circle of the window and that engage the flexible nipples on the extruded external rubber seal that is pressed into the external gap between the window and the window frame. This rubber seal may be pressed or lightly glued in place such that its edges form a flush interface with the external contour of the AFP. Both this rubber seal and the internal sealing tape on the window flange serve to secure the window to the aircraft and prevent air leaks around its perimeter. Both the rubber seal and the sealing tape are replaceable are both are designed to allow easy removal of the window in case of an emergency. In extreme emergencies, the circular window can be removed by forcibly pushing or kicking it inward toward the cabin from the outside of the aircraft.

The SkyQart I and SkyQart II

The SkyQart I and II are important components to this invention. They are specialized, standardized small fixed-wing aircraft expressly designed for the QUAD system to provide efficient hauling of the most common types of payload across distances of from as little as 16 km to more than 220 km. Its size, docking connections, power, speed, and short runway capabilities are chosen as workable standards to fit the processes and dimensions of the QUAD transportation system. Its core mission requirements are nominally:

a SkyQart that takes off within 43.9 m (144 feet) of its point of brake release at sea level in zero wind. Alternative embodiments of the SkyQarts may have a take-off distance within a conceivable range of about 0 m or more, about 35 m or more, about 52 m or more, about 68 m or any value between and including the said distances provided, while it is preferred that the take-off distance be the nominal interoperable 43.9 m with a preferred range of 40-50 m because this provides a combination of tolerable G forces, low noise emissions, safe lift-off speeds and SkyNests that comprise small land parcels.

a SkyQart that has a cruise flight airspeed of at least 193 km/hr at an altitude that is less than or equal to 914.4 m (3000') above mean sea level. Alternative embodiments of the SkyQarts may have a cruise speed within a conceivable range of about 140 km/hr or more, about 210 km/hr or more, about 240 km/hr or more, or any value between and including the cruise speeds provided, while it is preferred that the cruise speed be the nominal interoperable 193 km/hr with a preferred range of 180-225 km/hr as this provides a preferred combination of short runway capabilities, reduced land parcel size, improved energy efficiency, enhanced range, manageable power requirements and air traffic coordination.

a SkyQart that has a flight range of at least 193 km with 10-minute reserve. Alternative embodiments of the SkyQarts may have a flight range within a conceivable range of about 100 km or more, about 170 km or more, about 240 km or more, or any value between and including the maximum range values provided, while it is preferred that the nominal interoperable maximum range be ≥193 km with a preferred range of 140-200 km because this provides a workable compromise in terms of safety, minimizing battery swaps, minimizing battery pack weight, extending ridership possibilities, improving ride quality and reducing aircraft docking station size requirements.

a SkyQart whose maximum rate of climb at gross weight is at least 9.14 m/sec at an indicated airspeed of 24 m/sec at sea level. Alternative embodiments of the SkyQarts may have a maximum rate of climb within a conceivable range of about 6 m/sec or more, about 8 m/sec or more, about 10 m/sec or more, about 12 m/sec or more or any rate between and including the maximum rates provided, while it is preferred that the maximum rate of climb be ≥9.14 m/sec with a preferred range of 8-10 m/sec because this, along with curved traffic patterns, provides a sufficiently rapid gain of height to keep the acceptable noise sphere inside the boundaries of the SkyNest without demanding excessive amounts of installed power, excessive noise or unwieldly long wingspans, and this helps to keep the SkyNest land parcels small enough to enable them to be sited with high proximity to where people and goods needs to go.

a SkyQart whose maximum take-off noise emission is ≤55 dBA LAeq, 5 s as measured at 1 m height above ground level at a 40 m distance along any radius extending outward from the midline of the aircraft's nose. Alternative embodiments of the SkyQarts may have a maximum take-off noise emission within a conceivable range of about 42 dBA LAeq, 5 s or less, about 48 dBA LAeq, 5 s or less, about 57 dBA LAeq, 5 s or less or any value between and including the maximum levels provided, while it is preferred that the maximum level be the nominal interoperable level of ≤55 dBA LAeq, 5 s with a preferred range of 50-57 dBA because this offers the best compromise in the power, thrust, propeller diameter and RPM needed while minimizing the size of the SkyNest land parcel necessary to contain the acceptable noise sphere.

a SkyQart that can carry an EPC that has one or two seats or Qusheats, each of which has a capacity of 120 kg or more.

a SkyQart that can carry an EPC that has three seats or Qusheats, each of which has a capacity of 91 kg or more.

The nominal embodiments of the SkyQart I and II presented herein each are 6.7 m long and have a nominal interoperable wingspan of 10.97 m. Alternative embodiments of the SkyQarts may have a wingspan within a conceivable range of about 8 m or more, about 10 m or more, about 12 m or more, about 14 m or more or any value between and including the wingspans provided, while it is preferred that the wingspan be the nominal interoperable 10.97 m with a preferred range of 10-12 m because this provides a manageable wing weight and ride quality, an efficient aspect ratio and maximum glide ratio, a sufficiently rapid gain of height to keep the acceptable noise sphere inside the boundaries of the SkyNest without demanding excessive amounts of installed power, excessive noise or unwieldly long wingspans, and this helps to keep the SkyNest land parcels small enough to enable them to be sited with high proximity to where people and goods needs to go.

The SkyQart I and II each have a nominal interoperable wing area of 11.44 sq m. Alternative embodiments of the SkyQarts may have a wing area within a conceivable range of about 10 sq m or more, about 12 sq m or more, about 14 sq m or more, about 16 sq m or more or any value between and including the wing areas provided, while it is preferred that the wing area be the nominal interoperable 11.44 sq m with a preferred range of 11-13 sq m because this, along with the high lift coefficient of the SkyQart's fast flap system, provides a low enough stall speed without demanding excessive amounts of wetted area drag, installed power or excessive noise, and this enables the ESTOL performance that helps to keep the SkyNest land parcels small enough to enable them to be sited with high proximity to where people and goods needs to go.

The SkyQart I and II each have a nominal interoperable maximum gross weight of 857 kg. Alternative embodiments of the SkyQarts may have a maximum gross weight within a conceivable range of about 800 kg or more, about 900 kg or more, about 1050 kg or more, about 1220 kg or more or any weight between and including the maximum gross weights provided, while it is preferred that the maximum gross weight be the nominal interoperable 857 kg with a preferred range of 840-900 kg because this provides a sufficiently rapid gain of height during climb-out to keep the acceptable noise sphere inside the boundaries of the SkyNest without demanding excessive amounts of installed power, excessive noise or unwieldly long wingspans, and this helps to keep the SkyNest land parcels small enough to enable them to be sited with high proximity to where people and goods needs to go.

a SkyQart that has a 20° forward sweep in the trailing edge of its vertical tail.

a SkyQart that has a main wing aspect ratio of 10.525:1. Alternative embodiments of the SkyQarts may have a wing aspect ratio within a conceivable range of about 8 or more, about 12 or more, about 14 or more or any aspect ratio between and including the aspect ratios provided, while the nominal interoperable aspect ratio of 10.525:1 is preferred with a preferred range of 10:1 to 12:1 because it provides an energy efficient airframe with reduced induced drag and a manageable wing weight, and reduces the demand for climb power and thereby averts excessive noise.

a SkyQart that has a main wing that has double-slotted flaps of large span.

a SkyQart that has a trailing edge of the main wing that is swept forward by a nominal 8.2° with a nominal 142.3 cm wing chord at the fuselage midline.

a SkyQart that has a nominal wing chord that tapers to 140.3 cm at the flap root, where the nested flap segments occupy a nominal chord length of 45.8 cm.

a SkyQart that has a total flap span that is a nominal 71.82% of the total wingspan.

a SkyQart that has its mid-point of the range of acceptable e.g.s located nominally at the fuselage station (FS) 200.6 cm.

Alternative embodiments of the SkyQart I and II may have measurements that are different from these nominal ones given herein, and those differences may or may not be made compatible and interoperable with the other components of the QUAD transportation system, though component compatibility and interoperability are very important to sustaining such a transportation system.

a SkyQart that has a nominal aileron chord that is 28.%% of the wing chord at the inboard aileron edge.

a SkyQart that has a wing mean aerodynamic chord (m.a.c.) that is nominally 118.5 cm.

a SkyQart that has flaps that, when fully deployed and blown by the propellers, can produce a maximum lift coefficient of ≥4.8. The flaps have their high lift coefficient substantially augmented or reduced on demand by modulating the airflow over the flaps by varying the thrust or drag of the large propellers.

The nominal interoperable height of the AFP belly skin above ground level is 21.6 cm. Alternative embodiments of the SkyQarts may have a belly height above ground level with a conceivable range of about 17 cm or more, about 23 cm or more, about 30 cm or more or any height between and including the belly heights provided, while it is preferred that the belly height be the nominal interoperable 21.6 cm with a preferred range of 18-24 cm because this provides a low center of gravity to avoid wheelies on take-off while providing sufficient height to allow a long travel of the landing gear, a workable dock height and enough space for the standard swappable battery pack (SBP) to be carried below the SkyQart's cabin floor. The standard cabin floor height is 47 cm above ground level, which matches the preferred standard dock height of the upper surface of the SkyNest docks. These standard dimensions for belly height, cabin floor height and dock height are deterministic for other components including the tire and wheelpant height, dock height, seat height, cabin headroom, elbowroom, rear hatch swing clearance, main landing gear trunnion pillow block bearing track width, EPC track width, resistance to wheelies, and other component parameters. This means that if the AFP cabin floor height is changed in alternative embodiments of the SkyQarts, then the dimensions of all of these other interoperable components will be compelled to also change. These interdependencies of these components clarify and emphasize the need for the nominal interoperable QUAD transportation system to provide herein a set of 'just-right' standards that are internally consistent, mutually compatible, and scaled to about the $95^{th}$ percentile of human needs.

To make room for the size of a standardized battery pack (SBP) with sufficient energy for the SkyQart's performance envelope, the top surface of the cabin floor of the SkyQart is nominally located 25.4 cm above the lowest point on the belly skin of the AFP.

The wing chord at the SkyQart I and II ailerons outer edge is nominally 52.5 cm. The aileron chord at its outer edge is nominally 14 cm, which is 26.48% of wing chord at that station. The aileron chord at its inner edge is nominally 24 cm, which is 28.96% of wing chord at that station. The main wing trailing edge has a nominal 8.14° angle of forward sweep.

The SkyQart's tail height is nominally 400.1 cm tall. The tall tail offers improved headroom at the ramp/dock area underneath the tail, and ensures that the autonomous robotic electric payload cart (EPC) can operate on the dock without bumping heads of passengers on the empennage of the SkyQarts docked there. In addition, the tall tail offers a large wetted area above the wing that helps balance the drag of the wetted area of the pod below the wing. The SkyQart's pod-shaped fuselage, the AFP, has a nominal outside diameter of 160.02 cm and a fineness ratio of 2.93:1. Its shape coordinates are chosen for very low drag and its autonomous rear hatch opening facilitates rapid loading and unloading of the EPC. Interference drag is minimized by having the cantilevered wing attach to the AFP using a molded-in large surface spar extension that attaches in a removable fashion to the streamlined midline mono-strut of the AFP. The monostrut is important to the low drag of the SkyQart's fuselage pod. The monostrut uses a GOE 460 airfoil shape, which is symmetrical. This airfoil is truncated at its trailing edge to reduce wetted area. This airfoil is selected because its footprint onto the pod roof is one that rapidly grows in width and maintains good width across most of its attachment zone to the pod roof, thereby giving a strong broad base for the attachment of the AFP via the monostrut to the wing's lower surface. The leading edge of that footprint extends along the midline of the AFP, forward of the main wing's leading edge, to a point that intersects the AFP's outer skin at a reinforced point that is nominally just 2.54 cm aft of the rear edge of the windshields. The GOE 460 airfoil is deliberately chosen because it is a thick airfoil in order to broaden and strengthen the monostrut attachment to the pod and to the wing. An optional way to strengthen the attachment of the AFP to the main wing is by the addition of diagonal wing struts to the monostrut. Such diagonal wing struts are commonly used on the familiar Cessna 172, for example. Such diagonal wing struts can reduce wing weight while imposing a penalty on drag. Diagonal wing struts are not used on the nominal embodiments of the SkyQarts presented herein. However, they could be used on some future alternative embodiments of SkyQarts and still be encompassed by this patent. If used, there would be one diagonal wing strut on the starboard wing and one on the port wing. Each of these would have an airfoil shape to its cross section and could have its upper end attach to the main wing spar through an opening in the lower surface of the wing on or near the inboard edge of the motor nacelle. That strut could then have its lower end attach structurally to the main longeron that is embedded into the sidewall of the AFP. The maximum chord of the monostrut GOE 460 airfoil is in that portion near the top of the monostrut, where the airfoil is nominally 36.2 cm thick. At the bottom of the monostrut, the GOE 460 airfoil is nominally 33 cm thick. The GOE 460 airfoil shape transitions into a wider (spanwise) shape as it joins the lower surface of the wing, with fillet radii to reduce interference drag and to increase its grip on the wing structure. This wider shape continues into the tailcone and comprises the forward portion of said tailcone. The tailcone is nominally 63.5 cm wide at the trailing edge (TE) of the wing, and the waterline of the tailcone is positioned to intersect the wing so as to achieve the lower drag attained by a mid-fuselage wing arrangement. The gradual tapering reduction of the tailcone's cross-sectional area begins just aft of the wing trailing edge. At the fuselage station that coincides with the rearmost edge of the rear hatch when the rear hatch is fully opened to 90°, the belly of the tailcone is nominally 198.2 cm above the ground level, enabling a walk-under height adequate even for tall people. When docked, the walk-under height from the dock surface to the lower skin of the tailcone at this same fuselage station is nominally 151.3 cm. This 151.3 cm is a height tall enough to allow even the tallest laden EPCs to drive on the dock underneath the tailcone with more than 25.4 cm clearance.

The wing and empennage can be removed from the axisymmetric fuselage pod for maintenance, repair and replacement. The wing can likewise be removed from the empennage and tail cone at a separation bulkhead in the tailcone just aft of the monostrut.

The propeller disc plane of the SkyQart propellers are both at the nominal fuselage station 81.3 cm aft of the datum, which datum is the external tip of the nose of the AFP. The propeller thrust axis of each propeller is nominally 211.2 cm above the ground. This ensures adequate ground clearance for the propeller blades of nominally 152.4 cm radius and enables the propeller thrust to help reduce wheelies on take-off. The propeller disc plane and ground clearance are different for the propellers on the dual-AFP version named herein as the SkyQart III.

The SkyQart's main landing gear is equipped with wheelmotors that are active in controlling its ground operations including take-off acceleration, speed and positioning. The main landing gear wheelmotors also have a programmable energy regeneration system that provides precise and powerful anti-lock regenerative braking. The main landing gear legs attach to their shared crossbar trunnion through a sturdy dropped arm that ensures that the landing gear legs do not scrape on the underside of the dock during docking. Each main landing gear leg has a programmable electro-mechanical actuator system that both absorbs landing loads at a precisely controlled rate and controls ride height and fuselage pitch angle. The active main landing gear offers a nominal maximum travel of 65.02 cm from full down to full up, and the programmable absorption utilizes all 63.5 cm on each landing touch-down to provide comfortable landings with no bounce or rebound and with GRACE. Alternative embodiments of the SkyQarts may have a maximum landing gear travel within a conceivable range of about 30 cm or more, about 50 cm or more, about 70 cm or more, about 80 cm or more or any value between and including the maximum travel dimensions provided, though it is preferred that the maximum landing gear travel be the nominal interoperable 65.02 cm with a preferred range of 50-65 cm because this provides a long enough distance to gradually reduce the amount of deceleration experienced by passengers during a landing touchdown and keep the leverage forces on the landing gear legs at manageable levels while averting any scraping on the pavement of the belly of the AFP. The controllable sink rate and landing gear travel are temporally coupled with the retraction of the fast flaps and the reversal of propeller thrust to ensure full down force on the main landing gear tires within nominally 0.5 seconds of touch-down, which enables the tires to provide maximum braking action against the pavement.

Each main landing gear tire is nominally 40.6 cm in diameter. Alternative embodiments of the SkyQarts may have a main landing gear tire diameter within a conceivable range of about 30.5 cm or more, about 35.5 cm or more, about 42 cm or more, about 46 cm or more or any value between and including the tire diameters provided, while it is preferred that the tire diameter be the nominal interoperable 40.5 cm because this size provides enough size to contain an in-hub wheelmotor and to bear the weight loads involved while still fitting underneath the dock during docking, and in addition is a diameter that is small enough to allow higher RPM of its wheelmotor to provide more efficient power during take-off. Each main landing gear tire has a nominal interoperable width of 12.7 cm. Alternative embodiments of the SkyQarts may have a main landing gear tire width within a conceivable range of about 10.16 cm or more, about 14 cm or more, about 20 cm or more, about 25.4 cm or more or any width between and including the tire widths provided, but the preferred tire width is the nominal interoperable 12.7 cm with a preferred range of 10-15 cm because this provides sufficient area to the tire contact patch to apply the power of the wheelmotor during take-off without causing excessive tire noise, weight or frontal drag. The main landing gear track width for SkyQarts I, II and III is nominally 262.36 cm. Alternative embodiments of the SkyQarts may have a main landing gear track within a conceivable range of about 220 cm or more, about 280 cm or more, about 300 cm or more or any value between and including the main landing gear track widths provided, while it is preferred that the width be the nominal interoperable 262.36 cm because this provides a width sufficient to straddle the operation of the equipment in the dock service bay, to stabilize the ground operations of the long winged SkyQart in windy conditions and, combined with the position of the SkyQart wingtip, to prevent any possibility of propeller tip ground strike during ground operations. The SkyQart's landing gear wheelbase is nominally 371.1 cm.

Alternative embodiments of the SkyQarts may have a landing gear wheelbase within a conceivable range of about 250 cm or more, about 350 cm or more, about 450 cm or more or any value between and including the landing gear wheelbase sizes provided, but it is preferred that the landing gear wheelbase be the nominal interoperable 371.1 cm with a preferred range of 320-380 cm because this provides sufficient stability for ground operations and allows the large landing gear loads to be applied on the AFP at its reinforced hard points, while being small enough to limit the weight and drag of the system. These nominal interoperable dimensions may change on alternative embodiments if the interdependent components are likewise changed to be compatible. Each main landing gear leg is attached to and pivots on a large trunnion that rotates in the starboard and port main landing gear pillow block bearings which are integrated into the reinforced hard point structure of the AFP at a location just below the cabin floorboard and just forward of the rear hatch opening. The trunnions for the port and starboard main landing gear legs interdigitate in a transverse tube to provide load dissipation. The trunnion axis is nominally 50 cm above ground during docking. Each main landing gear leg can swing through an arc of nominally 64° in normal operation, which provides a diagonally aftward travel of the center of the tire contact patch of 79.8 cm and a vertical travel of nominally 65.02 cm. Each landing gear leg is rigidly attached to a trunnion that has a lever arm at the main landing gear pillow block bearing on the side of the pod, which arm operates along an arc fore-aft just inside the wall of the AFP's cabin area. The lever arms, in turn, are attached to an electrically controlled landing gear actuator that can precisely position the main landing gear leg at any position along its 64° arc of operation. There is a precise and required position for the main landing gear leg during each of these operations: taxiing, take-off, cruise flight, landing approach, docking, and maintenance. During landing approach, the landing gear is positioned at the full down position and upon touch-down, its shock absorbing motion is precisely controlled by the fast-acting actuator to ensure tolerable jerk rates for the aircraft and occupants and to take full advantage of the relative long travel for the gradual absorption of landing loads.

In the SkyQart, the main landing gear wheel fairings must reduce drag as much as possible while still being able to accommodate the very long 640 travel of the landing gear leg without striking the pavement on initial touch-down. Due to alignment when the landing gear is in the full down position during landing approach, it is necessary to truncate the aft portion of the wheel fairing so that it will not strike the ground upon landing. The wheel fairing shape is derived from a scaled-down low-drag version of the AFP of the SkyQart. The wheel fairing is clocked onto the landing gear leg so that its drag is minimized with the landing gear in the fully retracted position for cruise flight. The highly tilted angle of the wheel fairing when the landing gear is in the full-down position will increase total drag and this is intended to enhance the aircraft's capability for making steep landing approaches that minimize community noise impacts. Some versions of the wheel fairing may have hinged rear portions that fair with the forward section during cruise flight, but that are actuated to retract upward to increase drag during final approach.

The Qusheat ride control seat is an electro-mechanically actuated cushioned seat that is used as standard equipment in all SkyQarts to enhance ride quality for passengers. Similar to the technology of noise-cancelling headsets, the Qusheat ride control seat has a pro-active anticipatory electro-hydraulic actuator that counter-acts the gusts from turbulence that would otherwise create an uncomfortable or bumpy ride. It is an integral part of the passenger seats used in many but not all SkyQarts.

Standard human dimensions[4] along with commonly accepted guidelines for business class airline seating were used to size the seating space inside the SkyQarts. The seats are sized so as to allow each seat to have port and starboard armrest. A retractable lightweight, thin but rigid, translucent plastic sheet between the side-by-side seats can be fitted onto the EPC to serve as personal protective equipment and/or to enhance privacy for passengers. The bottommost part of the passenger's seated torso is nominally 16.5 cm above the EPC surface with the seat foam compressed. From this bottommost part of the passenger's torso seated on the EPC inside the AFP, a 97.8 cm diagonal dimension to the top of the passenger's head provides the space necessary for a 188 cm tall man of 95th percentile to have adequate cabin headroom inside the SkyQart. Alternative embodiments of the SkyQart that use larger or smaller diameter AFPs will need their cabin floor and EPC seat dimensions to preserve this 188 cm in order to provide adequate headroom for the $95^{th}$ percentile of the population and thereby serve the general public's transportation needs.

The SkyQart's automatic rear hatch opens autonomously just prior to the loading and unloading of the SkyQart during docking. The SkyQart's cabin floor is equipped with shallow grooves to help guide an EPC's tires into the correct latching positions. The cabin sidewalls of the AFP are reinforced at the locations of the four solenoid-actuated latching pins that secure the laden EPC to the cabin structure, so that said solenoids can be securely structurally mounted to the AFP. During the loading of an EPC into or out of the SkyQart at the dock, the SkyQart's cabin floorboard height is maintained in alignment with the dock height by both the active main landing gear and by a set of solenoid activated shear pins that extend from the dock face into the aft face of the floorboard of the SkyQart.

The portion of the AFP aft of the rear hatch is a foam filled flotation device with removable modules of foam to allow different internal volume space. This comprises one component of the closed flotation system.

The nominally 18° tilt-up angle of the rear hatch clears the dock surface and landing gear. The front of the rear hatch has a nominal interoperable outside diameter of 156.8 cm which, with its 2.54 cm thick walls affords a 151.7 cm inner diameter opening for loading payloads. The rear hatch opens on a nominally 20.3 cm long hinge upward at an 18° angle, toward the left wing, such that the hatch clears the main landing gear (including the wheelpant) and clears the dock surface as well as the lower surfaces of the tailboom, and wing trailing edge. Its opening swing also clears the inboard flap hinge fins, which have to be placed nominally 57.3 cm outboard of the flap root in order to not obstruct the hatch movement. The rear hatch forward edge in the nominal SkyQart AFP is at fuselage station (FS) 278.9 cm, as measured from the datum that is the external forward-most tip of the nose of the AFP. This location of the hatch is chosen because it offers a large opening for loading and because it places the seam of the hatch aft of the smooth forebody of the AFP so as to preserve its low drag coefficient.

The SkyQart I has each of its wingtips tilted upward at a nominal interoperable angle of 8.84° while the SkyQart II has its wingtips tilted downward at a nominal interoperable angle of 11.87°. These different angles for the wingtips enable these two different aircraft to have overlapping wingtips when they park wingtip to wingtip at the dock at the SkyNest. Angles smaller than 8.840 or larger than 11.87° may be used, but those alternative embodiments would adversely affect either wingtip clearances or aircraft spiral stability, respectively.

The wing leading edge at the midline of the fuselage is nominally at fuselage station (FS) 179.05 cm where its chord is 142.3 cm. Other FS locations could be used in alternative embodiments but would that adversely affect the aircraft's center of gravity, wing attachment structure or propeller tip to cabin clearance dimensions. The main wing uses a unique airfoil shape that is modified from that of the GA W2 airfoil. The lower surface of the wing is a minimum of 30.85 cm above the top skin of the AFP at the midline of the aircraft. Alternative embodiments that use larger or smaller dimensions for this distance between the wing and the AFP could be used in the conceivable range of from 15 to 47 cm, but these would likely entail increases in weight and/or interference drag.

The SkyQart cabin floorboard during docking is set to a standard 47 cm from the top of its cabin floorboard to the ground or pavement level. The cabin floorboard is nominally 2.54 cm thick.

The length of all moment arms used in the computation of the e.g. are measured from the datum, which is at fuselage station (FS)=0.00, and which is located at the external forward-most tip of the AFP.

The ballistic recovery system is packaged in a nominally 71.1 cm×30.5 cm×19.0 cm box and is a rocket-propelled vehicle parachute. The ballistic recovery system weighs a nominal 27.2 kg.

The active main landing gear maintains the height of the cabin floorboard during loading. The main landing gear legs can move upward so as to squat to lower the fuselage pod belly to just above ground level for off-loading an EPC onto a 244 cm long ramp in cases where no dock is available. The pod belly needs to not touch the ground or pavement during a full jounce movement of both main landing gear, as occurs in hard landings or parachute touch-downs. Keeping the pod belly low down averts wheelies, makes docks less costly, eases off loading, adds stability and enhances ground effect. The pod belly lowermost exterior surface has a nominal interoperable ground clearance of 21.6 cm above ground level during ground operations.

SkyQart windshields are above the mid-fuselage waterline. The windshields have tight seams between their window-frames and the AFP. The nominal measurements for the windshields are as follows: The forward edge of the windshield is at FS 39.2 cm where the pod outside diameter is 69.8 cm. The aft edge of the windshield is at FS 148.2 cm where the pod outside diameter is 137.4 cm. All corners of both windshields have a 5.08 cm radius to avoid stress risers. The two 71.12 cm diameter circular side windows of the AFP serve as emergency exits. Each is held in place by an internal, replaceable, pull-to-remove perimeter adhesive tape strip. Their round shape and inner perimeter frame safe-guard them against being pressed, blown or sucked-out into the nearby rotating propeller tips. The windows each have one or more internal pull grips that enable a passenger of ordinary strength to use his or her fingertips pull the window inward to remove it, after they easily peel away its perimeter adhesive tape strip. The peelable perimeter adhesive tape strip may be made of metal, plastic, duct tape or other material. On the exterior surfaces around these round windows, a customized extruded rubber seal is pressed and lightly glued into the perimeter gap around the circular side windows to produce a flush external skin that helps to preserve the low-drag airflow on the outer surfaces of the AFP.

Using EPCs, the interior of the SkyQart can accommodate a variety of payloads. The EPC can be configured to carry one, two or three seats with small, accessible baggage containers suited to the number of seats. The aft baggage rack limits the seatback recline angle, but this is tolerable for a mass transportation vehicle that typically makes only short-range trips of less than one hour duration. Alternatively and with modified cargo hauling attachments, the EPC can be fitted to carry a med-evac litter[5], a wheelchair, scooter, folded bicycles, generator, a pair of 208.2 liter (55-gallon) drums, lumber, plywood, sheetrock, solar panels, fuel cans, pets in cages or kennels or various sizes of cargo bins.

A cargo version of the SkyQarts I, II and III can be fitted with a nominally 0.61 m cylindrical extension of its AFP, making it the cargo AFP. That extension firmly attaches with fasteners to the standard AFP's rear hatchline, with flush alignment of the external skin contours of the AFP. The trailing edge of this cylindrical extension is an exact clone of that of the standard AFP, having the same dimensions and fasteners that are at the rear hatchline of the standard AFP. These fasteners provide a sturdy and flush attachment of a standard AFP rear hatch to the aft face of the cylindrical extension to make it a CAFP.

The retractable landing gear in the nose of the laminar pod is a free-swiveling type that provides up to 22.4 cm of nominal interoperable upward travel from its fully extended position. Alternative embodiments of the SkyQarts may have a nose landing gear travel within a conceivable range of about 12 cm or more, about 18 cm or more, about 24 cm or more, about 32 cm or more or any value between and including the nose landing gear travel provided, while it is preferred that the nose landing gear travel be the nominal interoperable 22.4 cm with a preferred range of 20-25 cm because this provides a relatively long distance over which to gracefully absorb the vertical loads of landing while keeping the total weight and size of the nose landing gear to a size that can retract and fit inside the nose of the AFP. The nominal interoperable outside diameter of the nose tire is 30.5 cm. Alternative embodiments of the SkyQarts may have a nose tire outside diameter within a conceivable range of about 22 cm or more, about 28 cm or more, about 34 cm or more, about 42 cm or more or any value between and including the nose tire outside diameters provided, while it is preferred that the nose tire outside diameter be the nominal interoperable 30.5 cm with a preferred range of 28-34 cm because this provides a size that can bear the anticipated loads on the nose landing gear and that is small enough to fit inside the space available for the retractable nose landing gear in the nose of the AFP.

The horizontal and vertical tail volumes are deliberately larger than those commonly used in order to ensure brisk and agile control under all flight conditions. The Horizontal Tail Volume coefficient for the SkyQart I and II is nominally 0.895 and the Vertical Tail Volume (Vv) coefficient is nominally 0.064, when using a nominal wing area of 11.4 sq m and a nominal wing m.a.c. of 188.5 cm with a mid-range e.g. The Vertical Tail Volume coefficient can be expected to act as if it were 0.07 or more due to the end-plate effect of the "T-tail", which enhances the rudder effectiveness, along with the fact that this vertical tail is very tall and thereby operates in undisturbed air. For comparison: the Beechcraft Baron with a large vertical tail has a Vv value of: 16×22.7/

199.2×38=0.048, while having nearly the same distance between its two propeller thrust lines.

At the flap root, an 18.6 cm chord distance of exposed flap is visible on the upper surface of the wing. The flaps on each wing have a nominal total span 788.0 cm, which is 71.8% of the exposed wingspan of 1097.3 cm. The inner flap hinges are placed a nominal interoperable 57.3 cm outboard of the flap root in order to clear the swing opening of the rear hatch of the AFP. The cabin floor is nominally 25.4 cm above the lowest point on the pod's external belly skin, which is 21.6 cm above ground level. Interoperability relies upon the dock at all SkyNests being set at a standard of 47.0 cm above ground level.

For comparison, the twin engined Beechcraft Baron's propeller thrust axes are 353.0 cm apart, while the SkyQarts I & II have larger diameter propellers whose thrust axes are nominally 366.4 cm apart.

The SkyQart's rear hatch and tailcone have closed, foam-filled or air-filled flotation spaces that are part of the closed flotation system, as are the other hollow foam-filled spaces in the AFP, wings, empennage and tail cone that are unoccupied by equipment.

A Faraday cage surrounds the battery pack in order to safely contain its high voltage in the event of a ditching into water and is part of its fire-resistant enclosure.

The rationale for the SkyQart's T-tail design is derived from extensive aeronautical design considerations. The SkyQart must have a tail that ensures brisk, authoritative pitch and yaw control at all times, most especially during slow flight at or below its 24 m/sec nominal interoperable liftoff and touch-down speeds, when the dynamic pressure is only about 34.2 kg/m². That means that its tail surfaces must be kept large enough to be effective at low airspeeds, even though that increases wetted area and drag. The potential for asymmetric thrust and yaw during slow flight with one motor inoperative in a twin motored SkyQart demands a relatively large vertical fin and rudder. The need to abruptly execute a nose-up pitch change at just the right moment during take-off, especially in a SkyQart that is taking off downhill, also demands a large and effective horizontal tail, aided in part by a surge in power applied to the active main landing gear wheelmotors to generate a torque that helps produce a desired wheelie-like nose-up pitch attitude at the instant of lift-off.

Using a T-tail on the SkyQart has the benefit of placing substantial wetted area above the thrust line, which can help offset the large wetted area drag that exists below the thrust line due to landing gear and AFP surfaces. At the loading dock, a high T-tail keeps well above the cart movements and heads of passengers and their packages or other items that might otherwise have to duck under a low tail.

T-tails help ensure that the airflow across the vertical and horizontal tail is not 'blocked' or cavitating from upstream turbulent flows coming off of a stalled wing or a windmilling prop. By keeping the elevator up and out of the propeller slipstream, the pitch trim changes that occur with abrupt changes in thrust settings are minimized. Likewise, the T-tail minimizes the irregular or turbulent inflow that can occur at touch-down and in ground effect at high nose-up attitudes due to wing/flap downwashes that strike the ground and then deflect upward into the tail surfaces. Ideally, the forces generated by the tail surfaces are predictably related only to airspeed and control surface deflection angle and NOT to any other secondary effects.

The T-tail confers an 'end-plate effect' to the vertical tail that adds some 5-10% to its effectiveness. Unlike the conventional low-mounted horizontal tail, the high-mounted horizontal T-tail also does not block or blank the upward airflow to the vertical tail during a high angle of attack sink or spin.

The T-tail's disadvantages are that it is heavier and has a more circuitous, complex path for its elevator control cables. This is not a problem when the SkyQart aircraft is fully autonomous with fly-by-wire remote actuators in the tail and needs aft weight increased for e.g. purposes. The weight added by a T-tail can be mitigated somewhat by the structural efficiency of using a laminar flow airfoil of greater thickness to chord ratio (e.g. 15% or more) for the vertical tail, along with larger than usual chords at the points where the surfaces intersect. There have been some instances where the T-tail has been blanked due to the stalled burble airflow coming off the forward wing. The likelihood of that is much reduced when the forward wing is one of high aspect ratio, is far forward of the T-tail, and, when the negligible control latency of autonomous flight ensures that the main wing never allowed to stall. Augmenting elevator authority with a blast of propeller thrust is a benefit for low-set horizontal tails as compared to T-tails, but it also causes weird unpredictability in power induced trim settings, especially during the flare to land. Another T-tail disadvantage is that, being high above the ground, it is more difficult to inspect and service.

The nominal planforms of the tail surfaces are chosen to fit optimum design practices. Low aspect ratio wings (or tails) have the benefit of tolerating higher angles of attack before stall occurs. However, low aspect ratios have more drag and with less span, they extend across a smaller region so that areas blanked by localized stalled airflow could be more of an issue than with a larger span that extends outside the region of blanking. Sweep angles of the tail surfaces can reduce their lift coefficient and drag, but this is a relatively minor ~5% factor if the sweep angles are kept below 15°.

The tailcone length and tail surface area are chosen to comply with reasonable guidelines for the tail volume coefficients, the metrics that predict tail surface effectiveness[6]. A horizontal tail volume coefficient, $V_H$, is computed as:

$V_H = S_H \times L_H / S_W \times $m.a.c., where $S_H$ is the horizontal tail surface area and $L_H$ is the length or distance from the horizontal tail's aerodynamic center to the aircraft's e.g. location. The horizontal tail's aerodynamic center is conventionally located at 25% of its mean aerodynamic chord. The surface area of the wing is denoted by $S_W$ and the m.a.c is the main wing's mean aerodynamic chord.

The vertical tail volume coefficient. $V_V$, is computed as:
$V_V = S_V \times L_V / S_W \times b$ where $S_V$=vertical tail area, $L_V$ is the diagonal length or distance from the vertical tail's aerodynamic center to the aircraft e.g., $S_W$ is the wing surface area and b is the wingspan. Both $V_H$ and $V_V$ must be larger than usual for the SkyQart, to ensure that it will have sufficient capability in strong crosswind landings and full and brisk control authority during its slow flight modes, landing flare and in steep approaches with windmilling props. The need for larger tail volume coefficients is eased somewhat by the SkyQart having fully autonomous flight controls with negligible control latency. This may allow alternative embodiments of the SkyQart to use smaller tail surfaces.

The tail volume coefficients, $V_H$ and $V_V$, for the SkyQarts I and II are scaled in relation to the known values for successful historical twin engine aircraft. $V_H$ for general aviation twin-engine aircraft are in the range of 0.8 to 0.9. The SkyQart I and II have a nominal $V_H$ of 0.895. This value is computed upon an $S_H$ value for the SkyQart I and II of 2.8 sq m and an $L_H$ value of 430.4 cm measured diagonally from the e.g. to 25% of the mean aerodynamic chord of the horizontal tail. The mean aerodynamic chord of the horizontal tail (m.a.c.) is a nominal 75.8 cm.

The SkyQarts I & II nominal wing area, Sw, is 11.4 sq m and the wing mean aerodynamic chord (m.a.c.) is nominally 118.5 cm. The leading edge of the wing m.a.c. is located at a nominal 173.9 cm aft of the datum, which is taken as the forward-most point on the external surface of the AFP.

The $V_H$ of both the SkyQart I and II is a nominal 0.895. For comparison, the $V_H$ of the Luscombe is 0.442, and of the Navion is 0.692, while general aviation twins & turboprops have $V_H$ values of 0.8-0.9. For the vertical tail coefficient, $V_V = Sv \times Lv/Sw \times b$, and this computes as 0.0640, where b is 11.0 m, Sv is 2.1 sq m and Lv diagonally is 377.2 cm.

The mean aerodynamic chord of the vertical tail is a nominal 128.4 cm which means that 32.1 cm is the aerodynamic center of the vertical tail.

The horizontal tail airfoil section is the GAW2 with a 12% thickness to chord ratio.

The vertical tail airfoil section is the NACA 63-015A airfoil.

The tire size for main landing gear is nominally a 40.6 cm outside diameter.

Tire size for nose tire is nominally 30.5 cm outside diameter.

The maximum jounce travel for the main landing gear tire from its static position when parked on the pavement ramp is a nominal 18.5 cm.

The SkyQart wing's lower surface at the aircraft midline is a nominal 30.9 cm above the roof of the AFP. The vertical distance from the thrust line to the roof of the AFP is 29.6 cm. The SkyQart's main wing spar shear-web height at the aircraft midline is nominally 21.3 cm. The main wing's main spar shearweb is located at a nominal 32.48% of the wing chord.

The tailcone shape can be one of circular cross-section or slightly oval with the oval's long axis oriented vertically, since the vertical loads on the tailcone are likely much larger than the side loads. The tailcone cross-section must be large enough to contain the elevator and rudder control parts.

The appearance of the tail planform shapes affects the esthetics of the whole aircraft, and they must be proportionate and not outsized to engender confidence in the design.

The nominal interoperable SkyQart I and II each have two propellers that are each mounted on a separate propeller motor that is mounted to a separate nacelle. There is a port nacelle and a starboard nacelle and each nacelle is on an opposite side of the AFP. These nacelles are attached to the leading edge of the main wing. The thrust axes of these two propellers are nominally 3.66 m apart. Alternative embodiments of the SkyQart I and II may have a number of propellers with a conceivable range of two to six but the preferred nominal interoperable number of propellers is two. Propeller spinners are both of a nominal 40.6 cm base diameter covering the electrically controlled propeller hubs of the ultra-quiet 7-bladed propellers.

The three-seat variant of the EPC loaded into a SkyQart I or II is intended to be used in the development phase of these aircraft in order to allow the occupant of the front seat to manually pilot a SkyQart as an optionally piloted vehicle (OPA) using conventional stick and rudder type controls. Such manual piloting is anticipated to be the standard for early implementations of QUAD, both for passenger and cargo service, while fully autonomous capabilities are undergoing maturation and certification.

The SkyQart uses a standard of 600 volts for its battery pack whose standard outside dimensions are 8.9 cm H×66.0 cm W×101.6 cm L. This comprises the standard battery pack or SBP for the QUAD system. Alternative sized embodiments of this battery may be used, but that would entail changing the standard dimensions of many other components throughout the QUAD system. The SBP is mounted just under the SkyQart's cabin floor. It can be easily removed from the SkyQart by sliding it out along its heavy-duty extensible drawer slides[7]. It can also be charged during docking with a DC fast-charge port located at the SkyQart's rear hatch opening. This port engages automatically as the precision positioning system (PPS) positions the SkyQart at an aircraft docking station.

The SkyQart's core equipment requirements, by name, are the following:
an ultra quiet propeller system with electric hub that offers rapid pitch change
an active main landing gear
at least two smart, ultra-quiet propellers that also act as spoilers
a fast flap system with double-slotted semi-Fowler flaps
a solenoid-actuated pin-latching system system
a networked situational awareness system at SkyNests
a precision positioning system with line-following software
a Standard Battery Pack (SBP) with a battery management system
a landing gear wheelmotors with regenerative braking
an AFP: axisymmetric fuselage pod
a peelable window frame with two pull-in emergency exit windows
an autonomous control system with negligible control latency
an automatic rear hatch on the rear portion of the AFP
an ELT: emergency locator transmitter
a Faraday cage around each battery pack
a BRS: ballistic recovery system comprising a parachute for a SkyQart
a robotic battery swap system using a robot arm
an EPC: electric payload cart
a Qusheat ride control seat: Autonomous passenger seats with ride control
a closed flotation system, wherein unused volumes in the SkyQart are sealed watertight for flotation
a cargo axisymmetric fuselage pod: the optional cargo AFP that gives a 61.0 cm cylindrical extension to the AFP
a lightning strike protection (LSP) of embedded metal mesh in the AFP wall
a retractable nose wheel landing gear
a DC fast-charging port at its rear hatch
a lightweight composite airframe
a T tail configuration with large tail volume coefficients
a forward swept laminar flow main wing
a monostrut wing attachment to its AFP
an OPA: Optionally Piloted Aircraft controls (stick, rudder, throttle, flaps)

The SkyQart III

The SkyQart III is an important component to this invention. It is the larger, 6-passenger version of the SkyQart. It differs from the SkyQarts I and II in having two identical AFPs, each of which is identical to the AFP used on the SkyQarts I and II except that the starboard AFP in the SkyQart III has its rear hatch open toward the starboard wing tip. The central axes of the AFPs of the SkyQart III are nominally 4.57 m apart in order to fit the equal spacing between the SkyNest aircraft docking stations. The nominal embodiment of the SkyQart III has three propellers, each driven by a separate motor on a separate nacelle on the leading edge of the wing. Alternative embodiments of the SkyQart III may have a number of propellers with a conceivable range that is three or more, four or more, five or more, six or more or any number between and including the numbers provided, while it is preferred that the number be 3 propellers because this provides low noise with a broad accelerated wake of increased airflow over the wing surface for blowing on the fast flaps, while also limiting the weight and complexity of the aircraft. The SkyQart III has a nominal interoperable maximum gross weight of 1450 kg. Alternative embodiments of the SkyQart III may have a maximum gross weight with a conceivable range of about 1350 kg or more, about 1450 kg or more, about 24 cm 1650 kg or more, or any weight between and including the maximum gross weight provided, while it is preferred that the maximum gross weight be the nominal interoperable weight of 1450 kg with a preferred range of 1400-1500 kg because this limits the amount of noise by limiting the amount of installed power needed for a sufficient rate of climb, while preserving a good payload weight and fitting the capacities of the tire sizes used. The SkyQart III has a nominal interoperable wingspan of 15.37 m. Alternative embodiments of the SkyQart III may have a wingspan with a conceivable range of about 14 m or more, about 18 m or any wingspan between and including the wingspans provided, while it is preferred that the wingspan be the nominal interoperable 15.37 m because this provides a low span loading that enhances the rate of climb on limited power without undue increases in wing weight, while also limiting the spanwise distance necessary for docking at the SkyNest dock. It will be noted that the SkyQart III has substantially longer wingspan than that of the SkyQart I or II. The SkyQart III has a nominal interoperable wing area of 18.96 sq m. Alternative embodiments of the SkyQart III may have a wing area with a conceivable range of about 16 sq m or more, about 19 sq m or more, about 21 sq m or more, any wing area between and including the wing areas provided, while it is preferred that the wing area be the nominal interoperable 18.96 sq m with a preferred range of 18-20 sq m because this provides a low wing loading that reduces the landing speed without undue increases in wetted area. The nominal interoperable wing loading of the SkyQart III is 76.5 kg/sq m because this reduces the landing speed without undue increases in wetted area. The nominal SkyQart III has a maximum height of 402.8 cm with a horizontal tail area of 4.9 sq m and a vertical tail area that totals 4.28 sq m. The nominal SkyQart III has a horizontal tail volume coefficient $V_H$ that is nominally 0.926 with a range of 0.8 to 1.1. Its vertical tail volume coefficient Vv is nominally 0.057, with a range of 0.05 to 0.09. These are relatively large numbers so that the SkyQart III can have enough yaw and pitch control authority to offset the large spanwise polar moment of inertial caused by its two axisymmetric fuselage pods as well as its forward center of gravity that inhibits wheelies on take-off. The SkyQart III employs extensive parts commonality with the standard SkyQarts I and II, including its axisymmetric fuselage pods, landing gear, seating, windshields, hatch, battery packs, mono-strut, floorboards, pin-latching system, outboard wing panels, controls, and ballistic recovery system parachutes.

By hauling three passengers in each pod, each flight of the SkyQart III can carry six passengers in all, if the average weight of those passengers is less than nominally 70 kg. When carrying six passengers, total baggage weight is restricted to nominally 13.6 kg. The nominal maximum payload for the nominal SkyQart III is 488 kg, with a limit of 244 kg per AFP. However, this payload may be increased to as much as 612 kg with a limit of 306 kg per AFP in future alternative embodiments of the SkyQart III if it can be done while preserving the SkyQart II's ESTOL and ultra-quiet take-off performance necessary for operations at SkyNests. Alternative embodiments of the SkyQart III may have a payload with a preferred range of 600-650 kg. The wing tips of the nominal embodiment of the SkyQart III are tilted upward from the horizontal at an angle of 9.58° to enable it to park at the dock of a SkyNest with its wingtips overlapping those of the other SkyQarts I or II. This overlapping provides more room for docking spaces and thereby increases the capacity of the SkyNest.

The roof of the standard battery pack is nominally set 4.76 mm below the bottom surface of the cabin floor in all SkyQarts. This allows 3.175 mm thicker dock surface that is 28.58 mm thick with still a 0.79 mm clearance for the battery pack to slide under the bottom surface of the dock.

The nominal interoperable SkyQart III has a 14.0 cm thick horizontal tail with a 13% thickness to chord ratio based on a 107.4 cm chord. Its horizontal tail is 402.8 cm above ground level. There are nominally 4.57 m between the SkyQart III's nose-tire centerlines. These nominal dimensions are deterministic of the dock ceiling height and distance between aircraft docking stations at the SkyNest, respectively.

Each outer main wing of the nominal SkyQart III has a 6.2° forward sweep of its trailing edge and has 5.66 sq m of wing area, which, when added to the 7.63 sq m wing center section creates a total wing area of 18.96 sq m. Compared to the SkyQart I and II, the SkyQart III has a larger wingspan of that is a nominal interoperable 15.37 m which gives a nominal interoperable aspect ratio of 12.46:1, computed as the result of wingspan squared divided by wing area. Alternative embodiments of the SkyQart III may have a wing aspect ratio within a conceivable range of about 10 or more, about 12 or more, about 14 or more or any aspect ratio between and including the aspect ratios provided, while the nominal interoperable aspect ratio of 12.46:1 is preferred because it provides an energy efficient airframe with reduced induced drag and a manageable wing weight, and reduces the demand for climb power and thereby averts excessive noise.

The nominal SkyQart III has 4.91 sq m of horizontal tail.

The nominal SkyQart III has 2.14 sq m of area on each of its vertical tails, which together combine to provide a total of 4.28 sq m of vertical tail area.

The nominal SkyQart III has three propellers, each of 3.048 m diameter and each mounted on its own nacelle forward of the main wing. The central of these three propellers is mounted in the midline of the aircraft on a nacelle that attaches to the center section of the main wing. The central propeller has a thrust axis that is nominally 223.0 cm above the ground when the aircraft is parked in its static position at gross weight. The central propeller disc plane is at fuselage station 94.56 cm aft of the datum. The two outer propellers have their thrust axis slightly higher, nominally at 228.1 cm above the ground. The two outer propellers of the SkyQart III have their propeller disc plane located at fuselage station 103.73 cm aft of the datum. The two AFPs of SkyQart III can each contain an EPC that hauls one, two or three seats, thus providing for a maximum capacity of six passengers.

Each of the two AFPs of the SkyQart III has a nose-tire plus port and starboard main landing gear tires. Having two AFPs helps to preserve privacy and serenity in ride-sharing flights, yet with mutual consent these two AFPs can share communication via an intercom.

The SkyQart III has a large blown flap span, with a double slotted fast flaps system on both the wing center section as well as on the left and right outboard wing panels.

All SkyQarts have a 21.6 cm belly ground clearance, a standard 47.0 cm cabin floor height and nominally 198.1 cm of headroom under the belly of the tailcone at the fuselage station that coincides with the rearmost edge of the fully opened rear hatch.

Alternative embodiments of the SkyQart III still fall within the concepts and processes of this QUAD system patent, with dimensions and weights that differ from the nominal embodiment presented herein, provided that these alternatives are capable of ultra-quiet ESTOL and can still interoperate autonomously with compatible EPCs, RDCs, docks and SkyNest facilities.

Overlapping Wingtips

Overlapping wingtips are an important component to this invention. During high capacity operations when the SkyNest dock is heavily occupied, the dispatch software known as the networked situational awareness program for QUAD operations keeps track of whether an arriving SkyQart is of type I, II or II and directs the arriving SkyQart to an appropriate aircraft docking station where its particular type of wingtip can overlap that of the adjacent docked SkyQart, and thereby make more efficient use of the docking stations. When the operations at a SkyNest are of lower volume causing there to be many vacant aircraft docking stations, these overlapping wingtip-matching requirements can be less rigorously enforced.

The overlapping of SkyQart wingtips saves dock span and thus enables a smaller size of land parcel for the SkyNest as well as a greater number of SkyQarts to operate there. When a nominal SkyQart II and SkyQart I dock with overlapping wingtips, side by side in alignment with the dock's battery swapping pathways, their nose-tires are placed 9.144 m apart and this results in their combined spanwise dimension consuming a total dock span of 20.14 m. In contrast, when two SkyQart I's or two SkyQart's II dock side-by-side in alignment with the dock's battery swapping pathways, they must do so without overlapping wingtips, resulting in their nose-tires being placed 13.7 m apart. This larger separation results in their combined spanwise dimension consuming a total dock span of 24.73 m, nearly 5 meters more dock space than consumed by the overlapping wingtips of a pairing of SkyQarts I and II. If each SkyQart is configured to carry three passengers, then the efficient, overlapping docking of two dissimilar SkyQarts achieves a passenger density of six passengers in 20 m of dock span, equating to 3.33 m of dock span for every passenger. If the less efficient docking of two identical SkyQarts with no wing overlap is similarly examined, it results in six passengers in 24.73 m of dock span, equating to 4.12 m of dock span for every passenger. The overlapping wingtips thus provide a roughly 25% improvement in dock efficiency. Similarly, when an ideal mix of SkyQart I, II and III are docked side-by-side in alignment with the dock's battery swapping pathways, as shown in FIG. 4, the total combined spanwise dimension of that dock span consumed is 33.76 m. If each AFP of these three SkyQarts carries three passengers, this example results in twelve passengers in 33.76 m of dock span, which equates to only 2.81 m of dock span per passenger.

The Acceptable Noise Sphere

The acceptable noise sphere is an important component to this invention. Aircraft noise emissions radiate spherically outward in all directions but are of larger amplitude in some directions than others. The radial direction outward from the vehicle along which the emitted noise is of maximum amplitude is herein defined as the azimuth of maximum noise. Along that azimuth, there is a definable radial distance at which the emitted aircraft noise will be quiet enough to be tolerable to 90% of neighbors who live adjacent to an airport. Extensive airport noise surveys in both Europe and the USA indicate that the quiet-enough noise level for those who live adjacent to airports, on whose surface aircraft take-offs happen frequently and at night, averages a continuous noise level of 48 dBA or less at the airport boundary. This continuous 48 dBA closely approximates the surface continuous noise level at which, on average, only 10% or less of airport neighbors reported being highly annoyed. The FAA and other agencies generally consider as community-acceptable (quiet-enough) noise levels that cause no more than 10% of airport neighbors to be highly annoyed. In the QUAD transportation system, the aircraft noise emissions from its SkyNests must be acceptable to quiet residential communities. The noise of tires rolling on pavement can be a significant contributor to the noise emitted during take-offs and landings. One study of the tire noise of towing a 658 kg small aircraft with tricycle landing gear with tires that were all longitudinally ribbed Goodyear Flight Custom III tire 500-5 6 ply PN: 505c66-5 aircraft tires rolling on smooth asphalt at 55 mph (with no engine or propeller noise) found that such tire noise may reach 60 dBA at a 30.48 m sideline, which is equivalent to 57.64 dBA at a 40 meter sideline distance. Similarly, a study of drive-by noise of an electric-powered car, a Chevrolet Bolt with 4 wide tires of Michelin Energy 215/50/R17, driving at 55 mph on a freshly smoothed asphalt road in a no wind condition with an ambient noise level of 44 dBA, revealed a peak drive-by noise of 55 dBA at a 40 meter sideline. The standards to be set for SkyNest noise can also be derived from studies of its health effects' and the current regulatory limit in 36 CFR Ch. 1 (7-1-10 Edition) for machine noise (e.g. generators) in National Parks[9], which is 60 dBA continuous noise at a 15.24 m sideline distance. This is equivalent to 51.6 dBA at a 40 m sideline. This 51.6 dBA continuous noise is a rigorous limit that can serve as a benchmark for preserving the serenity in quiet residential neighborhoods. The tolerance for noise during sleeping hours at night becomes even more stringent; 24 dBA measured indoors is the level that 10% of respondents found highly annoying. Annoyance also rises substantially if there are many flights passing overhead during sleep time. Accordingly, there is a noise metric known as the Lden or sound "level day, evening and night" in which a measured noise level is penalized by adding 10 dBA during the time of 23:00 to 07:00 and is penalized by 5 dBA during the time of 19:00 to 23:00. A continuous noise level of 48 dBA is equivalent to 54.7 dBA Lden, which is the noise level that, on average from several studies, caused 10% of people living near an airport to be highly annoyed. Noise levels of drive-bys and fly-bys are commonly measured as $L_{eq}$, which is the equivalent sound level averaged over a specified period of time. If measured using the A scale, then the $L_{eq}$ metric becomes $LA_{eq}$. If the $LA_{eq}$ is the average sound level over a 5 second period, such as a fly-by or drive-by event, then it is expressed as $LA_{eq}$, 5 s.

From the foregoing, and the goal of ensuring community acceptable noise levels from the QUAD system, a nominal acceptable continuous noise level of 48 dBA is herein adopted as a standard for use in the depiction of the perimeter of the acceptable noise sphere in the Figures presented in this patent. In addition, a maximum allowable noise level at the boundary of a SkyNest is 55 dBA $LA_{eq}$, 5 s.

The acceptable noise sphere is simply a circular two-dimensional depiction of a three-dimensional sphere whose radius is that at which an aircraft's noise emissions along its azimuth of maximum noise would equal or exceed 48 dBA $L_{eq}$ as measured from an unobstructed vantage near the ground (surface) level of the airport or neighborhood. This standard for the noise sphere can be applied to guide the operations, site and size of the SkyNests used in the QUAD system. The perimeter of the noise sphere depicts the boundary of a theoretical 48 dBA noise level as if it were emitted in all directions, even though it is typically only emitted along the azimuth of maximum noise. Noise levels as one approaches the center of the acceptable noise sphere become progressively louder than 48 dBA. The noise sphere provides a useful type of ruler, a conservative guide tool to help make sure that annoying aircraft noise levels are consistently kept within the boundaries of the SkyNest.

The radius of an aircraft noise sphere depends upon the power setting and the aircraft's height above ground. During full power take-off, the aircraft in its ground roll on the surface emits greater noise and its noise sphere will be of larger radius than during other phases of its operation such as power-off descents to landing. During the power-off landing approach the aircraft emits much less noise so that its noise sphere will be of smaller radius. When this smaller radius noise sphere during approach to landing is centered at a height of 40 m above the pavement surface, the cross-sectional area of that smaller noise sphere that actually intersects the plane of the pavement surface will be zero and, as the descent of a SkyQart proceeds to a height of 20 m or 10 m, the area of said intersection will grow to be more than zero, but will remain less than that of a circle of 40 m radius.

An aircraft's acceptable noise sphere can be better contained within a SkyNest that has a bowl shape (SkyNest IV), because the peak noise of take-off power is applied at the central bottom of the bowl, whose sloped sidewalls help contain the noise emissions against horizontal dissemination. Similarly, tire chirp noises in a bowl shaped SkyNest IV are contained by the sloped sidewalls of the bowl.

The largest noise sphere for the nominal embodiment of the ultra-low-noise SkyQart in this patent is 25.3 m in diameter. This would be the size of the noise sphere at the take-off lift-off location on the SkyNest pavement and represents the noise emissions with a SkyQart I or II with large, slow-turning propellers. Each such propeller emits 35 dBA at full take-off power at a 40 m sideline. The sum of those two 35-dBA propellers' noise would be 38 dBA at the 40 m sideline. The calculation of what would be the radius at which a 38 dBA would measure 48 dBA reveals that radius to be 12.65 m, which is that of a 25.3 m diameter circle. The calculation uses the following formula:

$$r_2 = r_1 * 10\textasciicircum((dB1-dB2)/20)$$

This calculation would thus be: $r_2=12.65=40\times10\textasciicircum((38-48)/20)$ This means that a 25.3 m diameter noise sphere on take-off is the maximum diameter that fits within the standard SkyNest.

To compare a given noise emission at one distance to what it would be at another distance, the formula is:

$$dBr2 = dBr1 - [20\times\log 10(r2/r1)] \quad \text{Equation (3)}$$

where:
r1=the distance from the sound source at which dB r1 exists
r2=the greater distance from the sound source at which dBr2 will exist. An example is as follows: A noise of 48 dB at 40 m, when measured at 80 m, by Equation (3), becomes: 48 dB-20×log 10(80/40) 41.98 dB noise at 80 m, or roughly 6 dB quieter at twice the sideline distance.

The SkyNest I The SkyNest I is an important component to this invention. For sustainable, high proximity operations, the land parcel size of the SkyNest for QUAD must be minimized while still being large enough to fully confine perceptible aircraft noise to within its boundaries. Using the tool of the acceptable noise sphere, the SkyQart's combined capabilities of ESTOL and ultra-quiet take-off will be the main determinants of the size of the SkyNest. The nominal SkyQart's design performance in the conflicted goals of ESTOL and low noise emissions are herein pushed to their realistically achievable limits. All versions of the SkyQart embodiments presented in this patent conform to those limits. This also means that the SkyQart, as a pilotless aircraft, must be capable of extreme aerial agility and very precise control of its flight path and surface operations. The flight path control must include 4D positioning. That means not only the three-dimensional (3D) position of the aircraft but also its $4^{th}$ dimension of location in time, must be sequenced with the other aircraft operations at the SkyNest so as to avoid a conflict or collision. It is important that flight path control include 4D positioning in order to enable the high capacity operations at each SkyNest. For example, the crossover point between a SkyQart on short final approach and a SkyQart that is taxiing on a taxiway is a potential conflict unless the separation of the SkyQarts is ensured by staggered timing.

SkyNest runways will be oriented on their land site in alignment with official wind rose data[10].

The SkyNest must also provide enough dock area to process the foreseeable passenger volume at its location. A longer dock can offer more numerous aircraft docking stations for SkyQarts to load/un-load. The different versions of the SkyQart are designed so that their wingtips can overlap when parked at the dock and thereby achieve tighter spacing between aircraft and greater capacity. The overlap of the wingtips of these versions of the SkyQart enable the longitudinal separation between aircraft docking stations to be shorter, standardized at just 4.57 m, a distance that provides sufficient room for high-capacity under-dock battery pack processing equipment as well as the busy top-of-dock bi-directional maneuverings of EPCs and passengers. All SkyNest facilities should share the same nominal interoperable dimension for dock floor height above the pavement, 47.0 cm, along with a nominal interoperable dock width of 7.47 m. Also standardized based upon the 4.57 m intervals are the locations of the precision positioning system. DC fast-charger ports, robotic battery swapping equipment and pin-latch spacings and locations.

There are five basic variations of SkyNest possible depending upon the cost, location, surroundings and passenger volume needed. These five types are:

1. Standard simple SkyNest I, surface sited, high capacity, 1.28 ha
2. SkyNest II, which is a pair of adjacent surface sited, high capacity SkyNest is apposed as mirror images on the sides of a buffer zone and comprising 2.8 ha
3. SkyNest III, a tiny SkyNest that borders on open space, 0.60 ha 4. SkyNest IV, a circular, bowl-shaped, all winds capable, maximum capacity SkyNest with sloped surfaces to shorten take-off and landing distances 5. SkyNest V, a reduced size rooftop circular SkyNest with its docking at a lower level one-floor down from the rooftop pavement surfaces Other variations of SkyNest are possible. For example, an initial low-cost implementation of QUAD service could use SkyNests that have no dock because they simply load and unload on the pavement of existing parking areas at conventional general aviation airports or country airstrips using the standard autonomous robotic delivery cart (RDC) to load and unload EPCs and battery packs. The use of the standard RDC instead of dedicated, standardized docking stations would mean much longer turnaround cycle times at the shared general aviation SkyNest, which would substantially reduce the capacity of passenger throughput at those facilities.

The basic standard SkyNest I is a purpose-built design that is surface sited on a small land parcel with its runway oriented to align with the annual average wind direction at that location. The SkyNest I has simple standard docking facilities for rapid off-loading of EPCs and battery packs. A sizeable array of solar panels can be placed above the dock and adjacent streets to provide some portion of the electrical energy use at the SkyNest I.

The SkyNest II is a larger, surface sited airpark with dual runways that can handle more flight operations and thereby larger passenger throughput. Its runways, taxiways and docking facilities share the same standard dimensions as those of the standard SkyNest I.

The tiny SkyNest III is sited with more than 50% of its borders on an open space selected from the group consisting of a shore line, a wild land, a community greenbelt, a highly elevated area around a building rooftop and other unpopulated area that is not noise-sensitive. The open space adjacent to the tiny SkyNest provide areas over which take-off and landing paths can be directed without annoying people on the ground with noise or low flying aircraft. This enables the tiny SkyNest to be much smaller and less costly and still keep its perceptible aircraft noise away from people living near the SkyNest.

The SkyNest IV has a bowl shape with a small flat central area. It can be surface sited or built into a bowl excavated into the soil. The SkyNest IV has the highest capacity of any type and is the most expensive to build. Its sloped areas are used for downhill take-off runs and uphill landing runs, both of which are oriented into the prevailing wind to further shorten their distances. The design goal of the SkyNest IV remains that of keeping all residential back-yard areas free at all times of any aircraft noise level above 48 dBA.

The rooftop SkyNest V can be smaller in area because the noise from its aircraft operations will be elevated far enough above the street level as to be non-annoying to people there. This means that, ideally, the landing surface of the rooftop SkyNest V should be sited at least 36.6 m above street level in order to minimize its noise impact. For cost reasons, the rooftop SkyNest is likely to be built atop existing tall buildings or multi-level car parking structures. Moreover, for safety reasons, the rooftop SkyNest V should be placed on the tallest building in its general vicinity. In some cases, the rooftop SkyNest V can employ solar panels on its sides to generate a helpful amount of renewable electrical energy.

The street(s) adjacent to the SkyNest should be walkable, small residential or non-arterial streets with speed limits of no more than 56.3 km/hr so that they can accommodate pedestrians, bicycles and the 40.2 km/hr RDC vehicles from the SkyNest. These streets will also provide bike lanes and some curbside parking spaces for use limited to loading and unloading passengers. Because these streets are not a part of the land parcel that comprises the SkyNest itself, they would be designed, built and maintained by the local municipalities. These streets will typically have the following components and dimensions, in the following order that begins with the portion immediately adjacent to the SkyNest: A sidewalk that is 2.44 m wide, a bike lane that is 1.83 m wide, short-term (5 minute) parallel parking lane that is 2.44 m wide, a car lane that is 3.05 m wide, a planter/center divide that is 1.83 m wide, a lane 2.44 m wide for an on-demand electric mini-bus, another lane 2.44 m wide for an on-demand electric mini-bus that travels in the opposite direction, another planter/center divide that is 1.83 m wide, another car lane that is 3.05 m wide for travel in the opposite direction of the other car lane, a short-term (5 minute) parallel parking lane that is 2.44 m wide, another bike lane that is 1.83 m wide, and the opposite sidewalk that is 2.44 m wide.

Braking times and distance can be calculated using the braking distance formula, where "D", the braking distance is:

$D = V^2 / 2 \times \mu \times G$ or meters $(m/sec)^2/(2 \times coefficient of friction \times 9.81 \, m/sec^2)$, which, for a landing speed of 24 m/sec, equates to 41.9 m for the braking distance to decelerate to zero km/hr at a continuous deceleration of 1 G with a 0.7 coefficient of braking friction of the tire on the pavement. However, it should be noted that the landing SkyQart need only decelerate from 24 m/sec to its taxiing speed of 7.6 m/sec, so the deceleration distance to zero km/hr can be less than 41.9 m or the deceleration rate can be less than one G.

In one embodiment of the QUAD process at an optimum-sized SkyNest I an idealized sequence and turnaround cycle cadence of operations can be described. While this idealized process is generic and can be applied at many differently sized SkyNests, it represents an extreme case of expeditiousness made possible by autonomous operations that allow very close aircraft separations and precision positioning of the vehicles. Its rapid cadence provides one departure and one landing every 10 seconds. The process described here is one of maximum performance in a fully implemented, autonomous high-capacity QUAD transportation system. This extreme case of the process with its rapid cadence serves to define the potential limits for speeds, distances and sizes that can be used to develop standards for the smallest conceivable SkyNests in a fully autonomous, optimized QUAD system. This process and its cadence are herein named the cadenced coordinated operations at Sky-Nests. If all departures are fully loaded, 6-seat SkyQart III's, then 6×6=36 people per minute can be launched. For the 1.28 ha SkyNest I, this calculates to it having a potential maximum capacity of launching 683 people per acre per hour and launching 2160 people per hour. Note that both the standard SkyNest and the other variants of it rely upon operational sequences that demand safe movements of aircraft at very close proximity to one another. Such close separations are unprecedented and will likely require special FAA regulations to permit them. That permission will depend upon QUAD having the ultra-quiet SkyQarts whose autonomous, precision positioning system using on-board navigation systems, sense and avoid systems and wheelmotor controllers operate with impeccable safety and to certificated standards. This invention thus includes such capable SkyQarts in its process. The reason for the "Q" in QUAD is that 'quiet' is the most distinguishing feature of the system. The acceptable noise sphere tool is thus valuable to ensuring that all SkyNest designs will be community acceptable. Keeping SkyNests as small as possible is what enables them to be close to where people live and work, and this enables them to reach a mass-market and provide meaningful benefits to the public transportation system. However, the smaller the SkyNest, the greater the likelihood that the noise of its aircraft will adversely impact the SkyNest neighbors.

The nominal embodiment of the SkyNest I has an area of 1.28 ha. This is the smallest size that can be located inside a quiet residential area and still confine the SkyNest noise to within SkyNest boundaries. Smaller SkyNests III can be used in other settings. For example, if at least 50% of its perimeter borders on open space, the SkyNest III can be as small as 0.6 ha and still provide the required noise containment. QUAD SkyNests located within urban and industrial areas where high levels of ambient noise exist, and those with fewer flight operations that are located within large, privately-owned campuses, ranches or family compounds, can also be smaller than the 1.28 ha SkyNest I embodiment presented in this patent, but each must still provide community-acceptable noise containment at the public margins of those properties. SkyNests larger than 1.28 ha can have similar operational cadences to those described herein, but there must be a match between the size of the SkyNest land parcel, the speeds and landing distances of the SkyQarts operating there, and the climb-out and landing approach trajectories and distances necessary to ensure that the potentially annoying noise emissions of the aircraft, according to an acceptable noise sphere, are confined within the SkyNest boundaries or kept away from noise-sensitive developed areas. It will be possible to 'carve out' various sizes of SkyNests within existing larger conventional take-off and landing airports in order to create early implementations of the QUAD process. By these requirements then, for practical purposes, this invention of the QUAD process is limited to SkyNests of sizes ranging from 0.4-5.0 ha.

In the operations at a SkyNest I presented herein, the aircraft that are airborne within the SkyNest boundaries are operating at 24 m/sec and those that are on the SkyNest surface are moving at 7.6 m/sec. These are the nominal interoperable speeds that tailor the distances that can be safely and expeditiously covered in each 10-second operational step in the sequence of landing, taxiing to the loading dock, taxiing to the departure runway and taking off again, to the actual size of the SkyNest land parcel. High capacity autonomous QUAD operations will ultimately require such scripted and extremely rapid cadences of operations in order to be affordable, efficient, and of meaningful volume. There is no provision in this extreme example of cadenced coordinated operations at SkyNests for delays in aircraft movement, such as would occur with the sustained hovering required by vertical take-off and landing (VTOL) aircraft, or by indecisive, hesitant human pilots, although these delays may occur in early implementations of the QUAD system.

The ideal fast cadences for loading and unloading of payloads on the SkyNest's dock are likewise modeled for very rapid turnaround times and rely on robotic equipment and pre-loaded EPCs. While these steps represent the ideal, fully developed system with maximum capacity for the SkyNest, this system invention nevertheless includes the slower, manual, less developed operational cadences that occur during the early development and evolution of the QUAD system.

A nominal SkyNest I whose dimensions are 167.6 m×76.2 m, amounts to 1.28 ha of land. The steps in the operational sequence of the SkyQarts at this SkyNest are modeled to consume 10 seconds each, including 10 seconds for deboarding and 10 seconds for boarding. This rapid cadence of operations is predicated on fully autonomous aircraft operating in a fully developed QUAD system process and is designed to maximize passenger throughput. This process and its cadence comprise the cadenced coordinated operations at SkyNests.

The following description of the steps by which a SkyQart aircraft can approach, land, taxi to the dock, park, deboard, board, refresh its SBP, taxi for departure, take-off and climb out of a SkyNest I will present the typical turnaround cycle at a busy SkyNest. The SkyQart, during its landing approach, enters the SkyNest boundary at a prescribed height and location that depend upon the current wind direction. For noise abatement purposes, it descends steeply from that location with a roughly 30° bank angle, and with its propellers producing drag by wind-milling in electricity regeneration mode, it descends from an initial height above ground level of roughly 30 m. At this initial height, its power-off noise emissions are so low as to be nearly imperceptible on the ground. The SkyQart proceeds to descend along a curved flight path toward the landing area of the SkyNest pavement. This curved traffic pattern is deliberate because it provides the SkyQart with a longer distance over which to complete its descent over the SkyNest property. The curved traffic pattern can be a precise, 4D, steep and banked curvilinear landing approach or climb out profile and is an important component for enabling SkyNests to as small as possible.

Descending at an airspeed of 24 m/sec, the SkyQart travels in 5.6 seconds a curved traffic pattern of 106.4 m as its landing approach path reaches the point of landing touch-down on the SkyNest. The SkyQart then consumes another 4.4 seconds by rapidly decelerating to the 7.6 m/sec taxiing speed at which speed it turns to begin its taxiing to the dock. Its approach, landing roll and turn off consume just 10 seconds after entering the SkyNest boundary. The SkyQart then continues taxiing at the speed of 7.6 m/sec to seamlessly reach a position along the arrival taxiway which is close by to an empty aircraft docking station at the dock. The SkyQart then stops taxiing and proceeds to use its wheelmotors to precisely back into the empty aircraft docking station, which it accomplishes in 10 seconds using its multi-sensor guided precision positioning system. The backing in and parking process rely on electronic vehicle guidance using the SkyQart's wheelmotors along with the active main landing gear ride height adjustment to consistently achieve a precise docking alignment to within ±2.0 mm.

The precision positioning system (PPS) is an important innovation in this invention. It is an on-board system that enables the SkyQart, the EPC and the RDC to precisely dock. The PPS enables the SkyQart to be rapidly parked in exactly the aligned position at the aircraft docking station such that it can rapidly load and unload both SBPs and EPCs. This is accomplished using a PPS comprised of one or more of the following guidance technologies: differential GPS, inertial navigation system (INS), line-following software, obstacle-avoiding video camera(s) vision system, auto-focus technologies of either active infrared or a vertical and horizontal auto-focusing charge-coupled device (CCD) camera chip, a 4-beam convergent bio-medical He—Ne laser targeting a transponding receiver plate on the dock, and a capacitive proximity sensor for the final alignment to the dock surface. The line-following software on the SkyQart can accurately follow a curved guideline emanating outward on the pavement from the edge of each aircraft docking station. This curved guideline for the SkyQart is continuous from beneath the edge of the centerpoint of the aircraft docking station and it emanates outward from there onto the SkyNest parking ramp. This curved guideline has a fixed width in the range of 3.175 mm to 12.7 mm with sharp edges. This line is either painted, taped on or projected by laser, and is of a color that sharply contrasts with that of the pavement. This line provides an alignment path to guide the line-following software that is on-board the SkyQart that intends to move precisely to the center of that aircraft docking station.

This combined parking alignment technology is important and consistently aligns the parked SkyQart to within nominally ±2.0 mm of the center of the aircraft docking station so as to enable rapid loading and unloading of EPCs, as well as automated connection of the SkyQart to the dock's DC fast-charging port. Two slightly tapered solenoid-actuated pins in the dock are spaced a nominal 81.28 cm apart and are engaged into the two pin alignment holes in the aft face of the SkyQart's floorboard, which are likewise 81.28 cm apart. The engagement of these pins helps maintain the necessary alignment of the SkyQart to the dock. Automated height adjustment of the active main landing gear of the SkyQart can also help maintain correct alignment during docking.

Just prior to backing-in to its allotted aircraft docking station, the SkyQart automatically opens its rear loading hatch door to prepare for charging and/or unloading/loading of its EPC at the dock. Unloading of the EPC from the SkyQart will be followed immediately by the reloading of a laden EPC waiting on the dock for that particular SkyQart. This reloading of an EPC into a SkyQart is facilitated by the EPC having its own on-board navigation and autonomous control system along with a PPS with line-following software that can accurately follow a curved guideline emanating outward onto the dock surface from the dock edge at the center of each docking station. This curved guideline for the EPC on the dock surface is continuous, originating at the centerpoint of the docking station and emanating outward onto the dock surface from there. This curved guideline has a fixed width in the range of 3.175 mm to 12.7 mm and has sharp edges. This curved guideline is either painted, taped on or projected by laser, and is of a color that sharply contrasts with that of the dock surface. This guideline provides an alignment path to guide the line-following software that is on-board the EPC that intends to move precisely to the said center of that docking station. Unloading and reloading are each ideally accomplished in just 10 seconds, each using the nominal interoperable embodiment of the EPC that is 144.8 cm L×103.2 cm W.

Concurrent with these 20 seconds that the SkyQart spends at the dock, a robot located at the aircraft docking station can remove the SkyQart's spent standard swappable battery pack (SBP) and insert a freshly charged one into drawer slide rollers that guide it precisely into the belly of the SkyQart, where its correct position, latching and electrical integrity are automatically confirmed. Battery pack replacement need not occur at every instance of docking, depending upon the particular range of trips being flown by that SkyQart and the total range available per battery pack. As future battery energy densities and charging rates improve and the average distance of QUAD flights diminishes, the frequency with which these robotic battery pack swaps occur at the dock will diminish and, for some applications, automated DC fast-charging instead of battery swap will occur from the dock's DC fast-charging port while the SkyQart is docked for a few minutes. Such automated fast-charging is also more likely in cases where a SkyQart's energy storage is by super-capacitor.

Just 20 seconds after arriving at the dock, when the SkyQart has completed its unloading and reloading with concurrent replacement of its SBP, it then departs the dock, and proceeds in 10 seconds to taxi onto the taxiway that is adjacent to the pavement for take-off and landing, heading toward the take-off area. The SkyQart then continues its taxiing for another 10 seconds to reach that take-off area where it stops to wait in place for take-off. Next, the SkyQart taxis in less than 10 seconds into the take-off position for brake release on take-off. Upon brake release, the nominal interoperable SkyQart rapidly accelerates in 4.66 seconds to roll 43.9 m on wet pavement in no wind conditions, while undergoing no more than 0.69 G's of acceleration, to reach lift-off. Its acceleration is conducted with guided rate acceleration change execution (GRACE) with a jerk rate that is kept below 3.4 m/sec$^3$ at all points during the take-off. From its lift-off position, the SkyQart climbs steeply on a curved traffic pattern over a ground surface distance of 104.5 m in 4.66 seconds at an indicated airspeed of 24 m/sec to reach in just under 10 seconds a height of 40 m above ground level (AGL) at a position near the boundary of the SkyNest. At this position, the noise of the departing SkyQart is nearly imperceptible on the ground. The timing of the take-off is maximally staggered with that of the landing aircraft so that a safe 4D separation is always maintained between the two curved traffic patterns of the arriving and departing SkyQarts. The steep descent and climb gradients ensure that the flight paths over the taxiways are well above the height of any taxiing SkyQart.

The total turnaround time consumed by the SkyQart is 100 seconds, as described in the above example of moving through the sequence of positions, and that 100 seconds is comprised of the following steps in the turnaround cycle:

10 seconds for descent, landing and turning off of the landing pavement 10 seconds for the first leg of taxiing 10 seconds for second leg of taxiing 10 seconds for precisely backing into the aircraft docking station 20 seconds parked at the dock: 10 seconds to de-board and 10 seconds to board concurrent battery swapping during the 20 seconds parked at the dock 10 seconds for the first leg of taxiing for departure 10 seconds for the second leg of taxiing for departure 10 seconds for taxiing onto the take-off brake release point 10 seconds for take-off and climb-out to the SkyNest boundary Total: 100 seconds turnaround time (TAT).

At maximum, with departures every 10 seconds by a SkyQart seating 3 passengers, a SkyNest I with a single runway can move 18 passengers per minute or 1080 passengers per hour. However, this assumes a very close 4D intermingling of landing and departing traffic.

The Cart Service building includes EPC and RDC cleaning, inspection, testing, preparation, modification, battery swapping and other servicing.

The Cargo Service building is where cargo containers may be loaded, unloaded, cleaned, inspected, attached to or removed from empty EPCs. In this building, there may be customer will-call pick-up and drop-off of departing or arriving packages as well as loading of packages from and onto various types of road vehicles for last mile delivery. Future specialized autonomous EPCs with cargo hauling attachments will be capable of exiting a SkyQart onto the dock, pin-latching in piggyback fashion onto the surface deck of a waiting RDC, and then leaving the SkyNest's dock as the RDC with EPC aboard drives onto neighborhood streets to robotically complete the last mile home delivery of shipped parcels. After such delivery, the RDC returns autonomously ('deadhead') to the SkyNest dock where it would unload its EPC and become ready for further delivery service. Such autonomous last mile RDCs can qualify as neighborhood electric vehicles that carry passengers or cargo on residential streets. The RDC is designed to fit the basic size, weight, height and EPC attachment standards given in this patent so as to be interoperable with QUAD and with trucking dock standards. The details of size and attachment standards for such an embodiment of the RDC are included in this invention. Also available at the SkyNest will be ancillary businesses such as restaurants, shipping companies, coffee-houses, mini-marts, car, cart and bike rental, taxicab and bus parking, bicycle rack, etc.

The SkyNest I can have a renewable energy source on site. It can have a nominally 167.6 m×48.8 m solar panel array that covers both its dock area and the adjacent street, comprising a nominal area of 8175 sq m. With the best commercially available solar panels of 2020, this large solar panel array would produce a maximum of 1,800 kilowatts of power on site. The maximum power produced by this large array at the SkyNest I could then theoretically provide a maximum of 100 kilowatts of charging power for each of eighteen SkyQart standard battery packs (SBP). This capacity could double if the energy capture of future commercially available solar panels were to double.

At minimum, a nominal SkyNest must provide a 67 m length of pavement for landing, with nominally 30.2 m of that consumed during landing gear squish and an overlapping 39.2 m needed in order to decelerate on dry pavement from 24 m/sec to 7.6 m/sec at −0.7 G. In regions subject to icing conditions, this length of pavement and other portions of the SkyNest surface may be heated. There will be, at minimum, 43.9 m necessary to decelerate from 24 m/sec to 7.6 m/sec at −0.6 G if on wet, flat pavement. A nominal descent within GRACE consumes a 24.4 m horizontal distance to initial touchdown from a height of 3 meters above ground level, which is a minimum 'over the fence' height for landing at a SkyNest.

The distance over the ground (surface) that is consumed in a steep, curved final landing approach to touch-down from a height of 30 meters in a 30° bank and at an initial sink rate of 30 fps is 106.4 m if the descent and touch-down are limited to a jerk rate of 3.4 m/sec$^3$ and the touch-down occurs at a sink rate reduced to 0.% m/sec, a rate that can be manageably dissipated by the SkyQart's active main landing gear mechanism. The same path and touch-down from a height of 40 meters consumes a nominal 130.8 m.

The SkyNest II

The nominal SkyNest II is an important component to this invention. It has an area of 2.8 ha, and is a higher capacity SkyNest at which two of the 1.28 ha SkyNest I facilities are sited as mirror-images. A required minimum buffer zone that is 12.2 m W×167.6 m L is placed between the two SkyNest I facilities to create the SkyNest II in order to ensure adequate separation of the aircraft that operate concurrently on its parallel runways. The nominal 12.2 m width of this minimum buffer zone presumes that the autonomously operating SkyQarts will have sufficient precision in controlling their flight path to maintain safe lateral separations when landing or taking off simultaneously on the two runways of the SkyNest II, even during gusting and cross-wind conditions. If all departures were made by fully loaded 6-seat SkyQart IIIs at a rate of six departures per minute per runway at the SkyNest II, then 36 people per minute per runway could be launched and this would equate to it having a potential maximum capacity of launching 632 people per acre per hour and 4320 people launched per hour. If two SkyQarts of variant I or II, each with a 10.97 m wingspan, were landing or taking off simultaneously and were moving along the centerline of their respective runways, the 12.2 m wide minimum buffer zone would provide for a nominal separation of 25.7 m for their respective wingtips. In the unlikely event that two SkyQarts III were so operating, their larger wingspan would cause their wingtip separation to be 16.95 m. The area of the 12.2 m×167.6 m minimum buffer zone, when added to the 1.28 ha of each of the SkyNest I's yields a SkyNest II that occupies a total of 2.8 ha of level land. This nominal size of SkyNest II can provide twice the passenger throughput capacity of the SkyNest I. The 4D flight operations above the taxiways of the SkyNest II are calculated to maintain adequate vertical separation of the taxiing aircraft from those that are taking off and landing. The SkyNest II is shown with two large but separate solar panel arrays, each one covering both the dock area and the adjacent street with nominal dimensions of 167.6 m×48.8 m, making 8175.5 sq m. With the best commercially available solar panels of 2020, each large solar panel array of this size could produce a maximum of 1800 kilowatts of power in those conditions. The combined maximum energy of two such large arrays at the SkyNest II would then be 3600 kilowatts, which could theoretically provide a maximum of 100 kilowatts of charging power for each of 36 SkyQart standard battery packs. This 3600 kilowatts of power could double to 7200 kilowatts with a future doubling of solar panel efficiency.

The SkyNest III

The SkyNest III is an important component to this invention. It is a minimum sized, reduced capacity SkyNest that can be sited on the periphery of noise-sensitive developed residential or commercial areas when those areas are bounded by open space such as bodies of water or greenbelts. Instead of confining the acceptable noise sphere to within the SkyNest boundaries, the tiny SkyNest III relies upon the reduced noise sensitivity of the adjacent open space that is a body of water or greenbelt as a flyover zone for low-flying SkyQarts that are taking off or landing. In effect, the SkyNest III allows its acceptable noise sphere to overlap with that open space in order to allow the SkyNest III to be smaller in size. Its nominal land parcel size is 99.1 m×61.0 m and this comprises 0.6 ha instead of the 1.28 ha of the nominal SkyNest I. This smaller size is a minimum for the safe take-off and landings of SkyQarts whose lift-off and touchdown airspeeds are 24 m/sec. The SkyNest III could be alternatively sited fully inside a developed area as a single-level rooftop facility, if said rooftop is of sufficient area and is sufficiently high above street level. The take-off noise of departing SkyQarts must at all times keep the acceptable noise sphere within the airpark's fence or boundary with the noise-sensitive adjacent developed community. This requirement is met by having the center of the runway of the SkyNest III a distance of greater than 40 meters from the sidewalk boundary of that facility.

The crash cushion used at the SkyNest III can be either fixed in position at each end of the runway, movable as a unit to be positioned at the far end of the active runway, or the more expensive option of being a crash cushion that is retractable into the ground to enhance ground clearance for landing SkyQarts. The stairs that lead up from street level to the dock at the SkyNest III are consistent with the standards used at the SkyNests I, II, IV and V, in having a nominal 15.7 cm rise with a 35.6 cm tread and are 1.83 m wide.

The SkyNest IV (a Bowl-Shaped Airport)

The SkyNest IV is an important component to this invention. It is the largest and highest capacity SkyNest facility intended for siting near transportation hubs that require high passenger throughput and sustained operation regardless of wind direction. Built in its largest embodiment, that being as an above-ground structure like a stadium, it occupies a land parcel size of nominally 192.6 m×213.7 m, comprising 4.12 ha. Also like a stadium, it has a circular bowl shape with sloping pavements that ensure extremely short take-off and landing distances for the SkyQarts that operate there. The bowl-shaped SkyNest IV can built above-ground or can be excavated into an area below ground level, depending upon the local terrain, soil and ground water table conditions, with the above-ground version being more expensive to build. On sloped terrain, a hybrid of the above-ground and excavated types can be built, as in the embodiment presented in this patent. Depending upon its size and number of vehicle lanes, the street design affects the area impacted by the operational aircraft noise at any SkyNest. The design of the street interface with the dock facilities used at the SkyNest IV can be of two types and the type chosen will depend upon whether it is the above-ground version or the excavated version. Both types of street design can be used for a hybrid SkyNest IV. The particular design used can be altered to be any of several variants and still be encompassed by this patent. The above-ground SkyNest IV provides access for RDCs from street level to reach its upper level dock(s) by providing down-ramps and/or elevators designed for that purpose. Passenger elevators must also be provided, along with stairways. The size, shape, number and location of the access ramps, elevators and stairways from street level at a SkyNest IV may differ from those shown in this embodiment and such alternative variations are also included in this patent. The above-ground SkyNest IV must provide at its truck dock/cargo service area at least one large freight elevator capable of carrying a mid-size pickup truck from street level up to dock level. The size, shape, number and location of freight elevator(s) may differ from that shown in this embodiment and such alternative embodiments are also included in this patent. The above-ground SkyNest IV, if equipped with a dock on each of two sides that each include one aircraft docking station for the larger SkyQart III, can provide thirteen SkyQart docking spaces along each side, making 26 docking spaces in all. The hybrid SkyNest IV, if equipped with one dock on its ground-level side and another on its above-ground opposite side, can provide sixteen docking spaces on the ground-level side and thirteen docking spaces on the above-ground side, making 29 docking spaces in all, again including one aircraft docking station on each dock side for the larger SkyQart III. The excavated bowl type of SkyNest IV with street-level docks on two opposite sides can provide sixteen aircraft docking stations per dock side making 32 docking spaces in all, again including aircraft docking station on each dock side for the larger SkyQart III. The ideal and standard slope for the SkyNest IV pavement is 10%, wherein a 6.4 m vertical drop occurs across 64 m of horizontal distance. This equates to an angle of 5.71° and, according to the cosine of 5.71°, provides a sloped pavement length of 64.3 m across 64 m of horizontal distance. The 64.3 m of sloped pavement length, along with the 15.24 m diameter flat circle of pavement concentric with the center of the circular bowl, provide a pavement path long enough for safe liftoffs and touchdowns of the 24 m/sec airspeed of the SkyQart. This 10% slope is ideal because a less steep pavement slope offers insufficient advantages while a steeper slope becomes untenable due to take-off and landing trajectories having insufficient ground clearance along with problems in using a steeper slope for circumferential taxiing. The 10% slope used in this embodiment requires use of steep, precisely-scripted climb and approach trajectories using curved traffic patterns in order to avoid traffic conflicts and fulfill GRACE requirements. In the unlikely event of having a SkyQart on its steep landing approach in a no-wind condition overfly a SkyQart that is taxiing circumferentially along the sloped upper portion of the bowl, the steep landing approach will still provide 4.15 m of clearance above the top of the T-tail of the taxiing SkyQart. Landing with any wind above zero would increase that 4.15 m clearance. These steep trajectories are selected to fit the aerial agility, negligible control latency, drag augmentation and climb capabilities of the SkyQarts and in all cases in this embodiment are calculated to comply with the GRACE requirements. Both the standard, no-wind landing trajectory and that for a 16.1 km/hr headwind velocity can be safely conducted at the SkyNest IV. These landing trajectories are both constrained to use the same ideal or target touchdown point, which is 3.8 m beyond the center of the bowl. That is a location that ensures adequate ground clearance all along the path of a no-wind (most-constraining) landing approach. All landing trajectories at a SkyNest IV use a curved traffic pattern in a left turn until they become fully aligned with the landing runway heading just before reaching the center of the bowl. The curved traffic patterns of the curved climb-out trajectories do not begin at the liftoff point on the pavement, which liftoff point will vary according to the wind velocity at the time. Instead, before initiating any heading change, all climb-outs begin by continuing straight and level flight to fly at very low altitude over the center of the bowl while maintaining the heading used during the initial take-off distance. All landing trajectories likewise proceed to fly at low altitude over the center of the bowl. The center of the bowl is thus an intersection at which SkyQarts that are landing and taking off have a potential traffic conflict. That conflict can be averted using the networked situational awareness and autonomous control system to maintain all traffic on timed 4D trajectories that do not intersect. The divergence of the landing and climb-out flight paths at all other points approaching and beyond this singular intersection at the center of the bowl helps to ensure the safe separations for the SkyQarts operating at the SkyNest IV. A nominal 19.8 m wide level perimeter deck surrounds the upper rim of the bowl and offers, in conjunction with the uppermost portion of the sloped bowl surfaces, ample space for SkyQarts to bi-directionally taxi and maneuver into and out of the dock area. The dock area is of the standard size used at all other types of SkyNests, being 7.5 m wide and 47 cm tall. The significant benefits from using ideally sloped runways are as follows:

less power and noise needed for take-off (saves weight in wheelmotors)
less take-off distance required
reduced tendency for wheelies on take-off
less landing ground roll required, even with wet pavement
greater safety in event of brake failure
always landing and taking off into whatever wind is present
affordable infrastructure with leasable surrounding commercial building use capable of saving water runoff to a central drain
surpassing a SkyNest II in passenger capacity per acre
noise reduction at the noisiest portion of the SkyNest (the liftoff area)

All SkyNests may use on their paved surfaces a heated, poro-elastic road surface (PERS) or other variant from asphalt or concrete as a helpful method to reduce tire noise and enhance wet traction, as described by L. Goubert, Belgian Road Research Centre, Belgium[11]

If built on top of the local land surface rather than as an excavated bowl, a perimeter tall enough for convenient, compatible street level commercial businesses and low-cost housing can allow the co-location of these within the land parcel size of the SkyNest IV. These may include apartments as well as businesses such as shipping, restaurants, small grocery, etc. The effect of having such useful and leasable properties embedded around all sides of an above-ground SkyNest TV effectively reduces the size of the land parcel actually dedicated for its surface and flight operations (and excluding its dock areas) to just 143.3 m×143.3 m or 2.05 ha. These mixed uses of the buildings underneath the above-ground SkyNest IV increase the walkability, utility, attractiveness and property values of the neighborhood around the SkyNest IV.

The portion of acceleration due to gravity, "G" that acts constantly along the downhill slope at a SkyNest IV is G Sin θ, if θ is the included slope angle. If the angle is that of a 6.4 m rise that occurs across a 64 m run, then the angle will be ATAN(21/210) or ATAN(0.1). That angle is therefore 5.711° and its sine is 0.1, which means that 0.1 G are acting continuously along the downhill (hypotenuse) slope of the ramp to assist in take-off acceleration, or, when the SkyQart is landing uphill, acting continuously as a constant braking deceleration assist[12]. The 10% slope provides these 0.1 G acceleration and deceleration assists to take-offs and landings regardless of the wind level or whether the pavement is wet or dry. The 10% slope provides enough deceleration assist that, in a worst-case scenario, a SkyQart can decelerate from its touchdown speed of 24 m/sec to the 7.6 m/sec taxiing speed when landing uphill in only 37.8 m with no headwind and no reverse thrust, if a 16.1 km/hr headwind is present and reverse propeller thrust is used, this deceleration distance can be reduced by more than 15.24 m.

The SkyNest IV reduces noise by reducing take-off power required, by its bowl shape serving as a sound wall, by placing the loudest part of tire/pavement noise into the center of the bowl (same for touch-down tire chirp). It also will slow down an abortive take-off with its uphill ramp, ensure consistency with into-the-wind take-offs and landings by offering any runway direction, varying the climb-out trajectory so that it is not always over the same neighbor's house, quell wind velocities down inside the bowl, reduce tire wear, capture water for irrigation/industrial use, potentially use some of its bowl surfaces as a solar panel array, use the perimeter outside the above-ground bowl to provide $1^{st}$ floor and $2^{nd}$ floor areas for small businesses underneath the dock areas, and use the bowl surfaces for taxiing and/or night-time parking of SkyQarts after curfew. In an alternative embodiment, the SkyNest IV could expand its dock area to encompass its entire perimeter and extend SkyNest pedestrian entries to all sides of the block perimeter. The dock can be protected with movable QUAD crash cushion carts that are placed at the terminus of each active runway. The SkyNest IV increases fixed initial infrastructure cost but can reclaim that cost by leasing its attractively located street level properties and in fees for its high capacity operations. The SkyNest IV offers the possibility of as many as six departures per minute, one every 10 seconds, interspersed with six landings in that same minute. If all six departures were for SkyQart III aircraft with six people aboard each aircraft, that would launch a maximum of (6×6×60)=2160 people per hour per above-ground SkyNest IV as an extreme of capacity.

Fillets in the paved surfaces at both the top and bottom of the bowl ramps smooth the transition across them. Rather than earth-fill, the above-ground-level, bowl-shaped SkyNest IV can be built like a stadium[33], on steel truss or concrete underpinnings for stability and accuracy in its geometric shapes. The steel and concrete construction method that is used in multi-level carparks can be employed for the above-ground bowl shape.

With the sloped runways at the SkyNest IV, the distance to decelerate from a touch-down speed of 24 m/sec to taxiing/turnoff speed of 7.6 m/sec is only 37.7 m if the landing is uphill with no wind and no reverse propeller thrust is employed.

The trajectories of both climb-out and landing at the SkyNest IV must be precisely conducted in order to ensure ideal use of the advantaged acceleration or deceleration imparted by the sloped runways at the SkyNest IV. Such precision trajectories are made possible by autonomous flight controls with negligible control latency. The circle of level floor at the center of the bowl shape of the SkyNest IV has a nominal diameter of 15.24 m. To ensure clearance of the downhill sloped pavement during final approach, a SkyQart landing with a correct trajectory must continue flying until it is directly over the center of this circle and must then touch-down at a point that is 3.81 m beyond the center of this circle.

In order to gain sufficient height when climbing to clear the opposite up-sloped portion of the bowl, the climb-out trajectory of the departing SkyQart must begin with a liftoff that occurs at or before a ground roll distance of 42.7 m from the point of its brake release at the top edge of the bowl. This performance demands the use of a combination of landing gear wheelmotors and propeller thrust to achieve a brisk rate of take-off acceleration that is still compliant with GRACE requirements.

The SkyNest TV will have separate runways for take-off and landing, with their respective runway headings 30° apart in order to enhance the separation of the aircraft that are landing from those that are taking off. The heading of these runways will change according to the wind direction, as follows: Each of the two runway headings will be oriented on either side of the prevailing wind heading, making each runway heading nominally 15° different from the present wind direction. For example, if the wind heading is from 30°, then the headings of the two runways will be 15° and 45°, making them 30° apart but causing the maximum crosswind angle to be only 15° for either of these runways. This alignment would cause the maximum crosswind component to be consistently limited to just 25% of the prevailing windspeed, thus allowing take-off s and landings in windspeeds as high as 96.6 km/hr with only a 24.1 km/hr crosswind component. If the runway headings were, instead of 30° apart, only 20° apart, the likelihood of traffic conflict would increase without significant gain in crosswind protection. Likewise, if the runway headings were 45° apart, the gain in reducing traffic conflict would not be significant relative to the worsening of the crosswind protection. Therefore, runway headings that are 30° apart are the standard for the SkyNest IV.

At the perimeter of the sloped sides of the bowl at the SkyNest IV, there is a nominal 19.8 m wide, level peripheral taxiway for SkyQarts to use, in addition to which, when traffic allows, SkyQarts can use the sloped walls of the upper portion of the bowl at the SkyNest IV as a taxiway.

The dock at the SkyNest IV has the same standardized dimensions as that at the SkyNests I, II and III, being 7.5 m wide and 47 cm tall.

After take-off, climbing to a 40 m height above ground is normally required of all SkyQarts to achieve community-acceptable noise levels at the outer boundaries of the SkyNests I, II, III and IV. The climb-out of the SkyQart normally requires a distance of 129.2 m in order to reach this 40 m height, when such climb-out is conducted over level ground in compliance with GRACE requirements. When this climb-out arc is conducted from a downhill pavement toward the opposite uphill pavement at a SkyNest IV, the ground clearances at all locations along the initial climb-out trajectory are reduced due to the SkyQart's liftoff occurring in a 5.71° downhill trajectory. The height above ground achieved at a given distance from the take-off brake release at a SkyNest IV will thus be less than that at a SkyNest I, II or III due to the initial downhill trajectory of the SkyQart at the SkyNest IV. The ground clearances are also affected by the location on the runway at which liftoff occurs, which, in turn, depends upon the wind velocity. After brake release at the top rim of the bowl of the SkyNest in a no wind condition, the point of lift off must occur within a worst-case ground roll distance of no more than 42.7 m in order to ensure sufficient ground clearance at all locations along the climb-out trajectory at a SkyNest IV. Immediately at the moment of liftoff in a standard take-off trajectory, the SkyQart will execute a climb in which it maintains its initial heading until it reaches the center of the bowl. In the no wind condition, the planar distance from liftoff to the center of the bowl is 29.0 m. From the center of the bowl, the departing SkyQart then continues its climb by executing a left turn in a 30° bank angle to climb a horizontal distance of 100.3 m along a curved traffic pattern to reach a height above ground of 40 m. At the SkyNest IV, the combination of the beneficial effects of a downhill pavement and taking off always into the wind can help to shorten the take-off distance and can make the nominal 42.7 m ground roll distance readily and consistently achievable by the SkyQarts I, II and III. For example, if the effective wind velocity on the runway surface is 17.1 km/hr, then the nominal 42.7 m take-off distance would instead be shortened to just 27.1 m, even when performed with the requisite GRACE. Likewise, a direct headwind velocity of 34.2 km/hr would reduce the take-off distance to just 16.8 m with GRACE. Such shortened ground rolls will cause the SkyQart to begin its climb-out at a position that is higher above the bottom of the bowl and thus afford substantially greater ground clearance throughout the climb-out trajectory. When the climb-out is initiated in a no wind condition at a liftoff that is exactly 42.7 m from the edge of the top of the bowl and is correctly conducted at an airspeed of 24 m/sec, then the climbing SkyQart will achieve a sufficient clearance height above all locations along the bottom and opposite (uphill) side of the SkyNest IV. For maximizing ground clearance after lift-off, the path projected over the ground of the climb-out trajectory must continue straight along the initial heading until it reaches the center of the SkyNest TV bowl, at which position the curved 30° banking climb trajectory must consistently and immediately begin.

Each SkyNest IV will have a small portion of its periphery devoted to a small aircraft hangar to enable any necessary maintenance, repair or overhaul (MRO) to the vehicles that operate there.

The perimeter of the top of the bowl at the SkyNest IV is 19.8 m from the closest dock edge, in order to provide adequate room for bi-directional taxiing of SkyQarts I, II and III.

The SkyNest IV bowl shape must have a nominal 7.6 m radius flat, non-sloped central circular area to serve as a transition from one side of the bowl to the other.

The SkyNest IV bowl has a planar (top view) radius of nominally 71.6 m including the flat, non-sloped central circular area of 7.6 m radius that is concentric to the center of the bowl.

The SkyNest IV can be configured with dock facilities on one, two, three or four, of its outer sides.

The bordering streets along one or more of sides of the SkyNest IV can be any of several types. Ideally, such streets would include bike lanes, short term parking, bus stop areas, loading zones, and a central bi-directional pair of lanes for electric mini-bus transit service.

The SkyNest IV standards for the pavement slopes, bowl size, taxiways and dock area dimensions are the minimums that can provide the necessary low-noise, steep landings and take-off's for the SkyQarts I, II and III. The SkyNest IV dock area can accommodate as many as sixteen SkyQarts per side dock if only one of those sixteen aircraft is the six-seat SkyQart III with its larger wingspan.

The Rooftop SkyNest V

The SkyNest V is an important component to this invention. It is possible to place a SkyNest atop a tall building or multi-level parking structure. The configuration of such rooftop SkyNests will depend upon the height of its building, the planar size of its rooftop and the height and proximity of adjacent tall buildings or trees. The main purpose of a rooftop SkyNest is to provide acceptably quiet, high proximity access to QUAD service in highly developed, surface-congested areas such as metro centers, urban canyons or major hub airport terminals. In some cases, a SkyNest can be added to the roof of an existing building or structure while in other cases it will be applied to a purpose-built building. It may be applied to the roof of existing parking garages at major hub airports. In all cases, there must be unobstructed approaches and departure paths to the pavement of a rooftop SkyNest, and the size of its pavement and docks must match the performance capabilities and dimensions of the SkyQarts described herein, just as is true for the each of the standard sizes embodied in the SkyNest types I, II, III and IV. Theoretically, and if the building size allows it, any of the SkyNest I, II, III and IV types could be placed on a rooftop. However, in all of those types, the SkyNest would have its dock area on the roof surface along with its pavement and this would require a building with an enormously large rooftop. The SkyNest V is a $5^{th}$ type that differs from SkyNest types I, II, III and IV in having its dock for SkyQarts placed not on the rooftop, but on a separate lower level that is one floor down from the rooftop. That lower level dock is reachable for SkyQarts on the pavement areas by having them use one or more taxi ramps to reach that lower level. By placing the dock on the lower level, and by being high enough above street level observers, a rooftop SkyNest V facility can quietly and efficiently use shorter pavements that align to any compass heading that suitable to the prevailing wind conditions.

In accordance with the calculated standard performance and trajectories of a SkyQart that is landing or taking off in zero wind on a pavement surface equipped with a crash cushion, the nominal interoperable SkyNest V requires a square or round flat rooftop surface whose minimum diameter is at least 99 m. If a square surface of 99 m per side, the area of such a SkyNest V would be 0.98 ha. A nominal SkyNest V must provide two sufficiently wide taxiing ramps to the lower level one floor down where its dock facilities are located. Said SkyNest V must also provide one or more express elevators to transport passengers and cargo at the dock to and from the street level below or to any of the other lower levels of the building or structure. The taxiing ramps are best positioned outside of the 99 m diameter pavement surface area, in order to preserve its fullest capability for landing along any compass heading.

The rooftop SkyNest V moves the SkyQart operations to a substantial height above street level, and so can enable the use of a smaller SkyNest surface where the landing and departure paths need not occur above and within the SkyNest boundaries because their acceptable noise spheres (ANSs) are imperceptible to observers at street level.

The nominal SkyNest V generally will incorporate the other core features of a surface SkyNest including the same sized facilities for docking, battery swapping, crash cushion, navigation, lighting, etc., except that the docking and battery swapping are performed on the lower level below that of the pavement level.

Fast Flaps System

The Fast Flaps System is an important component to this invention. The double slotted wing flaps on all of the SkyQart aircraft enable the ESTOL performance required of these aircraft. These flaps have a special design innovation that enables them to fully retract in less than 0.5 seconds. This is accomplished by their use of a special high instant torque, non-cogging, thin, fast-accelerating pancake motor, housed inside the mid-wing bay, whose motor rotor serves as a crankshaft to precisely move a set of pushrods the exact distance necessary to simultaneously extend or retract their respective attached flap segments on the right and left wing, to their ideal exact gap and overlap positions.

The extremely short pavement landing performance of the SkyQarts requires rapid and powerful braking instantaneously after touch-down because in no wind conditions the vehicle will be traveling at 24 m/sec at that instant. This rapid braking is made possible by the disc brakes and the regenerative mode of the electric motors in the wheels of the main landing gear. These wheelmotors are capable of powerful regenerative braking but only under conditions in which substantial downward weight is applied on the contact patch of the main landing gear tires. Providing this substantial downward weight at the instant of touch-down requires a near instantaneous cessation of wing lift, which is accomplished for the SkyQart by a precisely timed and synchronized robotic automatic symmetrical retraction of its high-lift wing flaps in less than 0.5 seconds. This extremely rapid retraction is the essence of the fast flaps system and it is made possible by the combination of a pancake motor with a direct crank linkage that can precisely, symmetrically and simultaneously move the left and right wing's extended flap segments on their respective hinge pins into and out of their fully retracted and nested position while using less than 180° of motor shaft rotation.

The high-lift wing flaps used in the fast flap system on the SkyQart are of the double-slotted semi-Fowler type, and the geometry of these flaps, according to credible research reports, can provide an unblown lift coefficient that approaches 4.0. The SkyQart uses blown flaps that are positioned directly downstream of the large propellers that are forward of the main wing of the SkyQart so that the airstream accelerated by the propellers will blow over the flaps and increase their effectiveness in creating extra lift, with blown lift coefficients that can approach 7.0. The double slotted flap is comprised of two flap segments; a forward flap segment and a rear flap segment. For the fast flap system on the SkyQarts of QUAD, the forward and rear flap segments each have a customized and unique airfoil section tailored to efficiently direct airflow downward and to closely fit the proprietary shape of the flap cove at the rear portion of the main wing airfoil. The main wing airfoil for the fast flap system is the NASA/Langley LS(1)-0413 (GA(W)-2) general aviation airfoil whose maximum thickness is 12.9% of chord. Other airfoils may be used with a fast flap system on other aircraft and still be encompassed by this fast flap system invention.

To minimize leakage drag, the forward and rear flap segments fit closely together when nested into their retracted positions inside the flap cove at the trailing edge of the SkyQart's wing. The internal spar and underside skin of each of these flap segments is rigidly attached to a flap hinge strut that connects that flap segment to the aircraft at precisely located hinge pins that attach to their respective external under-wing hinge fins. The hinge pin location for the forward flap segment is a different location than that for the rear flap segment, and this causes the forward and rear flap segments to swing on different radii through different arcs as they are extended. This differential arcuate movement causes the flap segments to separate from the wing and from each other at different rates as they are extended for the landing approach. The exact hinge pin locations and the length of their respective flap hinge struts determine the relative movement of the flap segments. The hinge pins are both located on a sturdy shared external underwing hinge fin that is rigidly and securely attached to the structure of the wing's rear spar and lower wing surface just forward of that rear spar. The hinge pin locations for the forward and rear flap segments are each located at a separate position below and aft of the rear spar of the wing so that as the flap segments extend, the initial movement of these flap segments is mainly aftward from the wing. Such aftward, rather than downward, movement of the flap segments is characteristic of the so-called Fowler flap, but in this case the aftward movement is accomplished by a simple, low-friction hinge rather than by the traditional Fowler flap method of movement by rollers on flap tracks. This aftward movement increases the chord of the wing and thereby increases the effective wing area, which in turn, enhances lift. Once beyond their initial aftward extension, continued extension of the flap segments moves them mainly downward from the trailing edge of the wing and thereby increases the camber of the wing. The combined increases in wing chord and wing camber that result from full and optimal extension of the flap segments have the effect of throwing air downward and thereby provide a large increase in lift and drag during flight at the operational angles of attack used during slow flight and approach to landing. The actuation by use of simple hinges instead of rollers on tracks enable these flaps to be retracted in less than 0.5 seconds. The fast retraction process that is produced by precise rotation of the flap motor(s) is aided by aerodynamic forces at touchdown that tend to force the flaps up into their retracted, nested position.

The full and optimal extension of the flap segments positions them so that an air gap or slot exists between the two flap segments and a separate slot exists between the forward flap segment and the trailing edge of the wing. At full and optimal extension, these two slot gaps each have an optimal geometry in terms of the size of these gaps and the overlap between both the flap segments themselves and between the forward flap segment and the wing. The gap measurement between the flap segments is simply the shortest distance between the upper wing or flap segment and the flap segment below. The gap is the length of a line drawn from the lower surface of the trailing edge of the wing or flap segment above to the nearest point on the upper surface of the flap segment below. The overlap measurement between the flap segments is made by first drawing an initial index line downward from the lower surface of the trailing edge of the upper wing or segment whose overlap is being determined, making sure that the drawn index line is perpendicular to the chordline of that upper wing or segment. Then, a second line is drawn that is both parallel to that initial index line and tangent to the leading edge of the lower flap segment. The overlap measurement is then the shortest distance between the drawn index line and the drawn tangent line. The gap and overlap sizes are expressed as a percent of the wing chord or % C. For each flap segment, it is the exact positioning of the hinge pin locations and the length of their respective flap hinge struts that determine the slot gaps and overlaps that, at full flap extension, provide optimal geometry for enhancing lift.

Dimensional details for the nominal interoperable embodiment of the fast flaps system expressed for the SkyQarts I & II in this patent are as follows: The forward flap segment, at its full extension of 34°, has a gap of 3.8 cm and an overlap with the wing trailing edge of 2.68 cm. Relative to the wing chord, "C", of 142.3 cm at the flap root, these represent a gap of 2.68% C and an overlap of 1.89% C. The rear flap segment, at its full extension of 56°, has a gap of 3.25 cm and an overlap of 0.11 cm. These represent a gap of 2.29% C and an overlap of 0.08% C. These gaps and overlaps closely fit the range of those that are optimal for high lift according to page 41 of NASA CR-2443 published in 1974. For the nominal SkyQart fast flap system geometry included in this invention, the fully extended flaps provide an increase in wing chord of 20.8% along with a marked increase in wing camber. The SkyQart I & II wing flaps have a span of 7.83 m. The maximum nested flap chord at the flap root (not at the fuselage midline) is 46.5 cm, which, relative to the wing's total chord of 142.3 cm at that station, comprises a flap chord of 32.7% C. An acceptable range for flap chords in the SkyQart is 28 to 38%. As the main wing tapers along its outer span, the flap chord tapers proportionately, remaining at 32.7% C. The flap span comprises 71.35% of the SkyQart I or II's 10.97 m wingspan. From its nested position, the aft flap segment swings about its hinge pin through an arc of 56° to its full extension while the forward flap segment swings about its hinge pin through an arc of 34°. When fully nested, there is 18.64 cm of the rear flap segment's upper surface that visibly extends aft of the wing trailing edge. Flap extension splays the two overlapping flap segments apart longitudinally as they extend aft from the wing trailing edge. The wing chord at the flap root, with full flap deflection, increases from 142.3 cm to 172.0 cm, providing an increase at the flap root of 29.7 cm in total wing chord. This results in a substantial increase in wing area with full flap extension, adding nearly 1.86 sq m. A span of 2.54 cm separates the outboard end of the flap from the inboard end of the aileron.

The hinged movement of the flap segments is actuated by a pancake motor that operates from inside the middle bay of the main wing. This motor rotates a crank with two separate crank pins—one pin for the forward flap segment and one for the aft flap segment. These crank pins each push a separate pushrod that, in turn, pushes on the leading edge of each flap segment. Because it must move a greater distance, the crank pin for the rear flap segment is on a longer radius crank throw than the crank pin for the forward flap segment, and thereby provides a longer travel for the rear flap segment when their common crank is swung through an arc of 120°. The robotic, software-controlled pancake motor can accomplish this ⅔ of a revolution or 120° rotation required for full flap retraction in less than 0.5 seconds, including the initial and terminal accelerations and jerk rates necessary for smooth and precise operation and consistent with GRACE. The motor can likewise fully or partially extend both flap segments in nominally less than 0.5 seconds, although such rapid extension is prohibited an any airspeed above the airspeed for flap extension ($V_f$). Such rapid extension should only be performed with caution due to sudden increased loads on the aircraft's structure. The radii of the crank throws can be exactly sized so that the roughly 120° crank rotation provides just enough pushrod travel to directly move each flap segment to its ideal position. When coupled with a ground proximity sensor and ground contact sensor in the main landing gear, as well as to a sink rate sensor and propeller thrust sensor, the pancake motor in the wing can fully retract the wing flaps in ideal synchrony with the landing touchdown. That ideal synchrony is one in which the wing flaps are fully retracted and nested into the flap cove within 0.5 seconds after the instant of touch-down. The full retraction of the flaps immediately after the landing touch-down instantly reduces wing lift so as to place a much greater downward force on the main landing gear tires, which, in turn, enables those tires to exert greater braking force on the pavement. The wheelmotor inside each main landing gear wheel will spool up the rotational speed of its wheel to match the detected ground speed of the aircraft just prior to the moment of landing touch-down. This will reduce both tire wear and tire chirp noise and allow almost immediate braking to begin after touchdown. The precisely controlled wheelmotors with their anti-lock braking system can then exert an exactly appropriate build-up and maximum amount of braking force to provide a minimum non-skid landing whose distance, deceleration and jerk rates that are tolerable to passengers, in accordance with GRACE.

To provide head clearance for pedestrians and crew, the flaps of the fast flap system remain retracted during the SkyQart's taxiing, docking and other ground operations.

The SkyQart III has a fast flaps system whose operation and dimensions are very similar to those of the SkyQarts I & II, except that it has an additional wing center section of constant wing chord in which large constant-chord fast flaps are installed.

Alternative embodiments of the fast flap system concept are possible. Other types of flaps systems, including those that rely upon co-flow jets and circulation control may be used on other embodiments of the SkyQart and these are encompassed by this fast flap system invention, when they are used as high lift devices on SkyQarts and when their full retraction or cessation of lift can be routinely accomplished in less than 0.5 seconds. Blown flaps are those whose lift is augmented by the blowing of air over them by propeller thrust or other means of blowing air such as compressed air or multiple small fans or turbines. Fast flap systems may include single-slotted flaps, plain flaps, Fowler Flaps of single, double or triple-slotted variety that move with rollers on tracks, as well as leading edge flaps and slats on the front of the wing, as long as their full retraction can be accomplished in less than 0.5 seconds.

Active Main Landing Gear

The Active Main Landing Gear is an important component to this invention. The main landing gear of the SkyQart is connected to a fast and powerful actuator system that is able to position it at any of a range of desired positions, depending upon the situation. This actuator system concept and process is called the Active Main Landing Gear. Its purpose as an invention is to enable the very steep landing approaches and short take-offs of the SkyQart along with its requirement for exact height positioning at the standard dock height.

In the embodiment presented herein, to reach its full dangle-down position as occurs during final approach to land, there is 49.0° of downward swing of the main landing gear leg around its trunnion axis when measured from the static docking position of the main landing gear leg. From its static docking position, the landing gear can also be rotated upward by 14.6° around its trunnion axis to place it in the trailing cruise flight position. The total swing angle of the main landing gear leg is thus 49+14.6=63.6°.

The trailing portion of the wheel pant or wheel fairing must be truncated due to the extreme down angle of the main landing gear during approach to landing, so as to avoid scraping the fairing on the pavement. The fairing is mounted such that it offers the lowest drag when the landing gear leg is in the fully up trailing cruise flight position.

The long-travel linear electro-hydraulic-magnetic damper used to move the landing gear lever arm and thereby move each leg of the main landing gear operates autonomously in a fast-acting closed feedback loop to precisely and actively position the landing gear at each instant during landing touch-down, with the positioning tailored to control the acceleration and jerk rates to tolerable levels while providing very long travel (jounce) to absorb the loads from arresting the descent of the SkyQart from the instant of touchdown. This process is designed to provide zero rebound after touchdown. It provides the gradual energy absorption of the full jounce travel, which is completed in 1.08 seconds across a jounce travel length of 0.65 m.

The automatic positioning of the main landing gear includes sensing and accommodating the effects of its wheelmotors in generating additive torque on the landing gear leg. The use of 40.64 cm diameter tires rather than larger ones provides higher tire RPM, which can deliver greater efficiency of the direct drive wheelmotors and greater precision in positioning of the SkyQart and its landing gear positions.

The Ultra-Quiet Propeller

Ultra-quiet Propellers are important components to this invention. The ultra-quiet propellers used on each of the nominal embodiments of the SkyQarts I, II and III herein are 3.05 m in diameter and have a maximum operational speed of rotation of just 650 RPM. In addition, these propellers have a special electrically operated hub that can simultaneously and rapidly and equally change the blade angle of each of its seven blades. The hub achieves such blade angle change by having a mechanism that can rotate each blade on its long axis at a nominal rate of up to 12 degrees per second. Such rapid blade angle changes enable the propeller to rapidly change its level of thrust or drag to suit the phase of flight.

The ultra-quiet propeller combines two important inventions. The first invention is a multi-bladed propeller with high aspect ratio blades than can deliver the thrust required for take-off and climb while emitting no more than 35 dBA of noise at a 40 m sideline[14]. The second invention is that same propeller having a controllable hub that is capable of precisely and equally changing each blade's angle at a rate of more than 12° per second, which enables the very rapid transition from thrusting mode to wind-milling mode to reverse-thrusting mode. The nearly instantaneous transition from thrust to reversal of thrust enables the extremely short landing distances and agile steep descents during approaches to landing.

The extremely low noise achieved by this propeller is due to its combination of very low tip speeds with seven high-aspect ratio, stiff, vibration-resistant, laminar flow blades that have reduced tip vortices and that are pitched to deliver high lift coefficients in accordance with the author's existing patent number U.S. Ser. No. 10/415,581B1.

The special ultra-quiet, multi-bladed propellers used in QUAD have a large diameter of more than 213.4 cm and have take-off and cruise rotational tip speeds that are limited to below 152.4 m/sec. These propellers may vary in number from the nominal interoperable two propellers on the SkyQarts I and II to the nominal interoperable three propellers used on the SkyQart III. Alternative embodiments of the SkyQarts may have a number of propellers of about two or more, about three or more, about four or more, about six or more or any number between and including the numbers of propellers provided, while it is preferred that the number be two for the SkyQarts I and II and three for the SkyQart III because these offer the lightest and simplest means to create blown wing flaps. Each nominal interoperable propeller has seven blades as in the preferred embodiments presented herein. Alternative embodiments of the SkyQarts may have a number of propeller blades with a conceivable range of about three or more, about four or more, about five or more, about six or more, about seven or more, about eight or more, about nine or more or any range between and including the numbers of propeller blades provided, while it is preferred that the number be seven for all SkyQarts with a preferred range of six to eight because these offer the lightest weight variants that can still achieve the extreme low noise emissions that are necessary.

Electric Payload Cart (EPC) Seat Latching Tracks and Latching Pins

The Electric Payload Cart (EPC) is an important component to this invention. The EPC is designed as a standard sized device with standardized attachment tracks. It can be loaded and latched into any SkyQart or onto the top of any RDC in order to carry the EPC's latched-on payload from point of departure to doorstep destination. The nominal interoperable EPC can carry a 265 kg payload. Alternative embodiments of the EPC may carry payloads within a conceivable range of up to 260 kg, to 280 kg, up to 315 kg or any weight between and including the weights provided, while it is preferred that the weight be the nominal interoperable 265 kg with a preferred range of 260-280 kg because this provides a workable combination of practicality, manageable power demand, structural loads, and compatibility with the most common payloads to be hauled. The EPC is sized to provide for hauling a wide variety of different payloads of common types while still fitting inside any SkyQart and atop a standard RDC. It is important that the EPC have standardized size, height, shape, capacity, seat-latching track dimensions and track spacings in order to enable standardized attachment fixtures on seats, cargo bins, latching racks and other cargo hauling attachments that carry various common and uncommon payloads in the QUAD system. Nominal interoperable dimensions for these parameters are provided as standards herein. Other alternative standards may be used, but these would only make sense to the concept and processes of the QUAD system if they were part of system-wide standards settings that were also made compatible with the dimensions and sizes of RDCs and SkyQarts.

The standard EPC trapezoidal platform that fits correctly inside the SkyQart is 144.8 cm long and 103.2 cm wide at its rear edge. This standard platform narrows symmetrically at the forward portion of the cart to have a width at its forward or front edge of just 71.12 cm. The narrowing of its trapezoidal platform begins at 91.44 cm forward of the rear edge of the platform, a station where, when pin-latched into its nominal interoperable position in the SkyQart, the inside diameter of the AFP is 146.7 cm. The EPC has a 119.4 cm wheelbase. Its front track is 58.1 cm wide and its rear track is 88.9 cm wide. The front wheels are sturdy swiveling castors. The rear wheels are autonomously controlled wheelmotors. Each of the four 12.7 cm diameter wheels are set 12.7 cm from the fore or aft edge of the cart[15]. The EPC has no suspension travel and therefore has a nominal and consistent 2.54 cm of ground clearance, an important dimension that is predicated both on its need to maximize passenger headroom inside the SkyQart's AFP and on the need for the EPC's surface deck to have a consistent height above the cabin floor of the SkyQart. The 2.54 cm ground clearance is sufficient because EPCs normally only operate on the flat smooth dock, and the flat smooth floorboard surfaces of the SkyQarts and the RDCs, which are grooved to accommodate the standardized tire spacings of the EPC. Each tire on the EPC has its sidewall just 5.2 cm from the lateral edge of the EPC.

Each rear wheel of the EPC is attached to a powerful wheelmotor that can provide precise rotation as needed for steering and positioning of the cart on the dock and into and out of the SkyQart or RDC. The EPC has four separate sets of identical 6.86 mm diameter holes arranged in a linear array with equal 25.4 mm spacing between these holes with an array located along both the forward and aft portions of both the port and starboard sidewalls of the EPC. Each of these four arrays consists of four such holes that are horizontal and are each 12.7 mm deep. These holes serve as receptacles for the four separate 6.35 mm diameter solenoid-operated latching pins that fixate the sides of the EPC to the interior of the SkyQart's AFP and to the floor of the RDC. There are two forward solenoids and two aft solenoids, all with latching pins. This array of solenoids are structurally attached to the interior of the SkyQart's AFP structure or to the sides of the RDC's surface deck, respectively. The center of the latching pins of the forward and rear solenoids are a standard 77.5 cm apart. These four solenoid pins are normally extended and require application of an electrical current in order to retract, but they can also be retracted and disengaged manually with a pull-ring that can be latched into the pin-disengaged position when pulled.

Side-to-side restraint of the EPC is augmented by the sturdy solenoid body itself. The means of manual release, when necessary, is by both a hidden external electrical push-button to electrically actuate the solenoids or by a hidden pull-cable that is ganged to the pull-rings of all four solenoids. One such commercial example of such a solenoid is described here[16].

The aft-most of these four 6.35 mm holes for the solenoid latching pins in the sidewalls of the EPC are centered nominally 38.1 mm forward of the cart's trailing edge on both its port and its starboard sides, at the midpoint of the cart's sidewall height. An identical array of these four holes is present on both sides of the cart at a forward location near the point at which the cart's trapezoid-shaped surface tapers in width. The forward most of these forward four holes is located 88.9 cm forward of the cart's trailing edge. These four holes provide adjustment of the location at which the EPC is pin-latched inside the aircraft so that the SkyQart's center of gravity can be adjusted as needed. For both the SkyQart and the RDC, the inner surface of the rectangular solenoid body whose pin latches the EPC is located 3.81 mm laterally from the sidewall of the EPC. This narrow 3.81 mm clearance is important to the rapid loading and unloading of the EPC. A larger clearance would lead to rattle and looseness of the pin-latching and a smaller clearance would cause scraping and friction during loading and unloading.

The EPC has its own low-profile rechargeable and swappable battery pack along with an on-board navigation system. This navigation system operates using detect-and-avoid hardware and software similar to those used in driverless cars, allowing it to move autonomously around the dock and into and out of the SkyQarts there. The EPC has a multi-sensor precision positioning system that is integrated with the navigation system and that includes line-following software that enables it to precisely dock into SkyQarts and onto RDCs.

The top surface of the EPC has six separate longitudinal seat latching tracks whose size, shape and spacings are standardized herein for the purpose of facilitating the attachment of various types of payload-holding devices, including seats, Qusheats and cargo hauling attachments. These payload-holding devices are attached to the EPC before it gets loaded with a payload and before it gets pin-latched onto a SkyQart or RDC. These payload-holding devices may include passenger seats of various types, baggage bins, cargo bins, latching racks for the attachment of out-sized freight and building materials and other cargo hauling attachments. To enable interoperability, the locations and dimensions of the seat latching tracks are standardized on all EPCs in terms of their shape, height, width, thickness, contour, hole size, material strength and spacing to make for uniform attachment specifications for the various types of payload. The shortened outermost seat latching tracks on the cart are near the cart edges and are truncated at the forward portion of the cart where the planform of the cart platform necessarily tapers symmetrically in order to fit inside the AFP. The centers of these outermost tracks are 99.1 cm apart horizontally. At a distance of 25.4 cm inboard of the center of these outermost seat latching tracks are the center of the EPC's medium-length seat latching tracks, which terminate at the forward wheel casters. At a distance of 8.9 cm inboard from the medium-length seat latching tracks are the full-length seat latching tracks. The center of the full-length seat latching tracks are 30.5 cm apart horizontally, and are spaced equidistant from the longitudinal centerline of the EPC. These exact dimensions of this array of seat latching tracks serve as a nominal interoperable set of standards to which a wide variety of payload-holding devices can be built so that they can be latched onto an EPC. These devices include seats, cargo bins, med-evac litters, wheelchairs, bicycles, scooters, generators, air compressors, solar panels and various combinations thereof as well as latching racks and platforms for a wide variety of other out-sized payloads. The size of the EPC itself, both laden and un-laden, is designed to also fit onto the surface of the Robotic Delivery Cart (RDC) and to pin-latch onto it in the same fashion that it fastens to the interior of the SkyQart, i.e., by solenoid pin-latching into the receptacle holes on the sidewalls of the EPC.

The EPC's battery pack is standardized for the QUAD system at a nominal size of 6.35 cm H×22.9 cm W×30.5 cm L. It is mounted between the inner seat latching tracks of the EPC, straddling its centerline, on top of its surface deck, with its rear face 2.54 cm forward of the rear edge of the EPC. Just forward of this battery pack is mounted the EPC's navigation hardware pack, whose dimensions are 6.35 cm H×22.9 cm W×6.35 cm L.

The one-seat and two-seat payloads when pin-latched onto the EPC provide closeable small carry-on baggage bins both in front and in back of the seat. The bin in front of the seat provides for access to personal items during flight. For two-seat payloads, there are two front baggage bins and two rear ones. Each front baggage bin and aft baggage bin is at least 58.4 cm H×36.8 cm W×25.4 cm L and can accommodate one airline standard carry-on bag of 55.9 cm×35.6 cm×22.9 cm, so that each passenger in a two-seat SkyQart can carry two airline standard carry-on bags. The hinged lid of the front baggage bin contains an accessible touch-screen tablet computer whose dimensions are 30.5 cm×22.0 cm×0.69 cm. It has a 32.8 cm diagonal screen (a popular size for a computer tablet) and offers high-speed wi-fi internet access and a USB or other popular standard port jack. When the EPC is fitted with its maximum of three seats, space limitations demand that there is no room for baggage bins. In the case of an EPC with a three-seat payload, the forward passenger must fold his or her legs onto the leading edge of the cart when it is rolling along the dock. Other limitations of the three-seat EPC are that it can be carried on top of the RDC for short trips in good weather, but unlike the one or two-seat version of the EPC, the three-seat version is too large to be covered with a rain roof on the RDC. The two and three-seat configurations of the EPC can offer a thin, lightweight, retractable, translucent plastic privacy screen between the side-by-side seats and this screen can also serve as a breath and sneeze barrier for social distancing.

In order to carry out-sized or larger freight payloads such as 1.22 m×2.44 m sheets of plywood, 155.7 cm solar panels or 5.1 cm×30.5 cm×365.8 cm long lumber, the rear hatch of the pod can be removed and replaced with an alternative "stretched" version of the rear hatch that incorporates a 61.0 cm L×156.8 cm W cylindrical extension to increase the cabin volume of the SkyQart. This extension includes an extension of the cabin floor to maintain the ability to roll payload-laden EPCs into and out of the SkyQart. Hauling such large building materials will also typically require that a latching rack be attached to the seat latching tracks of the EPC in order to position the building materials closer to the central axis of the AFP such that the bottom surface of the building materials is 30.5 cm above the cabin floor's upper surface. This 30.5 cm dimension positions the building materials such that they can occupy the maximum available length inside the AFP. In some cases, an EPC especially dedicated to hauling building materials may be used. That builder's version of the EPC retains its standard trapezoidal planform, wheelbase and track, but has no seat latching tracks; instead it has a latching rack or other truss-braced, purpose-specific framework permanently attached to the EPC's deck surface. An example of a builder's EPC with a purpose-specific framework would be once with a cradle that fits standard 208.2 liter (55 gallon) drums whose 59.7 cm diameter and 87.6 cm length would allow for two such drums to easily fit within the SkyQart AFP's interior space.

QUAD cargo bins that attach to the EPC come in three standard versions. These standard versions are designed to maximize interior volume while still fitting inside the AFP when attached to the EPC. Alternative cargo bins could be devised using different dimensions if they retain the ability to fit inside the AFP, whether attached to an EPC or not. One version, the Main Cargo Bin, has a single large cavity for holding several parcels of medium to large items. A second version of cargo bin is used to expand this Main Cargo Bin by adding two Extension Bins to it, one at the front and one at the back. Each Extension Bin is nominally 63.5 cm L×63.5 cm H×63.5 cm W and is centered on the long axis of the AFP. The rear Extension Bin has an aft door for inserting long objects. When added onto the Main Cargo Bin dimensions, these Extension Bins provide an interior dimension that is 2.44 m long. A third version of cargo bin for the SkyQart is the Locker Bin, which is a Main Cargo Bin that is modified to contain several different sized lockers with digital key locks that can be unlocked by the intended recipient of each parcel in the payload. All of these standard embodiments of the QUAD cargo bin containers attach to the standard EPC by the same mechanism as do passenger seats, using solenoid actuated latching pins into the seat latching tracks of the EPC.

In the three-seat version of the EPC, the seats are positioned so as to accommodate rear passengers who are the standard size for the $95^{th}$ percentile human at 188.0 cm tall. The seat for the forward midline passenger is positioned to accommodate a person only up to 177.8 cm tall. This sizing of people on a three-seat EPC produces a total height of 113.8 cm from the top of the tallest passenger's head to the surface of the dock. This is the same height dimension as for the passenger-laden standard two-seat version of the EPC. This 113.8 cm height allows any EPC loaded with passengers to easily fit underneath the tailcone of any SkyQart parked at the dock, where the clearance is 198.1 cm. By having the EPCs move underneath the aircraft tailcones as they board and deboard the SkyQarts, their transit time on the dock can be minimized, and the land parcel size necessary for the SkyNest can be kept small.

The three-seat version of the EPC can be carried in each of the two fuselage pods of the dual-AFP SkyQart III, resulting in the maximum of six passenger seats in that aircraft, provided that the passenger weights and their personal items in each pod are kept within specified weight and e.g. limits. The baggage space available in the three-seat version of the EPC is necessarily limited and consists of either placing personal items under one's seat or holding them on one's lap for the duration of the flight. In some cases, a threesome traveling together may choose to arrange for a SkyQart III to carry them on a three-seat EPC in one of its AFPs, while its other AFP carries an EPC that can carry all of their baggage, packages or cargo.

Cargo normally gets pre-loaded at a dedicated Cargo Service facility on the dock of the SkyNest rather than on the dock area where passengers are boarding near their SkyQart's appointed dock station. The standard embodiment of the seat latching tracks on the EPC allow the conversion of EPCs to various payload purposes. However, the Cargo Service facility may have some specialized alternative embodiments of the EPCs that have no seat latching tracks in order to carry unusual types of cargo. In practice, most EPCs will continue in service as either seat-equipped or cargo bin-equipped, with modifications for carrying unusual payloads being rather uncommon. If carrying building materials, the EPC will have a cargo version that allows it to carry and deliver larger items such as 1.22 m×2.44 m sheets of plywood or sheetrock, or various lengths of framing lumber. The standard EPC seat latching tracks can also allow the EPC to carry ground mobility devices such as wheelchairs and walkers, along with electric scooters, bicycles of low height, etc., provided these items are fitted with compatible seat latching track adaptors. These ground mobility items may fit side-by-side with a passenger seat on an EPC. Some items too large to fit alongside a seat will have to be carried alone as a single fare on their own EPC.

The EPC inside a SkyQart fuselage pod can be off-loaded using a ramp when a dock or RDC is not available. This off-loading is facilitated by having the active main landing gear retract to lower the belly of the AFP to within 1.3 cm above ground level with the nose gear at its nominal height, which creates a 5° nose-up fuselage angle, so that the EPC can roll out the back of the AFP onto the ground without scraping its belly.

To ensure passenger headroom and no head-bump, EPC seats can automatically recline slightly during the on and off loading of the SkyQart at the dock.

EPC Payloads

As stated above, an EPC, with its nominal 119.4 cm wheelbase, can carry a variety of payloads consisting of both people and goods within its weight limits. It can also carry lumber, fuel and building materials. A common use for the SkyQart I or II is to carry two passengers seated side by side on reclining seats that are equipped with the Qusheat ride control seat. The two-seat version normally has its EPC pin-latched into the SkyQart such that the front edge of its seat-mounting bracket is at FS 206.0 cm which places the center of gravity of the crew at FS 228.2 cm, a location that helps to keep the SkyQart's center of gravity within acceptable limits.

In such a case of two-seats, each passenger on an EPC is provided with two separate baggage compartments, one in front of the seat and one behind the seat. Each compartment has external dimensions of 25.4 cm L×58.4 cm H×36.8 cm W which allow a standard size domestic airline carry-on baggage item of 22.9 cm L×55.9 cm H×35.6 cm W to fit inside it. The front baggage compartment has a closeable lid that contains a touchscreen computer tablet that offers free wi-fi internet service. The rear baggage compartment is hinged so that it can recline rearward 34° to enable the passenger seat to recline 30° rearward for sleeping. The forward baggage compartment is mounted to the EPC with a 45° tilt-back angle to aid accessibility for the seated passengers. The rear baggage compartment is mounted to the EPC with a 27° tilt-back angle. These baggage compartments are removable and they pin-latch onto the seat latching tracks of the EPC. One or both of these baggage compartments can be removed to accommodate exceptionally large passengers.

The nominal removable 55.9 cm L×114.3 cm H×121.9 cm W flotation module #1, when removed from a two-seat SkyQart, provides adequate space inside the rear hatch of the AFP for the reclining seat and rear baggage compartment to recline to their respective limits. This flotation module is nominally 121.9 cm wide at the waterline of the seat armrests but narrows to only 101.6 cm wide at the waterline of the passenger's shoulders. The bottom of module #1 is aligned with the cabin floor of the SkyQart.

In the case of a SkyQart fitted with an EPC that has three Qusheat ride control seats, there is no room for reclining the front seat and there are no baggage compartments. The three-seat SkyQart must fly with flotation module #1 removed. With three-seat EPCs, passengers must stow their personal items under their seat or on their lap.

All EPCs carrying payloads in SkyQarts have their weight and center of gravity automatically calculated prior to boarding the SkyQart so as to determine the appropriate fore-aft position for latching the EPC inside the SkyQart. Said weight and center of gravity are calculated from data obtained from the EPC's on-board strain-gauges that are attached near each of its four wheels.

The EPC can alternatively be configured to carry not passengers but various sizes of cargo bins pin-latched to its seat rails. All cargo bins are sized so that when fastened to an EPC, that EPC/cargo bin combination will fit inside the interior cabin space of a SkyQart's AFP. A nominal interoperable embodiment of such cargo bins is comprised of the Main Cargo Bin, which is a large central 121.9 cm L×91.4 cm H×106.7 cm W bin. The Main Cargo Bin can be joined to two smaller Extension Bins, one fore and one aft, each of which is nominally 63.5 cm L×63.5 cm H×63.5 cm W. Together, these three joined bins can offer a standard SkyQart an interior fore-aft dimension of 2.44 m in order to haul long objects. Alternatively, the large central Main Cargo Bin can be carried alone, in which case flotation module #1 can be installed into the rear hatch. To fit fully inside the standard AFP, the leading edge of the large central Main Cargo Bin is positioned at FS 141.76 cm where the inside diameter of the AFP is 131.75 cm. In such case, the aft face of the large central Main Cargo Bin is 15.24 cm forward of the AFP's hatchline and its bottom surface is elevated 10.16 cm above the top surface of the EPC and 14.6 cm above the cabin floor. The smaller 63.5 cm cubical Extension Bins in this case straddle the axial center of the AFP, which places their bottom surfaces 8.26 cm above the bottom surface of the large central Main Cargo Bin. The combined three cargo bins attach to the seat latching tracks of the EPC with four separate 10.16 cm H×10.16 cm L×4.45 cm W brackets that contain solenoids with latching pins that are also pull-pins. The leading edges of the forward pair of these brackets are at FS 157.8 cm. The leading edges of the two rear brackets are at FS 253.5 cm. The two forward brackets attach to the innermost seat latching tracks while the two rear brackets attach to the outermost seat latching tracks.

If stacked on a special latching rack that fits on top of the EPC and that has its top surface nominally 30.5 cm above the cabin floor, the SkyQart can carry 3.05 m lengths of standard lumber, whose actual dimensions are 3.81 cm H×28.58 cm W, if that lumber is stacked six boards high and two boards abreast on that latching rack. This would comprise a load of twelve boards, each of which weighing 21.8 kg and totaling 261.3 kg. To obtain an acceptable center of gravity for the SkyQart with this lumber payload, its forward edge must be positioned as far forward as possible, at the aft face of the bulkhead located at the rear limit of the nosegear well, which is at the FS 68.6 cm, measured as the distance aft of the datum, which datum is the external tip of the nose of the AFP. At FS 68.6 cm, the inside diameter of the AFP is 88.1 cm. Alternatively, the latching rack could carry a spare SBP of 145.15 kg. Alternatively, the latching rack could carry a 54.9 cm tall stack of twelve SunPower solar panels[17], each of which weighing 18.6 kg to equal total of 223.2 kg. These solar panels each have nominal dimensions of 155.7 cm×104.6 cm×4.6 cm. The leading edge of this stack of solar panels would be positioned at FS 134.14 cm where the AFP's inside diameter is 126.0 cm. Such a payload of solar panels, at 22.7% efficiency, have a maximum power of 370 watts each and so when arrayed correctly could comprise a power station with a potential to produce more than 4.4 kW. The EPC on its latching rack could alternatively carry two 208.2 liter (55 gallon) drums of dimensions 59.7 cm diameter and 87.6 cm height, if these drums were lying on their sides end-to-end and were partially filled to a weight within the capacity of the SkyQart's payload. The leading edge of these two drums would be positioned at FS 123.24 cm where the AFP's inside diameter is 120.5 cm. The EPC could alternatively carry or a Honda 5.5 kW generator of 118.8 kg whose size is 119.9 cm×70.1 cm×72.1 cm, along with three gasoline cans, each of which has 18.9 liter capacity and whose size is 35.1 cm×27.9 cm×36.3 cm and whose empty weight is 0.91 kg each.

The AFP can be fitted with a nominally 61.0 cm long cylindrical extension to become the cargo axisymmetric fuselage pod. This cylindrical extension piece is attached at the rear hatch opening of the AFP. Using the cargo axisymmetric fuselage pod and an EPC with a latching rack, the SkyQart could carry six sheets of 1.22 m×2.44 m plywood of 2.86 cm thickness, with each sheet weighing 38.3 kg, comprising a 230.0 kg payload. This stack of six sheets of plywood would have its leading edge positioned at FS 145.5 cm where the inside diameter of the AFP is 131.45 cm. Also, with such an extended cargo axisymmetric fuselage pod, the aforementioned load of stacked lumber could each instead be of 3.66 m length rather than 3.05 m length. In such case, the stack of lumber would extend from FS 68.6 cm to FS 434.3 cm where the AFP's inside diameter is 78.4 cm.

The EPC is typically pin-latched to the AFP in the standard SkyQarts by four separate 6.35 mm diameter round solenoid pins, which pins are normally extended from their solenoid actuator. There are two solenoid actuators on each side of the AFP and the centers of their pins are nominally 77.5 cm apart in the fore and aft direction. Each solenoid actuator is nominally 4.45 cm wide (spanwise) by 4.45 cm long by 3.8 cm tall. The aft solenoid actuators have their pin centerline at 3.8 cm forward of the plane of the AFP's rear hatch door. The forward solenoid actuators have their pin centerline a compatible 81.3 cm forward of the plane of the AFP's rear hatch door. For the uncommon case of using a cargo axisymmetric fuselage pod, there are two additional intermediate solenoid pin actuators in each AFP, one on either side, and the pin centerlines of these are placed nominally 25.4 cm aft of those of the forward solenoid pin actuators. In addition, for the case of the cargo axisymmetric fuselage pod, there are two additional aft solenoid pin actuators, one on either side in the cylindrical extension piece, and these can be paired with the intermediate solenoid pin actuators to pin-latch EPCs at locations that are further aft inside the cargo axisymmetric fuselage pod. These intermediate solenoid pin actuators are standard equipment in each AFP and the aft solenoid pin actuators, which are located at the standard 77.47 cm aft of the intermediate ones, are standard equipment in each AFP cargo extension piece.

Each solenoid actuator body has a nominal 3.81 mm gap from the side edge of the EPC, when the EPC is positioned inside the AFP.

The EPC with any of its various payload configurations can also be pin-latched atop the RDC and can be off-loaded from the RDC onto a variety of other surfaces. It can be off-loaded onto a truck dock, the roof of an autonomous car, the bed of a pickup truck, or other vehicle.

The autonomous robotic EPC has a manually operated "Go-button" that alerts its on-board autonomous robotic control system that it is ready to roll on the dock to its next destination. The Go-button is to be pressed by a passenger who is seated and seat-belted onto the EPC only when that passenger has completed all of his or her optional preparations for travel, including stowing of baggage and personal effects, combing hair, checking cellphone messages, waiting for a ride-sharing person, if any, to arrive and be seated and seat-belted aboard said EPC, etc. The time spent on such optional preparations is herein called a "prep-delay" and, by policy, it is to be minimized in order to achieve a high capacity throughput for the QUAD system. The prep-delay is measured from the appointed and reserved on-demand departure time of the SkyQart. Prep-delay is zero when the EPC Go button is pressed and the EPC has rolled into and securely latched to the interior cabin of its docked SkyQart at any time prior to the appointed and reserved on-demand departure time of that SkyQart. Pressing the Go-button will have no effect unless all seatbelts on the EPC are detected as being securely fastened. As soon as secure pin-latching of the EPC into the SkyQart cabin or onto the surface deck of an RDC is completed, the wheelmotors of the EPC are immobilized and the SkyQart or RDC can begin its scheduled trip. The policies that minimize prep delay comprise potential flight cancellation and substantial user cancellation surcharges whenever a prep delay exceeds a reasonable limit. When a SkyQart lands and docks with precise alignment to an aircraft docking station with its rear hatch open, the SkyQart's autonomous control system detects that successful docking and immediately and automatically unlatches the pin-latches that secure the EPC to its cabin floor. This unlatching is detected by the EPC and is interpreted by it as if the EPC's Go-button had been pressed, so that the EPC will then be activated to exit the SkyQart cabin and roll onto the dock to its next designated, intended destination. Likewise, an unlatching of the EPC from the surface deck of a docked RDC activates that EPC to roll off of the RDC onto the dock and onward to its appointed destination.

For cargo payloads, the Go-button is nominally to be pressed by the person on the dock area who performs the loading and closing of the EPC's cargo bin(s) and it is pressed only when said loading and closing is complete and the EPC is ready to go to its appointed destination. As is the case for a passenger flight, avoiding prep-delay means that the Go-button for an EPC that is carrying a cargo payload is to be pressed prior to the appointed and reserved on-demand departure time of its appointed SkyQart so as to allow that EPC to load and latch into said SkyQart prior to said departure time. By policy, some cancellation or surcharge fees can likewise be assessed for cargo payloads that have excessive prep-delays. For EPCs with a cargo payload, when the SkyQart's autonomous control system detects that a precise and successful SkyQart docking has been achieved, it then automatically unlatches the pin-latches that secure the EPC to its cabin floor. This unlatching is detected by the EPC and effectively activates the EPC's Go-button so that the cargo laden EPC will exit the SkyQart cabin and roll onto the dock to its next appointed destination.

The loading and unloading of an EPC to an RDC proceeds in the same fashion as for the loading and unloading of an EPC to a SkyQart. That is, pressing a Go-button can initiate movement of an EPC on the dock to roll to a docked and waiting RDC and cancellation of EPC movement occurs once it is pin-latched onto the RDC. When the RDC reaches its appointed destination, it automatically unlatches the pin-latches holding the EPC and this activates the EPC to roll off of the RDC and onto the dock from which it proceeds onward to its next destination.

The Robotic Delivery Cart (RDC)

The Robotic Delivery Cart (RDC) is one of the important inventions that make QUAD possible. The fundamental importance of the RDC is not its robotic navigation or its versatile residential delivery, it is the RDC's interoperability with the other electric vehicles in the QUAD system by virtue of its standardized track, wheelbase, height, dimensions, batteries, speed, precision positioning system along with the standard embodiment of the EPC latching system. The RDC's standards, along with its long-travel scissor jack enable the RDC to act as if it is part golf cart and part forklift while being compatible with QUAD SkyQarts, EPCs, trucking, cargo, med-evac, and last-mile deliveries of all types, including those in bad weather and for disabled people. The standard embodiment of the RDC presented in this invention will have many future variations and refinements and will evolve over time, but an RDC needs to retain dimensional and operational standards such as those described in the embodiment herein in order to be compatible with the QUAD dock and SkyQart vehicles. The RDC is mainly intended to carry in a type of piggyback transportation, a payload-laden EPC to its intended doorstep destination, but it is also specially equipped to service any SkyQart that happens to need its EPC removed and replaced or its SBP swapped when parked at a location other than at a QUAD aircraft docking station. In the unusual event that it is necessary, the RDC can use its extensible heavy-duty battery pack drawer slides in order to unload a battery pack from a disabled or stranded SkyQart on the aircraft pavement ramp at a SkyNest.

When an RDC onloads an EPC, the surface deck of the RDC is set to the same height as the bottom of the EPC's tires. The RDC deck is normally set at the nominal interoperable height of 47 cm above ground level for this maneuver because that is the standard height of the surface of the dock at a SkyNest. The EPC loads from the dock surface onto the top of the surface deck of the RDC by backing up, once its tires are in alignment with the tire grooves provided in the RDC's surface deck. When it reaches the proper position on the RDC deck, the EPC is pin-latched onto the RDC by four separate solenoid latching pins. When carrying an EPC loaded with two passengers, the RDC provides a windscreen that can be rotated to the rear of the RDC during the on-loading of the EPC. In windy and rainy conditions, the RDC's windscreen can extend in accordion-like fashion to become a rain canopy to protect the passengers, provided that its EPC is loaded with no more than two passengers seated side-by-side. Due to safety regulations and neighborhood electric vehicle licensing, the RDC is not recommended for carrying an EPC that is loaded with three passengers, unless for short distances in dry weather. Alternatively, the RDC can on-load and carry an EPC that is loaded with a Main Cargo Bin, or a Main Cargo Bin with both a forward and an aft accessory Extension Bin, each of which adds 63.5 cm to the available length. With such cargo bin extensions, the combined interior cargo dimension becomes 244 cm long. The RDC can also on-load and carry an EPC with a latching rack loaded with out-sized building materials from either a standard SkyQart, or from a SkyQart with an extended cargo axisymmetric fuselage pod, though the length of those materials precludes use of the windscreen and bubble rain roof canopy. These outsized building materials could include, for example, 5.08 cm×30.48 cm lumber or 1.22 m×2.44 m sheets of plywood. An RDC can also serve as a courier to deliver spent battery packs to a nearby charging station and bring freshly charged battery packs back to a dock or to a stranded vehicle. Like a forklift, the RDC can stack heavy standard battery packs onto a nearby dock site or pallet. The RDC can on-load and off load both EPC and standard battery packs autonomously at docks of various heights as needed.

The scissor jack on the RDC utilizes nominally 7.6 cm diameter and 3.18 cm wide high capacity cast polyurethane wheels on 1.27 cm diameter axles such as this example[18]. The RDC standard scissor jack has 4 separate scissor blades, two on the port side and two on the starboard side, and each such blade has a nominal length of 159.18 cm between its end axles. The four aft end blade axles have a nominal diameter of 12.7 mm, and each holds a pair of the 7.6 cm diameter by 3.18 cm wide cast polyurethane wheels, each of which has a wheel capacity that is nominally 272.2 kg. The two bottom forward blade end axles each pivot on a nominal 11.11 mm diameter bolt in a ball-bearing hinge that is attached to a stationary gusseted flange that is structurally attached to the forward outer bottom portion of the steel frame of the RDC. The other blade end axles on the forward ends of the upper scissor blades each pivot on a nominally 11.11 mm diameter bolt in a ball-bearing hinge that is attached to a gusseted flange that is structurally attached on the underside of the forward outer portion of the RDC's height-adjustable surface deck. There are two separate but identical linear actuators for the scissor jack, and each of these is mounted to a 11.11 mm pivot bolt that connects its forward end to the bottom of the front portion of the chassis of the RDC. At its opposite (rear) end, the ram of each linear actuator is structurally attached with a nominally 1.27 cm shear bolt to a yoke that pulls horizontally on the 1.27 cm diameter axles of the scissor jack's rear 7.6 cm diameter wheels. These two actuators work in unison to autonomously move the scissor jack to position the height of the RDC's surface deck. Each actuator offers a nominal 48.3 cm of travel, which is enough to move the scissor jack from its fully collapsed position where the RDC surface deck is nominally 35.6 cm above street level, to its fully extended position where the RDC surface deck is elevated to nominally 142.2 cm above street level. This 106.7 cm range of heights for the RDC surface enables it to be positioned so as to off-load its EPC onto a variety of surfaces, including onto commercial truck loading docks and truck rear doors, the back of pick-up trucks, etc.

Each of the RDC's scissor jack's polyurethane wheels can accommodate a nominal load of 272.2 kg. For load spreading, dual wheels are used at the rollers at the bottom rear axles of the scissor jack and widely gusseted bearing flanges with 11.11 mm bolts are used at the ball-bearing hinges located at the forward ends of the scissor blades where they attach to the steel frame of the RDC.

The height of the top deck of the RDC is normally maintained at the standard 47.0 cm dock height by its electric scissor lift mechanism and this height is continuously adjusted and tuned to maintain dock height as loads are transferred onto and off of the RDC. Alternatively in some lower cost RDCs, the outer corners at the front of the metal chassis of the RDC could contain extendable vertical legs that serve as manually or electrically-operated screw jacks that extend to touch the ground and thereby lock the height of the RDC at the dock height in order to maintain that height as loads are transferred onto the RDC. The range of dock heights at truck docks[19] that could be expected to be encountered are accommodated by the extension of the RDC's long scissor lift arms, which can lift its top deck to as high as 142.2 cm above the ground level. The nominal 142.2 cm height coincides with the standard height of most types of commercial truck shipping docks, including some containerized cargo docks. In addition, the RDC can lower its top deck to a height of just 35.6 cm above ground level, which improves its cornering stability, passenger de-boarding and reachable height for users who are removing parcels from its Locker Bin.

The RDC and EPC both have miniaturized modular on-board autonomous navigation and positioning hardware that couple to their rear wheelmotors and steering to enable these carts to precisely align with dock locations where loading and off-loading are to occur. The precision positioning system in the EPC and RDC operates with a miniature electronic sensor suite similar to that in the SkyQart.

The RDC has a nominal gross vehicle weight of ≤907.2 kg.

The SBPs are held in place on the RDC by latching solenoid pins similar to those used to hold the EPC to the SkyQart cabin floor.

A special, alternative embodiment of the RDC can handle three SBPs at once, which would comprise a 435.4 kg payload, by having its surface deck outfitted with both a top and bottom 205.74 cm length of heavy-duty drawer slide. The height of the RDC's surface deck can be autonomously adjusted by the cart's scissor-jack to match the height needed to on-load or off-load SBPs to either its top or bottom drawer slide, whether they be charged or discharged. This special alternative embodiment of the RDC can thereby serve as a shuttle for moving SBPs around the dock, charging station or aircraft parking area. The height of the SkyNest dock and that of the cabin floor of the SkyQart's AFP must both be 47 cm in order for this special alternative embodiment RDC to engage as a shuttle.

The dock at the SkyNest can provide on its surface a path for the EPC back up to exit out of the rear hatch of a SkyQart and then to traverse to the opposite side of the dock where it can back-up onto the surface deck of a waiting RDC and pin-latch into place. This RDC can then depart the SkyNest with that payload-laden EPC to perform the last-mile home or commercial delivery of that payload.

The RDC uses a scissor jack to raise and lower its top deck to match the height of the dock that is in use. Each blade of the scissor jack has nominally 159.18 cm between its end axles. The aft axles of each blade each hold a pair of hard polyurethane rollers that can tolerate the heavy loads involved. The battery pack-receiving tray under the top deck is for carrying SBPs and it is nominally 205.74 cm long, which allows it to carry two SBPs end-to-end, i.e. in tandem. The RDC's surface deck can be lowered to a minimum height above ground of 35.6 cm and this height determines the minimum height for off-loading EPCs at delivery destinations other than SkyNests. A specially contoured standardized ramp can enable the EPC to be off-loaded from the surface deck of the RDC and onto ground or street level without scraping the EPC's undersurfaces on the ramp. This standardized ramp must have gradual and compatible contours in order to facilitate this task. The top edge of this nominal embodiment of the off-loading ramp for the RDC is 35.6 cm high, and the ramp is 343.4 cm long and 1.22 m wide. The ramp's surface is curved on an 838 cm radius with a symmetrical inflection in that curve in order to smoothly transition the EPC onto the ground or street level. This nominal ramp is utilized at residential and other locations where off-loading of an EPC to the ground level needs to take place and where a dock with the standard specifications of a standard SkyNest is not available. To utilize this special ramp, the scissor jack of the RDC must be fully collapsed into the full-down position, which lowers the RDC's top surface to a height just 35.6 cm above the street level.

Alternatively, passengers riding an EPC atop an RDC may, when their destination is reached, simply unbuckle their seat harnesses and step off of the RDC and walk away. RDCs whose EPC carries a Locker Bin with multiple digitally locked lockers can either off-load that EPC at a manned distribution center, or the RDC can travel to each of the several destinations assigned to individual users of its lockers and notify each user to retrieve their package using their digital lockbox code when the RDC is parked outside their location.

The RDC must use a very compact, low-height front suspension in order to fit under the loading dock.

The width of the RDC must be less than 1.22 m in order for it to qualify as a neighborhood electric vehicle and thereby be accorded use of bicycle lanes in some states.

The street-side of a SkyNest dock facility is typically provided with special RDC cart service bays that are called cart docking stations and that have compatible heavy-duty drawer slides under the dock surface, which surface is at the standard height of 47 cm so that the RDC can use its scissor jack and precision positioning system to align the surface deck of the RDC with that of the dock surface and then load and unload EPCs and SBPs. In alternative but less common embodiments, the cart docking stations may be adjacent to the aircraft docking stations on the same side of the dock facility as the pavement for the taxiways. To help maintain the alignment of the RDC with the cart docking station, the dock edge has two solenoid-actuated pins of 6.35 mm diameter that can protrude from the dock to engage in two pin receptacle holes in the edge of the front of the surface deck of the RDC. These pins and holes are both 81.28 cm apart and symmetrically straddle the center point of the RDC and the RDC cart docking station.

The standard RDC has 30.5 cm outside diameter pneumatic tires with 1.9 cm diameter axle size and each tire is rated for a 202 kg load[20]. The 30.5 cm tire diameter enables the wheelmotors on the RDC to operate at relatively higher RPM, and the pneumatic character of the tires helps the RDC operate on rough surfaces at its speed limit of 40.2 km/hr.

In most U.S. states, the RDC is required to have headlights, taillights, stoplights, turn signals, horn, fenders, windshield, wipers and a retractable rain roof in order to operate on city streets.

The swappable rechargeable RDC special battery pack is located inside the bottom of the frame of the RDC's steel chassis and has nominal dimensions of 5.08 cm H×50.8 cm W×50.8 cm L with a nominal capacity of 12.8 kWh and a nominal weight of 32 kg. This RDC battery can also be charged during docking through the cart docking station's DC fast-charging port that automatically connects to the RDC's DC fast-charging port on the forward edge of the RDC when it is precisely docked. The RDC battery pack is sufficient for a range of at least 32 km.

The scissor jack on the RDC is driven by dual electric or electro-mechanical linear actuators.

The RDC has a low-profile front suspension in order that the height of its surface deck can as low as possible above street level.

The outer dimensions of the RDC are 2.44 m in length× 116.8 cm wide, becoming 1.22 m wide when the retractable rain roof is attached. The RDC has a nominal 210.5 cm wheelbase.

The top speed of the RDC is limited to 40.2 km/hr in order to qualify it as a Neighborhood Electric Vehicle (NEV).

The RDC chassis has four separate solenoid operated latch pins of 6.35 mm diameter. The gap from these solenoids to the sidewall of an EPC that is aboard the RDC is uniformly 3.81 mm. The longitudinal spacing of the latch pins on the RDC is the same standard 77.5 cm between centers as the longitudinal spacing between latch pins that are used on the sides of the AFP of the SkyQart.

Both the floor surface of the RDC and that of the SkyQart cabin provide shallow grooves that match the track width dimension of the EPC to help keep its wheels aligned during loading. Like the EPC, the RDC is equipped with a precision positioning system that includes line-following software that enables it to exactly align with the SkyQart cabin or a cart docking station, respectively. This line-following software can align with and precisely move the EPC or RDC along a line projected onto the dock surface or pavement surface, respectively. A continuous guideline with sharp edges that emanates outward onto the pavement surface from the dock edge at the center of each docking station has a fixed width in the range of 3.175 mm to 12.7 mm. This line is either painted, taped on or projected by laser, and is of a color that sharply contrasts with that of the pavement. This line provides an alignment path to guide the line-following software that is on-board the RDC that intends to move precisely to the said center of said docking station. Both the SkyQart and the dock itself are capable of projecting such laser lines onto those surfaces so that the laser line leads the surface cart to the exact center of the floorboard of the SkyQart or the exact center of the docking station, respectively. Such exact alignment enables the latching pins of the solenoid-actuated pin-latching system to engage and pin-latch these vehicles and it prevents collisions between the carts and the solenoid bodies or pins.

If for any reason a SkyQart is unable to taxi to the dock, the RDC can drive onto the SkyNest pavement to reach that remote stranded SkyQart, use its precision positioning system and line-following software to dock with it, and can rescue its EPC and passengers. It can also swap that remote SkyQart's spent battery pack for a fresh one if necessary.

Dock Standards and Battery Swapping Standards

The Dock Standards and Battery Swapping Standards are two components that are important to this invention. A QUAD SkyNest must use standardized dimensions and facilities in order to achieve high capacity and to expedite deliveries. The QUAD dock height standard is 47 cm above the pavement on which the SkyQart parks. This 47 cm dimension matches the cabin floor height of the SkyQart, which is set low in order to create a low center of gravity for the vehicle and to confer maximum passenger headroom in the cabin. This 47 cm dimension also matches the height of the surface deck of the RDC during its docking operations. The stairs from the SkyNest's perimeter sidewalk that lead up to the dock surface are nominally 1.83 m wide and consist of three steps, each having a rise of 15.66 cm and 35.6 cm of horizontal tread run. These provide the 47 cm of rise that is needed. In addition, there are several American Disabilities Act (ADA) compliant ramps that provide the requisite 1:14 standard rise from the street/sidewalk up to the SkyNest dock height of 47 cm. These ramps each have two stages. They use a 152.4 cm×182.9 cm level landing platform as an intermediate stage after accomplishing the first 25.4 cm of the 47 cm rise with a pair of ramps that are 355.6 cm long. The final 21.6 cm of rise is accomplished by the second stage of the ramp, which runs perpendicular to the dock.

The dock thickness at its outer edge where it interfaces with the SkyQart or RDC is nominally 28.58 mm. This edge contains the transponding alignment target for the precision positioning system lasers of the SkyQart and RDC, as well as the two 6.35 mm diameter solenoid-actuated tapered pins that protrude 19.05 mm from the edge surface of the dock to mechanically maintain alignment of the dock surface with the surface deck of the SkyQart and RDC during loading and off-loading of the EPC. These dock pins are 81.28 cm apart and they symmetrically straddle the center point of the docking station. During docking, these dock pins engage into equally spaced 6.86 mm diameter receptacle holes in the edge of the surface deck of either the SkyQart or RDC. There is a separate alignment target for the precision positioning system at each mating center along the dock edge and these targets are equally spaced horizontally at intervals of 4.572 m.

The nominal interoperable 4.572 m intervals for docking allow the tightly spaced side-by-side docking of SkyQarts. The docking center is that portion of the dock that is specially equipped to off-load and on-load both EPCs and SBPs. There is a recess underneath the docking center between the dock's support pillars to allow the SkyQart's main landing gear to roll under the dock. To avoid the complexity, safety, and reliability problems of folding wings, there are two different versions of the standard SkyQart (SkyQart I and SkyQart II) and these can be parked at the dock with overlapping wingtips. This reduces the required space between their docking station to just 9.144 m. One version of the standard SkyQart, named SkyQart I, has each of its wingtips tipped slightly upward at a nominal dihedral angle of 8.84°. The other version of the standard SkyQart, SkyQart II, has each of its wingtips tipped slightly downward at a nominal anhedral angle of 11.86°. A third version of the SkyQart is the dual-AFP version, or SkyQart III, which has each of its wingtips tipped slightly upward at a nominal dihedral angle of 9.58θ in order to enable it to overlap at each of its wingtips with the anhedral version, the SkyQart II. The SkyQart III version has a distance of 4.572 m between the centers of its AFPs, so that it can align and dock at any two adjacent aircraft docking stations in order to load and unload each of its AFPs simultaneously. If a SkyQart III docks next to a SkyQart II, it can overlap its wingtips and thereby dock with a separation of just 9.14 m between its nose-tire and that of the adjacent SkyQart II. If two identical standard SkyQarts dock side-by-side, their wingtips cannot overlap and therefore they must park at aircraft docking stations that are 13.715 m apart. A computerized dock utilization program directs incoming SkyQarts of the various types to park at a compatible aircraft docking station that ensures best overlaps so as to maximum system capacity. Because of their different wingtip angles, the SkyQart I and SkyQart II will have slightly different flying qualities, particularly with regard to spiral stability and Dutch roll. However, it is anticipated that this will not be a significant problem because of two factors: 1) the high wing design of these aircraft and 2) the use of autonomous flight and thrust controls with negligible latency that can anticipate and compensate for these instabilities.

Battery swapping of the standard swappable battery pack (SBP) is a necessity because the SkyQarts will be operating on a nearly continuous duty cycle consisting of short-range flights. The swapping must be accomplished precisely, reliably and rapidly without risk of damage to vehicle, dock or SBP. It must not delay or impede system capacity. It must be resilient in its operations, with multiple loading, unloading and charging stations operating in parallel, including, during power failures, an allowance for manually operated swapping if necessary. These requirements favor using sturdy extensible drawer slides for moving the battery packs during the initial interface with the SkyQart and RDC in the exchange process. Ball-bearing extensible suspension drawer slides that are strong, affordable, fast, precise, replaceable, manual, and of a consistent standard in size are to be used. McMaster-Carr offers such drawer slides as 101.6 cm long slide rails capable of supporting 199.6 kg and whose cross-section is 7.62 cm tall and 19.05 mm wide. These are adopted as the standard in this embodiment of QUAD facilities and vehicles for moving the standard swappable battery pack (SBP) of 8.89 cm H×66.0 cm W×101.6 cm L and that weighs 145.15 kg as used in SkyQarts I, II and III. Each battery pack is a self-contained package that includes a sturdy outer shell, internal septae and cooling passages, a battery management system, external electrodes for both power and the battery management system/charging interface and side rails that are compatible with the standardized heavy-duty drawer slides described herein. Battery packs are rated at a standard 600 volts DC. Alternative embodiments of the SBP may be rated as low as 400 volts and as high as 800 volts. The standard SBP capacity is 58 kWh (with a range in alternative embodiments of 30 to 80 kWh), but this will vary between battery packs of differing vintages as energy storage technologies improve. This 58 kWh energy source may be supplemented in some embodiments of the SkyQarts by the addition of a super-capacitor either inside the SBP or inside the SkyQart's AFP. The super-capacitor's purpose is to augment the capability of the battery to rapidly supply the large amounts of electrical current needed for the brief periods of high power demanded for take-off acceleration.

At the high capacity SkyNest, the facilities at the dock will have robotic stacking of battery packs onto a battery charging rack that is equipped with high capacity DC charging connections. At each aircraft docking station, these battery charging racks will be located under the dock on either side of a central battery swapping robot. There will also be a single high capacity DC fast-charging port located on the external surface of the edge of the dock at each aircraft docking station so as to mate with the DC fast-charging port that is located on the lower face of the SkyQart's rear hatch opening.

The standard swappable battery pack (SBP) is retained in the SkyQart by dual latches that can be released by either operation of an electric solenoid-actuated pin or by manual operation.

The moving of the SBP at the dock can be accomplished by a robotic arm that grips and releases the battery pack using suction cups or by an electromagnet grip face applied to a ferrous metal surface on the pack. At relatively less busy, lower capacity SkyNests, the battery swapping can be simpler and less expensive, with manual transfer of SBPs from the docked SkyQart onto the drawer slides in the space just under the surface of the dock and thence on a continuum of said drawer slides across the full width of the dock to a waiting RDC at the opposite side of the dock that can receive and then deliver the SBP(s) to a nearby charging station. Alternatively, an RDC can use its precision positioning system to approach and align with the rear hatch opening of a stranded SkyQart that is parked on the parking ramp of the SkyNest and exchange its SBP directly without a dock. An RDC can also deliver a freshly charged battery to the drawer slide under the dock so that it can be inserted and latched into a waiting SkyQart.

High capacity SkyNest docks can use a specialized central robot arm to accomplish fast and precise movement of the SBPs to a battery charging rack that recharges SBPs under the dock. The articulated specialized central robot arm can rapidly move in complex 3D paths, to unload and load freshly charged SBPs to and from a battery charging rack. Such robotic arms grip the SBP without crushing it by using either vacuum cups or an electro-magnetic under-cradle to lift the SBP. There must be an alternative method to exchange the SBP in case the robot arm is without power or is inoperative. The under-dock central robot arm will have the ability to be moved out of the way when it is inoperable. A slower, manual handling option for SBPs is made possible by having two insertable 205.7 cm long drawer slide segments that can be attached and aligned with the drawer slide gap on the underside of the dock to create a continuous drawer slide path for moving SBPs from a docked SkyQart across the full dock width distance of 7.47 m to the far opposite side of the dock where an RDC can on-load them in order to transport them to a remote charging station. For general aviation airports and start-up locations for QUAD, these manual SBP swapping methods may precede the installation of high capacity robotic swapping with battery charging rack. A specialized double-decker RDC whose top surface is equipped with a second set of SBP drawer slides that can be lowered by the RDC's scissor jack to exactly align with those of the SkyQart for off-loading SBPs from docked SkyQarts provides an alternative method of loading and off-loading SBPs. However, this double-decker RDC method of off-loading SBPs is slower than the fully automatic robotic system. By use of its scissor jack and compatible precision positioning system, the double decker RDC with its upper and lower set of drawer slides can provide a versatile loading/off-loading option for SBPs on both the docked SkyQart as well as for the SkyQart that is stranded or immobilized on the parking ramp.

The nominal SBP will weigh 145.15 kg. Its weight is likely to decrease as future battery energy densities improve. The SBP's kWh capacity will also rise as future energy densities improve with technologic progress, which will increase the SkyQart's range and decrease the number of SBP swaps needed per day. Alternatively, the standard battery pack for QUAD may have different dimensions, voltages and energy capacities as long as those standards fit the standards used for drawer slide spacing and electrical systems in the QUAD vehicles, dock and storage racks. If average trip length for the QUAD system is 48.3 km, then battery swapping will likely only be needed every other flight or even every $3^{rd}$ flight. Swapping takes time and costs money. Ideally, at the busiest hubs, swapping should be accomplished consistently in less than 20 seconds. That leaves 10 seconds for removal and 10 seconds for insertion of the fully charged SBP. With fast robot arms, swapping could be accomplished in as little as 5 seconds for removal and 5 seconds for insertion, but that would be unlikely to be needed in the first few years of operation the QUAD system. After the 10-second removal and 10-second insertion are accomplished, there will be another time interval of at least 20 more seconds before the next SkyQart arrives in position at the dock. If that SkyQart does not need a battery swap, then another 20 seconds will pass before it departs the dock with its newly boarded passengers and yet another 20 seconds will pass before the $3^{rd}$ SkyQart arrives ready for a battery swap at the dock. An outline of this sequence of battery swapping for SkyQarts (SQs) is shown in Table 4.

TABLE 4

| Time | Event | Battery needed |
|------|-------|----------------|
| 0:00 | SQ #1 arrives at dock | |
| 0:20 | Battery swap complete | 1 |
| 0:40 | SQ #1 leaves, SQ #2 arrives | |
| 0:60 | No swap, passenger boarding only | |
| 1:20 | SQ #2 leaves, SQ #3 arrives | |
| 1:40 | Battery swap complete | 1 |
| 2:00 | SQ #3 leaves, SQ #4 arrives | |
| 2:20 | No swap, passenger swap only | |
| 2:40 | SQ #4 leaves, SQ #5 arrives | |
| 3:00 | Battery swap complete | 1 |
| 3:20 | SQ #5 leaves, SQ #6 arrives | |

The ratio in this modeling of battery swapping is three swaps to every two no-swaps and this ratio consumes three freshly charged batteries every three minutes and 20 seconds. This is equivalent to requiring one freshly charged SBP every 66.6 seconds. From extant technologies, it can be presumed that an SBP can be fast-charged to more than 80% capacity in just 20 minutes. Therefore a 20-minute supply of batteries will consume six of the above 3:20 cycles and must therefore have 3×6=18 freshly charged battery packs to be on hand for each aircraft docking station at the high capacity SkyNest. This means that, at peak operating capacity, each of the eighteen battery packs should complete its dock cycle of removal to recharge to re-insertion in just over 20 minutes. The rapid consumption of an SBP every 66.6 seconds requires that the battery charging rack at each docking space must have at least eighteen fast-charging outlets, each one capable of supplying about 100 kW of continuous power. That will demand 18×100=1800 kW of continuous power at each aircraft docking station at the high capacity SkyNest. That is more than 2400 BHP of continuous power at each aircraft docking station. With the wide street adjacent to the SkyNest covered with solar panels that extend over the dock area, at sunny high noon and with 30% efficiency, the solar panel array for the SkyNest can generate 2453 kW of power from its nominal 8175 square meters of solar panels, which is sufficient to supply the electricity needs of just one high capacity aircraft docking station. This solar capacity limitation indicates that the SkyNest must have an additional source of grid electrical supply to supplement its own solar panel array.

Each aircraft docking station can provide space for four battery charging racks, two on either side of the robot arm. Each battery charging rack has five slots arranged vertically. Each such slot can hold an SBP. The robot arm can insert an SBP into a slot in less than 10 seconds. It can likewise remove an SBP from a slot in less than 10 seconds. The four battery charging racks at an aircraft docking station have a combined capacity of holding and charging twenty SBPs. Each of the five slots in each battery charging rack has compatible hardware to DC fast-charge, monitor and cool an SBP. The battery charging racks themselves are arranged as modules that can receive a spent SBP in an empty slot and supply a separate fully charged SBP from another of its slots. The robot arm can grab the freshly charged SBP from a slot in the BCR and insert it into the docked SkyQart. The BCRs are mounted on sturdy 4-wheel carts in order to be movable and serviceable. A battery management system, and charge monitoring system informs the robot about which slot is empty in the BCR and which slot can provide a fully charged SBP.

Graph of Tolerable Jerk Rate on Take-Off

The rate at which acceleration increases during the take-off roll and decreases during landing roll can only be as high as will be tolerable to the public fare-paying passenger. This graph depicts the range of those accelerations for take-off. The rise and fall of acceleration rates are called the jerk rates and they are used to model the 4D trajectories of the SkyQart in its standard operations at the SkyNest. Passenger-acceptable jerk rates are derived from the jerk rate limits adopted by the industry for amusement park rides. The comfort limit for changes in acceleration used by that industry is a jerk rate of generally about 3.4 m/sec$^3$ both in terms of increasing accelerations or decreasing accelerations in both the vertical and fore-aft axes. All movements executed by vehicles in the QUAD system, including the SkyQart. EPC and RDC, and whether in accelerating or decelerating, will be constrained to the extent possible to be at or below the jerk rate of ±3.4 m/sec$^3$ in the vertical and fore-aft directions. This constraint model for movement is herein named guided rate acceleration change execution or GRACE.

The Standard Battery Pack (SBP)

The standard battery pack SBP is an important component of this invention. It is used in every model of SkyQart and it has standard specifications and interfaces that are chosen so that the SBP can be handled both manually and by robotic equipment. The shape of the SBP is determined by its need to fit into the belly of the AFP at a low waterline so as to lower the height of the center of gravity of the SkyQart. The container of the standard SBP has nominal interoperable dimensions of 8.89 cm H×66.04 cm W×101.6 cm L comprising thereby 59.65 liters, which, at the energy per volume of 975 wh/liter currently claimed by Tesla[21] can provide a 58.16 kWh battery pack of 145.15 kg with a density of 2.44 kg/liter. The nominal interoperable battery pack weight of 145.15 kg will vary within a preferred range of 120-150 kg depending upon the energy density of the battery and the desired range. The pack consists of a large number of cells that are wired together in series to create a standard pack voltage of 600 volts. The conceivable range of voltages is from 400 to 800 volts in alternative embodiments of the SBP, with a preferred range of 550-650 volts. The pack has its positive and negative electrodes recessed slightly below the forward surface of its outer case. When the SBP is inserted into the extensible drawer slides in the belly of the SkyQart, these electrodes make firm and broad contact with corresponding spring-loaded electrodes in the forward belly of the SkyQart. The forward surface of the SBP includes a central circular grommeted orifice for connecting to the SBP's battery management system, which monitors the its capacity, temperature and charging status. In some embodiments, the forward surface of the SBP also includes two cooling ports, one port and one starboard, that connect the SBP's internal cooling channels to the SkyQart's supply of cooling air or liquid coolant. These cooling ports are likely to not be needed on future SBPs that have greater temperature tolerance and performance as battery chemistries continue to improve. The outer container of the SBP is nominally a 0.406 mm thick stainless-steel sheetmetal case with a honeycomb pattern of internal structural supports bonded to its inner surfaces so as to stiffen it for handling. This metal container serves to confine out-gassing or smoke emissions as well as acting as a Faraday cage and RFI filter. The rear surface of the outer container has a midline opening that serves as a smoke vent in case of smoke emissions. This smoke vent mates to a short midline stainless steel air duct in the rear hatch of the AFP that provides an external exit on the midline belly of the SkyQart. The bottom surface of the SBP's stainless steel container includes a ferrous steel plate that facilitates the ability of the robot arm to firmly grip the SBP when moving it. Firmly attached to each of the long 8.9 cm tall sidewalls of the SBP's container are the male component of the 1.9 cm wide heavy duty drawer slides that mate with the female component of those drawer slides that is rigidly attached both to the side walls of the battery compartment in the belly of each SkyQart as well as to the sides of the battery swapping drawer slides under the dock and the drawer slides on an RDC.

Crash Cushion

The crash cushion is an important component to this invention. It enables the concept and process of safely protecting SkyQarts and passengers in the event of a loss of control on the pavement. The crash cushion is the component comprised of a specially designed cart that can join with other carts to form a moveable train of carts placed at the end of the SkyNest's active pavement in order to safely bring to a stop an out-of-control SkyQart. The relatively low speeds and light weights of SkyQarts and their consistent and precise use of short runways make this concept and process viable. As an affordable, moveable, cushioned collision barrier, the crash cushion can provide a safe and controlled deceleration to full stop of the SkyQart from speed as high as 30 m/sec. By safely halting the motion of an out-of-control SkyQart, the crash cushion can ensure that it stays within the limited boundaries of the SkyNest. The nominal embodiment of the crash cushion as a system is comprised of a modular, impact-absorbing hybrid cushioning system mounted on a heavy, moveable crash cushion cart that is nominally 4.88 m in length. Each cart has four tires located at its four corners with a nominal 139.7 cm track width and a nominal 365.76 cm wheelbase. Each tire is nominally 25.4 cm wide and 40.6 cm in diameter. The two front tires of each crash cushion cart are free to swivel 360° on casters in order to allow positioning of the carts. When four such carts are joined together with large caliber elastic bungee bands, they form a barrier wall that is nominally 19.5 m long that can be positioned on the pavement surface at the end of the active SkyNest runway to provide a collision barrier function. When so positioned, each crash cushion cart can extend a pair of hinged reinforced steel plates downward from the rear face of its rear vertical wall to form stabilizing gusseted foot pads on the pavement surface. Each plate has a large rubber footpad on its under surface. Each of these steel plates can be secured in its down position by a 12.7 mm bolt to apply the rubber footpad onto the pavement surface below the cart in order to broaden the cart's base and help it resist it toppling during a collision. When the crash cushion carts are being re-located on the pavement, these hinged steel plates are temporarily retracted upward and secured to the rear face of the rear vertical wall of the crash cushion cart. The structural base of each nominal crash cushion cart is a stiff steel ladder frame that is nominally 17.8 cm tall. This ladder frame can be filled with either sand or water or both in order to obtain the desired mass for the crash cushion cart. The rear (non-impact) edge of the ladder frame is attached to a hollow steel vertical rear wall of nominally 487.7 cm L×226.1 cm H×30.5 cm W that is welded along its bottom edge to the ladder frame. These bottom welds are strengthened by welded steel triangular gussets. This vertical rear wall supports the large airbag cushioning device on the crash cushion cart. This vertical rear wall is, in turn, buttressed on its backside by the two large retractable steel plates that provide the stabilizing gusseted foot pads for each crash cushion cart. To absorb the initial impact of the nosewheel of the SkyQart, a sloped ramp made of a steel plate extends from the impact side of the cart's ladder frame outward for about 0.915 m underneath its large memory foam beanbag cushion and onto the pavement at ground level. This sloped ramp spans the entire 4.88 m on the impact side of the crash cushion cart and is hinged where it joins with the cart's ladder frame so that it can be lifted up off of the pavement during re-location of a crash cushion cart. This shallow-sloped full-length ramp is intended to allow the initial impact of the SkyQart's nosewheel and landing gear to roll up this sloped ramp as it compresses the soft memory foam beanbag cushion and thereby avoid striking a blunt edge of the thick ladder frame in the first 0.915 m of impact absorption. This ramp also serves to support the memory foam beanbag cushion as a wall, which is also suspended from the nominal 5.08 cm diameter frangible plastic masts on each end of the cart. There are two such masts and they are attached at each end of the ladder frame 86.4 cm away from the impact surface of the memory foam beanbag cushions so that there will be nominally 86.4 cm of compression before the impacting vehicle reaches these frangible masts.

Each junction between the joined crash cushion carts on their impact side is covered with a 0.254 mm thick flexible load-spreading polyethylene terephthalate (PET) tarp whose tensile strength is 55 Mpa and whose peripheral edges are secured with aramid fiber straps to the beanbags on either side of said junctions. For the SkyNests I, II and III, which have fixed headings of their pavement runways, the crash cushion carts can be permanently positioned at each end of the runway with their braced footpads on the pavement. For SkyNests IV and SkyNests V which have selectable variable headings according to the current wind conditions, the carts can be moved by towing them individually into position at the end of the active pavement and joining them into a train of carts. The hybrid cushioning system on the crash cushion, which is part memory foam beanbag cushion and part large airbag, provides an inelastic collision in which the SkyQart's kinetic energy on impact is gradually converted into a combination of heat, material deformation, movement and friction. The details of these processes are calculated herein for this embodiment of the crash cushion. This embodiment is designed and modeled as a crash cushion that can arrest the motion of a SkyQart I & II or a SkyQart III from a groundspeed of 20 m/sec. This impact speed of 20 m/sec is chosen because the nominal take-off and landing airspeed of the SkyQart is 24 m/sec and there is nearly always some headwind or rolling friction to reduce that to a groundspeed of about 20 m/sec as the nominal impact speed. This design model of a crash cushion is one of several possible embodiments in terms of crash cushion size, weight and materials, all predicated on the same concept and process. This model presumes that the SkyQart's autonomous control has applied neither thrust nor braking at the time of the SkyQart's impact with the crash cushion, making the SkyQart essentially a ballistic projectile for the purposes of calculation.

The analysis of the collision of a SkyQart with the barrier cart known as a crash cushion can be solved using the kinematic equations, the conservation of momentum equations and impulse analysis. This collision is inelastic because it has negligible re-bound of the SkyQart after impact. For the calculations of the collision presented herein, an 846 kg SkyQart I or II is presumed, although the nominal interoperable SkyQart weight is 857 kg. The SkyQart has irregularly shaped forward surfaces that upon impact, will gradually come to rest on the stationary crash cushion cart. The majority of the SkyQart's kinetic energy gets absorbed and dissipated into the cushioning materials on the heavier crash cushion. The mass of the crash cushion cart is chosen so that a known impact force will cause a short and harmless skid of the crash cushion cart. The mass of the crash cushion cart and the impact velocity of the SkyQart will mainly control the length of the skid[22]. The complete analysis of such a collision involves additional variables (beyond the weights, speeds and coefficient of friction) that are beyond the simplified calculations here. These additional variables include the unknown deformation of the nose of the SkyQart's AFP, the heating of the cushioning materials, the friction of sliding of the surfaces of the beanbag on the forward parts of the SkyQart and other nearly instantaneous factors. Nevertheless, the method of analysis applied here assumes average forces and constant acceleration with the expectation that the dynamics of these unknown variables will be of relatively small magnitude. The crash cushion barrier cart is 4.88 m in length and sits on rubber tires that can skid with a known coefficient of friction on pavement. There are two functions of the crash cushion cart: 1) the energy of the SkyQart's impact must be dissipated in a gradual enough fashion and over a sufficient time and distance as to ensure that the passengers inside the SkyQart are exposed to tolerable levels of G; and 2) to the extent possible, the impact force must be distributed and spread evenly onto the leading surfaces of the SkyQart such that it likewise suffers minimal damage. This latter function demands that the initial impact of the SkyQart with the crash cushion cart be one in which its cushioning materials conform to and envelop the irregularly shaped forward surfaces of the SkyQart to thereby provide a load-spreading function. Within milliseconds after impact, the cushions of the crash cushion cart must not only conform to these forward surfaces of the SkyQart, they must then themselves progressively compress the other cushioning materials on the crash cushion cart. As this happens and the force of impact is progressively transferred to the stationary crash cushion cart, until said force reaches the point at which the crash cushion cart is designed to break loose and skid some short distance to a full stop to dissipate the remaining energy of the impact to zero. The relevant variables in analyzing this inelastic collision are the mass of the SkyQart, its initial impact speed, the mass of the crash cushion cart, the coefficient of friction of the skid of rubber tires and rubber footpads on pavement, $(-\mu_f)$, the 'spring rate' (resistance to deflection) of the cushioning materials and their coefficients of restitution. The cushioning materials are selected so as to make the crash cushion dissipate the kinetic energy of the SkyQart across a distance, "$d_1$", so as to result in a tolerable level of G. From the information in Table 5, below, a total deceleration distance of 2.6 m is selected as ideal. That 2.6 m is comprised of 1.5 m of compression of crash cushion cushioning materials and an additional 1.1 m of skid distance on the pavement of the combined SkyQart/crash cushion cart. The cushioning materials consist of a beanbag filled with small pieces of memory foam and a large airbag. The tailoring of the cushioning of the beanbag is by the amount and density of the memory foam pieces used inside it. The tailoring of the cushioning of the large air bag is by the sizing of its air vents so as to control the air bag's resistance to compression such that the velocity of the SkyQart would be substantially reduced on the crash cushion cart over a total compression distance $d_1$ of 1.5 m. The proposed material to provide the both the cushioning and shape-conforming functions is made of large memory foam beanbags, stitched together and suspended vertically to form a wall whose height is tall enough to block the SkyQart's motion. An example of such a memory foam beanbag is here[23]. Its specifications are as follows: weight, 41.7 kg for each 2.44 m L×2.44 m W×86.4 cm H. Combining two of these beanbags by stitching the beanbags together can form a wall that is 2.44 m tall and 4.88 m long with 86.4 cm depth with a total weight of 83.5 kg, according to The Bigairbag company[24]. It can provide a customizable inflatable airbag that has internal baffles, external vent windows, internal blowers and an anchoring system. Such a large air bag can be engineered to provide a compression pillow on the backside of the crash cushion memory foam beanbag wall with sufficient strength and resistance to compression by the impact of a SkyQart that it will deliver the calculated performance in energy absorption. The analysis of this inelastic collision is predicated on there being no external forces (e.g. propulsion or braking) on the SkyQart or crash cushion so that the law of conservation of momentum can be applied. That law basically says that if a mass $m_1$ traveling at velocity $v_1$ strikes and sticks to a stationary mass $m_2$ whose velocity is $v_2=0$ on a frictionless surface, then the final velocity, $v_f$, of the combined masses can be found by the formula:

$m_1*v_1+m_2*v_2=v_f*(m_1+m_2)$ is the formula for computing conservation of momentum. The collision of the SkyQart with the crash cushion is an isolated system because any frictional force during the brief collision period is presumed to be of insignificant magnitude. Within the impulse computation of force times time, the momentum of this collision will be conserved. After the collision with the stationary crash cushion cart, the frictional force and application of Newton's second law and kinematic equations can be used to find the distance that the combined SkyQart/crash cushion cart will skid. From the instant of impact, the SkyQart progressively decelerates into the cushions of the crash cushion as the resisting force of those cushions is progressively increasing. For simplicity, we here analyze the collision in metric units only, and we assume that the SkyQart is not losing energy due to rolling friction or braking, nor is it gaining energy by propulsion. Rather we assume that at the instant of impact, the SkyQart is a passive ballistic projectile with zero thrust and with the bottom of its tires at a height of about 12.7 mm off the pavement. After it compresses the memory foam beanbag and large airbag cushions on the crash cushion by 1.5 m, the SkyQart becomes embedded into the crash cushion cart and the combined SkyQart/crash cushion cart begins to move as a unit in its skid along the pavement. The cushioning materials are designed so that the cushion compression distance $d_1$ will be 1.5 m because that is a length sufficient to result in tolerable G's experienced by passengers as the SkyQart is slowed from it 20 m/sec impact speed. The initial skidding speed of the combined SkyQart/crash cushion cart can be calculated. The skid of the combined masses of the SkyQart/crash cushion cart continues the positive horizontal movement of the SkyQart across the skid distance of $d_2$, which is 1.1 meters. The total distance traveled by the SkyQart from impact to full rest is 2.6 meters.

Autonomous Control System

The autonomous control system of the SkyQart is an important component to this invention. The autonomous control system and its suite of multiple sensors for autonomous navigation, aerial agility, 'polite', sense and avoid traffic and obstacle separation in nearly all-weather conditions, functioning at a fully independent level of autonomy, will not be available for the QUAD system in its initial operations. This means that lesser levels of autonomy, including optionally piloted aircraft (OPA) with human pilots, and/or remotely piloted aircraft using bunker pilots, will be employed in the initial phases of QUAD implementation. These will be included by inference in this invention. The rapid progress in driverless vehicle technology is expected to soon inform and produce affordable 'drop-in' autonomous control modules that can be adapted for use in the QUAD system, pending their certification by FAA. Such autonomous flight controls need not be present on the first iterations of the SkyQarts in order for it to be covered under this patent. However, autonomous flight controls, when available, must include, at minimum, appropriate servomotor control of the positions of ailerons, rudder, flaps and elevator in order to enable safe, controlled flight and use of the fast flaps system. Similar autonomous control of spoilers, propeller thrust or drag, active landing gear, wheelmotors, rear hatch, pin-latching and battery swapping will be needed for the nominal embodiments of the SkyQart to operate at SkyNests as described herein. The operation of these several autonomous control functions will comprise the autonomous control system. The SkyQart's on-board autonomous control system will integrate with a computerized networked situational awareness system and a precision positioning system at each SkyNest that, along with other air and surface vehicle guidance systems, will coordinate and control the sequencing, movements (including take-off, landing and taxiing) and positioning of SkyQarts, EPCs and RDCs on SkyNest surfaces and dock areas. This sequencing, movement and positioning will in all cases possible be performed by the autonomous control system with negligible control latency and with GRACE. The autonomous control system will require a diverse suite of multiple sensors that provide a variety of signals and data to the central control software program that performs sensor fusion on-board the SkyQart. Precision Positioning System (PPS)

The precision positioning system is an important component to this invention. It is the concept and process by which the various types of carts of the QUAD system autonomously dock with each other and with the SkyNest dock to enable QUAD's high capacity for moving people and goods. The precision positioning system relies upon sophisticated electronic vehicle guidance devices that use multiple miniature electronic sensors in sequenced sensor fusion to enable docking accuracy to be nominally within +2.0 mm. There are several types of docking in the QUAD system for which the precision positioning system is important. In every type, there is an approaching vehicle and a stationary dock or other vehicle. The types of approach include SkyQart to dock. EPC to SkyQart, EPC to RDC, RDC to SkyQart, RDC to SkyNest dock and RDC to commercial truck dock or to a compatible off-loading ramp. The approach to the dock is made in phases that are appropriate to the range and accuracy of the sensors involved. The nominal SkyQart's approach to the dock begins with a phase that is an initial gross approach to the dock using differential GPS and inertial navigation system (INS) to guide the main landing gear wheelmotors to taxi to and park in a position about 13.7 m from the dock. This parking position is preparatory to the SkyQart backing in toward the target aircraft docking station, which must be accomplished in just 10 seconds. This initial gross approach phase is followed by a more accurate phase in which the SkyQart backs up toward the aircraft docking station using line following software to command its active main landing gear wheelmotors to follow a laser line on the pavement that points directly to the target center of the aircraft docking station and guides the SkyQart to within about 1.83 m of it. The line following software is aided by a camera vision system that avoids obstacles. This phase, in turn, is rapidly and seamlessly followed by a 3rd phase in which proximity to the dock is determined by auto-focus technology. This auto-focus system may be either or both an infrared emitter type (which can function in the dark) or a passive vertical and horizontal auto-focusing CCD camera chip on the SkyQart that guides the wheelmotors to steer the SkyQart toward a small, high-contrast alignment checkerboard target on the dock, bringing it to within about 15.24 cm of the dock. The $4^{th}$ and final alignment and docking phase is accomplished as a two-step sequence using two sensor systems: 1) a pair of four convergent helium-neon (HeNe) laser beams, aimed at their respective transponder receiver plate on the dock, bring the SkyQart to within 19.05 mm of the dock where the capacitive proximity sensors then guide the final 19.05 mm of movement by which the two 6.35 mm diameter tapered pins that protrude from the dock engage into the two horizontal pin alignment receptacle holes in the aft edge of the surface deck of the SkyQart. For redundancy and verification, the sensor types of the initial docking phases continue to gang monitor and corroborate the alignment process that is being guided by the sensors in the later docking phases. The vertical alignment of the approaching vehicle with its target is accomplished by the active main landing gear in the SkyQart and by the scissor jack in the RDC, each of which are guided by the sensors to maintain the correct vertical alignment. At the conclusion of the approach, the SkyQart must have aligned its surface deck (the cabin floor) and battery drawer slides with those of the dock so that the two 6.35 mm diameter tapered solenoid-activated pins are engaged into the two horizontal pin alignment holes in the aft face of the SkyQart's surface deck. The engagement of these pins maintains the necessary alignment of the SkyQart to the dock. This combined parking alignment technology enables the SkyQart to rapidly load and unload EPCs, as well as automated connection of the SkyQart to the dock's DC fast-charging port. The standard dock thickness at its outer edge where it interfaces with the SkyQart or RDC is 28.58 mm. This edge contains the alignment target for the precision positioning system lasers of the SkyQart and RDC, as well as the two 6.35 mm diameter tapered pins that protrude 19.05 mm from the dock to mechanically maintain alignment of the dock surface with the floor height of the SkyQart and RDC during loading and off-loading of the EPC. There are separate alignment targets for the precision positioning system at each aircraft docking station along the dock edge and these targets are equally spaced horizontally at intervals of 4.57 m. The RDC and EPC each have miniaturized modular on-board autonomous navigation and positioning hardware that couple to their rear wheelmotors and steering to enable these carts to precisely align with docking stations where loading and off-loading are to occur. The precision positioning system in the EPC and RDC operates with a similar miniature electronic sensor suite as that in the SkyQart. At the street side of the SkyNest dock, the RDC is provided with its own specially dimensioned cart docking station where it can align with the dock height of 47 cm using its precision positioning system. The precision positioning system on the RDC can steer the swiveling nose tires, and the RDC's steering is augmented by differential control of its rear wheelmotors, each of which is nominally 3 kW and is driven by a nominally 6 kWh, 15.4 kg battery pack. If for any reason a SkyQart is unable to taxi to the dock, the RDC can drive onto the SkyNest pavement ramp or taxiway to reach and rescue a remote stranded SkyQart, using its precision positioning system and scissor jack to dock with it, and thereby rescue that SkyQart's laden EPC and SBP. It can also swap that remote SkyQart's spent battery pack for a freshly charged one if necessary. An RDC can also deliver a freshly charged battery to the street side of the dock where the battery drawer slide under the dock can receive it so that it can be slid on the drawer slides underneath the dock across the full width of the dock to be pin-latched into a docked and waiting SkyQart at the opposite side of the dock. By use of its scissor jack and compatible precision positioning system, the double decker RDC with its upper and lower set of drawer slides can provide a versatile loading/off-loading option for SBPs on both the docked SkyQart as well as for the SkyQart that is stranded or immobilized on the parking ramp. Each battery swapping station at a QUAD dock has a pair of precision positioning system transponder receiver plates mounted on the face of the dock on either side of the center point of the dock battery swapping station. Each precision positioning system transponder receiver plate receives four convergent He—Ne laser beams from the emitters on the aft face of the sidewalls of the SkyQart's rear hatch opening, and the receiver plates process the information from those laser impingement patterns into a wireless transmission back to that SkyQart to provide guide signals for the SkyQart's wheelmotors and active main landing gear to steer the SkyQart into the exact required horizontal and vertical alignment with the dock's battery swapping station. To help ensure precise docking with the HeNe lasers, the precision positioning system also employs a combination of multiple other miniature electronic sensors in sensor fusion. Co-located on the dock face with the precision positioning system transponder receiver plates are two capacitive proximity sensors for short-range positioning, which help guide the SkyQart to park exactly at the appropriate station at the dock with a 3D precision of ±2.0 mm. This guidance is assisted by the Active Main Landing Gear that is able to control and set the ride height of the SkyQart during its dock maneuvering. When the rear hatch is fully open, a SkyQart may be precisely positioned and aligned with the dock manually. This can be accomplished by simple visual alignment of the fine-line markings on the SkyQart's rear floor centerline with those fine lines on the dock surface at the center of the aircraft docking station. The manual docking of a SkyQart requires use of a nose-wheel towbar and a wireless remote control that is authorized to command the height settings of the active main landing gear.

Wheelie Prevention System

A wheelie on take-off is prevented by a combination of components that are configured to keep the nose tire on the pavement during the aggressive take-off acceleration of a SkyQart.

A downforce on the nose tire is produced by a propeller whose thrust axis is at least 60 cm or more above the center of gravity of a SkyQart. A standard battery pack whose mass is located below the cabin floor of the axisymmetric fuselage pod lowers the SkyQart's center of gravity, which helps prevent a wheelie during take-off. An active main landing gear can help prevent a wheelie by positioning the main landing gear leg at a lowered position at the moment of brake release so as to reduce the wing's angle of attack and create a downforce forward of the center of gravity during the initial take-off roll. At the moment when the indicated airspeed becomes sufficient for lift-off, the active main landing gear can retract the main landing gear leg upward so as to increase the fuselage pitch angle in order to suddenly increase the wing's angle of attack and lift and thereby induce lift-off. The wheelie prevention system includes a wing whose extended wing flaps during take-off produce a nose-down pitching moment that also helps to prevent wheelies by keeping the nose tire on the pavement during take-off. The long wheelbase and the forward location of the SkyQart's center of gravity along with a far forward location of the nose tire also help to prevent a wheelie. The forward center of gravity requires a horizontal tail coefficient large enough to induce a nose-up pitch attitude when the indicated airspeed becomes sufficient for lift-off. The autonomous control system has a sensor for fuselage pitch angle that enables it to instantly modulate the thrust of the main landing gear tires, the thrust of the propellers, the landing gear leg position and the wing flap position in order to prevent a wheelie.

TABLE 7

Nomenclature Summary

3 D: three dimensional
4 D: a three-dimensional path along which each point has a specific clock time (0025)
Above mean sea level, describing elevation or altitude on a standard day
AFP: axisymmetric fuselage pod
ANS: Acceptable Noise Sphere
e.g.: center of gravity
$CO_2$: carbon di-oxide, a greenhouse gas
dBA: decibel level on the "A" weighted scale
EPC: electric payload cart, a driverless cart that carries people or goods latched to its surface
ESTOL: extremely short take-off and landing
FlyQUAD: the mobile device software application for reserving a flight in QUAD
Faraday cage around battery pack, to contain dangerous high voltage and radio interference
G: the acceleration due to gravity at sea level on Earth, 9.81 m/sec$^2$
GPS: global positioning system
Ground travel time, the total of non-airborne time during a trip using QUAD
GRACE: Guided Rate Acceleration Change Execution
$L_{den}$: level in dBA, day, evening and night, a standard metric for noise measurement
kg: kilogram unit of mass
km/hr: kilometers per hour
kWh: kilowatt-hour, unit of energy = 1000 watts for one hour
kW: kilowatt, unit of power = 1.34 horsepower
last mile: the final ground travel portion of a trip to reach a doorstep destination

TABLE 7-continued

Nomenclature Summary

Landing gear wheelmotor, an electric motor embedded inside a landing gear's wheel
Minimum buffer zone, a separator between SkyNests or SkyNest and community
m: meter, metric unit of length, equivalent to 3.2808 feet
National Household Travel Survey, a reputable report on transportation statistics
Networked Situational Awareness, software that controls vehicle movements at SkyNests
Prep-delay: the time spent boarding, stowing personal effects or loading an electric payload cart prior to pressing its Go-button and after the appointed time of departure from the dock
PPS: precision positioning system
QUAD: quiet urban air delivery, a system of vehicles to move people and goods by air
Qusheat: Autonomous passenger seat with electronic ride control to reduce bumpiness
Robotic battery swapping, a robot arm that removes and replaces standard battery packs
RDC: robotic delivery cart, a golf-cart-like electric vehicle for hauling EPCs and SBPs
Runway end identification lights, usually strobe lights on either side of the pavement threshold
RPM: revolutions per minute
SBP: standard battery pack, an energy source in a standard sized container fit for SkyQarts
Solenoid-actuated pin-latching System, a fast-acting way to securely latch items together
SkyNest Dock Standards, the uniformly sized facilities/capabilities at a QUAD dock
SkyNest: one of a series of five standardized airparks used in the QUAD system
SkyQart: standardized electric-powered autonomous QUAD aircraft as types I, II and III
Cadenced coordinated operations at SkyNests, the rapid cadence sequence of operations at SkyNests
Visual Approach Slope Indicator, a pavement lighting system to guide final approach slopes
VTOL: vertical take-off and landing, for example helicopters
$V_{max}$: maximum velocity
Wheelie: during take-off, an upward tilting of a fuselage that lifts its nose tire off the ground

BRIEF DESCRIPTION OF SEVERAL VIEWS OF THE DRAWINGS

The accompanying drawings are included to provide a further understanding of the invention and constitute a part of this specification. They illustrate the embodiments that comprise the invention, and together with the description of their components serve to explain the operation of the system.

DETAILED DESCRIPTION OF THE ILLUSTRATED EMBODIMENTS

As used herein, the terms comprises, comprising, includes, including, has, having or any other variation thereof, are intended to cover a non-exclusive inclusion. For example, a process, method, strategy, article or apparatus that comprises a list of elements is not necessarily limited to only those elements but may include other elements not expressly listed or inherent to such process, method, strategy, article, or apparatus. Also, use of a or an are employed to describe elements and components described herein. This is done merely for convenience and to give a general sense of the scope of the invention. This description should be read to include one or at least one and the singular but it also includes the plural unless it is obvious that it is meant otherwise.

GENERAL: The invention is that of the concepts and processes that include the sequence of operations and the important components, electric-powered vehicles and specifications of the distributed airborne mass-transportation system that is herein named "Quiet Urban Air Delivery" (QUAD) and that uses uniquely-capable, one to six seat, electric-powered aircraft (SkyQarts) along with versatile, compatible, standardized electric-powered ground vehicles to provide highly distributed, high-capacity delivery of both people and cargo across urban mega-regions by flying between small, high-proximity SkyNests that themselves have specific and standardized dimensions, structures, facilities and features and from which either walking or use of a variety of ground vehicle types, including the EPC and the RDC, can provide last-mile delivery to doorstep destinations. The SkyNests provide a standard embodiment of the loading dock at which the compatible SkyQarts can be loaded and unloaded rapidly and where rapid robotic or manual replacement of its standard swappable battery pack (SBP) can take place. The SkyNest, SkyQart, EPC. RDC and SBP are all included as important components in this patent, as a combination comprising the QUAD processes. The following detailed description of the illustrated embodiments necessarily includes some redundancy with the descriptions provided in the SUMMARY OF THE INVENTION above, but only to the extent that it provides the reader the convenience of proximate context for the description at hand.

The Axisymmetric Fuselage Pod (AFP)

FIGS. 1, 2, 2A and 3 and shows plan views of the top, side and front, respectively of the axisymmetric fuselage pod (AFP) in accordance with one embodiment of the present invention. Other alternative embodiments of SkyQarts that do not have AFPs may be used in alternative QUAD systems and still be included in this invention if they retain the capability of loading and unloading EPCs and or RDCs through a large door or hatch in their fuselage while docked.

Figure 1:
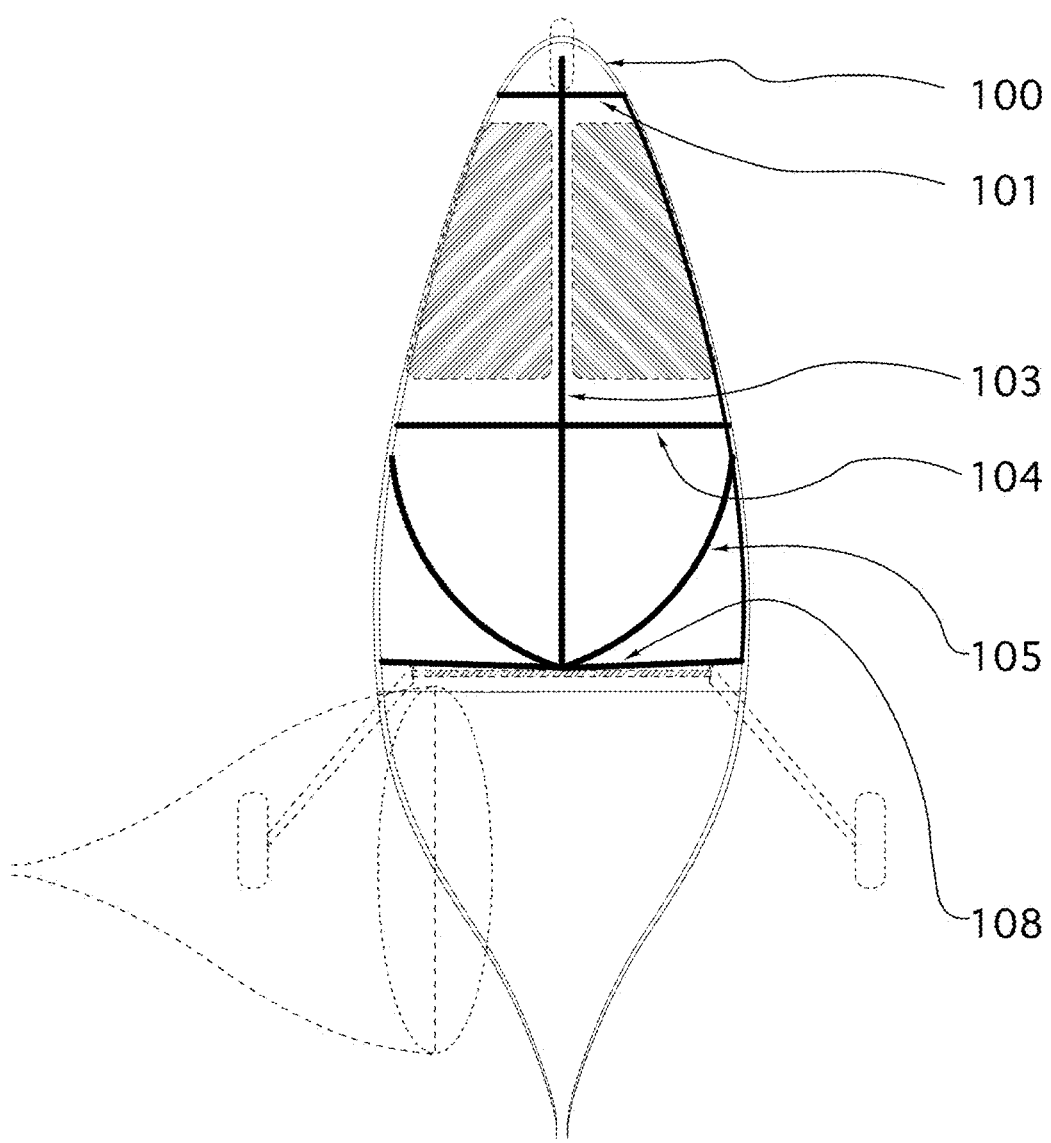
FIG. 1 depicts a top view of an exemplary Axisymmetric Fuselage Pod (AFP) showing its hard points, ribs and rear hatch.
Figure 2:
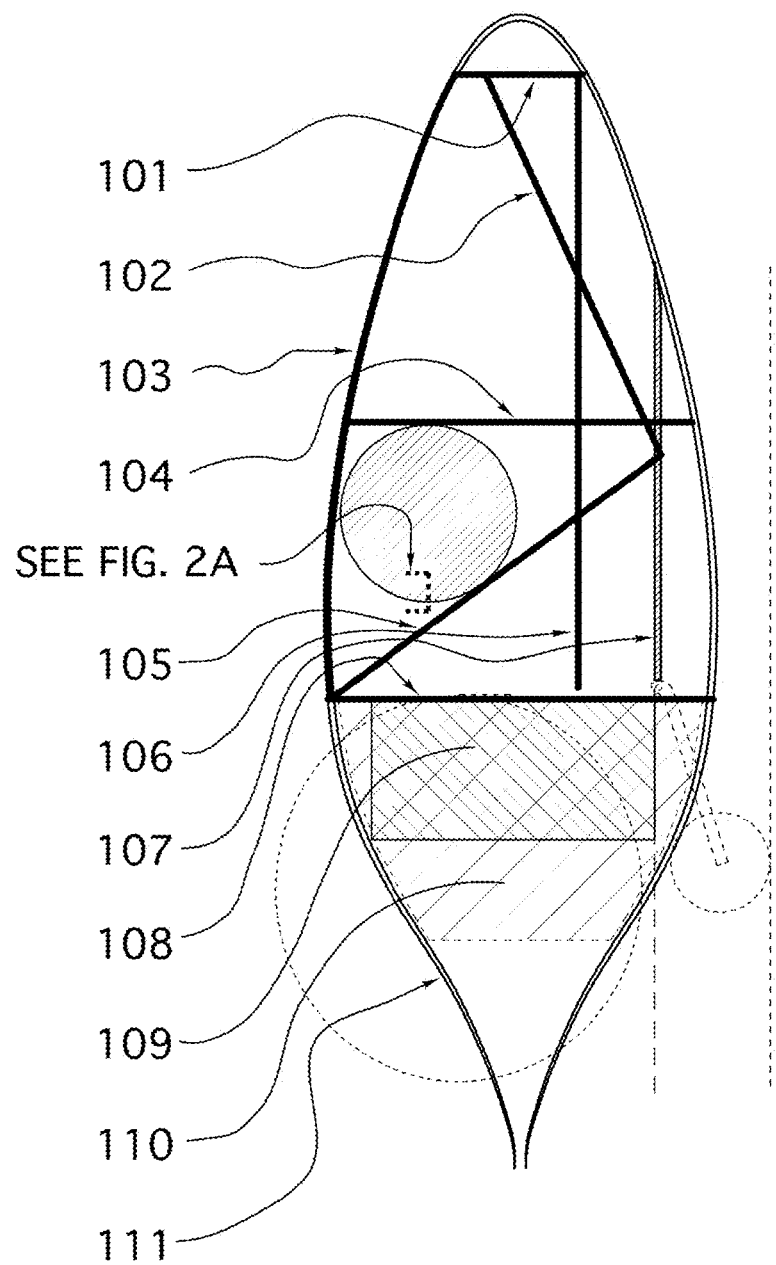
FIG. 2 depicts a side view of the exemplary Axisymmetric Fuselage Pod (AFP).
Figure 3:
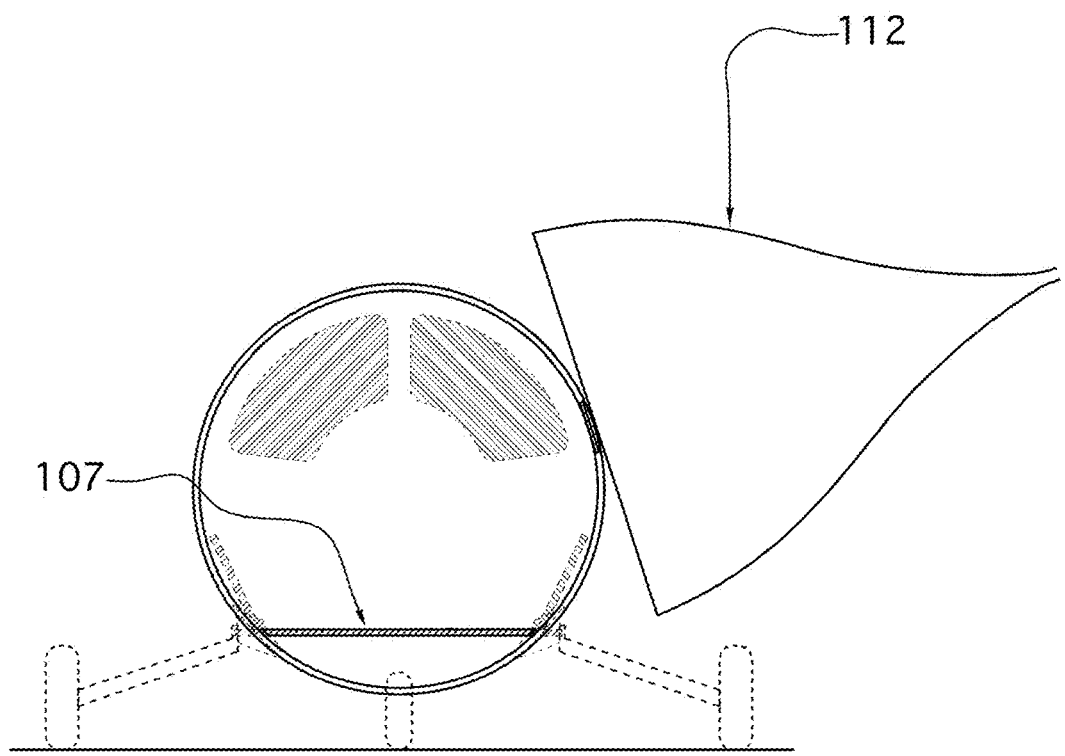
FIG. 3 depicts a frontal view of the exemplary Axisymmetric Fuselage Pod (AFP).

All of the embedded bulkheads and longerons shown in FIGS. 1, 2 and 3 have cross-sections that actually include a wider and gradual tapering (not shown) of their thickness at locations outward from the thick lines that depict their core structure. Only the core structure of each bulkhead and longeron is depicted by the thick lines in the figure.

Figure 2A:
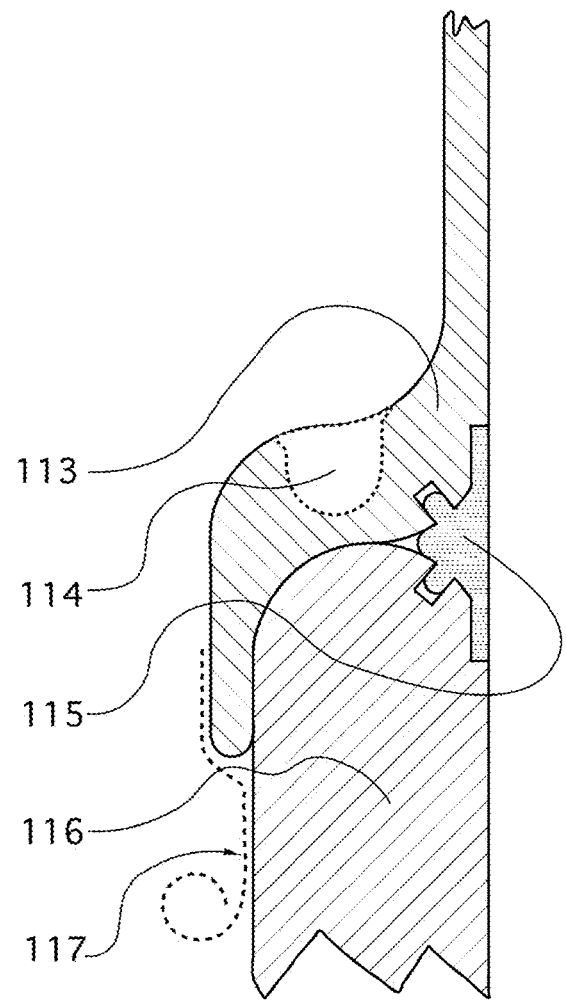
FIG. 2A depicts a cross-sectional view of the window frame of the circular emergency exit window of the AFP.

FIGS. 1, 2 and 3 provide top, side and frontal views of the AFP, respectively. FIG. 2A provides a magnified view of the peelable window frame. Reference number 100 points to a top view of the right side of the external surface of the nose of the axisymmetric fuselage pod (AFP), which has a circular cross-section. Reference number 101 points to top and side views of the forward-most structural bulkhead of the AFP, which dissipates the loads of the nosewheel into the AFP. Reference number 102 points to a side view in FIG. 2 of the lower diagonal forward longeron of the AFP. Reference number 102 is omitted in FIG. 1 for clarity. Reference number 103 points to a top view in FIG. 1 and a side view in FIG. 2 of the longitudinal reinforced spine that is embedded into the upper midline of the AFP and helps to carry the loads from the forward portion of the AFP and its nosewheel to the mono-strut and main wing attachment. Reference number 104 points to a top view in FIG. 1 and a side view in FIG. 2 of the mid-fuselage circular circumferential structural bulkhead that is embedded into the skin of the AFP and that reinforces its floorboards and its other spines, longerons and bulkheads, while also spreading the loads from the forward wing attachment onto the roof of the AFP. In FIG. 2, the reference "FIG. 2A" points to the location of the cross section of the perimeter of the circular cabin side window that is depicted in larger detail in FIG. 2A below. Reference number 105 points to a top view in FIG. 1 and a side view in FIG. 2 of the curved diagonal embedded bulkhead that joins the lower portion of the mid-fuselage bulkhead to the more aftward circular hatch door bulkhead and spreads the loads from the wing attachment on the roof of the AFP to its forward structures. Reference number 106 points to a top view in FIG. 1 and a side view in FIG. 2 of the curved horizontal longeron that joins the rear bulkhead to the middle, diagonal and forward bulkheads and stiffens the side of the AFP. Reference number 107 points to a side view of the upper surface of the composite sandwich structure of the cabin floorboard of the AFP. Reference number 108 points to a top view in FIG. 1 and a side view in FIG. 2 of the rear bulkhead of the AFP that stiffens its rear hatch opening and dissipates loads from both the main wing and the main landing gear. Reference number 109 points in FIG. 2 to a side view of the removable flotation module #1 that provides enhanced flotation for the SkyQart by filling the empty space inside the AFP's rear hatch. Module #1 is typically removed for most payloads. The removal of Module #1 affords extra space to allow the seats and the rear baggage bin to recline. Module #1 measures nominally 55.9 cm L×114.3 cm H×121.9 cm W at the armrest waterline, narrowing to 101.6 cm W at the shoulder waterline. Reference number 110 points in FIG. 2 to a side view of the larger removable flotation module #2 that can be removed from the rear hatch of the AFP in order to increase the rear cabin volume and enable the hauling of out-sized cargo items. Excepting the volume of module #1, module #2 occupies nearly all of the volume of the rear hatch forward of the fuselage station that is 96.5 cm aft of the hatchline. Reference number 111 points in FIG. 2 to a side view of the top portion of the outer skin of the rear hatch of the AFP. Reference number 112 points in FIG. 3 to a frontal view of the rear hatch of the AFP when it is in its fully opened position, wherein it is swung upward at an 18° angle, the position that allows it to clear both the dock and the main landing gear. In FIG. 2A, reference number 113 points to a cross-sectional view of the cross-hatched structure that is the juncture of the circular cabin window on the upper right of the figure with its thicker reinforcing internal perimeter flange. Reference number 114 points to a cross-sectional view of a representative finger recess in the window's internal perimeter flange. This finger recess and identical others distributed at several points along the window's perimeter serve as grips for a passenger to be able to pull the window inward into the aircraft cabin in the unlikely event of having to use the window opening as an emergency escape exit. Reference number 115 points to a cross-sectional view of the horizontally crosshatched, specially shaped extruded rubber external sealing strip that seals the outer gap between the window and the window frame. To increase its surface to volume ratio, this rubber sealing strip has small nipples that engage into each of the circumferential grooves shown in the window's perimeter flange and the window frame. It will be noted that this rubber sealing strip forms a flush external surface with the outer skin of the AFP when properly pressed and glued in place. Reference number 116 points to a cross-sectional view of the diagonally crosshatched structure that is the outer wall of the AFP, showing the rounded contour of the edge of its window opening. This rounded contour facilitates using the opening as an escape exit. Reference number 117 points to a cross-sectional view of a dashed line that represents the internal sealing adhesive tape that joins the window's perimeter flange to the surface of the inner wall of the AFP and thereby prevents air leakage in or out of the narrow gap around the window.

The SkyQart I and SkyQart II

Figure 4:
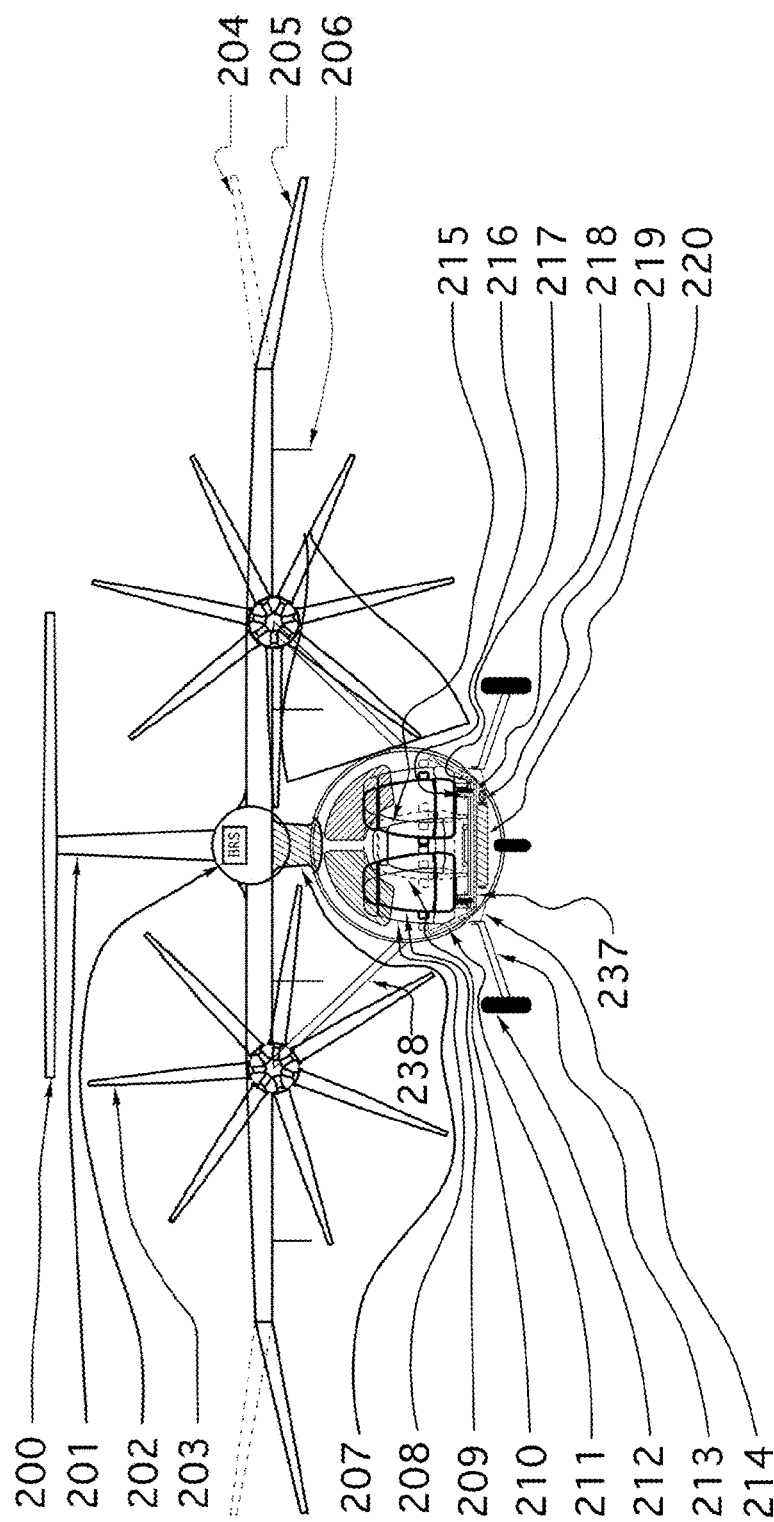
FIG. 4 depicts a frontal view of an exemplary SkyQart I and II
Figure 5:
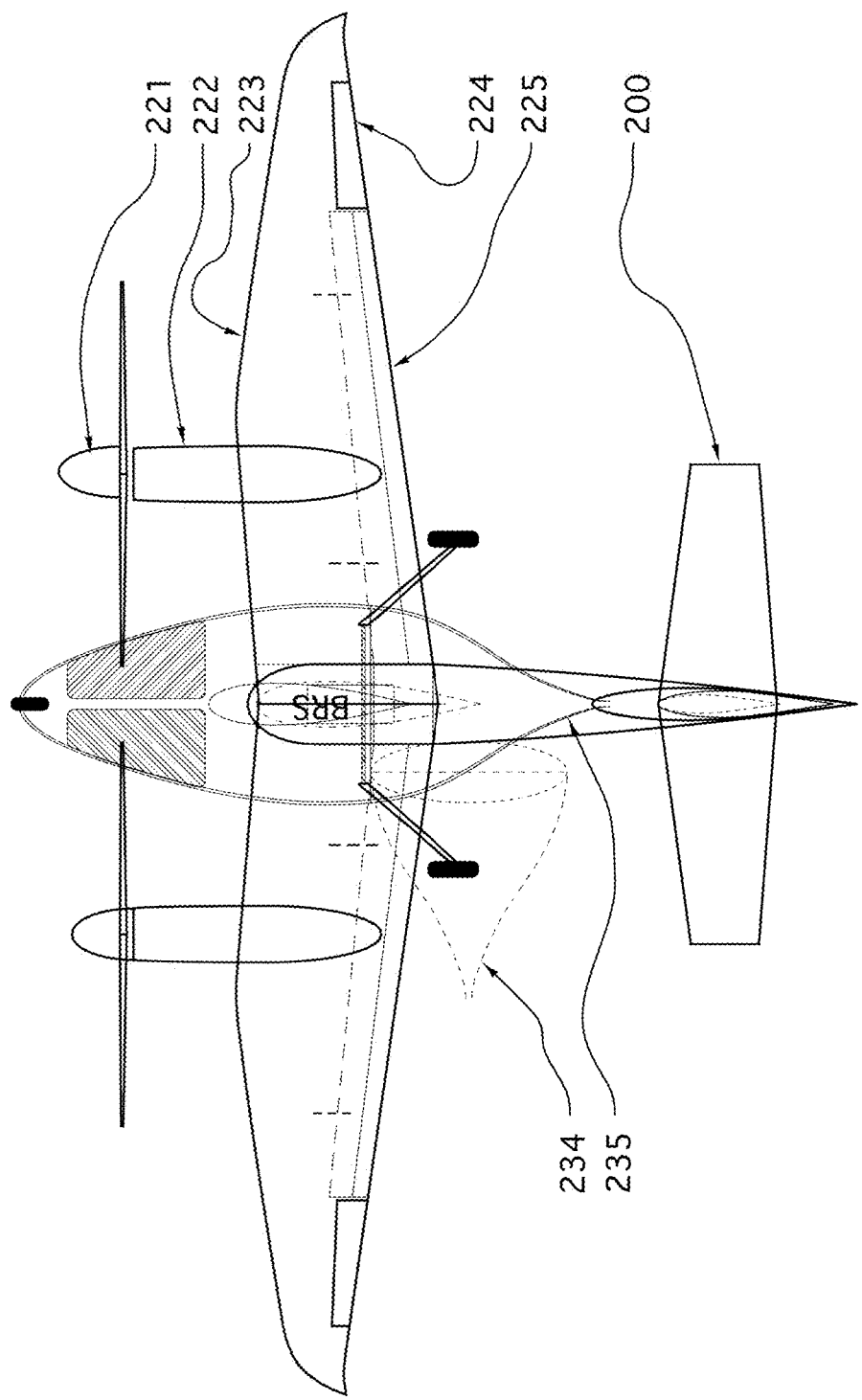
FIG. 5 is a top view of an exemplary SkyQart I and II
Figure 6:
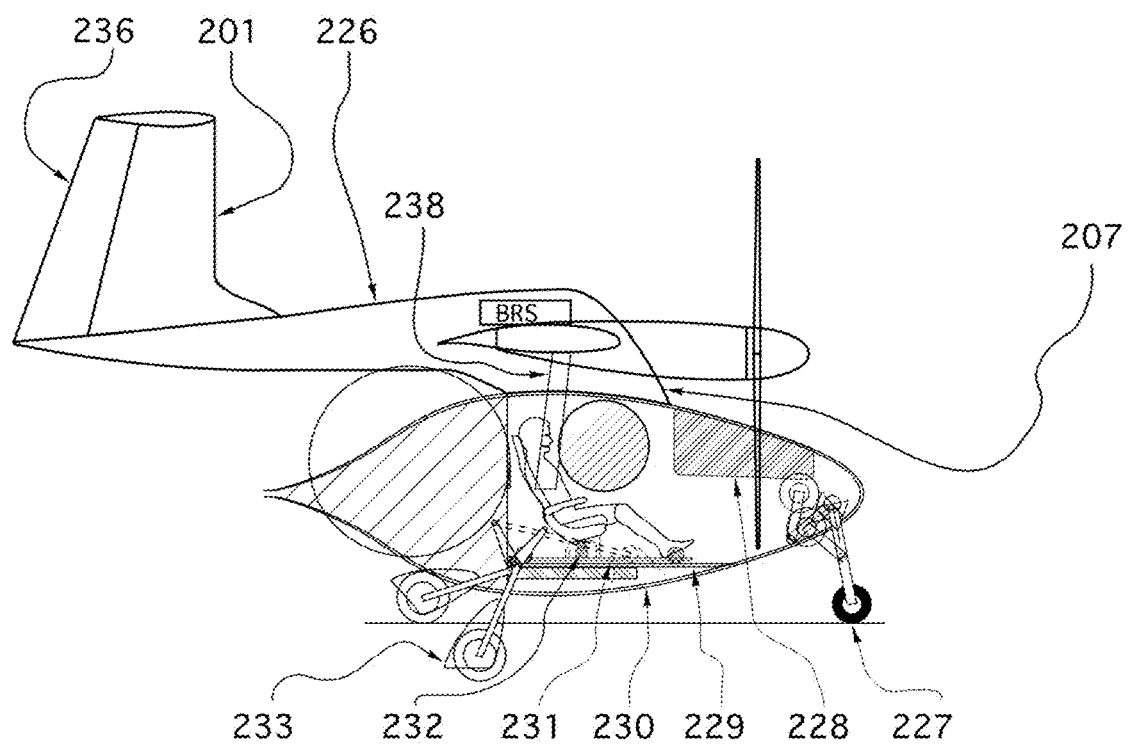
FIG. 6 is a side view of the exemplary SkyQart I and II

FIGS. 4, 5 and 6 and shows plan views of the front, top and side, respectively of the nominal SkyQart I and II in accordance with one embodiment of the present invention. Referring now to these FIGS. 4, 5 and 6, the detailed features of the exemplary SkyQart I and II are indicated by reference numbers 200 through 238. The SkyQart is sized and proportioned so as to match the dimensions of a standard SkyNest, its loading dock and its surface carts. Its wing area and span, flap area, propeller diameter, fuselage shape and size, tail volume, ground clearance, landing gear dimensions, center of gravity, cabin volume, battery pack size, and rear hatch door are all scaled to one another so as to allow this aircraft to fulfill the mission requirements and processes of the QUAD system. The relative scale of these components in the 3-view drawing are accurate and are shown together in order to clarify their three-dimensional (3D) shapes. These components are shown in accordance with the dimensions given in the text. When not specified, all items described apply to both SkyQart I and SkyQart II as the nominal interoperable embodiments presented herein.

In FIG. 4, Reference number 200 points to a frontal view of the starboard tip of the horizontal tail of the SkyQart. Reference number 201 points to a frontal view of the upper starboard portion of the vertical stabilizer of the SkyQart. Reference number 202 points to a frontal view of the rectangular container of the emergency ballistic recovery system, a compact rocket-fired vehicle parachute that is contained within the tailcone of the SkyQart and that has its attachment cables embedded into the outer skin of the SkyQart and attached to appropriate hard points of its structure. Reference number 203 points to a frontal view of one of the seven identical propeller blades of the SkyQart's starboard quiet propeller, shown without the propeller spinner in place. The left or port wing has an identical seven-bladed propeller and it is shown with its axial spinner in place, covering the innermost shank portions of its propeller's blades. Reference number 204 points to a frontal view of the left wingtip of the SkyQart I, showing that it has a dihedral (upward tilt) of 8.84°. Reference number 205 points to a frontal view of the left wingtip of the SkyQart II, showing that it has an anhedral (downward tilt) of 11.87°. Reference number 206 points to a frontal view of one of the four flap hinge fins that project down below the trailing edge of the lower wing surface. These hinge fins provide the pivot axes for both the forward flap segment and the rear flap segment of the double slotted wing flaps of the SkyQart's fast flap system. Reference number 207 is shown twice for clarity. In FIG. 4, reference number 207 points to a frontal view of the right side of the mono-strut that attaches the main wing to the AFP. In FIG. 6, reference number 207 points to a side profile view of the leading edge of that mono-strut, showing its position between the main wing and the AFP. Reference number 208 points to the outer edge of a frontal view of the seatback of the starboard passenger seat for the configuration of the SkyQart in which a total of three seats are used inside the AFP. It will be noted that the other two seats of this three-seat configuration are also shown with the same rather thin line thicknesses; there is a symmetrical left-hand or port passenger seat (not labeled), and a smaller midline front seat whose upper left side is labeled as reference number 215. Reference number 209 points to the outer edge of a frontal view of the seatback of the starboard passenger seat for the most common configuration of the SkyQart in which a total of two seats, side-by-side, are used inside the AFP. In this common configuration, both the starboard and port passenger seats are depicted with a thicker line width, while the left hand passenger seat is not labeled. Reference number 210 points to a dashed line that depicts the outer edge of a frontal view of the seatback of the single, large, midline passenger seat that is used in the single-seat configuration of the SkyQart. The single-seat configuration is used either for exclusive solo privacy (at a higher fare price) or for those cases where an outsized passenger's girth or weight require that the SkyQart's payload be limited to that one person. Reference number 211 points to a frontal view of the lever arm that moves the active main landing gear through its range of motion. This lever arm is rigidly attached to the transverse trunnion bar, shown in frontal view as crosshatched and labeled as reference number 218, whose rotation in the two main landing gear trunnion pillow block bearings provides the swing axis of the active main landing gear. Reference number 212 points to the right side of the right main landing gear tire of 40.64 cm diameter, which, like its identical mate the left main landing gear tire, is mounted on a powerful wheelmotor whose exact rotational position, RPM and power are controlled so as to provide take-off acceleration, regenerative braking on landing, as well as precisely guided trajectories for taxiing, parking and docking. Not shown in the frontal and top views of the SkyQart are the lightweight wheel fairings, shown in side view in FIG. 6 as reference number 233. These wheel fairings provide a rigid streamlined outer cover for the port and starboard main landing gear tires. Reference number 213 points to a frontal view of the bottom surface of the right main landing gear leg of the SkyQart, whose mirror-image, the port main landing gear leg, is shown on the SkyQart's port side. Each main landing gear leg has a stout axle on which is mounted its respective tire/wheelmotor. Each main landing gear leg is rigidly attached to the transverse trunnion bar, which is labeled as reference number 218. Reference number 214 points to a frontal view of the starboard main landing gear trunnion pillow block bearing that, along with the left hand pillow block bearing, bears and spreads the loads imparted by the main landing gear's transverse trunnion bar. It will be noted that the port side pillow block bearing is on the left side of the SkyQart at a symmetrical location and that it is a mirror-image of that on the right side. Reference number 215 points to the upper outer port side edge of a frontal view of the seatback of the single, small, low-set, midline front passenger seat that is used in the three-seat configuration of the SkyQart. It will be noted that the seat shown as reference number 215 has a smaller width than that shown by reference number 210 in order for it to fit into the more forward portion of the AFP's cabin. Reference number 216 points to a frontal view of one of the two rear wheelmotors of the autonomous robotic electric payload cart (EPC). An identical, not-labeled, mirror-image rear wheelmotor can be seen on the opposite side of the EPC with this view. Reference number 217 points to a frontal view of the starboard latching pin of one of the SkyQart's solenoid bodies, showing that it is inserted inside the side wall of the floorboard of the EPC in order to securely pin-latch the EPC to the SkyQart. The structure that secures this solenoid body to the inside wall of the SkyQart is not depicted in order to enhance clarity. Reference number 218, as mentioned above, points to the transverse trunnion bar of the main landing gear. Reference number 219 points to a frontal view of the bottom edge of the oval shaped DC fast-charging port, shown in horizontal crosshatch, in its standardized location under the floorboard of the SkyQart and just lateral to the SBP. Reference number 220 points to a frontal view of the bottom surface of the standard swappable battery pack (SBP) showing its size and location in the belly of the AFP along with the drawer slides on its port and starboard sides. Reference number 221 points to a top view in FIG. 5 of the starboard axisymmetric propeller spinner with its 40.64 cm base diameter. There is an identical spinner shown in top view on the port side propeller. These spinners enclose the controllable pitch hubs of the starboard and port propellers. Reference number 222 points to a top view of the starboard motor nacelle that provides a structural mount and streamlined covering for the right side propeller motor and its accessories. A symmetrical nacelle that is not labeled is shown on the port side of the SkyQart. These nacelles extend the propellers well forward of the wing's leading edge in order to help ensure undisturbed air inflow to the propellers, a feature that is important to minimizing propeller noise. Reference number 223 points to a top view of the leading edge of the right main wing. Reference number 224 points to the trailing edge of the starboard aileron, shown in top view in FIG. 5. There is a not-labeled mirror-image of the right aileron symmetrically placed on the trailing edge of the left wing, comprising the left aileron. Reference number 225 points to the trailing edge of the right main wing's double slotted flap, whose full chord-wise extent when nested inside the wing is depicted by the dashed line just forward of that trailing edge. A symmetrical mirror-image double slotted flap and nested chord limit line is likewise depicted for the left main wing. Reference number 226 points to a side view of the top surface of the tapering tailcone structure that joins the main wing to the horizontal and vertical tail surfaces. This tailcone has a circular cross-section when viewed from the frontal perspective. Reference number 227 points to a side view in FIG. 6 of the intersection of the SkyQart's 30.5 cm diameter nose tire with the ground plane, as would occur with a fully loaded SkyQart at static conditions on a level parking ramp. Reference number 228 points to the bottom edge of the SkyQart's right side windshield. Reference number 229 points to a side view of the bottom surface of the SkyQart's cabin floor structure. Reference number 230 points to a side view of the outer skin of the belly of the SkyQart's AFP, whose skin is comprised of a 2.54 cm thick composite sandwich structure. Reference number 231 points to a side view of one of the rectangular latching solenoid bodies that are arrayed inside the SkyQart and that serve to pin-latch the EPC in place. Other such solenoid bodies for latching the EPC are omitted from FIG. 6 to simplify the drawing. The structure that attaches these solenoid bodies to the interior of the SkyQart likewise is not depicted here in order to simplify. Reference number 232 points to a side view of the Qusheat ride control seat which is the electromechanical pedestal that fits underneath and smartly moves each seat bottom so as to reduce the impact of air turbulence on the SkyQart passengers. Reference number 233 points to the aforementioned truncated wheel fairing for the main landing gear. Reference number 234 points to a top view of the outline of the AFP's rear hatch when it has been swung open 90° into its fully open position. The rear hatch swings open on a hinge that is located on the port side of the SkyQart's AFP. That hinge has a hinge axis that is tilted 1080 above the horizontal plane and this causes the rear hatch to swing along a path that makes an 18° angle above the horizontal. Reference number 235 points to the port rear side of the SkyQart's rear hatch when it is in the closed position as viewed from above. Reference number 236 points to the trailing edge of the movable rudder on the rear portion of the SkyQart's vertical tail. Reference number 237 points to a frontal view of the left-hand one of the two 6.86 mm diameter dock pin alignment receptacle holes in the floorboard of the SkyQart. It can be seen that the starboard hole that is mate to this left-hand alignment hole is symmetrically placed and that these two holes are nominally 81.3 cm apart, straddling the midline of the SkyQart. In FIG. 4, reference number 238 points to a frontal view of the starboard wing's optional diagonal wing strut, shown as an outline that has its upper end attached to the main wing spar through an opening in the lower surface of the wing on or near the inboard edge of the motor nacelle. That strut has its lower end attached structurally to the strong main longeron that is embedded into the sidewall of the AFP. There is a mirror image of this diagonal wing strut shown in frontal view under the left wing of the SkyQart. Reference number 238 is also depicted as a thin rectangle in the side view shown in FIG. 6, showing its position relative to the wing and AFP. NOTE: such optional diagonal wing struts are not shown in the SkyQarts in any other drawings or figures herein.

The SkyQart III

Figure 7:
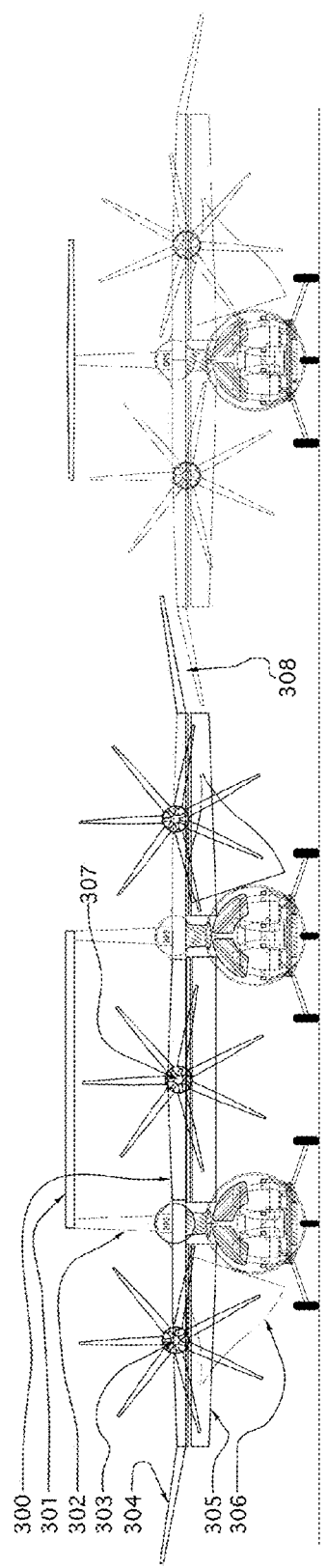
FIG. 7 is a frontal view of an exemplary SkyQart III and its wingtip overlap with a SkyQart I
Figure 8:
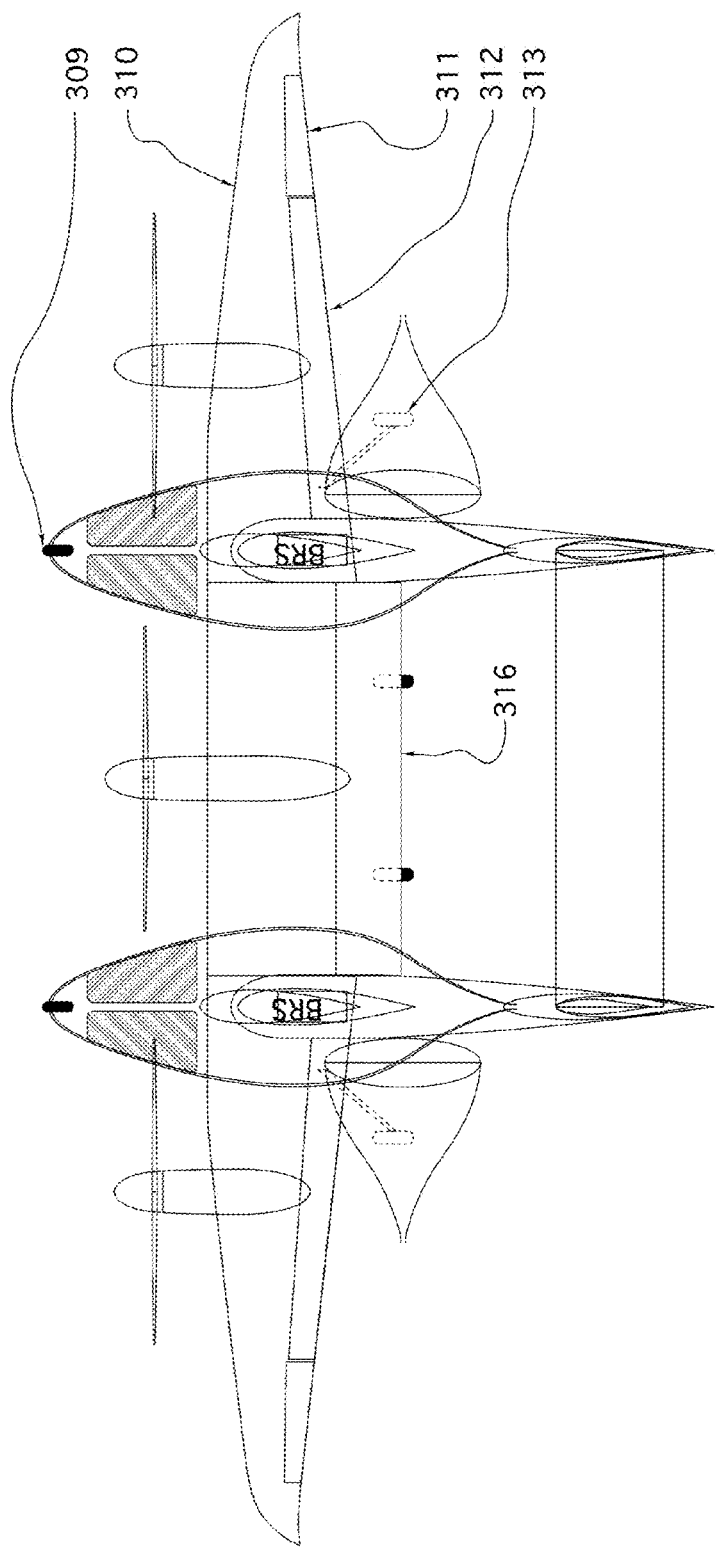
FIG. 8 is a top view of the exemplary SkyQart III
Figure 9:
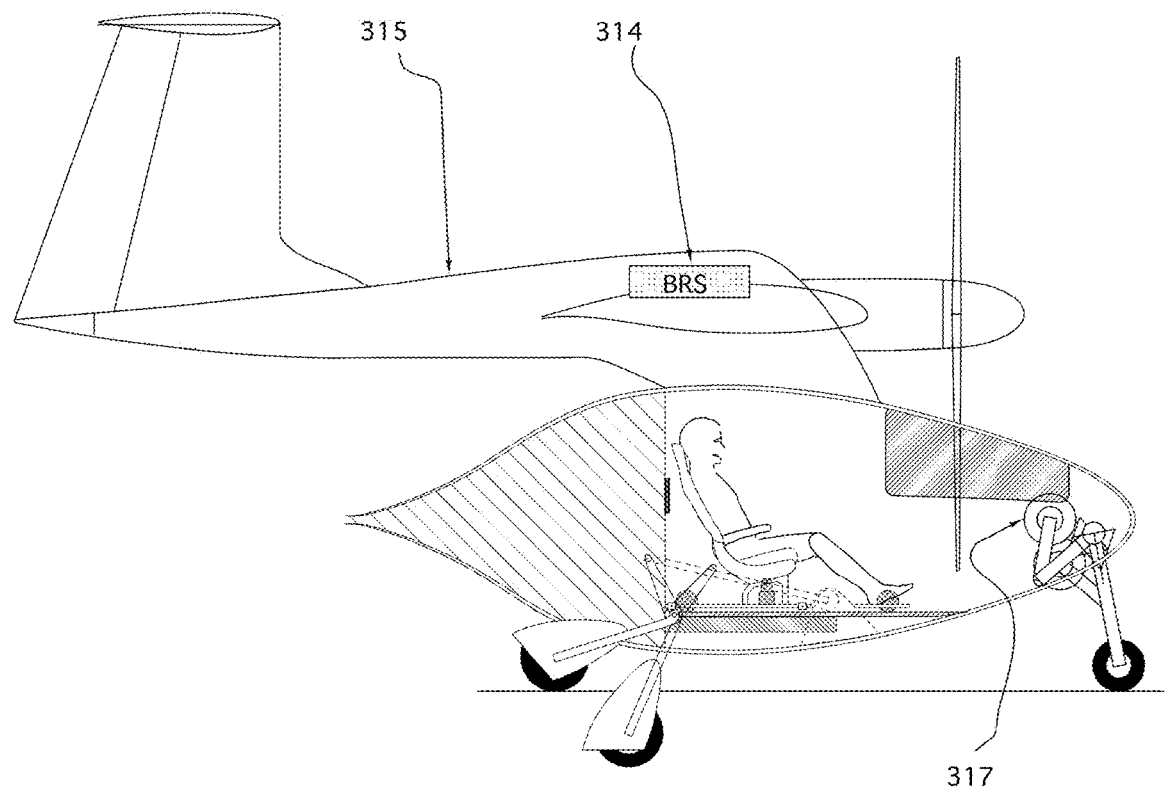
FIG. 9 is a side view of the exemplary SkyQart III

SkyQart III is shown in FIGS. 7, 8 and 9 in frontal, top and side views along with its wingtip overlap with a SkyQart II as when docked at a SkyNest. The internal parts of each AFP are not labeled in the frontal view shown in FIG. 7 because those parts are identical to those shown in FIGS. 4, 5 and 6, where the contents were identified. Where parts commonality exists between the SkyQart II and the SkyQarts T and II, the shared or common parts in the SkyQart III are not labeled in FIGS. 7, 8 and 9. Similarly, where there exist and are shown more than one identical parts of a given type, only one of those parts will be labeled with a reference number. The SkyQart III is easily recognizable as different from the SkyQarts I and II because it has three propellers rather than two. The reference number 300 in FIG. 7, points to a frontal view of the top surface of the main wing center section of the SkyQart III. This center section is comprised of the same airfoil section as the outboard wing panels and it has a constant chord. It is also equipped with full-span double slotted flaps that operate with the fast flaps system. Reference number 301 points to a frontal view of the upper surface of the horizontal tail of the SkyQart III, which is larger than that of the SkyQarts I and II. Reference number 302 points to a frontal view of the starboard vertical tail surface of the SkyQart III. It will be noted that this starboard vertical tail surface has a matching port side mirror image vertical tail surface and that these two surfaces together comprise the total vertical tail area of the SkyQart III. These two surfaces also are seen to secure and connect the horizontal tail to the aircraft. Reference number 303 points to a frontal view of the thrust axis of the seven bladed propeller on the starboard wing, which axis, as shown, is higher above ground level than the comparable propeller on the SkyQarts I and II, because it is mounted above rather than below the chordline of the outer wing. It will be noted that the propeller indicated by reference number 303 has a matching seven bladed propeller mounted symmetrically on the port side wing of the SkyQart III. Reference number 304 points to a frontal view of the starboard wingtip of the SkyQart III, showing that it is tilted upward from the horizontal at an angle of 9.58° in order to facility the overlapping of wingtips with other SkyQart II aircraft at the dock of the SkyNest. Reference number 305 points to a frontal view of the trailing edge of the rear flap segment of the fully extended double-slotted wing flap that is mounted to the rear portion of the main wing of the SkyQart III. Reference number 306 points to a frontal view of the lower edge of the fully opened rear hatch of the starboard AFP of the SkyQart III. It will be noted that this starboard rear hatch opens toward the starboard wingtip while the symmetrical matching rear hatch on the SkyQart III's port side AFP opens toward the left wingtip, as does that of the SkyQart II that is parked adjacent to the left wingtip of the SkyQart III in FIG. 7. Reference number 307 points to a frontal view of the thrust axis of the seven-bladed propeller at the midline of the center section of the main wing of the SkyQart II. This propeller has a diameter of 3.05 m and is identical to all other propellers in FIGS. 7, 8 and 9. Reference number 308 points to a frontal view of the clearance gap between the overlapping wingtips of the SkyQart III and SkyQart II, whose minimum dimension is nominally 18.3 cm. This dimension assumes that both aircraft are parked on level ground at their appropriate separation interval of 9.144 m between their adjacent nosewheels. Reference number 309 points to a top view of the forward edge of the nose-tire of the starboard AFP of the SkyQart III. It can be noted that there is an identical nose-tire symmetrically positioned on the port side AFP of the SkyQart III. Both of these nose tires can be retracted into their respective AFPs during flight. Reference number 310 points to a top view of the leading edge of the SkyQart III's starboard main wing. It can be noted that the SkyQart III has a port main wing that is a mirror image of this starboard main wing, and that the propellers on the nacelles of each of those main wings are symmetrically placed relative to the longitudinal centerline of the aircraft. Reference number 311 points to a top view of the trailing edge of the starboard aileron on the outboard portion of the starboard main wing of the SkyQart III. It can be noted that there is also a mirror-image port aileron symmetrically placed on the outboard portion of the port main wing. Reference number 312 points to a top view of the trailing edge of the starboard main wing's double slotted flap in its fully retracted position. It can be noted that there is also a mirror-image of this flap symmetrically placed on the SkyQart III's port main wing. Reference number 313 points to the starboard AFP's starboard main landing gear tire of 40.64 cm outside diameter. It can be seen that each AFP on the SkyQart III has two such main landing gear tires, a starboard and a port, making a total of four such main landing gear tires in addition to the two nose-tires. Reference number 314 points to one of the two rectangular enclosures for the ballistic recovery system parachute housings that are located along the midline of each AFP and above the main wing. These two ballistic recovery system units are programmed to deploy their rocket powered parachutes simultaneously in the event of an unrecoverable loss of control or in-flight structural failure. Reference number 315 points to a side view of one of the tapering tailcones of the SkyQart III. The tailcones are the beam-like structures that join the main wing to each of the SkyQart III's vertical tail surfaces. These tailcones are very similar but not identical in shape to those of the SkyQarts I and II and each of these tailcones has a circular cross-section in frontal view. Reference number 316 points to a top view of the trailing edge of the fully retracted double slotted flap on the main wing center section. These flaps work in synchrony with the flaps on the outer main wing panels as parts of the fast flap system. Reference number 317 points to a side view of the rearmost surface of one of the two fully retracted nose-tires to show how its nests within its AFP.

Overlapping Wingtips

Figure 10:
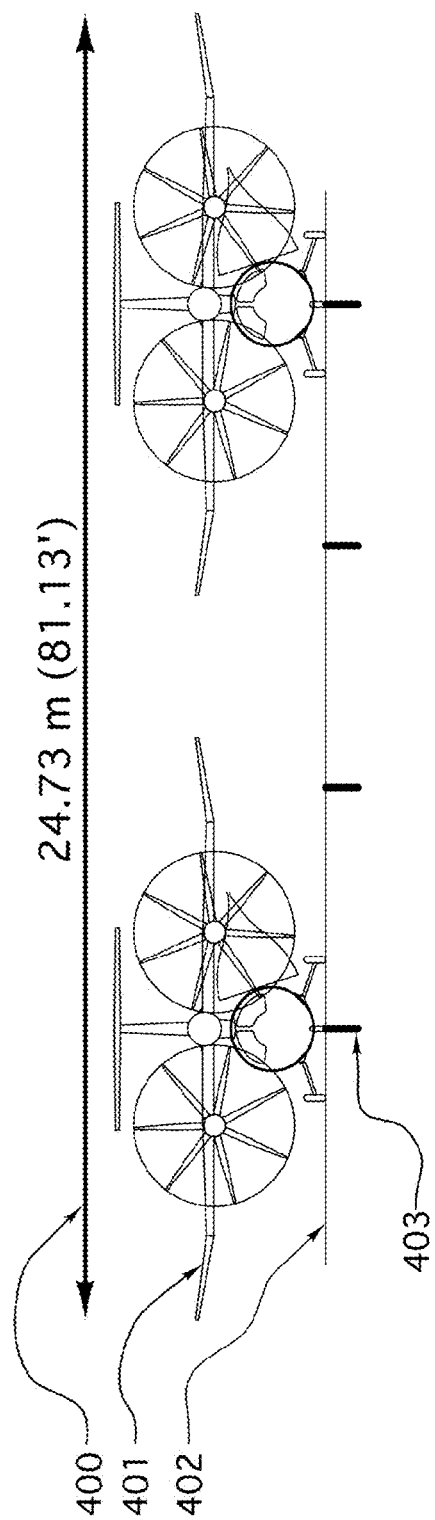
FIG. 10 shows a frontal view of two SkyQarts configured next to each other with no overlapping of their wingtips
Figure 11:
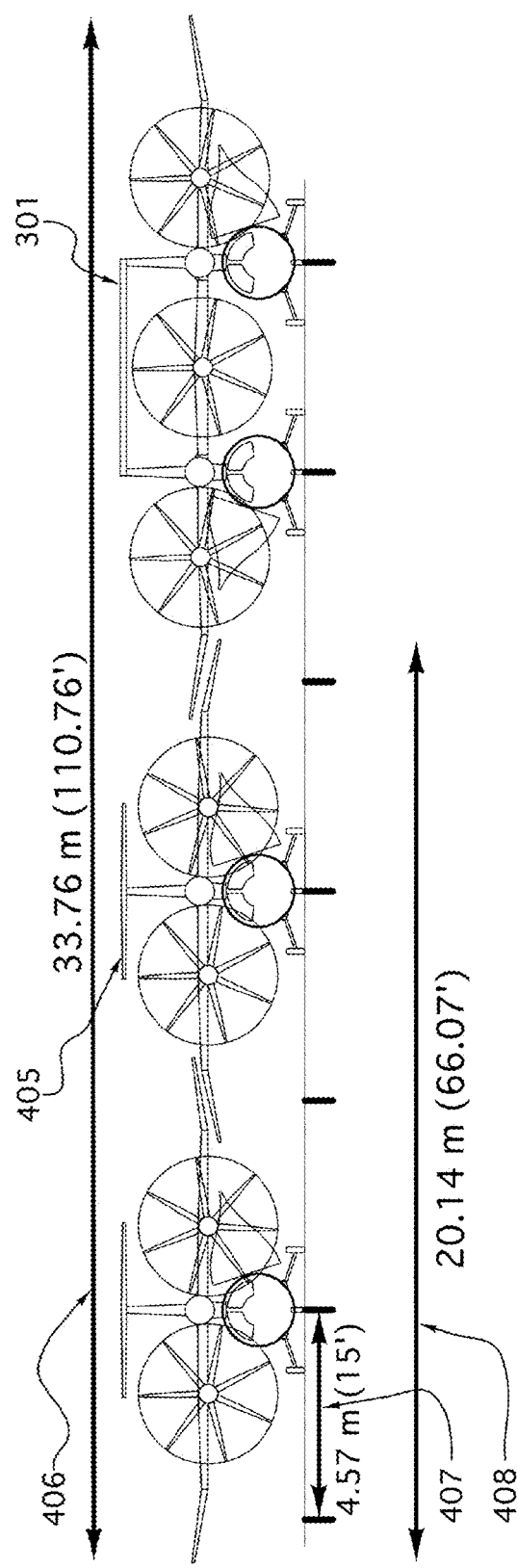
FIG. 11 shows a frontal view of three different SkyQarts configured next to each other with overlapping of their wingtips

FIGS. 10 and 11 depict two frontal views of the dimensions involved in two overlapping wingtip situations for various SkyQarts that are docked at a SkyNest. The main purpose of these figures is to show how overlapping wingtips enable a more efficient use of dock space at the SkyNest. The docking of SkyQarts at a SkyNest must necessarily be spaced at regular intervals that match the QUAD standard for the spacing of battery swap infrastructure at the dock. That QUAD standard is 4.57 m between battery swapping stations. Each battery swapping station at a QUAD dock has a pair of precision positioning system transponder receiver plates mounted on the face of the dock on either side of the center point of the battery swapping station. Each precision positioning system transponder plate receives four convergent He—Ne laser beams from the emitters on the aft face of the sidewalls of the SkyQart's rear hatch opening, and they process the information from the laser impingement pattern into a wireless transmission back to that SkyQart to guide the movement of the SkyQart's active main landing gear wheelmotors to steer the SkyQart into the exact horizontal and vertical alignment with the dock's battery swapping station. To help ensure precise docking, this precision positioning system uses a combination of multiple miniature electronic sensors in sequenced sensor fusion in addition to its convergent He—Ne laser guidance system. Co-located on the dock face with these precision positioning system transponder receiver plates are two capacitive proximity sensors, which help guide the SkyQart to park exactly at the appropriate station at the dock with a 3D precision of nominally 2.0 mm. (These plates and sensors are too small to depict in the drawings.) This guidance is assisted by the Active Main Landing Gear, which is able to control and set the ride height of the SkyQart during its dock maneuvering. When two SkyQart I's dock next to each other, their upturned wingtips prevent them from parking with overlapping wingtips and this causes them to have to park with their nose tires 13.7 m apart. Reference number 400 in FIG. 10 points to a line denoting the dock span distance of 27.73 m spanned by these two SkyQarts' wings when they are docked with this amount of separation. Reference number

401 points to a frontal view of the upturned right wingtip of the SkyQart I. Reference number 402 points to the ground level of the pavement at a SkyNest dock. Reference number 403 points to one of several interval alignment markers for the nose tire of a docking SkyQart so as to align the aircraft with the battery swapping stations at the dock. It will be noted in FIG. 10 that these interval markers are each equally spaced along the ground pavement level at intervals of 4.57 in, a dimension shown by a double arrow and labeled as reference number 407 in FIG. 11. Reference number 408 points to a double arrow that depicts the dimension of 20.14 m, which is the dock span that obtains when a SkyQart II and SkyQart I dock side-by-side with overlapping wingtips and with their nose-tires 9.14 m apart. In contrast, when two SkyQart I's or two SkyQart's II dock side-by-side in alignment with the dock's battery swapping pathways, they must do so without overlapping wingtips, resulting in their nose-tires being placed 13.7 m apart. This larger separation results in their combined spanwise dimension, shown in FIG. 10 as the double arrow whose dimension is labeled as reference number 400 and consuming a total dock span of 24.73 m, nearly 5 meters more dock span than consumed by the pairing of overlapping SkyQarts I and II. If each SkyQart is configured to carry three passengers, then the efficient, overlapping docking of two dissimilar SkyQarts can achieve a maximum passenger density of six passengers in 20 m of dock span, equating to 3.33 m of dock span for every passenger. If the less efficient docking of two identical SkyQarts is similarly examined, it results in six passengers in 24.73 m of dock span, equating to 4.12 m of dock span for every passenger. The overlapping wingtips thus provide a roughly 25% improvement in dock efficiency. Similarly, when an ideal mix of SkyQart I, II and III are docked side-by-side in alignment with the dock's battery swapping pathways, as shown in FIG. 11, the total combined spanwise dimension of that dock span is 33.76 m and is depicted by the double arrow that is labeled as reference number 406 in FIG. 11. If each AFP of these three SkyQarts carries three passengers, this example results in twelve passengers in 33.76 m of dock span, which equates to only 2.81 m of dock span per passenger. Reference number 301 points to a frontal view of the upper surface of the horizontal tail of the SkyQart III that is docked with overlapping of its right wingtip. Reference number 405 points to a frontal view of the horizontal tail of a SkyQart II that is docked with overlapping of its wingtips.

The Acceptable Noise Sphere (ANS)

Figure 12:
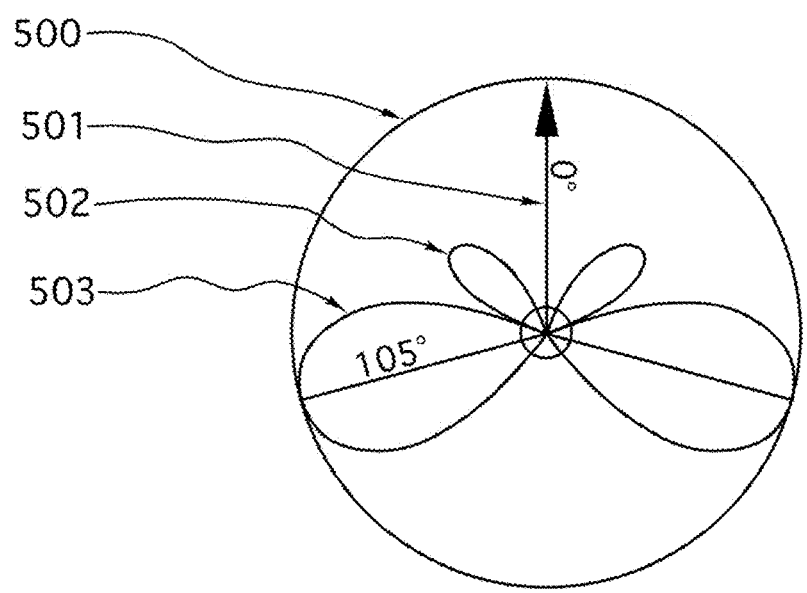
FIG. 12 depicts a top view of the acceptable noise sphere and its inner details
Figure 13:
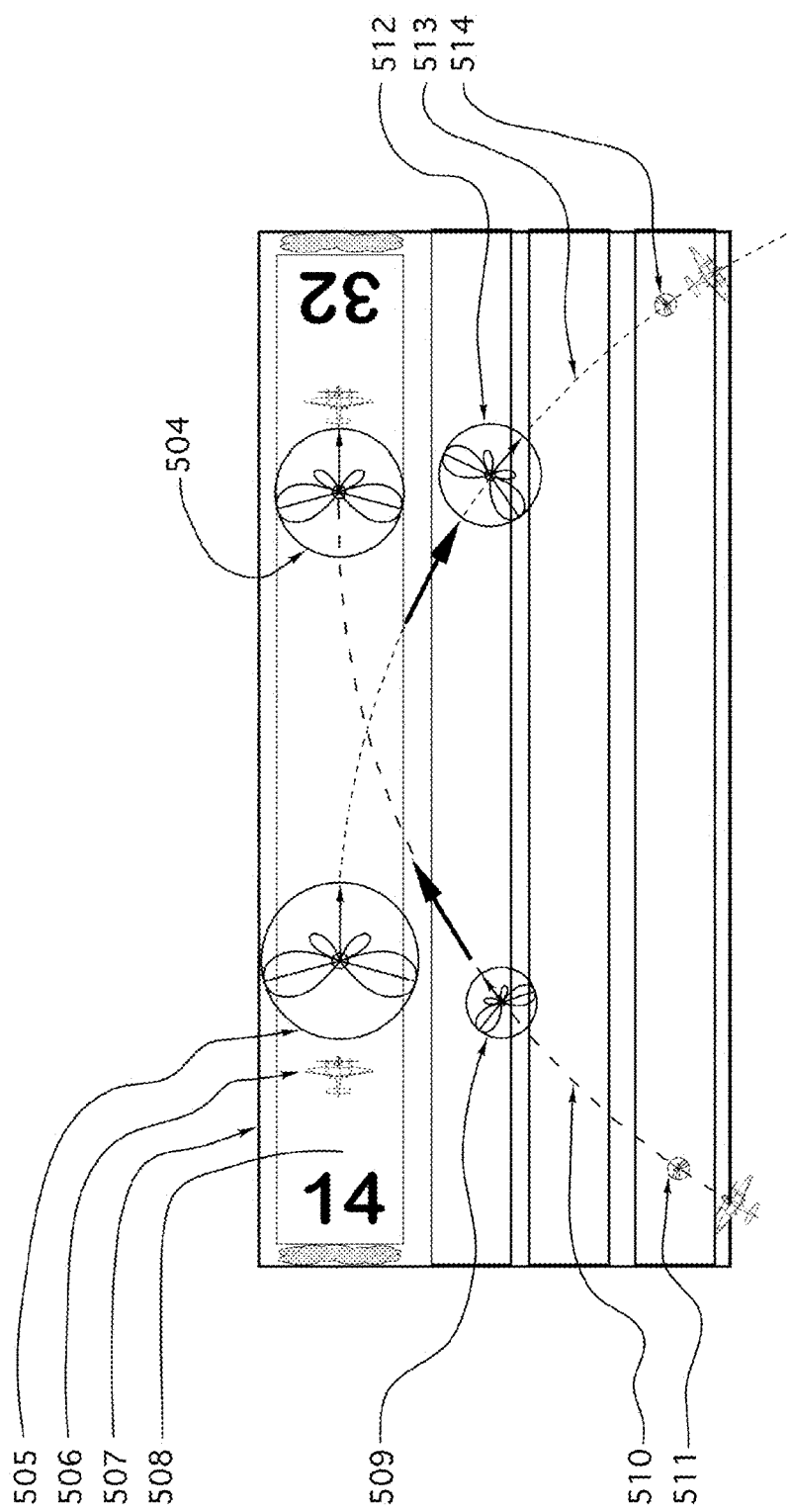
FIG. 13 shows a top view of the relative sizes of an acceptable noise sphere as projected onto the surface of a SkyNest according to a SkyQart's typical trajectory, power setting and height above said surface

FIGS. 12 and 13 show the acceptable noise sphere concept. The acceptable noise sphere is an innovative aircraft noise depiction tool for the design and sizing of SkyNests for the QUAD system. The size of the two-dimensional intersection of the acceptable noise sphere with the pavement surface of a SkyNest depends on the SkyQart's height above ground and its power settings. Several airport noise survey studies have compared aircraft noise levels in the neighborhood of airports, measured in decibels, with the percentage of people in those areas who were highly annoyed by those noise levels. The results of those studies indicate that, to be community acceptable and to comply with FAA standards, airports should be sized so that the noise level at an airport's outer boundaries is kept low enough that no more than 10% of airport neighbors are highly annoyed. To reliably accomplish this, the average noise at the SkyNest boundaries with noise-sensitive developed areas, measured using the Community Noise Equivalent Level (CNEL), which is also known as the "day, evening, night" metric signified as $L_{den}$, would have to remain below 54.7 dBA $L_{den}$, and preferably substantially less than that. This level scales with the standard for noise limitation required for machines operating in U.S. National Parks, where noise must be kept below 60 dBA at a 15.24 m sideline. That National Park noise requirement translates to a noise level of 51.6 dBA at a 40 m sideline. A body of evidence indicates that noise must be kept especially low when SkyQart aircraft operate with frequent take-offs and landings at short time intervals or at night, both of which will commonly occur at busy SkyNests in the QUAD system. Accordingly, a reasonable initial goal for the quietness of all SkyQarts will be a take-off noise level, measured during full-power take-off, that remains below 55 dBA $LA_{eq}$, 5 s at a 40 m sideline drawn from the midline of the aircraft's nose. The $LA_{eq}$, 5 s metric denotes the average noise level, measured on the A scale during a 5 second interval. This level of 55 dBA $LA_{eq}$ at a 40 m sideline appears to be one whose acceptable noise sphere can be kept from impinging on noise-sensitive developed areas by all 5 types of SkyNests embodied herein for the QUAD system. The community noise equivalent level, designated as CNEL, is another commonly used metric for noise, and is equivalent to the $L_{den}$. It consists of a weighted average sound level over a 24 hour period, with a penalty of 5 dB added between 7 pm and 10 pm, and a penalty of 10 dB added for the nighttime hours of 10 pm to 7 am. The noise emissions of the SkyQarts I, II and III included in this invention are expected to achieve the requisite low noise levels, possibly getting as low as 40 dBA CNEL at the 40 m sideline. The acceptable noise sphere is the tool that is both directional and scalable. The acceptable noise sphere heading line is an arrow that is oriented in the direction in which the aircraft is traveling. Although the acceptable noise sphere is shown as a two-dimensional circular object on maps, it is in reality a virtual three-dimensional sphere. The acceptable noise sphere can be shown in a SkyNest layout plan at various points along the trajectory of a SkyQart as simply the acceptable noise sphere scaled in size to be only the two-dimensional slice of it that intersects with the ground surface of the SkyNest. When so applied to a SkyNest layout plan, the acceptable noise sphere at a given location is shown as a circle whose area is that space outside which the noise level of the passing aircraft is at or below the acceptable limit. This actual area will change at different locations on the SkyNest depending upon the height of the SkyQart above ground level at said location as well depending upon the aircraft's speed, power setting, flap setting, thrust or drag level, etc. The goal in the QUAD system is to have the height above ground of the SkyQart aircraft flying over the SkyNest boundary always be higher than the radius of its acceptable noise sphere at that point. When the SkyQart aircraft's height above ground level is exactly equal to its acceptable noise sphere radius, then its acceptable noise sphere projection onto the ground would be just a tiny dot, and that one dot would be the location at which there was a localized noise level at the limit of acceptability, with lower noise levels at all other locations nearby. Reference number 500 points to the circle that depicts the outer rim of a representative acceptable noise sphere that includes the typical directionalities of the SkyQart's propeller noise. This circle depicts the radius from the SkyQart's AFP at which its noise emissions will not exceed acceptable levels and outside of which the SkyQart's noise will be quiet enough to ensure that less than 10% of people outside that radius will be highly annoyed. Reference number 501 points to the directionality axis of the acceptable noise sphere, an arrow line that, by convention herein, is aligned with the heading of the aircraft and that is assigned the angle of 0°. Reference number 502 points to the forward 'wing' of the butterfly-shaped noise contours that are calculated for the aircraft's propeller take-off noise using the Gutin propeller noise mathematical formula. The largest span or radius of this forward butterfly wing contour is typically shorter than that of the rear butterfly wing of the noise contour, which larger rear wing contour is shown as reference number 503. Inside reference number 503 is shown the straight line that denotes the rearward azimuth of maximum noise, which is labeled as being at 105°, a fairly typical angle for peak propeller noise radiation. Reference number 504 points to the relatively large acceptable noise sphere that would apply at the landing touch-down location of the SkyQart on the SkyNest shown in FIG. 13, where the aircraft typically executes a sudden increase in propeller and tire noise due to 1) its use of a rapid increase in propeller thrust to arrest its sink rate by blowing on the fully extended double slotted wing flaps and 2) the onset of a touchdown tire chirp, tire spool-up and the rolling noise of the main landing gear tires. Note that the acceptable noise sphere shown as reference number 504 has its axis of directionality oriented in the direction that the SkyQart is landing. Reference number 505 points to the outer circle of the SkyQart's acceptable noise sphere that is located at the point on the SkyNest pavement where the SkyQart executes its liftoff on take-off. This is the location where the fast rolling speed of the SkyQart's tires and its high level of propeller thrust produce the greatest amount of noise. Consequently, the two-dimensional circle that represents the acceptable noise sphere labeled as 505 is the largest diameter acceptable noise sphere on this SkyNest diagram. Note that even with its large diameter, the reference number 505 acceptable noise sphere circle shows that its acceptable noise level is contained within the confines of the SkyNest land parcel shown in FIG. 13. Reference number 506 points to a top view of the left wingtip of a SkyQart I or II, showing it to be heading in the same direction as the heading of the reference number 505 acceptable noise sphere on the take-off portion of the SkyNest pavement. There are three other identical SkyQart aircraft shown with their heading direction on the typical trajectory paths on this SkyNest diagram. Reference number 507 points to the outer long edge of the large rectangle that represents a top view of the area of the SkyNest land parcel, an area that encloses the pavement, two taxiways and a dock area. It will be seen that the pavement portion of this SkyNest is labeled with large opposing heading numbers 14 and 32. Reference number 508 points to a top view of the center of the take-off portion of the SkyNest pavement. Reference number 509 points to a top view of the medium-sized circle of the acceptable noise sphere (projected onto the surface of the SkyNest) that depicts the noise emissions of a SkyQart that is descending power-off on its curvilinear final landing approach, the curved traffic pattern of its descent path to the SkyNest, wherein said descent path is depicted by the curved dashed line labeled as reference number 510 in FIG. 13. It will be noted that the outer circle of reference number 509 represents the boundary outside which the SkyQart's noise emissions at ground level are nominally below 48 dBA at this point along its descent path. Reference number 511 points to the very small circular area that exists at the point along the curvilinear final landing approach descent path that represents the boundary (projected onto the surface of the SkyNest) outside which the SkyQart's noise emissions at ground level are below the acceptable noise limit at this point during its descent. Reference number 511 is a very small area because of two conditions at its location along the descent path; 1) the SkyQart's acceptable noise sphere is small due to its use of a very low power setting during descent, and 2) the SkyQart is flying its descent at a height well above 30 m above the ground so that the portion of the small acceptable noise sphere that intersects the surface of the SkyNest is very small. Reference number 512 points to the outer circle of the projection of the SkyQart's acceptable noise sphere onto the surface of the SkyNest at the location where the SkyQart is climbing out on a curvilinear path after take-off on the SkyNest pavement. Reference number 512 is of medium size because the SkyQart is climbing with maximum power at that point. Reference number 512 is smaller than reference number 505 (the maximum power take-off acceptable noise sphere projection) because at the location of reference number 512 the SkyQart has climbed to reach a height of several meters above ground level. This height reduces the area of the acceptable noise sphere's intersection with the ground surface. Reference number 513 points to a top view of the curvilinear flight path of the SkyQart's climb out from the SkyNest, shown as a dashed line. Reference number 514 points to the very small circular area that exists at the point along the SkyQart's curvilinear climb out path that represents the boundary (projected onto the surface of the Sky-Nest) outside which the SkyQart's noise emissions at ground level are quieter than the acceptable noise level. The small size of reference number 514 reflects the fact that it is located at a point along the climb out path where the SkyQart has climbed to a height that is more than 30 m above the surface of the SkyNest, where the portion of the acceptable noise sphere that intersects the ground is a small circle. The size and position of the four acceptable noise spheres of differing sizes that are projected on the SkyNest diagram in FIG. 13 depict one example in which the noise of the departing and arriving SkyQart can be seen to be kept at or below acceptable levels at all points within the boundaries of the SkyNest. This example illustrates the usefulness of the acceptable noise sphere as a tool in planning the size of the SkyNest so that it will be community acceptable.

The SkyNest I

Figure 14:
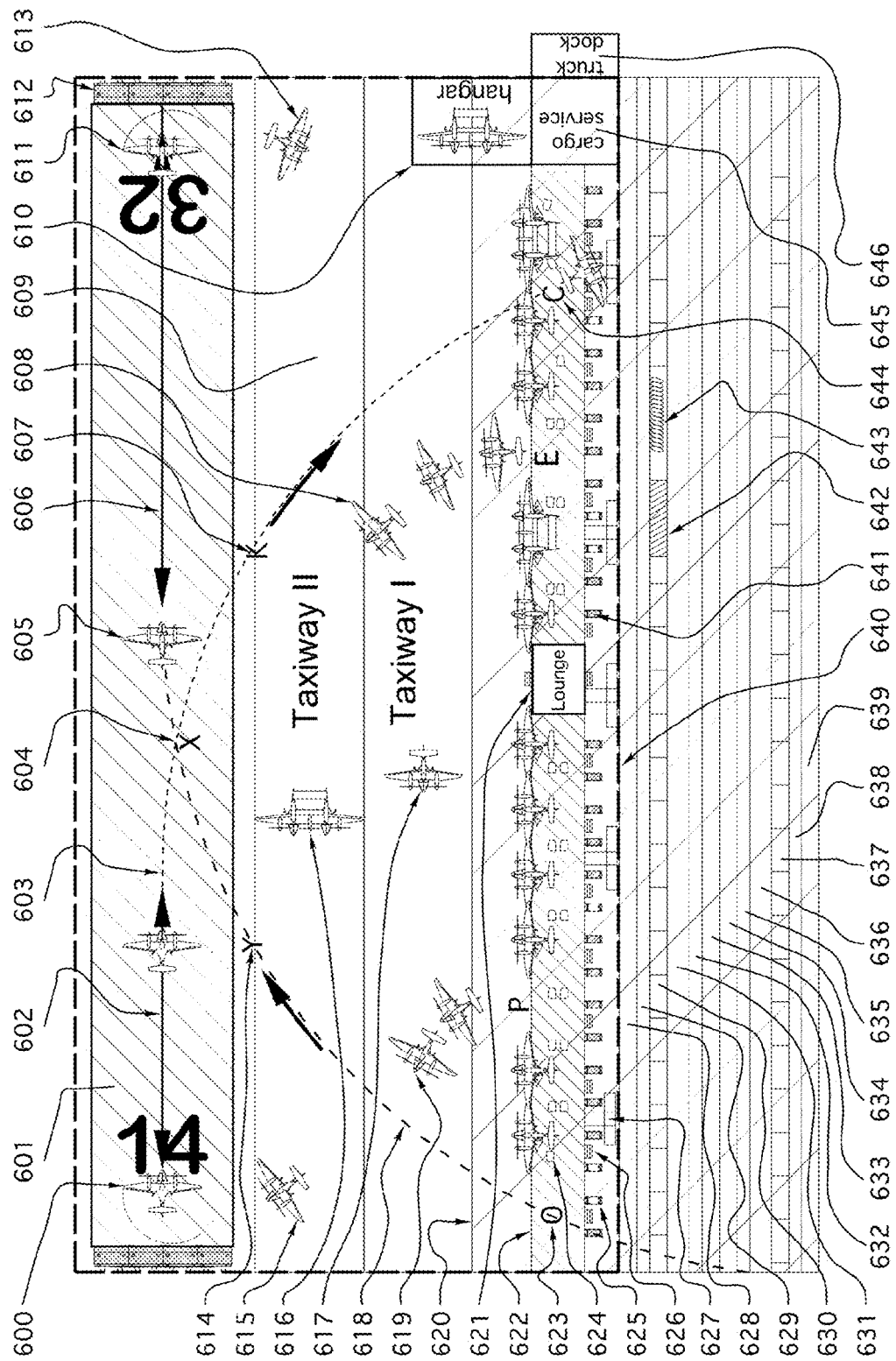
FIG. 14 shows a top view of a SkyNest I and its components

FIG. 14 which depicts a standard 1.28 ha nominal SkyNest I with its pavement and dock facilities, SkyQarts. EPCs, RDCs, crash cushions and the concepts of their operations. Nominal embodiments of these components have each been described above in detail and, together with their sub-components, comprise the main innovations of this invention. Their interoperating and interdependent processes are best depicted by combining all of them into one detailed drawing. Accordingly, the embodiment of the QUAD process in FIG. 14 depicts in fine detail an ideal sequence and cadence of operations of those components. While these operations are generic and can be applied at many differently sized SkyNests, they nevertheless represent in FIG. 14 an extreme case of expeditiousness made possible by sentient autonomous vehicles that operate with very small separations. This extreme cadence provides one SkyQart departure and one landing every 10 seconds. The process described is that of a fully implemented, autonomous QUAD system operating at maximum capacity. The process described here is called cadenced coordinated operations at SkyNests and it sets the standard for operations that can provide a very rapid turnaround time for a landing SkyQart. Cadenced coordinated operations at SkyNests are a component integral to this patent. Cadenced coordinated operations at SkyNests maximizes capacity and efficiency in order to determine the realistic limits for capacity, size, speeds and distances that, in turn, can be used to develop the necessary standards for the smallest practical SkyNest that can work in a fully autonomous, optimized QUAD system. Keeping SkyNests as small as possible is what enables them to be affordably built and to be sited close to where people live and work, an important feature if they are to reach a mass-market and provide meaningful benefits to the public transportation system. The 1.28 ha size of the SkyNest I in FIG. 14 is presumed to be the smallest size that can be located fully inside a quiet residential area and still confine the aircraft noise to within its boundaries. Smaller SkyNests can be used in other, less noise sensitive settings. For example, if at least three of its sides have borders on open space or open water, a SkyNest can be as small as 0.61 ha and still provide the required noise containment. QUAD SkyNests located within urban and industrial areas where high levels of ambient noise exist, and those with fewer flight operations that are located within large, privately-owned campuses, ranches or family compounds, can also be smaller than the standard SkyNest I depicted in FIG. 14, but each must still provide containment of the acceptable noise sphere at the public margins of those properties. SkyNests larger than 1.28 ha can have similar operational cadences to those shown in FIG. 14, but, for system-wide uniformity, the size, speeds and landing distances of the SkyQarts operating there must still be compatible for use at all other SkyNests across the QUAD system, including the smallest SkyNests. It will be possible to 'carve out' various sizes of SkyNests within existing larger conventional take-off and landing airports in order to create early implementations of the QUAD system. According to the requirements for cadenced coordinated operations at SkyNests and the performance envelope of the SkyQarts, this invention of the QUAD transportation system is limited to SkyNests of sizes of less than 5.0 ha. In the example of operational processes shown in FIG. 14, the aircraft that are airborne within the SkyNest boundaries are operating at a nominal 24 m/sec and those that are taxiing on the SkyNest surface are moving at a nominal 7.6 m/sec. These are optimum speeds that relate the distances that can be expeditiously covered in each 10-second operational step in the sequence of autonomous landing, taxiing to the loading dock, taxiing to the departure pavement and taking off again, to the actual size of the SkyNest land parcel. The ideal fast cadences for autonomous loading and unloading of payloads on the SkyNest's dock are likewise modeled for very rapid turnaround times that rely on robotic equipment and pre-loaded EPCs. In FIG. 14, reference number 600 points to the left wingtip of a SkyQart I or II that is positioned at the brake release point on the active pavement (runway 14) of the SkyNest. Reference number 601 points to the crosshatched area that represents the SkyNest take-off pavement. Reference number 602 points to a double arrow whose location and length represent the portion of the pavement used in a nominal take-off roll of a SkyQart in dry, no wind conditions. Reference number 603 points to a curved dotted line that represents the ground track of the curved traffic pattern climb-out path of the SkyQart during a normal departure. Reference number 604 points to the intersection of the landing approach path with the take-off departure path of the SkyQart projected onto the surface of the SkyNest at point labeled "X", a point at which both the exact timing and 3D positions of the passing aircraft must be consistently and continuously coordinated in 4D to avoid conflict. That coordination is jointly performed by the networked situational awareness system and the autonomous control systems on-board each SkyQart. The networked situational awareness and autonomous control system are important components of this patent. Reference number 605 points to the left wingtip of a SkyQart that is located at the landing touch-down point on the SkyNest pavement. Reference number 606 points to a double arrow that depicts the nominal length that is the distance of the short landing roll of the SkyQart at the SkyNest. This double arrow (606) terminates at the point, labeled as reference number 611, at which the SkyQart has sufficiently slowed its rolling speed to enable it to make a right turn to exit the landing pavement. Reference number 607 points to a location labeled as "K" along the curved climb-out path of the SkyQart, at which it would reach a height of 19.2 m above ground level. This height at this location above the SkyNest ensures that the departing SkyQarts are well above the height of any SkyQarts that would be concurrently taxiing on the surface of the subjacent Taxiway II. Reference number 608 points to the starboard wingtip of a SkyQart I or II that has departed from position "E" at the dock and is heading toward Taxiway II in order to proceed to the departure end of the runway 14. Reference number 609 points to the surface of Taxiway II. Reference number 610 points to the corner of an outline of the aircraft maintenance hangar that is large enough to contain a SkyQart III. Reference number 611 points to the port wingtip of a SkyQart I or II that is in position to turn off of the pavement after landing. Reference number 612 points to the QUAD crash cushion at the end of the pavement. An identical crash cushion is located at the opposite end of the pavement. In other embodiments of the SkyNest, the crash cushion is a movable device that can be positioned at the end of any active runway pavement. Reference number 613 points to a SkyQart that has just turned off of the runway pavement after landing and is in the process of taxiing to park at the dock. This SkyQart is traveling at 7.6 m/sec and thereby can travel 76 m in 10 seconds. Reference number 614 points to a position labeled as "Y" along the surface projection of the SkyQart's landing approach. Position "Y" is the point at which the landing SkyQart, after steeply descending over both Taxiway I and Taxiway II, has descended to a height of just 8.2 m above the surface of the SkyNest. This height of 8.2 m is enough to ensure that the descending SkyQart will readily clear the SkyQarts that are taxiing on the surface of Taxiway II. Reference number 615 points to the port wingtip of a SkyQart that has completed its taxiing for take-off and is in a hold position awaiting entry onto the active runway 14. Reference number 616 points to a SkyQart III that is taxiing on Taxiway II toward the hold position that is labeled as reference number 615. It will be noted that the longer wingspan of the nominal interoperable SkyQart III spans the entire 15.24 m width of Taxiway II, emphasizing the practical importance of limiting the wingspan of SkyQarts in order to limit the size of the land parcel required for a SkyNest. Reference number 617 points to a SkyQart that is taxiing on Taxiway I from the position labeled as reference number 613 toward the position labeled as reference number 619 where it will stop its forward taxiing and stop to become able to reverse the rotation of its main landing gear wheelmotors so as to back-in to a vacant position labeled as "P" at the dock. Reference number 618 points to the curved, dashed line that is the curved traffic pattern projection onto the surface of the SkyNest of the curved landing approach path flown by a SkyQart. Reference number 620 points to a line that is both the proximal edge of Taxiway I, and the distal edge of the large, coarsely crosshatched area that represents the nominal 167.6 m×48.8 m solar panel array that covers the dock and adjacent street area. Reference number 621 points to the centrally located passenger lounge on the dock area, wherein are found restrooms, telephones, a SkyNest service counter and/or a SkyNest kiosk for making and paying for travel reservations, seating areas, vending machines, etc. Reference number 622 points to the edge of a finely crosshatched area that represents the dock that borders the aircraft operations area. The dock has its aircraft docking stations for SkyQarts spaced at 4.57 m intervals and it will be noted that the SkyQarts I and II are shown to be docked with overlapping wingtips. Reference number 623 points to the location marked as "0" which is the position at which the SkyQart on its approach to landing has descended to a 30 m height above the surface of the SkyNest. This 30 m height is safely above the solar panel array and dock. Reference number 624 points to the trapezoidal outline of one of many autonomous robotic electric payload carts (EPCs) on the dock surface. The several EPCs shown on the dock are to illustrate the large amount of bi-directional cart traffic on the dock, with each EPC at some phase of loading or unloading passengers or payload, rolling into or out of a docked SkyQart, or rolling onto or off of an autonomous robotic delivery cart (RDC) at the street side of the dock. Reference number 625 points to an RDC at the dock. It is laden with an EPC on its surface. It can be noted that several other RDCs are also at the dock, some with and some without EPCs on their surface. Reference number 626 points to one of the sets of stairs that enables passengers to climb up from street level onto the dock, whose surface is 47 cm above street level. Several sets of such stairs are shown in FIG. 14. Each set of such stairs is 1.83 m wide with a 15.66 cm rise and a 35.56 cm tread. Reference number 627 points to one of several ADA compliant ramps to enable wheelchair passengers to move from street level up onto the dock. Reference number 628 points to the 2.44 m wide public sidewalk that borders the SkyNest. Reference number 629 points to the 1.83 m wide bicycle lane that borders the sidewalk. Reference number 630 points to the 2.44 m wide parallel parking spaces that border and protect the bicycle lane. Reference number 631 points to the 3.05 m wide single car lane that borders the parallel parking spaces. Reference number 632 points to the 1.83 m wide center divide that separates the car lane from the electric mini-transit bus lane. Reference numbers 633 and 634 point to the two central electric mini-transit bus lanes, each of which is 2.44 m wide. Reference number 635 points to the 1.83 m wide center divide that separates the opposite car lane from the electric mini-transit bus lane. Reference number 636 points to the 3.05 m wide opposite direction single car lane. Reference number 637 points to the 2.44 m wide parallel parking lane that borders the opposite direction single car lane. Reference number 638 points to the 1.83 m wide opposite bicycle lane. Reference number 639 points to the 2.44 m wide opposite sidewalk. The area in FIG. 14 that is occupied by reference numbers 628 to 639 inclusive is indicated with a coarse diagonal crosshatch because these items comprise one embodiment of the type of street and sidewalk areas that would be the public amenities adjacent to a typical SkyNest I. These amenities are not a part of the SkyNest I land parcel but are a generic format of street and sidewalk that would likely be provided by local municipalities in order to provide good surface access to any type of SkyNest. Reference number 640 points to the dashed line that outlines the rectangular outer boundary of the SkyNest I parcel as being a nominal 167.6 m×76.2 m. Reference number 641 points to an RDC on that has no EPC on it. Reference number 642 points to a transit bus parked at the SkyNest I. Reference number 643 points to a bicycle rack in the parallel parking lane at the SkyNest I. Reference number 644 points to the location labeled as "C" at which the departing SkyQart, is climbing out from the SkyNest I and has reached a height of 40 m above ground level. At this height and location, its noise emissions are nearly imperceptible on the ground. Reference number 645 points to the cargo service building in which cargo and parcels are loaded and unloaded from EPCs and cargo containers. The cargo service building is appropriately located adjacent to what is labeled as reference number 646, the truck dock at which shipping and receiving of larger cargo takes place. A large solar energy array (reference number 620) may be installed above the dock area at SkyNests of several types as well as above adjacent streets, land parcels and buildings in order to provide renewable energy for the battery charging processes that take place at the SkyNest.

Other amenities not shown in FIG. 14 but important at any SkyNest are deer-fencing, taxiway and pavement lighting, laser-guided and guideline docking alignment, weather detection and navigational aids, including but not limited to one or more of the following: differential GPS, Visual Approach Slope indicator, Runway End Identification Lights, ceilometer. Doppler wind lidar, transmissometer, Forward Looking Infra-red Radar, Diode Laser Centerline Localizer and Diode Laser Glideslope Indicator. Ancillary businesses co-located at SkyNests but not shown in FIG. 14, though not required, are anticipated to include businesses like coffee shops, shipping services, convenience stores, restaurants, etc.

A more detailed explanation of the cadenced coordinated operations at SkyNests process above is as follows: A SkyQart aircraft is shown at the lower left portion of FIG. 14, as it enters the SkyNest boundary during its landing approach. For noise abatement purposes, it descends steeply with a shallow, roughly 30° bank angle, (and with its propellers producing drag by wind-milling in electricity regeneration mode) from a height of nominally 30 m above ground level at the position labeled with an "O" as reference number 623 in FIG. 14, at which position its noise emissions are so low as to be nearly imperceptible on the ground. It proceeds to descend from there along the curved path shown as the dashed line labeled as reference number 618, toward the landing portion of the SkyNest pavement. That curved path is deliberate because it provides the SkyQart with a longer distance over which to complete its descent over the SkyNest property. These precise, 4D, steep and banked curvilinear landing approaches and climb outs are herein named curved traffic patterns. Descending at an airspeed of 24 m/sec. the SkyQart travels on this 106.4 m curved traffic pattern as its landing approach path. It travels this 106.4 m in only 5.6 seconds, reaching the point of landing touchdown at a point just beyond the mid-point of the SkyNest pavement. The aircraft then consumes another 4.4 seconds by rapidly decelerating on the pavement surface to the 7.6 m/sec taxiing speed at which speed it turns off the runway pavement to reach the position labeled as reference number 613, just 10 seconds after entering the SkyNest property at position "O". From the position at reference number 613, the aircraft continues taxiing at the speed of 7.6 m/sec to reach the position shown as reference number 617 along the arrival taxiway, i.e. Taxiway I, which is shown in FIG. 14 as being adjacent to and parallel with the dock. From position 617, the aircraft continues taxiing for another 10 seconds at 7.6 m/sec to reach the position shown as reference number 619. At position 619, the SkyQart stops taxiing and proceeds to use its wheelmotors to precisely back into the aircraft docking station P at the dock, which it accomplishes in 10 seconds using its multi-sensor guided precision positioning system. The backing in and parking process rely on electronic vehicle guidance using the SkyQart's wheelmotors along with the active main landing gear ride height adjustment to consistently achieve a precise docking alignment. The precision positioning system can enable the SkyQart of QUAD to be rapidly parked in exactly the properly aligned position at the dock of the SkyNest to enable it to rapidly load and unload both SBPs and EPCs. This is accomplished using a precision positioning system comprised of one or more of the following guidance technologies: differential GPS, inertial navigation system (INS), line-following software, obstacle-avoiding video camera(s) vision system, auto-focus technologies of either active infrared or a vertical and horizontal auto-focusing CCD camera chip, a 4-beam convergent bio-medical He—Ne laser targeting a transponding receiver plate on the dock, and a capacitive proximity sensor for the final alignment to the dock surface. This combined parking alignment technology is important and consistently aligns the parked SkyQart to within 2.0 mm of the center of the aircraft docking station so as to enable rapid loading and unloading of EPCs, as well as automated connection of the SkyQart to the dock's DC fast-charging port. Two slightly tapered pins in the dock are engaged into the two pin alignment holes in the aft face of the SkyQart's floorboard. The engagement of these pins maintains the necessary alignment of the SkyQart to the dock. Automated height adjustment of the active main landing gear of the SkyQart can also help maintain correct alignment of these pins during docking. Just prior to backing in to its allotted aircraft docking station, the SkyQart automatically opens its rear hatch door to prepare for charging and unloading of its EPC at the dock. Unloading will be followed immediately by boarding/reloading of another EPC. Deboarding and boarding are each accomplished in just 10 seconds, using standard 144.8 cm L×103.2 cm W EPCs, an example of which is shown in FIG. 14 as reference number 624. Several other identical EPCs are shown on the dock. Concurrent with these 20 seconds that the SkyQart spends at the dock, a robot at the aircraft docking station can remove the SkyQart's spent standard swappable battery pack (SBP) and insert a freshly charged SBP into rollers that guide it precisely onto the drawer slides and into the belly of the SkyQart, where its correct position, latching and electrical integrity are automatically confirmed. Battery pack replacement need not occur at every docking, depending upon the particular range of trips being flown by that SkyQart and the total range available per battery pack. As future battery energy densities and charging rates improve and the average distance of QUAD flights diminishes, the frequency with which these robotic battery pack swaps occur at the dock will diminish and the alternative automated charging from the dock's DC fast-charging port can occur while the SkyQart is docked. Just 20 seconds after the arriving SkyQart has completed its docking and has de-boarded and boarded anew, it departs from the dock, as shown by the SkyQart labeled as reference number 608 in FIG. 14. This exiting SkyQart proceeds in 10 seconds onto the taxiway that is adjacent to the runway pavement (Taxiway II), to reach the position shown as reference number 616 in FIG. 14, as it taxis toward the departure end of the pavement labeled as runway 14. From position 616, the SkyQart continues taxiing for 10 seconds on toward the end of the taxiway to reach the position shown as reference number 615. From position 615, the SkyQart taxis in less than 10 seconds into the position shown as reference number 600, which is the brake release take-off position of runway 14. Upon brake release at position 600, the SkyQart rapidly accelerates in 4.66 seconds to roll 43.9 m on wet pavement in no wind conditions to reach the position shown as reference number 603, while undergoing no more than 0.69 G's of acceleration with a jerk rate kept below 3.4 m/sec$^3$ at all points during the take-off roll. From its lift-off at the position shown as reference number 603, the SkyQart climbs steeply over a nominal ground surface distance of 104.5 m in 4.66 seconds at an indicated airspeed of nominally 24 m/sec to reach, in just under 10 seconds, the position shown as reference number 644 at location "C", while achieving a height of 40 m at that location. At this location, the noise of the departing ESTOL SkyQart is nearly imperceptible on the ground. The timing of the take-off is maximally staggered with that of the landing aircraft so that a safe 4D separation is always maintained at the crossing point (labeled as "X" in FIG. 14) where the two curved flight paths cross above the pavement and at any other crossing points on the SkyNest. The steep descent and climb gradients ensure that the flight paths over the taxiways remain well above the height of any taxiing SkyQart. The nominal 10-second cadence of operations presented here is not to exclude from this invention alternative cadences of as short as 7 seconds or as long 5 minutes, which will depend upon the maturation, location and regulations that are applied to the QUAD system.

The SkyNest II

Figure 15:
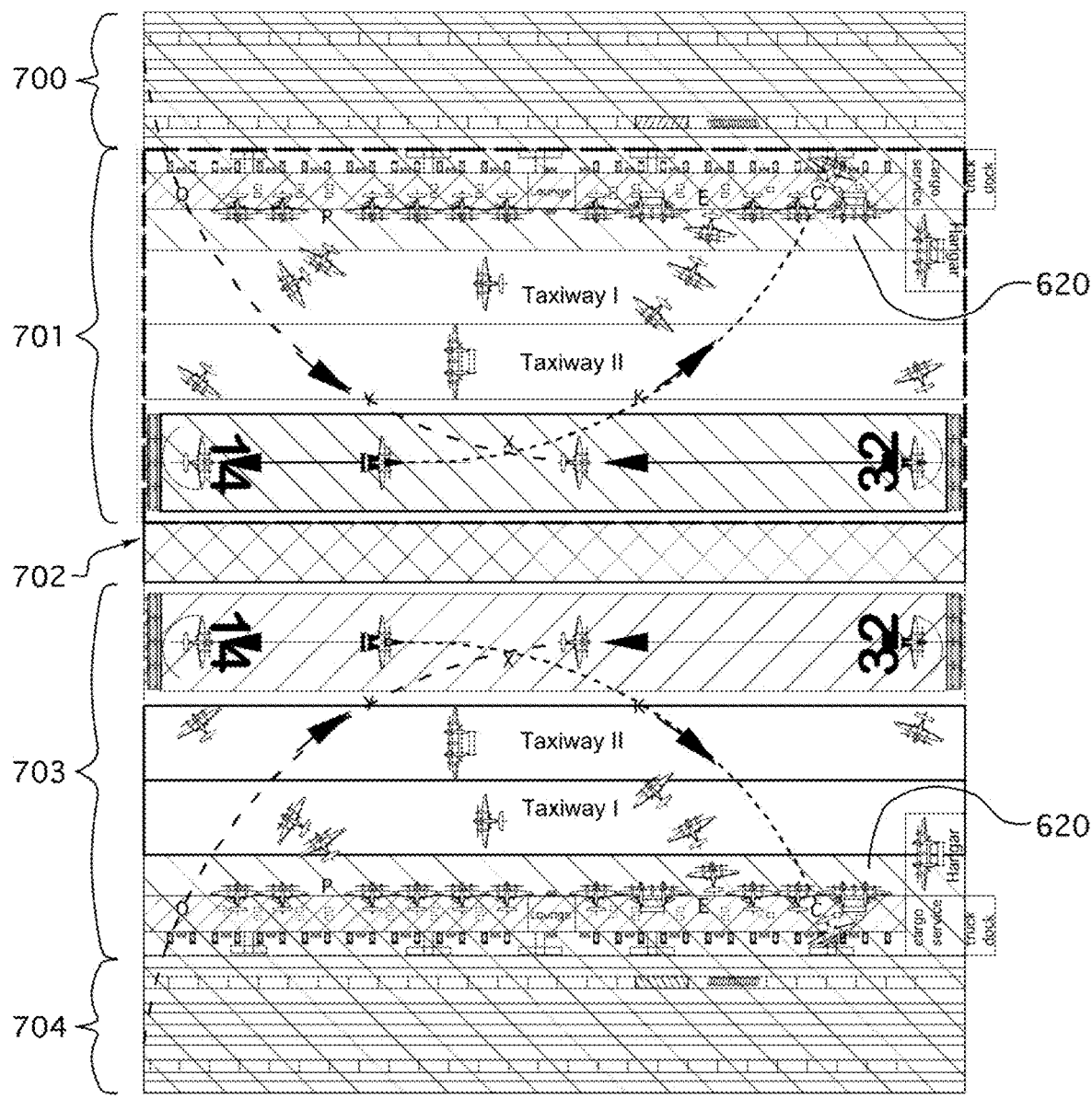
FIG. 15 shows a top view of the SkyNest II, or dual SkyNest, which is a high capacity pairing of two SkyNest 1's side-by-side

FIG. 15 depicts a nominal embodiment of a dual SkyNest II at which the capacity of the standard SkyNest I is doubled by having two of the standard SkyNest I's and their adjacent street amenities placed as mirror images, top and bottom in the drawing. All of the operational details and subcomponents at the SkyNest II remain the same as those described with FIG. 14 for the SkyNest I except that the upper SkyNest is a mirror image of the lower SkyNest. The SkyNest II is shown in FIG. 15 with two large but separate solar panel arrays, each one covering both a dock area and the adjacent street with dimensions of 167.6 m×48.8 m, making 8175.5 sq m for each array. These are both shown in FIG. 15 as large crosshatched areas labeled as reference number 620. Reference numbers 700 and 704 point to the combined public street and sidewalk areas that border each side of a SkyNest II as mirror images. Reference number 701 points to a vertically mirrored image of the SkyNest I of FIG. 14, in which all of the same operational stages are shown and which is placed above and adjacent to the standard SkyNest I, which itself is labeled as reference number 703. Reference number 702 points to the rectangular double crosshatched area that is the required minimum buffer zone separator that is 12.2 m wide by 167.6 m long and that is placed between the two SkyNest I facilities to create the full SkyNest II in order to ensure adequate separation of the aircraft that operate concurrently on its parallel runways. As shown in FIG. 15, the SkyNest II occupies 2.76 ha of level land. Alternative embodiments of the SkyNest II are possible, including those of different size and operational cadences, provided that they offer facilities that are compatible with the extant QUAD system vehicles.

The SkyNest III (Tiny)

Figure 16:
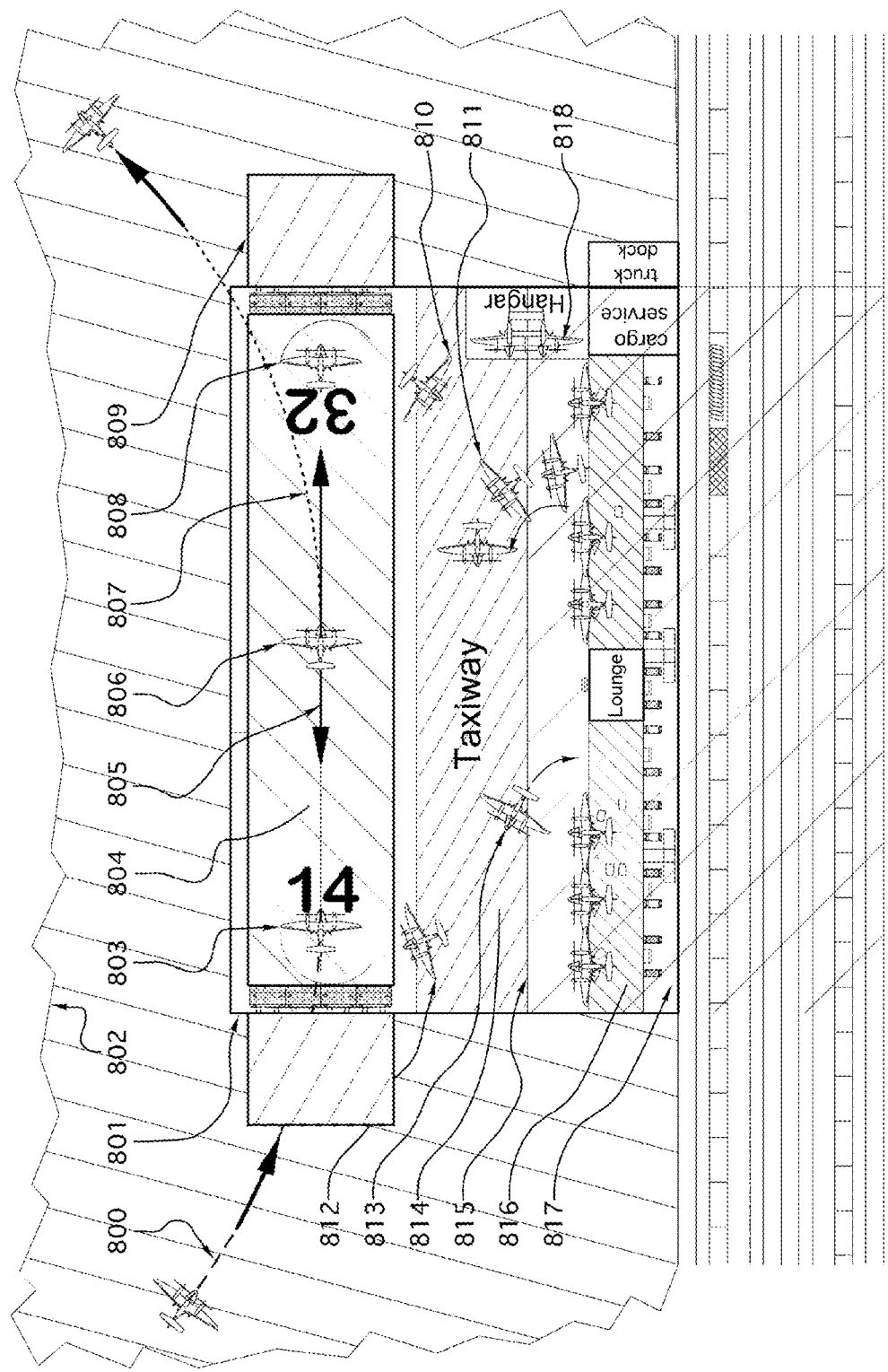
FIG. 16 shows a top view of the SkyNest III

FIG. 16 depicts a nominal SkyNest III, in accordance with one embodiment of the present invention. This SkyNest is nominally only 99.1 m×61.0 m which is an area of 0.61 ha This SkyNest III can be smaller than the standard SkyNest depicted in FIG. 14 because it is sited with its borders adjacent to open space. Such open space may be either a shore line, a wild land, a community greenbelt, a highly elevated area around a building rooftop or other unpopulated area that is not noise-sensitive. A greenbelt area may be an area of crops, grass, forest or golf course. A shore line may be along the surface of a lake, indolent river, bay or ocean. This open space provides an area over which there is a much greater tolerance for aircraft noise. It will be seen in FIG. 16 that the curved flight paths of both the arriving and departing SkyQarts at the SkyNest III are positioned over the open space for noise abatement purposes. The aircraft operations at the SkyNest III are somewhat different from those at the SkyNest I and, accordingly, are denoted by different reference numbers according to their location on the SkyNest III. For simplicity, these operations in FIG. 16 are depicted for SkyQarts I and II but not with SkyQarts III. A SkyQart III is however shown parked inside the maintenance hangar at the SkyNest III, and it is labeled as reference number 818. The details of the sidewalks, bicycle lanes and street adjacent to the SkyNest III are identical to those detailed in FIG. 14. The labeled reference numbers in FIG. 16. In numerical order, are as follows: Reference number 800 points to a dashed line that represents the landing approach path of a SkyQart to the SkyNest III. Reference number 801 points to the outline of the SkyNest III land parcel, which is 99.1 m×61.0 m. These dimensions are the standard for a SkyNest III and are the minimum size for the SkyQart's take-off and landing speed of 24 m/sec. These dimensions are chosen to also be large enough to ensure that the acceptable noise sphere of SkyQarts that are taking off consistently remains within that SkyNest III's boundary with the community. Reference number 802 points to the jagged outline of the open undeveloped green-space or body of water that surrounds three sides of the SkyNest III. Reference number 803 points to the left or port wingtip of a SkyQart I or II that is in the take-off brake release position on the pavement. In order to efficiently share the use of the pavement, the touch-down of the landing SkyQart is sequenced to occur 10 seconds after the take-off brake release of a departing SkyQart. Reference number 804 points to the crosshatched pavement surface of the SkyNest III. Reference number 805 points to a double arrow that represents the portion of the pavement that is typically used for ground roll after touch-down during a no-wind SkyQart landing at the SkyNest III. The touchdown location, as represented by the left hand tip of that (805) double arrow in FIG. 16, is shown as being beyond the airpark fence at the left-hand side of Reference number 801, and is a location that affords adequate vertical clearance for the landing approach at the 2.44 m tall airpark deer fence. Reference number 806 points to the left wing of a departing SkyQart at the position on the pavement at which it would typically lift off and begin its climb out if a no wind condition were in effect and if the maximum take-off acceleration of 0.8 G were achieved with GRACE. Reference number 807 points to the dotted line that represents the curved path of the departing SkyQart's climb out after lifting off at the SkyNest III. Reference number 808 points to the left or port wingtip of a landing SkyQart that is at the position at the end of the runway pavement where it would turn off to begin taxiing to the dock. Reference number 809 points to one of the two optional runway clear zones at each the end of the SkyNest III runway. Reference number 810 points to the left or port wingtip of a SkyQart that has turned off of the runway and is beginning to taxi on the taxiway toward an open aircraft docking station on the dock. Reference number 811 points to the right or starboard wingtip of a SkyQart that is departing from the dock area to taxi onto the taxiway toward the take-off end of the pavement. Reference number 812 points to the left or port wingtip of a SkyQart that has taxied into a hold-short position for the departure end of the pavement, where it is awaiting take-off. Reference number 813 points to the nose of a SkyQart that has completed its taxiing and come to a stop at a position from which it can back in to a vacant aircraft docking station at the dock. Reference number 814 points to the shared singular taxiway of the SkyNest III. Reference number 815 points to the upper edge of the coarsely crosshatched area that represents the rooftop solar panel array for the SkyNest III. Reference number 816 points to the finer crosshatched area that represents the raised dock area of the SkyNest III, which is 47 cm higher than the level of the pavement surface of the runway/taxiway. Reference number 817 points to the portion of the SkyNest III that fronts onto the sidewalk of the adjacent street and along which the RDCs line up in order to load or off-load EPCs. The standard for autonomous operations calls for each step in the sequence of operations at the various positions on the SkyNest III to require only 10 seconds or less. In FIG. 16, a SkyQart is shown making its steep final approach to landing at the SkyNest III along the curved dashed line that is reference number 800 in the upper left side of the drawing. The cadenced coordinated operations at SkyNests is the sequence of standard operations for completing the turnaround of that landing SkyQart and it will be slightly different at the SkyNest III than the cadenced coordinated operations at the SkyNest I or II. It will proceed as follows: At a nominal interoperable approach speed of 24 m/sec, the landing SkyQart will touch down at a location marked by the tip of the left-hand arrowhead of the double arrow shown as reference number 805 on the landing portion of the pavement and will rapidly decelerate on the pavement surface, reference number 804, to reach its turn-off position at reference number 808 where its taxiing speed will have slowed to just 7.6 m/sec. From there, the SkyQart will continue to taxi at the nominal taxiing speed of 7.6 m/sec to the position shown as reference number 810. This interval of movement from its landing approach to reach position 810 consumes 10 seconds. Then, in the next 10 seconds, the taxiing SkyQart moves from its position at reference number 810 to a position at reference number 814 where it stops momentarily and then, in the next 10 seconds, backs up into the open aircraft docking station at the dock, using its wheelmotors and precision positioning software to park in the exactly correct alignment with that station's battery swapping/charging equipment. Position 814 will vary according to which berth at the dock is unoccupied. The SkyQart will then de-board or unload its EPC in 10 seconds. It spends an additional 10 seconds in its berth at the dock in order to complete the boarding or loading in of a newly laden EPC for the next flight. Concurrently with the 10 seconds of de-boarding and 10 seconds of boarding time the SkyQart undergoes swapping of its spent SBP with a freshly charged SBP, providing it with another 161 km+ of range. Once these steps are completed, the freshly loaded SkyQart will leave its berth at the dock, as shown by the curved arrow along the left or port wingtips of the sequence of three SkyQarts; the right wingtip on the middle one of these three SkyQarts is labeled as reference number 811. The SkyQart thus departing from the dock will begin taxiing to reach, in just 10 seconds, the position labeled as reference number 812 at the departure end of the take-off pavement. During these 10 seconds of taxiing at 7.6 m/sec, the departing SkyQart must share Taxiway I with any other arriving and/or departing SkyQarts that are taxiing there. Thanks to the autonomous precision positioning using on-board navigation systems, the sense and avoid systems, the networked situational awareness program and wheelmotor controllers of the autonomous control system, this sharing is reliably and routinely accomplished without conflict. Once it reaches position 812 and has completed its automated checklist for take-off, the SkyQart then will use the next 10 seconds to taxi into the take-off brake release position, which is labeled as reference number 803, on the pavement. From there, it will then rapidly accelerate on its take-off roll to reach position 806 in less than 5 seconds, where it will lift off the pavement and conduct over the next 5 seconds its curved climb-out path, reference number 807, to depart the SkyNest III in a curved traffic pattern at 24 m/sec. The movement from position that is reference number 803 to departing the SkyNest consumes another 10 seconds. By this idealized sequence then, the total turnaround time at this SkyNest III is summarized as follows: 10 seconds for approach, touchdown, deceleration and turning off the pavement; 10 seconds to taxi to a stop in front of an open berth at the dock; 10 seconds to precisely back into the berth at the dock; 10 seconds to de-board or unload the EPC from the SkyQart at the dock; 10 seconds to board or load the laden EPC into the SkyQart at the dock; 10 seconds to taxi to the hold for take-off position at 812, 10 seconds to taxi onto the brake release position on the pavement; 10 seconds to complete the take-off and climb out to exit the SkyNest III. This sequence enabling 80 seconds total turnaround cycle time at the SkyNest III.

Note that the turnaround time (TAT) at the SkyNest III is shorter (80 seconds) than for that using cadenced coordinated operations at the standard SkyNest I shown in FIG. 14. This is due to the shorter distances required for taxiing. However, the SkyNest ill has fewer aircraft docking stations at its dock, eight in all, and, compared to the sixteen aircraft docking stations at the SkyNest I, this reduces the buffering effect of having several extra aircraft and aircraft docking stations available at the SkyNest for resiliency in operational sequences. The importance of the SkyNest III as one embodiment of this invention is that it provides an extreme example of high passenger capacity per acre of land parcel, which it achieves by taking advantage of siting at locations where noise sensitivities are reduced while proximity is still very near where people live and work. In FIG. 16, the SkyNest III can be seen to include the same standardized core amenities as the standard SkyNest that is shown in FIG. 14. These include the Lounge, Cargo Service. Hangar, ADA ramps, stairs to dock from sidewalk, crash cushion, EPCs, RDCs, as well as the adjacent street with short-term curbside car parking spaces, bus and bicycle rack. Alternative embodiments of the SkyNest III are possible, including those of different size and operational cadences, provided that they offer facilities that are compatible with the extant QUAD system vehicles.

The SkyNest IV (Bowl)

Figure 17:
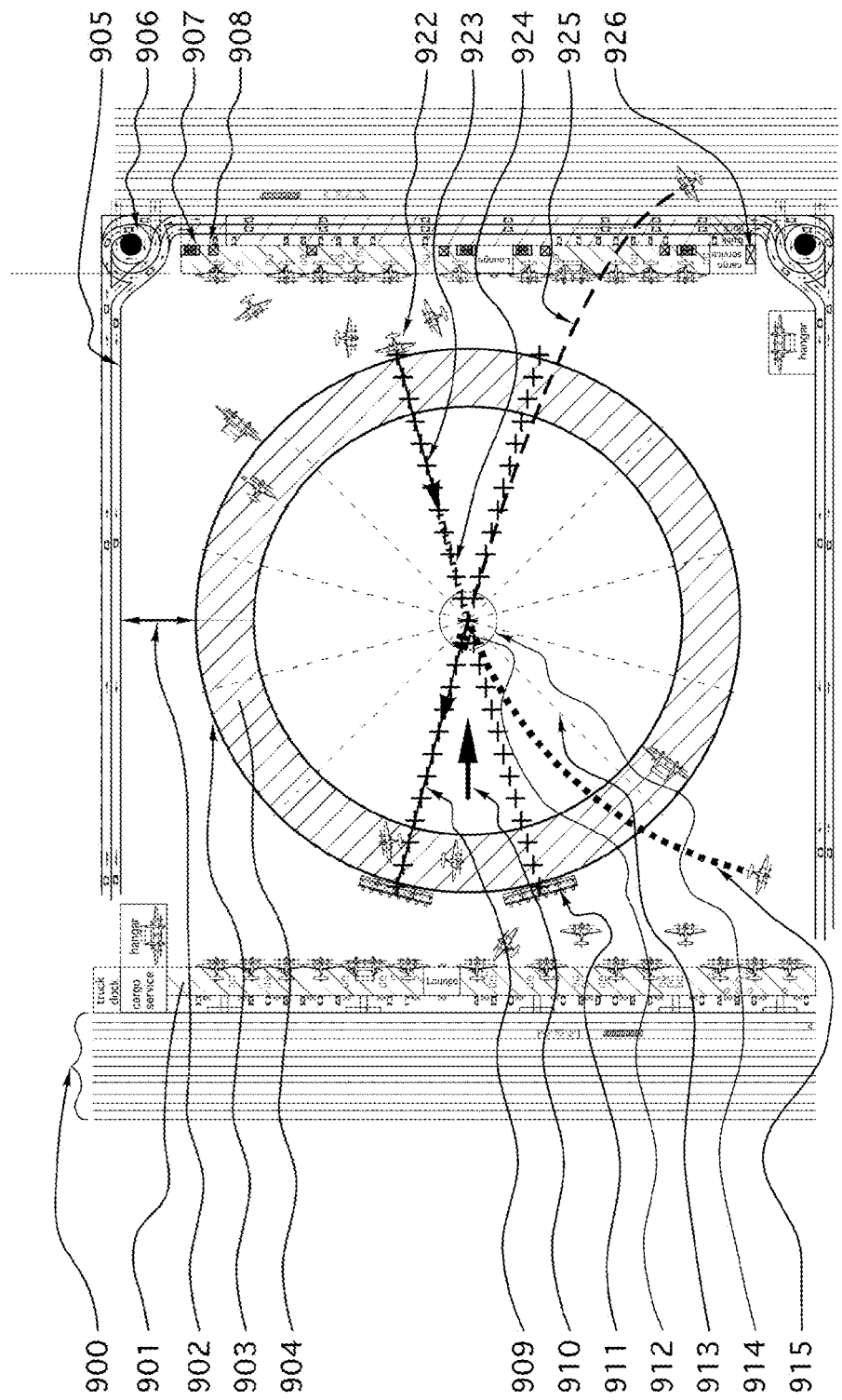
FIG. 17 shows a top view of the bowl-shaped SkyNest IV
Figure 18:
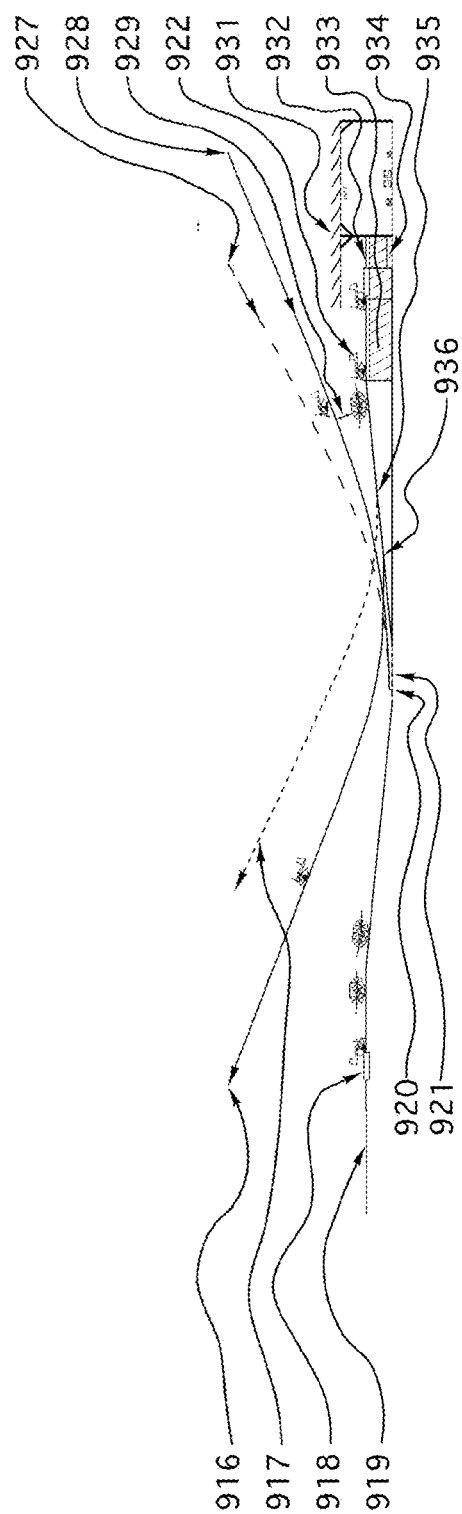
FIG. 18 shows a side view of the SkyNest IV

FIGS. 17 and 18 depict an embodiment of the SkyNest IV, in accordance with the present invention. This SkyNest IV is designed to accommodate extremely short take-offs and landings in a direction appropriate to existing current wind conditions. As such, it is a 360° circular airpark facility. In addition, the pavement of the SkyNest IV is sloped so as to give its surface a bowl shape wherein the sloped sides of the bowl substantially enhance the acceleration and deceleration of the SkyQarts that are landing or taking-off there. In effect, take-offs are made downhill and landings are made uphill. The SkyNest IV can be seen to include the same standardized core amenities as the standard SkyNest I that is shown in FIG. 14. These include the Lounge, Cargo Service, Hangar. ADA ramps, stairs to dock from sidewalk, crash cushion, EPCs. RDCs, as well as the adjacent street with short-term curbside car parking spaces, bus and bicycle rack. In FIG. 17, reference number 900 points to the street adjacent to the SkyNest IV, which is comprised of the same size and number of lanes and components as those depicted in FIG. 14. Reference number 901 points to the crosshatched area that represents the dock surface of the SkyNest IV, which has the same standard width, 7.5 m as that depicted for the SkyNests I, II and III. Reference number 902 points to a double arrow whose dimension represents the 19.8 m radial dimension of the flat pavement area for taxiing that extends from the top of the paved bowl to the outer edges of the SkyNest pavement. Reference number 903 points to a solid circle of 143.3 m diameter that represents the upper outer rim of the nominal pavement bowl at the SkyNest IV. Reference number 904 points to the crosshatched ring that represents the pavement area on the upper outer slope of the bowl, which can be used for taxiing and whose radial dimension is 15.24 m. Reference number 905 points to the bidirectional cart paths that are located at the outer borders of the above-ground version of the SkyNest IV wherein such paths are for the exclusive use by RDCs that need to travel to opposite sides of the SkyNest. Reference number 906 points to the bidirectional spiral of concentric cart paths that, in this embodiment, are located at the outer corners of the SkyNest IV property and that provide a path for RDCs to travel up and down the nominal 6.4 m height difference between street level and the upper cart paths surfaces of the SkyNest IV. Reference number 907 points to one of the above-ground SkyNest IV's four pedestrian stairwells that each occupy a space of 8 feet by 16 feet and that enable passengers to move from street level to the up-stairs dock level and vice versa. Note that these stairwells are not depicted or needed on the dock area shown on the left side of FIG. 17 because that left side dock area represents the embodiment of an excavated, street-level SkyNest IV. Reference number 908 points to a top view of one of the five identical passenger elevators at the dock of the above-ground SkyNest IV. Each of these five passenger elevators is shown as being 8 feet square in planform. The combination of these five passenger elevators with the four pedestrian stairwells is sufficient, when supplemented by the deliveries of people and freight that occur by RDC, to fulfill the operational capacity of the dock on one side of a SkyNest IV. Alternative embodiments of the dock facilities at SkyNests to those presented herein, including those that provide more or fewer of these elevators and stairwells or that provide them in different locations on the dock, are nevertheless still encompassed by this patent. Reference number 909 points to a solid line with a directional arrow that represents a top view of the portion of the pavement that is used for the uphill landing roll of a SkyQart. It will be noted that there are two SkyQarts shown adjacent and on either side of the upper end of this landing roll, and each of these SkyQarts is depicted to have turned off of the landing pavement in order to taxi to its intended dock. Reference number 910 points to an isolated arrow that indicates the direction of the prevailing wind that, for this drawing, determines which runway directions will be used for the take-off s and landings at the SkyNest IV shown in the drawing. It will be noted in FIG. 17 that those runway directions are 30° apart, straddling the indicated wind direction arrow such that each runway direction is 15° different from that of the prevailing wind. Reference number 911 points to one of the two movable crash cushion carts that is positioned at the end of the take-off pavement. It can be noted that the other crash cushion is positioned at the end of the landing pavement. Reference number 912 points to the exact and required standard touchdown point for landing for this wind condition at this embodiment of a SkyNest IV. This touchdown point is based upon the ground clearance requirements for a SkyQart that approaches its landing touchdown while descending over the downhill portion of the bowl of a SkyNest IV. For any runway chosen, this standard touchdown point will be 3.81 m beyond the center of the bowl on the surface of the flat circular area that is concentric at the bottom center of the bowl. Reference number 912 also points to the beginning of a short thickly dashed line that is aligned with the landing runway direction depicted in FIG. 9. The scaled length of this short thickly dashed line is 3.81 m. Reference number 913 points to one of the twelve thin dashed lines that represent some of the spoke-like alternative runway directions that could be usable at a SkyNest IV when favored by wind conditions. While the runway headings of these thin dashed lines are placed 300 apart for illustrative purposes, the actual runway headings used by the SkyQarts operating at a SkyNest IV could be any compass headings that are suitably oriented into the prevailing wind. Reference number 914 points to a circular line that outlines the nominal 15.24 m diameter circle of flat pavement surface that lies concentric at the bottom center of the bowl at a SkyNest IV. This outline is for illustrative purposes only because the actual transition from the flat bottom of the bowl to its up-sloped sides is, in reality, not built as a sharp angle change but is instead a gentle transition with a fillet radius of 12.2 m. Reference number 915 points to a curved thickly dotted line whose arc depicts the climb-out trajectory of the SkyQart, beginning at the center of the bowl. This arc is 100.3 m long in the no-wind condition and it begins after the SkyQart has completed its initial climb aligned with the runway heading from liftoff to the center of the bowl, a segment shown by a straight, thinly dotted line of 29.0 m length and separately labeled as reference number 924. In FIG. 18, reference number 916 points to the tip of the curved arrow that represents a side view of the standard climb profile of a SkyQart in the no-wind condition and that reaches a height of 40 m above the bottom of the bowl. The climb profile shown by reference number 916 is not conducted in a banked turn but is instead entirely flown while maintaining the heading of the take-off pavement. Reference number 917 points to a side view of the climb profile of a SkyQart in a 16 km/hr headwind condition, showing the larger ground clearances that result. Reference number 918 points to a side view of the surface of the dock that is used at an excavated type of SkyNest IV. The surface of this dock as shown is the standard 47 cm above the level of the pavement surface of the aircraft parking area adjacent to the dock, which is the standard dock height used at all other SkyNests. The width of the surface of this dock is the SkyNest standard of 7.5 m. The dock surface is also shown to be the nominal 129.5 cm above the bottom of the under-dock service bay that contains the robotic battery swap equipment. Reference number 919 points to a side view of the street level adjacent to the sidewalk at an excavated type of SkyNest IV. This street level is shown adjoining a sidewalk curb that is 15.24 cm tall. The sidewalk adjacent to the street level adjoins the dock at the SkyNest and its sidewalk surface is 47 cm below the height of the dock surface. Reference number 920 points to a side view of the point of the standard landing touchdown at a SkyNest IV. Reference number 921 points to a side view of the point that is the center of the bottom of the bowl where the dashed line represents the 15.24 m diameter circular flat area centered at that point. This center at 921 can be seen to coincide with the center of the bowl above in the FIG. 17 view of the SkyNest IV. Reference number 922 points to a SkyQart whose nosewheel is positioned on the level pavement at the top of the bowl that is the brake release point for take-off on the active runway. Reference number 923 points to a solid line with arrow that indicates a top view of the nominal 42.7 m take-off distance of a SkyQart in the no-wind condition. Reference number 924 indicates a thinly dotted line that represents the 29.0 m distance traveled by the SkyQart is its straight-ahead initial climb from its point of lift off to the center of the bowl. The intersection of the trajectories of departing and arriving SkyQarts at the center of the bowl can be safely managed by staggering the timing of their flights as 4D trajectories. Reference number 925 indicates a top view of a dashed line that depicts the curved no-wind landing approach of the SkyQart. It will be noted that this approach comes to align with the landing runway heading and that it passes through the center of the bowl, continuing 3.81 m beyond that center to the standard point of touchdown shown by reference number 912. Reference number 926 points to the 2.44 m×4.88 m cargo/freight/vehicle elevator that is inside the Cargo Service Building and that lifts cargo from the street-level truck dock below to the dock level above at an above-ground type of SkyNest IV. In FIG. 18, reference number 927 points to a point that is 40 m above the bottom of the bowl and is the topmost point of a side view of the landing approach profile of a SkyQart in a 16 km/hr headwind condition. Reference number 928 points to a point that is 40 m above the bottom of the bowl and is the topmost point of a side view of the landing approach profile of a SkyQart in a no-wind condition. It will be noted that both 927 and 928 have the same touchdown point, but that the 927 approach in the wind offers substantially larger ground clearances. Reference number 929 points to a tiny double arrow that indicates the worst-case clearance of 4.15 m above the tail section of a taxiing SkyQart for the case of a no-wind landing approach. In FIG. 18, reference number 922 also points to a side view of a SkyQart that is at the brake release position for take-off. Reference number 931 points to a nominal 45.7 m wide solar panel array that is 12.5 m above the street area and 6.1 m above the level taxiing surface of the SkyNest TV. Reference number 932 points to a side view of the surface of the RDC operations area adjacent to the dock at an above-ground SkyNest IV. Reference number 933 points to a side view of a crosshatched area under the surface of an above-ground SkyNest IV that represents the building area for potential commercial and housing uses. Reference number 934 points to a side view of the truck dock that is a nominal 1.22 m above street level at the above-ground type of SkyNest IV. Reference number 935 points to a side view of the liftoff point for a take-off made into a 16 km/hr headwind, where the take-off distance is only 27.1 m. Reference number 936 points to a side view of the liftoff point for a standard take-off in no wind, where the ground roll is 42.7 m. Alternative embodiments of the SkyNest IV are possible, including those of different size and operational cadences, provided that they offer facilities that are compatible with the extant QUAD system vehicles.

The SkyNest V (Rooftop)

Figure 19:
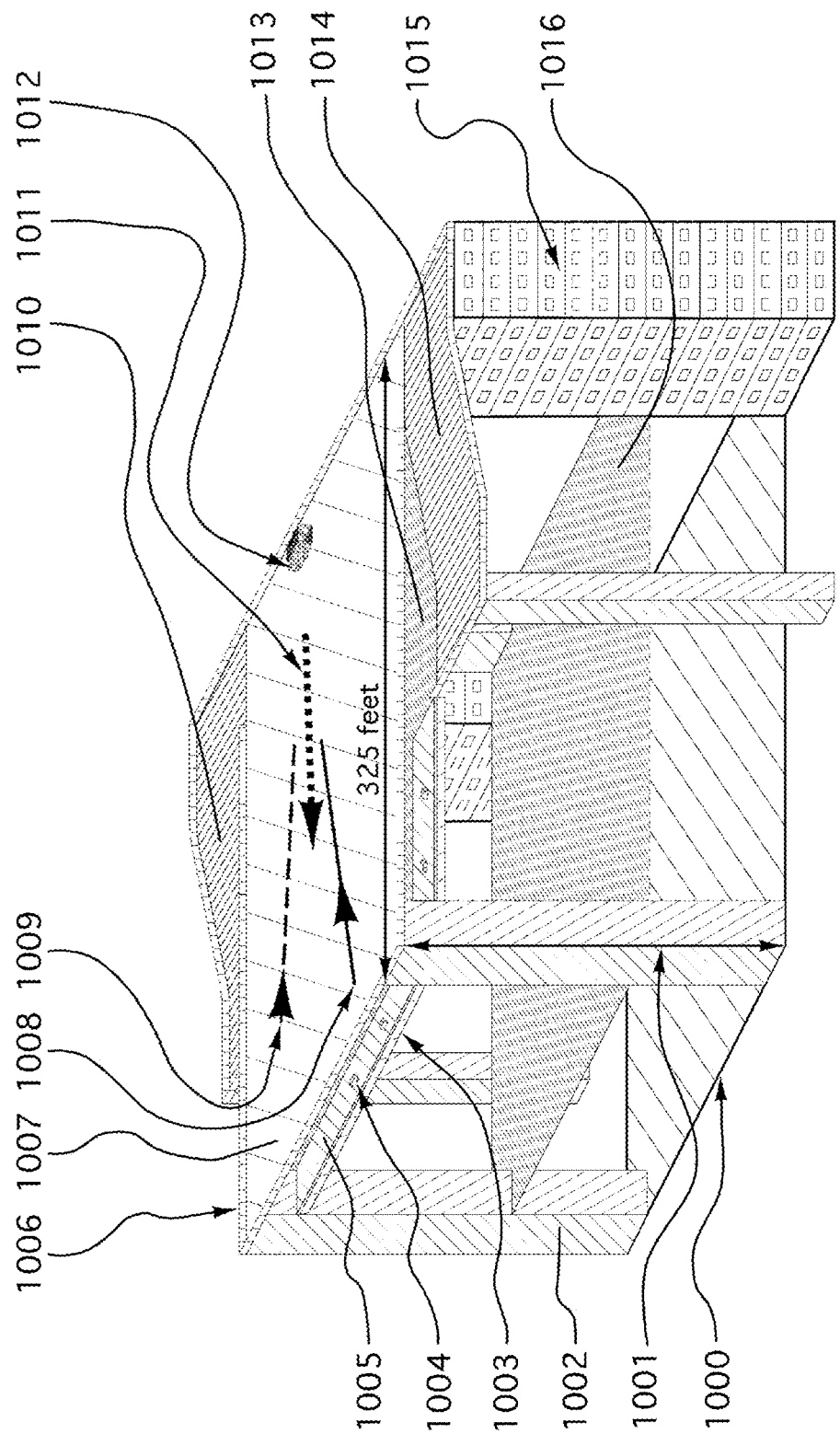
FIG. 19 shows a perspective view of an exemplary rooftop SkyNest V configured on a rooftop of a structure

FIG. 19 depicts a simplified view of a standard minimum-sized rooftop SkyNest V, in accordance with one embodiment of the present invention. This embodiment depicts the standard SkyNest V with its minimum dimensions, which are predicated on the extremely short take-off and landing (ESTOL) performance capabilities of the SkyQart. Other, larger, alternative embodiments of this standard minimum SkyNest V can occur in order to fit varying sizes of existing building rooftops and these are also encompassed by this patent. The SkyNest V is anticipated to provide high-proximity QUAD services to metro centers, urban canyon areas and large hub airport terminals where the built environment precludes finding a larger land parcel size for a surface SkyNest and/or where there is no proximate shoreline or greenbelt for siting of a smaller SkyNest III. The SkyNest V can be sited on the rooftop of large multi-level parking garages that are typically adjacent to many major airline hub airports and amusement parks. These hub airport SkyNest Vs would provide QUAD services for airline travelers and thereby offer them major time savings compared to their trips using ground transportation to and from the hub airports. Some SkyNest Vs may be built atop multi-story office or residential buildings. In FIG. 19, reference number 1000 points to the surface of the ground floor of the SkyNest V, which is nominally considered to be at street level. Reference number 1001 points to a vertical arrow that depicts the 60 m height above street level of the pavement surfaces at this SkyNest V. This height may vary depending upon the building's size, surroundings and ambient noise level. Reference number 1002 points to one of the four corner pillars of the SkyNest V building. These pillars may be of varying size and may contain high-speed passenger and/or freight elevators that move people and goods to and from the SkyNest V dock and the ground floor. It should be noted that there is normally no need for pedestrian access to the rooftop pavement surfaces at a SkyNest V, since all passenger-boarding and de-boarding occurs at the dock area on the floor below the rooftop. It is however possible to have a rooftop SkyNest whose passenger dock is included on the rooftop; in which case it would closely resemble the layout of a SkyNest III as shown in FIG. 16. Reference number 1003 points to the bottom edge of the dock service bay in which battery swapping occurs. Reference number 1004 points to a rectilinear box that conceptually represents one of several loaded EPCs that would be operating on the dock area. Reference number 1005 points to the surface of the dock area, a surface that is the standard 47 cm above the floor of the adjacent taxiing ramp area, and is the same dock height used at all other types of SkyNests. Reference number 1006 points to the perimeter safety fence or wall that surrounds the rooftop pavement and ramp area. A similar perimeter safety fence or wall would surround the outer edges of the dock on the lower level, but this is not depicted in FIG. 19 in order to clarify other features. A horizontal, life-saving perimeter net, similar to that used on the Golden Gate Bridge, would likely be placed outside the perimeter safety fence on both the rooftop and dock levels of the SkyNest V, but for the sake of simplicity and clarity in depicting other features, that perimeter net is not depicted in FIG. 19. Reference number 1007 points to the surface of the rooftop pavement area of the SkyNest V, whose area is nominally 99.1 m×99.1 m making an area of 0.98 ha. Reference number 1008 points to the end of a solid line that depicts the direction (arrow) and the 38.7 m length of a 0.8 G GRACE take-off distance of a SkyQart at the SkyNest V. Reference number 1009 points to the location of landing touchdown at the end of a dashed line that depicts the direction (arrow) and the 43.9 m length of a 0.8 G GRACE landing ground roll of a SkyQart at the SkyNest V in the case of the wind direction shown by the dotted line arrow and labeled as reference number 101 II. The location of landing touchdown as shown is 29.0 m beyond the intersection of the landing path with the outer edge of the rooftop. This 29.0 m is the nominal distance needed to complete a 3-meter final descent with GRACE when flying at an airspeed of 24 m/sec. This 43.9 m length of ground roll is the nominal distance needed in zero wind conditions for the SkyQart to decelerate with GRACE at a maximum of 0.8 G while using regenerative braking and reverse propeller thrust from its touchdown speed of 24 m/sec to its taxiing/turn off taxiing speed of 7.6 m/sec. Reference number 1010 points to the surface of the downhill exit ramp that allows the arriving SkyQart to taxi to the dock that is located on the lower level that is below the rooftop pavement area of the SkyNest V. Reference number 1011 points to the dotted arrow that depicts the wind direction on which are based the take-off and landing directions and the positioning of the movable crash cushion in this depiction of the SkyNest V. Reference number 1012 points to the portable crash cushion placed in the position appropriate to the wind direction illustrated by reference number 1011. The crash cushion is designed to slide 1.1 m to full stop in the event of a SkyQart impacting it at 20 m/sec. Accordingly, and to maximize runway length, the crash cushion is shown positioned with its impact surface inboard of the outer edge of the rooftop pavement. Reference number 1013 points to the surface of the taxiway ramp area that serves the dock area on the lower level of the SkyNest V, one floor below the rooftop pavement surface. Reference number 1014 points to the uphill entry ramp that allows the departing SkyQart to taxi from the dock that is located on the lower level thence upward to the rooftop pavement area of the SkyNest V. Reference number 1015 points to the large 14-story building that serves as a support pillar for the reference number 1014 uphill ramp. A similar 14-story building is shown at the rear of the SkyNest V, supporting the downhill ramp that is labeled as reference number 1010. These buildings may house offices or residences and therefore may not considered to be part of the SkyNest V land parcel footprint. Alternatively, the reference numbers 1010 and 1014 may be structured as gusseted, cantilevered ramps that do not have a building supporting them. Reference number 1016 points to a large surface that represents one of the many other floors that could potentially fit into the structure that supports the rooftop SkyNest V. In FIG. 19, these additional floors would number 13, if the separation between each floor level were the nominal standard height of 4.27 m. However, in other buildings whose rooftops harbored SkyNest Vs, these lower floors could vary widely in number from as few as two to as many as one hundred or more and could be used for car parking, housing, offices, warehousing or retail spaces.

Fast Flaps System

Figure 20:
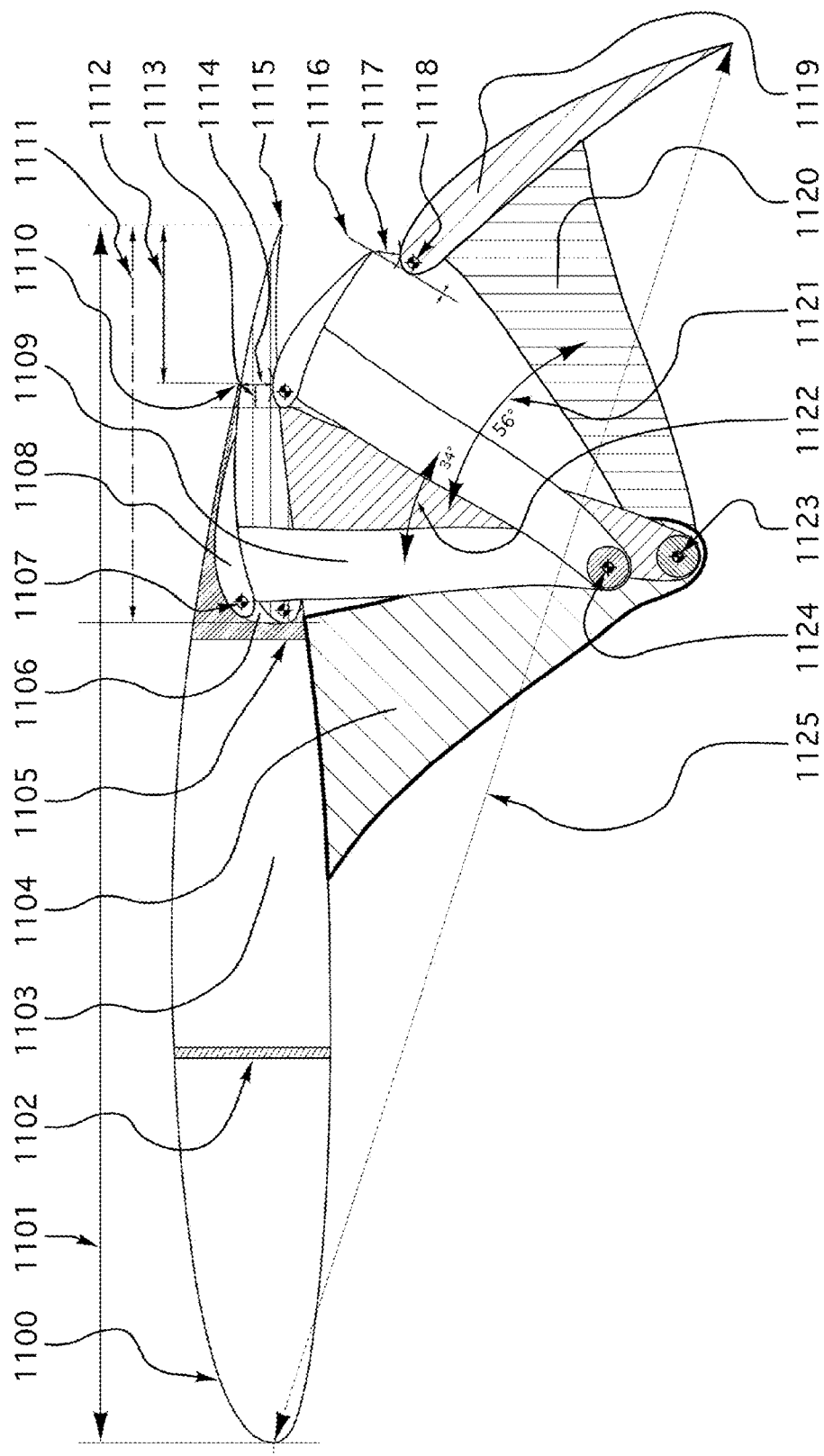
FIG. 20 shows a side view of the fast flaps system

FIG. 20 illustrates the Fast-Flaps System used on SkyQart aircraft in order to enable their ESTOL performance and aerial agility, in accordance with one embodiment of the present invention. The fast flap system in this embodiment is a double-slotted flap system in which the two flap segments, forward and rear, are shown in both their retracted and fully extended positions. The forward flap segment nests above the larger rear flap segment, and each of them has a sturdy vertical strut firmly attached to its leading edge and internal main spar. These vertical struts, which may be multiple along the flap's span and may vary from two to four struts per flap segment, extend downward underneath the wing from the flap segment to their attachment at that flap segment's hinge pin that is located on a large external hinge fin. Each flap segment has its own separate hinge pin and these hinge pins are located on a shared hinge fin. The exact locations of these hinge pins on the hinge fin are critical to the operation of the fast flap system. These hinge pin locations determine the geometry of the extension of the flap segments and, thereby, the lift-enhancing performance of the flap system. These hinge pin locations are accurately drawn in FIG. 20 so as to produce the correct gap and overlap of the fully extended flap segments. In order to minimize leakage drag, the fully retracted flap segments nest snugly inside the rear flap cove portion of the main wing airfoil within minimal gaps between them and the external wing surfaces. The fast-flap name is applied because these flaps are specially designed to fully retract in less than 0.5 seconds at the moment of touch-down on landing of the SkyQart. In FIG. 20, reference number 1100 in this embodiment of the fast flap system points to the forward upper surface outline of the main wing's GAW2 airfoil as it exists at the root of the wing flaps. Reference number 1101 points to a horizontal double arrow that depicts the nominal 142.3 cm chord length of the main wing at the inboard flap root. Reference number 1102 points to the forward face of the main wing spar. Reference number 1103 points to the space that is the mid-wing bay between the main spar and rear spar. The mid-wing bay is the location for the pancake motor that actuates the fast flap system. Reference number 1104 points to the large underwing hinge fin that provides the hinge pins to which attach the flap hinge struts of each flap segment. Reference number 1105 points to the front face of the rear spar of the main wing. Reference number 1106 points to the forward portion of the empty space known as the flap cove. The flap cove is behind the rear spar of the main wing and it provides the space into which the flap segments nest when fully retracted. Reference number 1107 points to the center point of the bolt hole that attaches the pushrod from the motor to the nose of the forward flap segment. Reference number 1108 points to the interior of the proprietary airfoil of the forward flap segment. Reference number 1109 points to the flap hinge strut of the forward flap segment, which connects it to the reference number 1104 hinge fin at the hinge pin labeled as reference number 1124. Reference number 1110 points to the upper surface of the trailing edge of the main wing's flap cove. Reference number 1111 points to a dashed line double arrow that depicts the 46.5 cm length of the chord of the rear flap segment. Reference number 1112 points to a solid line double arrow that depicts the 18.64 cm length portion of the upper surface of the rear flap segment that is exposed aft of the upper trailing edge of the flap cove (reference number 1110). Reference number 1113 points to a small horizontal solid double arrow that depicts the 26.8 mm length of overlap between the forward flap segment and the trailing edge of the flap cove. Reference number 1114 points to the small vertical solid double arrow that depicts the 38.1 mm air gap between the extended forward flap segment and the underside of the trailing edge of the flap cove. Reference number 1115 points to the trailing edge of the rear flap segment in its fully retracted position. Reference number 1116 points to a pair of thin solid lines that are separated by the 1.07 mm distance that is the overlap between the forward and rear flap segments when both are fully extended. Reference number 1117 points to a small, nearly vertical solid double arrow that depicts the 32.5 mm length of the air gap between the forward and rear flap segments when both are in their fully extended positions. Reference number 1118 points to the center point of the bolt hole that attaches the pushrod from the motor to the nose of the rear flap segment. Reference number 1119 points to the interior of the proprietary airfoil of the rear flap segment. Reference number 1120 points to the large flap hinge strut of the rear flap segment. Reference number 1121 points to the solid line double arrow that is the curved arc of 56° that depicts the range of travel of the rear flap segment from its retracted to its fully extended position. Reference number 1122 points to the solid line double arrow that is the curved arc of 34° that depicts the range of travel of the forward flap segment from its retracted to its fully extended position. Reference number 1123 points to the center axis of the hinge pin for the rear flap segment. Reference number 1124 points to the center axis of the hinge pin for the forward flap segment. Reference number 1125 points to a long, solid line double arrow that depicts the 172 cm chord of the wing with its flaps fully extended.

Active Main Landing Gear

Figure 21:
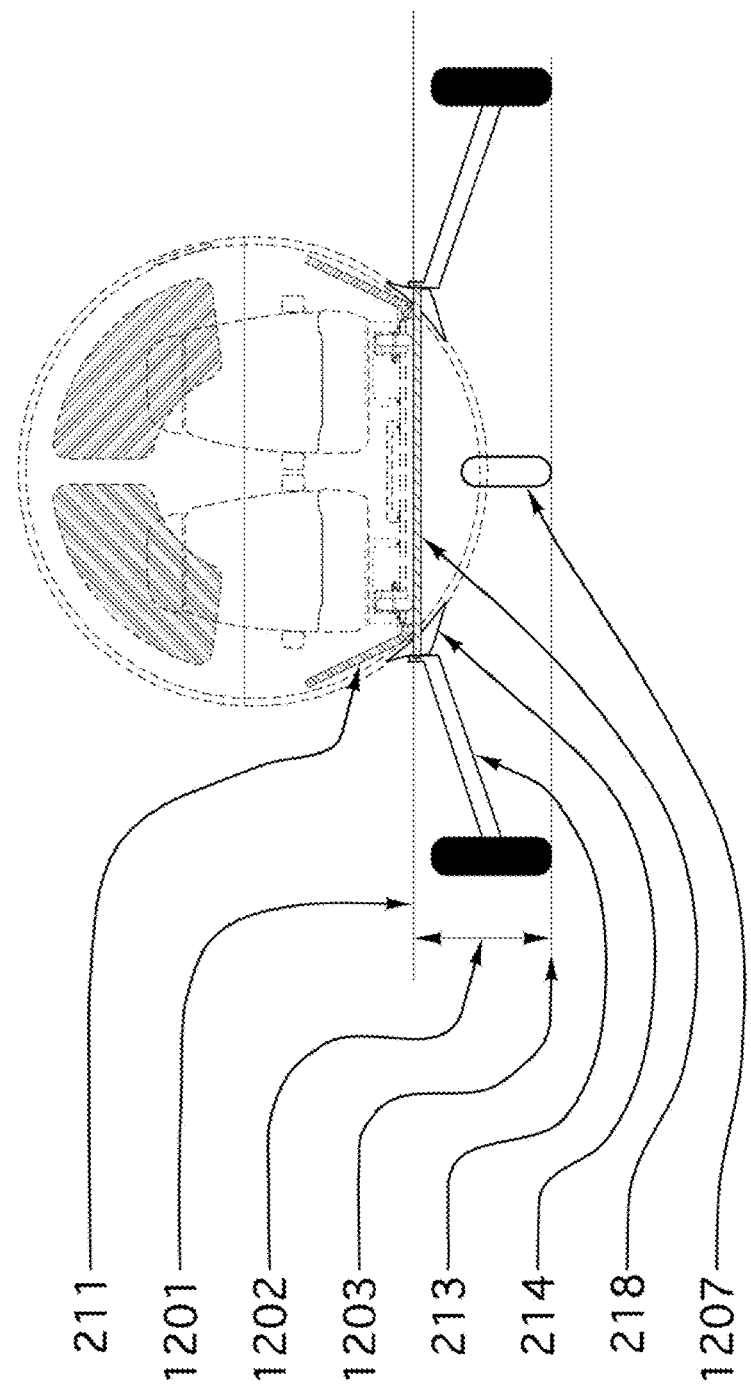
FIG. 21 shows a frontal view of the active main landing gear
Figure 22:
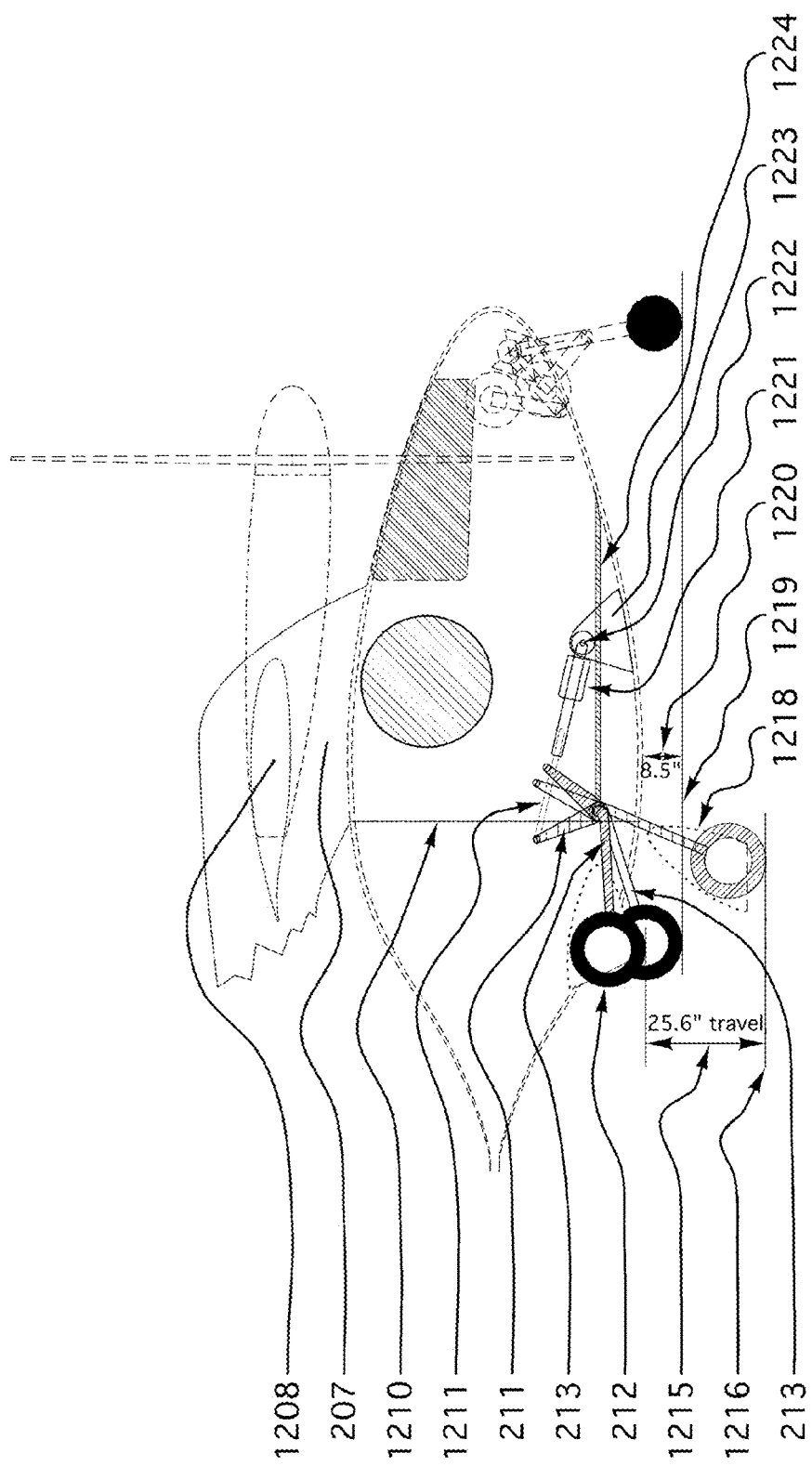
FIG. 22 shows a side view of the active main landing gear

FIGS. 21 and 22 illustrate views of the SkyQart's Active Main Landing Gear system, in accordance with one embodiment of the present invention. The active main landing gear is a concept and process invention that provides a long-travel main landing gear that can gracefully absorb a high rate of sink rate upon landing and can autonomously provide very rapid and precise changes in ride height and, thereby, change the SkyQart's pitch attitude on the ground. The changes in ride height enable two key capabilities required in QUAD. The first is the capability to set the ride height to match the height of the loading dock floor. The second is the capability to rapidly rotate the aircraft into a nose-up attitude at the moment during the take-off roll when such rotation is needed for lift-off. The active main landing gear accomplishes the change in ride height by moving the main landing gear's rigid lever arm that is inside the Axisymmetric Fuselage Pod (AFP). A powerful motor that uses the energy in the SkyQart's battery pack actively moves this lever arm by exactly the appropriate amount, and this active main landing gear motor's movements are controlled by a software application that accurately, instantly, continuously and automatically senses the appropriate pitch attitude, sink rate and ride height of the aircraft. The actuating mechanism by which the active main landing gear motor(s) control(s) the movement of the main landing gear's lever arm may use different actuator devices in different embodiments while still being included in this patent's concept and process[27]. One embodiment is by a special design of linear motor that exerts direct control of the arm's position. Another is by a rotary motor that spins the shaft of a ball-screw or jack-screw, which, in turn, translates the motion of the spinning shaft to linear motion in order to move the landing gear's lever arm the appropriate distance. A third embodiment could use an actuator mechanism that is a hydraulic cylinder whose length and compression resistance is rapidly varied to the appropriate level by an electro-hydraulic pump. Yet another embodiment may use a magnetorheological damper to modulate the position of the landing gear's lever arm. The active main landing gear has three main working positions. One is for the cruise flight condition, in which the swept-back main landing gear leg and its airfoil-shaped cover fairing are aligned with the free-stream airflow in flight to reduce drag. The cruise flight working position is at the top of the range of motion of the active main landing gear. The second working position is the docking position, for docking the SkyQart. This docking position is one in which the main landing gear leg and lever arm are rotated from their cruise flight position downward 14.6° around the center of their trunnion. This docking position aligns the ride height of the SkyQart so that its cabin floorboard height exactly matches the standard 47 cm height of the loading dock. The third working position is the fully dangle down position of highest drag, called the landing approach position, which is used during a SkyQart's steep final approach to landing. The landing approach position is one in which the main landing gear leg and lever arm are rotated 49° downward from the docking position, making 63.6° of total rotation downward from the cruise flight position. The landing approach position of the main landing gear provides a nominal total landing gear travel in jounce of 65.0 cm for absorbing the landing impact upon touchdown. There are two additional working positions that, for clarity, are not shown in FIG. 22. The first of these is the nose-down pitch attitude position that is used during the initial portion of the take-off roll in order to enhance down-force on the tires to enhance their traction on the pavement and to prevent a wheelie. The nose-down pitch attitude position is also routinely used to minimize unwanted lift during the portion of the landing ground roll just after completing the full landing gear jounce after touchdown. The nose-down pitch attitude is also used during the time that a SkyQart is parked away from a dock. The second of the additional positions not depicted in FIG. 22 is the momentary position in which the main landing gear abruptly retracts enough to produce a nose-up pitch attitude of the SkyQart to suddenly increase its lift at the exact moment when it reaches its preferred lift-off speed of 24 m/sec during its take-off roll. In FIG. 21, reference number 211 points to a frontal view of the lever arm, shown in crosshatch, that moves the active main landing gear through its range of motion. This lever arm is rigidly attached to the transverse trunnion bar, shown in frontal view as crosshatched and labeled as reference number 218, whose rotation in the two main landing gear pillow block bearings provides the swing axis of the active main landing gear. Reference number 1201 points to a frontal view of a horizontal line that is 47 cm above the ground level and that represents the surface level of the loading dock which is level with the cabin floorboard of the SkyQart when its landing gear are in the docking position, as shown. Reference number 1202 points to a double arrow whose length represents the 47 cm height of the dock at a SkyNest. Reference number 1203 points to a frontal view of a horizontal line that represents the ground or surface level on which the tires of the SkyQart are resting when in the docking position. Reference number 213 points to a frontal view of the right main landing gear leg. Reference number 214 points to a frontal view of the triangular starboard pillow block bearing whose structure is integrated into the AFP and that, along with the port side pillow block bearing, bears and spreads the loads imparted by the main landing gear's transverse trunnion bar. Reference number 218 points to a frontal view of the 2.54 cm diameter transverse trunnion bar that joins the port and starboard main landing gear legs. Reference number 1207 points to a frontal view of the outline of the nose gear tire. Reference number 1208 points to a side view of the main wing airfoil at the midline of the SkyQart, showing its position relative to the nose and main gear tire contact patches. Reference number 207 points to the side view of the midline mono-strut that attaches the main wing to the AFP. The empennage is omitted from FIG. 20 for simplicity. Reference number 1210 points to the line that depicts the seam in the AFP that can open to separate its rear hatch from its forward portion during loading and unloading operations at the dock. Reference number 1211 points to the pushrod that connects the powered actuator to the reference number 211 crosshatched main landing gear lever arm, which arm is shown in its dangle down, landing approach position. Reference number 213 points to a side view of the finely crosshatched main landing gear leg in its cruise flight position. Reference number 212 points to the aft edge of the starboard main landing gear tire of nominal 40.64 cm diameter, which, like its identical mate the port or left main landing gear tire, is mounted on a powerful wheelmotor whose exact rotational position, RPM and power are controlled so as to provide take-off acceleration, regenerative braking on landing, as well as precisely guided trajectories for taxiing, parking and docking. This landing gear tire is shown in its retracted, cruise flight position and a partial outline of its enclosing wheel fairing is shown behind it for reference. Reference number 1215 points to a double arrow whose length of 65.0 cm depicts the full range of jounce travel of the main landing gear tire. Reference number 1216 points to a side view of a line that depicts the level of the pavement during initial touchdown of the SkyQart during landing. Reference number 213 points to a side view of the right main landing gear leg in its docking position. Reference number 1218 points to a side view of the dashed line that outlines the shape of the wheel fairing of the crosshatched main landing gear tire when the main landing gear is in its dangle down landing approach position. Note that the nose tire position is not shown for this touchdown line since it could be at any of several positions. Reference number 1219 points to a side view of a line that depicts the ground or surface level of the pavement as would occur when the SkyQart is docked. Reference number 1220 points to a double arrow of 21.6 cm length that depicts the nominal ground clearance of the belly of the AFP. Reference number 1221 points to a side view of one outline of the active main landing gear's powered actuator (of whatever type used) that moves the main landing gear lever arm to position the landing gear. The powered actuator shown has the appearance of a hydraulic ram, but many other types of actuator may be used in other embodiments. Reference number 1222 points to a side view of the forward pivot axis for the landing gear powered actuator. The location of this pivot may vary in different embodiments of the SkyQart. This pivot is located at the apex of the large load-spreading gusset that is structurally integrated into the AFP. Reference number 1223 points to a side view of the outline of that large load-spreading gusset. Reference number 1224 points to a side view of the undersurface of the floorboard of the cabin in the SkyQart.

The Ultra-Quiet Propeller

Figure 23:
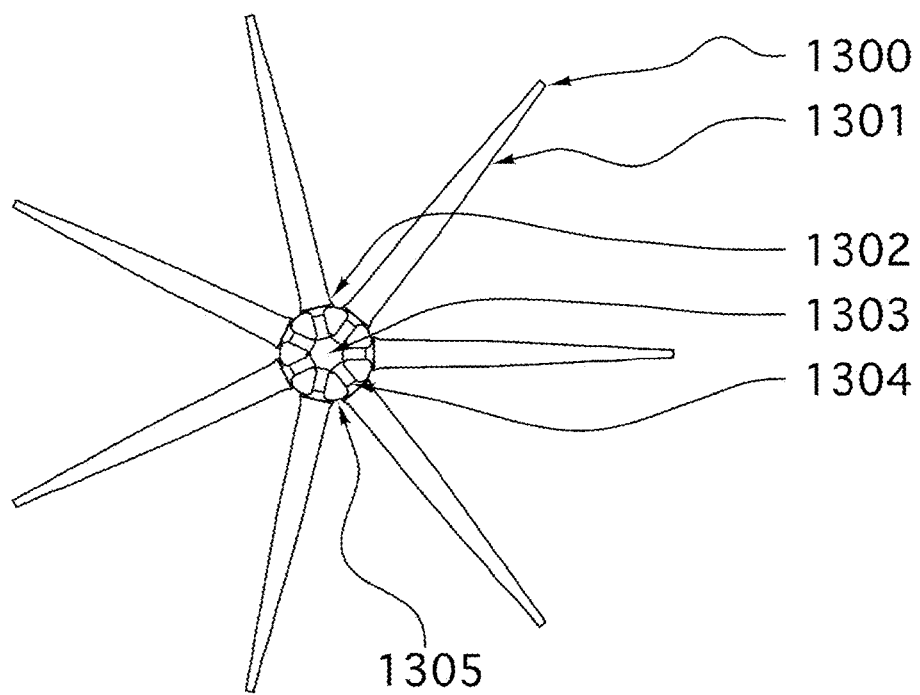
FIG. 23 shows a frontal view of a SkyQart ultra-quiet propeller
Figure 24:
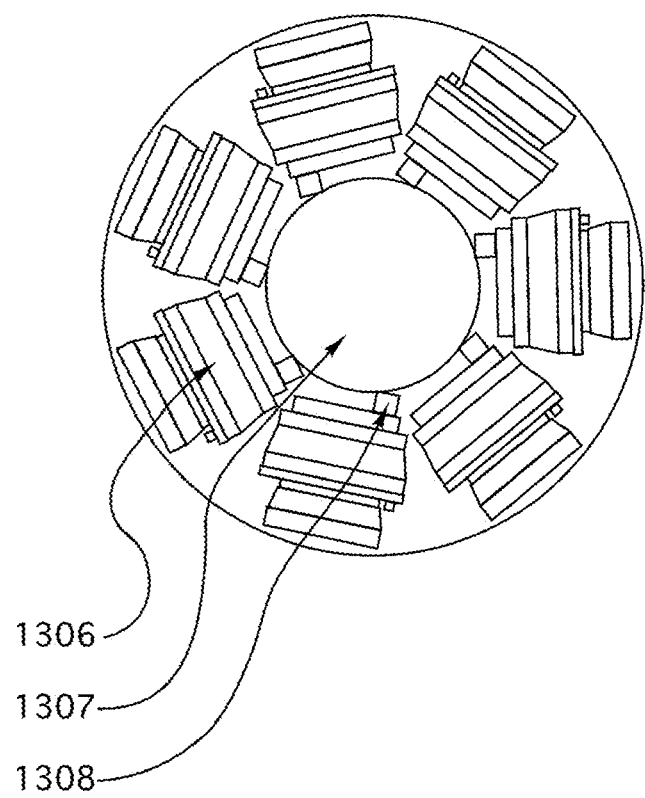
FIG. 24 shows a frontal view of an exemplary central hub of a SkyQart ultra-quiet propeller.

FIGS. 23 and 24 depict a nominal embodiment of the ultra-quiet propeller. The ultra-quiet propeller is an important component to this invention. It is a seven-bladed propeller of a nominal 3.05 m diameter that is used on the embodiments of SkyQarts depicted in this invention and this is shown in frontal view in FIG. 23, along with a separate frontal view in FIG. 24 of its central controllable pitch propeller hub. These propellers are of the design used in the author's existing patent number U.S. Ser. No. 10/415,581 B1. These propellers accordingly incorporate blades of high-aspect ratio with laminar flow airfoil sections tailored by CFD to minimize spanwise flow and to have deliberate blade strengthening increases at Fibonacci intervals in order to dampen harmonic blade vibrations. These blades also incorporate that propeller patent's special blade angles near their tip that, in normal take-off operation, produce a small amount of reverse thrust so as to reduce or eliminate their blade tip vortex and the noise attendant thereto. The propeller shown in FIG. 23 has seven blades with equal spacing between blades. This propeller is shown with zero blade twist in order to better depict its planform shape. Reference number 1300 points to the blade tip. Reference number 1301 points to the trailing edge of the blade at its 0.75R or 75% blade station. Reference number 1302 points to the innermost airfoil of the blade where it exits the streamlined spinner. Reference number 1303 points to the central thrust axis of the propeller. Reference number 1304 points to the outer limit of the round neck of the propeller blade shank that fits inside the hub. Note that the round neck of each blade is shown here with a round nub at its inner end and without its blade retention clamp. Reference number 221 points to a frontal view of the outer circumference of the streamlined spinner that encloses the hub and the innermost portions of the blade neck and its fillet transition to the innermost blade airfoil. The generic, 7-bladed, controllable pitch propeller hub is depicted below the propeller blades in FIG. 24. Reference number 1306 points to one of the seven propeller blade retention clamps located inside this hub. Each blade retention clamp typically has a cam-following pin on its inner surface, shown as reference number 1308 in FIG. 24. Each cam-following pin in the hub can be moved an equal amount by a small motor inside the hub (not shown) so as to identically rotate each propeller blade to the blade angle that is appropriate for the desired thrust and RPM. Reference number 1307 points to the propeller hub's central round propeller mounting flange, which attaches the hub to the propulsor unit (electric motor). The six equally spaced mounting bolt-holes in this flange are omitted for clarity. Alternative embodiments of ultra-quiet propellers could be used in the QUAD system, if they fulfill the ultra-quiet and efficiency needs of the QUAD system.

The Electric Payload Cart (EPC)

Figure 25:
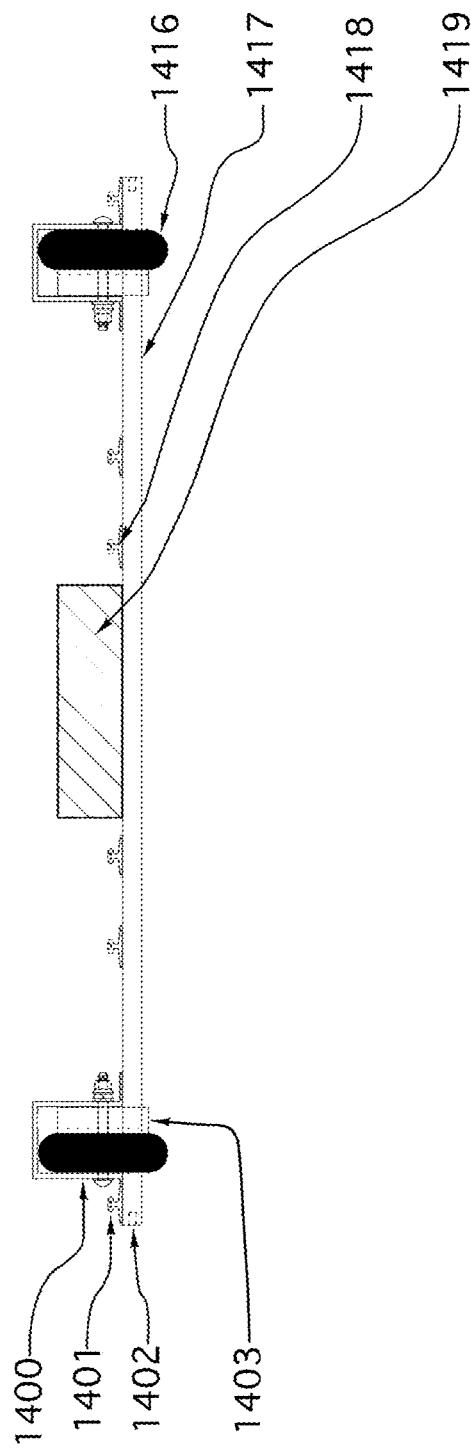
FIGS. 25, 26, 27 and 28 depict the details of the autonomous robotic electric payload cart (EPC) and its seat-latching tracks
Figure 26:
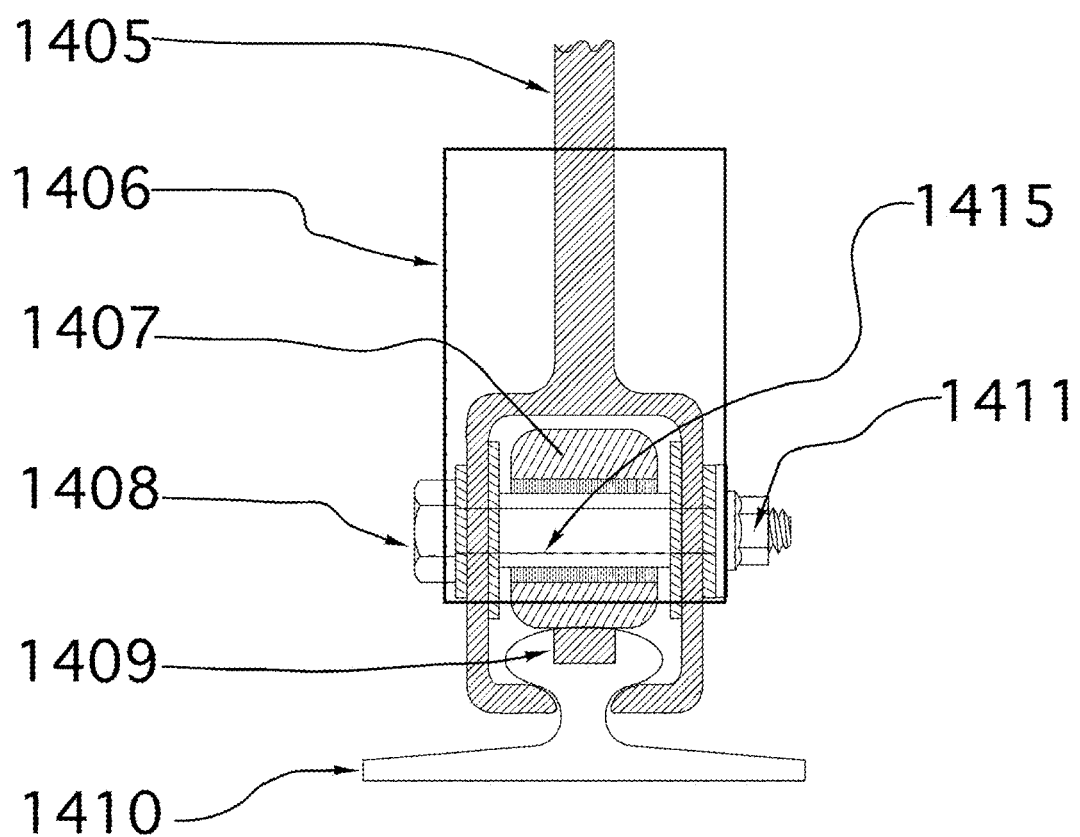
Figure 27:
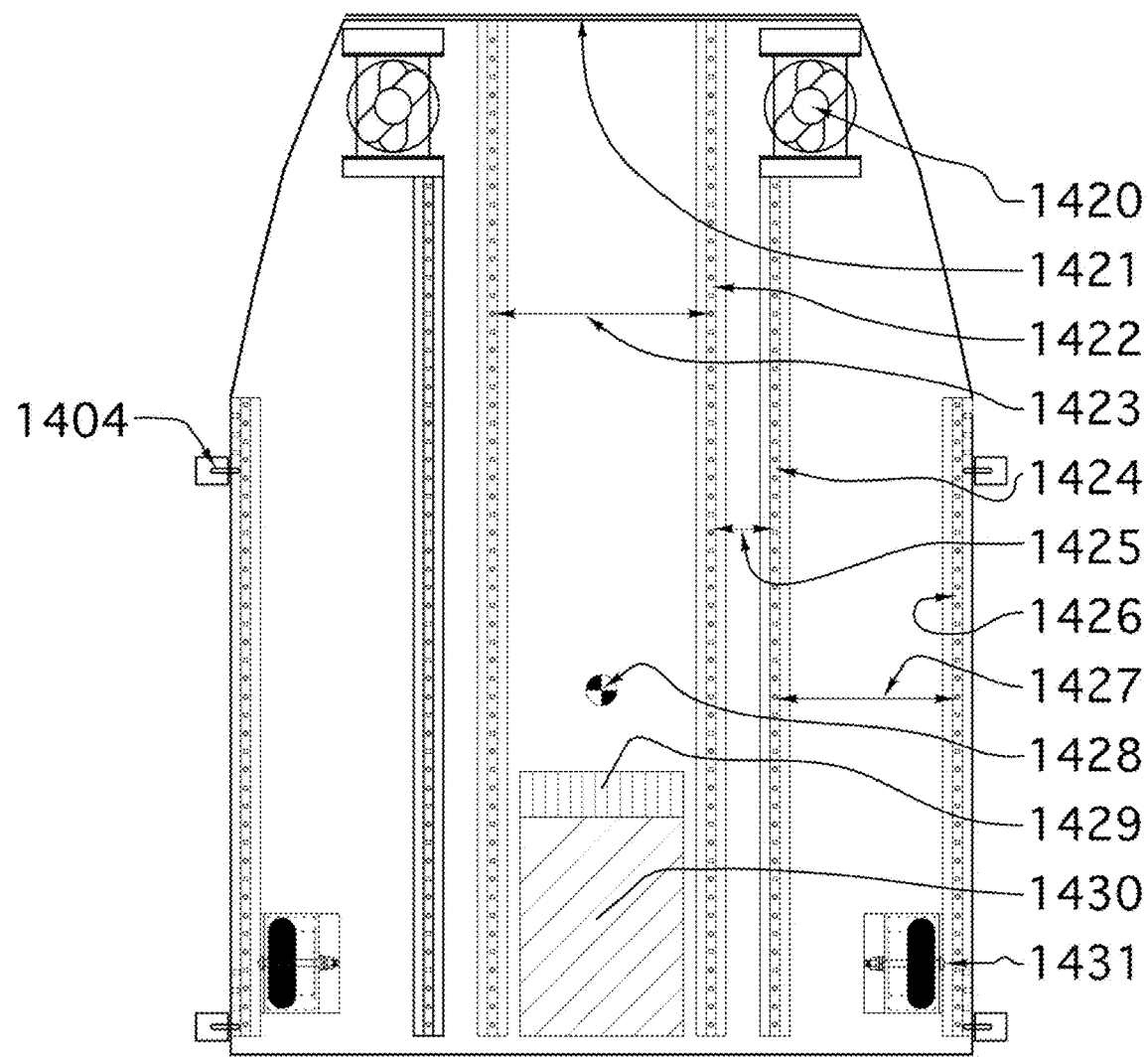
Figure 28:
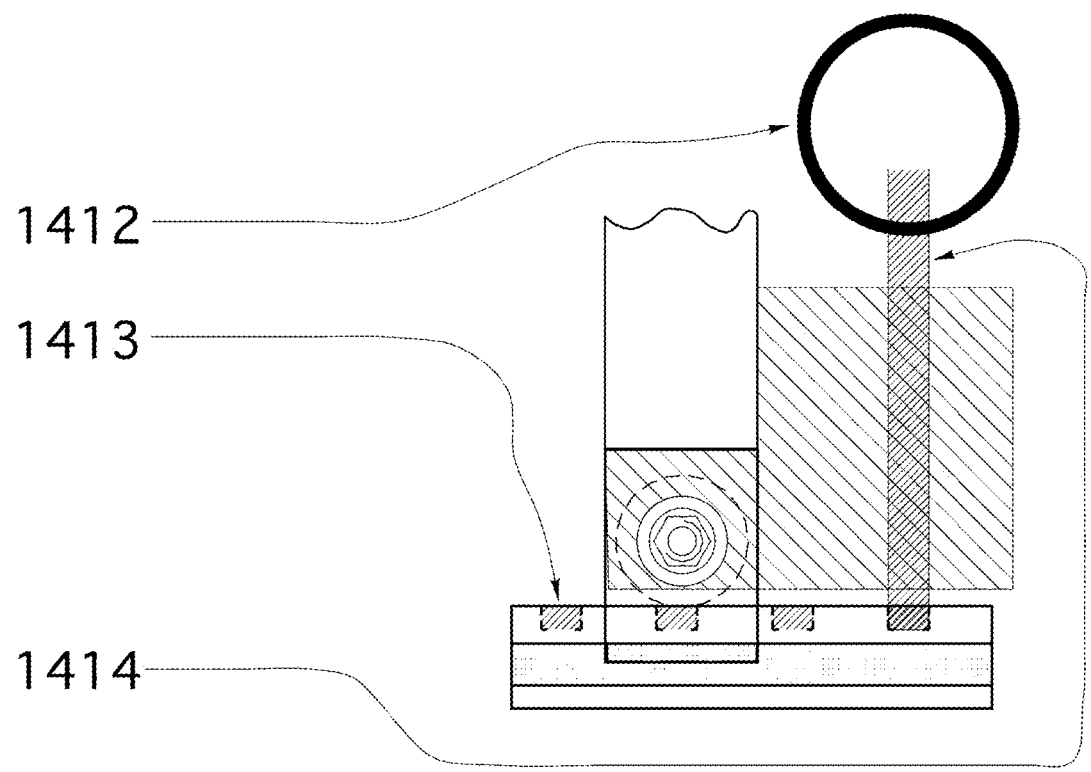

FIGS. 25, 26, 27 and 28 depict a standard embodiment of the Electric Payload Cart (EPC) and its details. The EPC is an important component to this invention. It is the device that enables the very short turnaround time (TAT) for loading and unloading SkyQarts at the docks of the QUAD system. With its standard embodiment of the seat-latching rails and latching system, each EPC can provide attachments with which to pre-load various types of payload and then can be autonomously positioned on the dock surface in a position close by to where the next SkyQart will dock and open its rear hatch. Once the SkyQart's rear hatch is fully open, the EPC can autonomously and rapidly roll into the SkyQart's cabin and be automatically pin-latched securely to its interior structure. Once so latched, the rear hatch is closed and the SkyQart is ready for departure. In FIG. 25, reference number 1400 points to a frontal view of the EPC's port rear wheel housing, which supports the axle bolt and encloses both the rear tire and its wheelmotor. Reference number 1401 points to a frontal view that shows the cross-section of the EPC's port outboard seat-latching track. It will be seen that there are a total of six separate but parallel seat latching tracks on the top surface of the EPC. Reference number 1402 points to a frontal view of one of the 6.86 mm diameter receptacle holes in the side of the surface deck of the EPC. The EPC has two separate sets of four identical holes arranged in a linear array with equal spacing along each of its sidewalls. Each of these four receptacle holes are 12.7 mm deep and they are spaced 25.4 mm apart. These holes serve as receptacles for the four, separate, solenoid-operated latching pins that fixate the sides of the EPC to the interior of the AFP and to the surface deck of the RDC. Reference number 1403 points to a frontal view of the bottom edge of the port rear wheelmotor housing. In FIG. 27, reference number 1404 points to a top view of the 6.35 mm diameter latching pin that is inside the latching solenoid on the port side of the EPC. There are a total of four identical pins and solenoids shown in FIG. 27. FIG. 26 depicts one embodiment of a payload-holding device. Reference number 1405 points to a frontal view of the strut of such a payload-holding device. This type of strut may be part of any of a variety of payload-holding devices, including a seat, a cargo bin, a latching rack, etc. This strut is seen to contain a tiny roller and to terminate in a claw shape that wraps around the rail of the seat-latching track below it. Reference number 1406 points to a frontal view of the edge of a rectangular block-like body of the solenoid whose vertical pin latches the payload-holding device to the rail of the seat-latching track. Reference number 1407 points to a frontal view of the tiny roller that is enclosed in the terminal claw shape of the strut shown as reference number 1405. This tiny roller helps to ease movement of payload-holding devices along the seat latching tracks when they are re-positioned in order to adjust the center of gravity of a payload. Reference number 1408 points to the hexagonal head bolt that serves as the axle for the tiny roller that is reference number 1407. Reference number 1409 points to a frontal view of the crosshatched outline of the 6.86 mm diameter vertical hole in the centerline of the rail of the seat-latching track. Reference number 1410 points to a frontal view of the lateral edge of the seat-latching track, showing the outline of its shape including its central rail. Reference number 1411 points to a side view of the hexagonal nut that secures the bolt that is reference number 1408, into position and allows it to compress the bushing that is reference number 1415 for the tiny roller. In FIG. 28, reference number 1412 points to a side view of the pull-ring that can be used to manually disengage the normally-extended solenoid latching pin. This pull ring, when pulled to disengage, can be latched into that disengaged position. Reference number 1413 in FIG. 28 points to a side view of one of the many 6.86 mm holes in the top of the central rail of the seat-latching track. Reference number 1414 points to a side view of the vertical solenoid latching pin that secures the payload-holding device to the seat-latching track. Reference number 1415 points to a side view of the inner surface of the hollow shaft bushing for the tiny roller. In FIG. 25, reference number 1416 points to a frontal view of the bottom of the starboard rear tire of the EPC. Reference number 1417 points to a frontal view of the bottom surface of the floorboard of the EPC. Reference number 1418 points to a frontal view of the inner seat-latching track, which extends the full length of the EPC. Reference number 1419 points to a frontal view of the battery pack of the EPC. In FIG. 27, reference number 1420 points to a top view of the swivel axis of the right or starboard front castoring wheel. There is an identical left or port front castoring wheel shown in FIG. 27. Reference number 1421 points to a top view of the front edge of the floorboard of the EPC. Reference number 1422 points to a top view of the centerline rail of the starboard inner seat-latching track. Reference number 1423 points to a double arrow that denotes the 30.5 cm center-to-center distance from the starboard inner seat-latching track to the port inner seat-latching track. Reference number 1424 points to a top view of the centerline rail of the starboard middle seat-latching track. Reference number 1425 points to a double arrow that denotes the 8.9 cm center-to-center distance from the starboard inner seat-latching track to the starboard middle seat-latching track. Reference number 1426 points to a top view of the centerline rail of the starboard outer seat-latching track. Reference number 1427 points to a double arrow that denotes the 25.4 cm center-to-center distance from the starboard middle seat-latching track to the starboard outer seat-latching track. Reference number 1428 points to a top view of the center of the 228.2 cm arm length from the e.g. datum at the nose of the AFP, which is the normal arm length at which the seated crew weight applies when the EPC is pin-latched, as shown in FIG. 27, at the rear-most of its four latching pin holes. Reference number 1429 points to a top view of the navigation module that sits atop the rear portion of the floorboard of the EPC. Reference number 1430 points to a top view of the battery pack of the EPC. Reference number 1431 points to a top view of the right starboard axle bolt of the EPC. Alternative embodiments of the EPC could be used in the QUAD system, provided that their size and function are compatible with the operation of the other vehicles in the system.

The EPC Payloads

Figure 29:
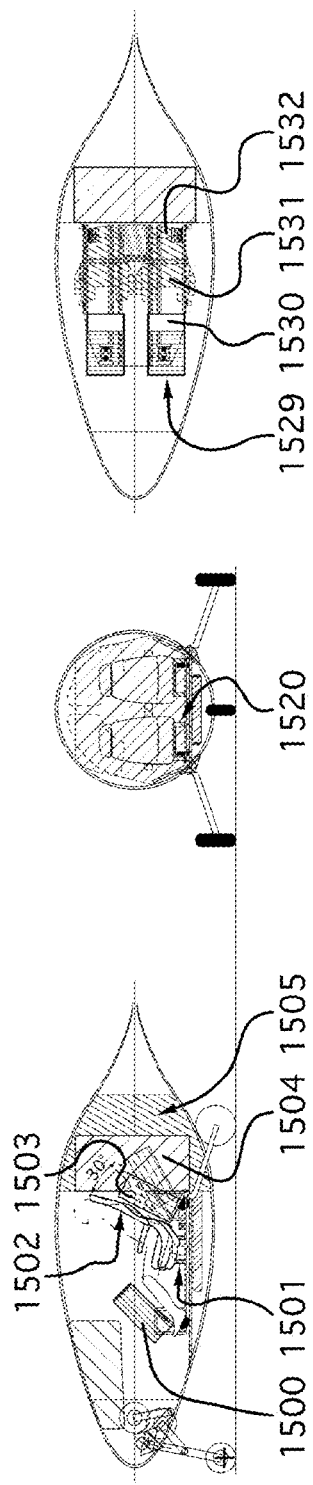
FIGS. 29, 30, 31 and 32 depict various types of payloads loaded into the SkyQart AFP
Figure 30:
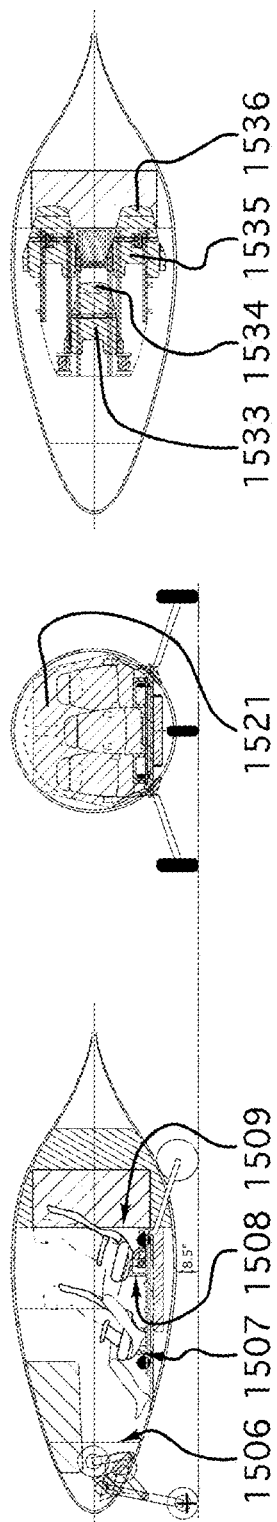
Figure 31:
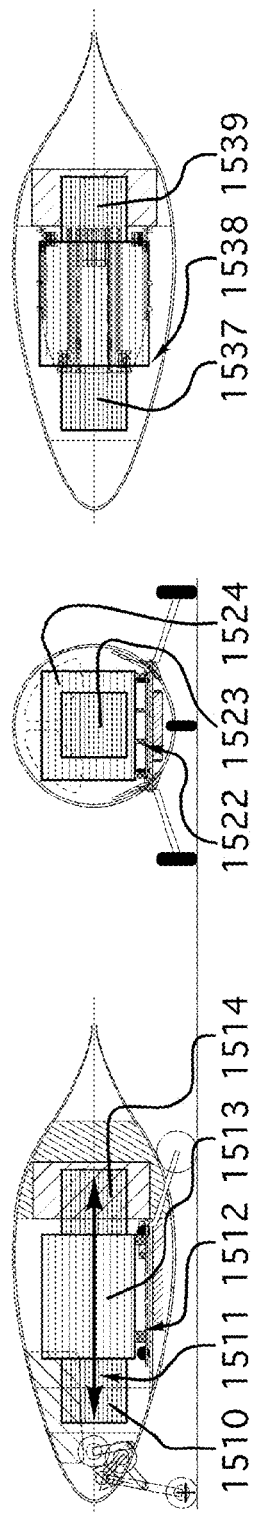
Figure 32:
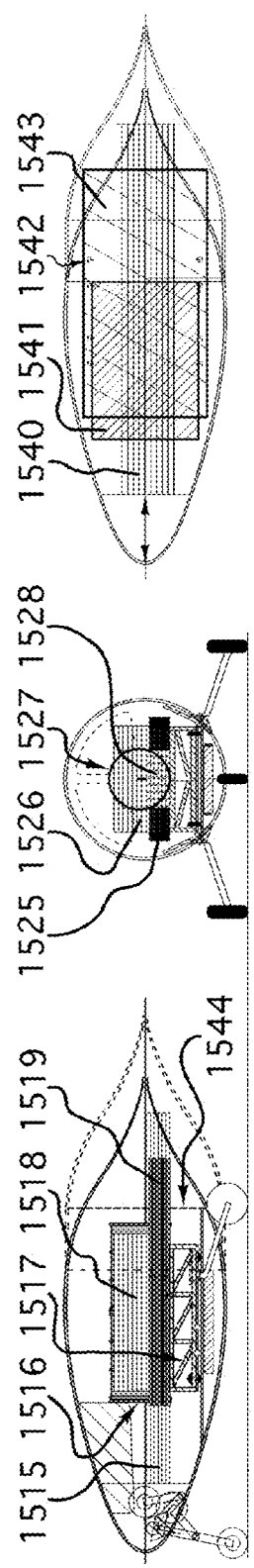

FIGS. 29, 30, 31 and 32 depict some of the common types of payload that the standard EPC can carry, showing 3-view layered drawings of how such payloads would fit onto the EPC and inside the AFP of the SkyQart. These common payloads include passengers, baggage, cargo and building materials. These drawings are sample embodiments and do not constrain other possible payloads or loading geometries from being carried in the QUAD system. The cargo axisymmetric fuselage pod is shown in FIG. 32, and its use requires that the EPC be pin-latched into the SkyQart at a position nominally 25.4 cm further aft from the standard solenoid latching pin locations. In FIG. 27, reference number 1500 points to a side view of the forward baggage compartment in a two-seat EPC/SkyQart configuration. Reference number 1501 points to a side view of the forward surface of the passenger seat support bracket, which pin-latches to the seat latching tracks of the EPC. Reference number 1502 points to a side view of the seatback of the passenger seat in its normal non-reclined position. This same seatback is also shown in side view as a dotted outline in FIG. 27 as one that is tilted back 30°, which is its fully reclined position. Reference number 1503 points to a side view of the rear baggage compartment in its normal non-reclined position. The outline of this same baggage compartment is also shown tilted back 34°, as it would be if the seatback were fully reclined. Reference number 1504 points to a side view of the space, shown in coarse crosshatch, normally occupied by removable flotation module #1. Reference number 1505 points to a side view of the space, shown in finer crosshatch and extending 96.5 cm aft of the rear hatchline, normally occupied by removable flotation module #2. In FIG. 28, reference number 1506 points to a side view of the aft face of the nosegear bulkhead at FS 68.6 cm, where the diameter of the AFP is 87.8 cm. Reference number 1507 points to a side view of the forward portion of the front seat support bracket, shown in crosshatch, as would occur in the case of an EPC with a three-seat payload. Reference number 1508 points to a side view of the forward portion of the rear seat support bracket, shown in crosshatch, as would occur in the case of an EPC with a three-seat payload. Reference number 1509 points to a side view of the rear hatchline where the rear hatch opens and separates from the forward portion of the AFP. In FIG. 29, reference number 1510 points to a side view of the 63.5 cm L×63.5 cm H×63.5 cm W forward cargo extension bin, shown in horizontal crosshatch at its nominal position cantilevered from the front side of the main cargo box. The interior space of reference number 1510 extension cargo bin is contiguous with that of reference numbers 1513 and 1514. Reference number 1511 points to a double-ended arrow that depicts the 2.44 m dimension that exists inside the three combined cargo bins (reference numbers 1510, 1513 and 1514) to enable them together to carry packages up to 2.44 m in length. Reference number 1512 points to a side view of the aft surface of one of the large central Main Cargo Bin's forward support brackets, shown in fine horizontal crosshatch. Reference number 1512 is one of four such support brackets, two forward and two rear, each of which pin-latches to the seat latching tracks of the EPC to secure the cargo bin(s) to it. Reference number 1513 points to a side view of the nominal 121.9 cm L×91.44 cm H×106.7 cm W central Main Cargo Bin, shown in medium-sized grain horizontal crosshatch. Reference number 1514 points to a side view of the 63.5 cm L×63.5 cm H×63.5 cm W rear extension cargo bin, shown in horizontal crosshatch at its nominal position cantilevered from the rear side of the main cargo box. The interior of reference number 1514 is contiguous with that of reference numbers 1510 and 1514. In FIG. 32, reference number 1515 points to a side view of the forward portion of one of the two six-high stacks of 2×12 lumber boards. Each such board is 3.66 m L×3.81 cm H×28.6 cm W and there are a total of twelve such boards in the stacked payload depicted in FIG. 32. The leading edge of these boards is located at FS 68.6 cm, which is reference number 1506. The trailing edge of these boards is at FS 434.3 cm, where the inside diameter of the cargo axisymmetric fuselage pod is 78.44 cm and that trailing edge is shown to fit inside the extended cargo axisymmetric fuselage pod, which is nominally 61.0 cm longer than the standard AFP. In the standard sized AFP, a payload of these same twelve boards would be limited to a board length of 3.05 m. Reference number 1516 points to a side view of the top or lid of the forward-most of the two 208.2 liter (55-gallon) drums that are shown, with fine vertical crosshatch, laying end-to-end on their sides as sample payload in a standard sized AFP. Each such drum is 87.6 cm long and both are shown to be resting atop reference number 1517, which points to the payload latching rack that is pin-latched to the top surface of the EPC and which is a truss-braced structure shown in diagonal crosshatch. Any of the several outsized payloads depicted in FIG. 32 can be attached to this latching rack. Reference number 1518 points to a side view of a stack of commercial solar panels, positioned atop the reference number 1517 latching rack, that comprises a 54.9 cm tall stack of twelve such panels, each panel of which is 155.7 cm L×4.6 cm H×104.65 cm W. The stack shown as reference number 1518 fits fully inside the standard sized AFP. Reference number 1519 points to a side view of a stack of seven sheets of plywood, each of which is 2.44 m L×2.86 cm H×1.22 m W shown with fine horizontal grain crosshatch and sitting atop the latching rack with the stack's trailing edge fitting inside of the dashed outline of the cargo axisymmetric fuselage pod. The leading edge of this stack of plywood is at FS 145.5 cm where the inside diameter of the AFP is 131.45 cm. Its trailing edge is at FS 389.23 cm where the inside diameter of the cargo axisymmetric fuselage pod is 131.45 cm. In FIG. 29, reference number 1520 points to a frontal view of the inner edge of the seat support bracket for the two-seat version of the SkyQart, showing its location and shape. In FIG. 30, reference number 1521 points to a frontal view of the diagonally crosshatched area that represents flotation module #1, showing the extent of the space that it occupies in the forward portion of the rear hatch of the AFP. In FIG. 31, Reference number 1522 points to a frontal view of the outer edge of one of the two forward support brackets of the large central Main Cargo Bin. Each of the two forward support brackets pin-latch onto the innermost seat latching tracks of the EPC, which tracks enable adjustment of the latching position of the cargo bin support brackets as may be needed to achieve a correct center of gravity for flight. Reference number 1523 points to a frontal view that shows the axial location inside the AFP of the extension cargo bins, which are depicted in horizontal crosshatch. Reference number 1524 points to a frontal view of the large central Main Cargo Bin to show its size of 106.7 cm W×91.44 cm H, showing its axial location inside the AFP. In FIG. 32, reference number 1525 points to a frontal view of the stack of seven sheets of plywood, each of which is 28.58 mm thick, as the stack, shown in finely grained horizontal crosshatch, sits atop the latching rack on the EPC inside the AFP. Reference number 1526 points to a frontal view of the stack of twelve solar panels, each of which is 45.72 mm thick, as that stack, shown in coarse horizontal crosshatch, sits atop the latching rack on the EPC inside the AFP. Reference number 1527 points to a frontal view of the circular outline depicting the end-on view of the size and position of the 208.2 liter (55-gallon) drum payload as it sits atop the latching rack on the EPC. Reference number 1528 points to a frontal view of the size and position of the two stacks of 2×12 lumber, with the side-by-side stacks each containing six boards and the stacks tied or lashed onto the top of the latching rack on the EPC. In the top views that follow, items are shown as transparent in order to depict the details of the underlying EPC. In FIG. 29, reference number 1529 points to a top view showing the forward edge of the front baggage compartment and its projected size and location in the two-seat version of the EPC in the AFP. Reference number 1530 points to a top view of the 34.93 cm wide computer tablet that comprises the lid for that front baggage compartment. Reference number 1531 points to a top view of the size and position of the seat-bottom of the port side seat, shown in diagonal crosshatch in a two-seat version of the EPC in the AFP. Reference number 1532 points to a top view of the size and position of the headrest for the port side seat, shown in diagonal crosshatch, in a two-seat version of the EPC in the AFP. In FIG. 30, reference number 1533 points to a top view of the size and position of the midline front seat bottom, shown in diagonal crosshatch in a three-seat version of the EPC in the AFP. Reference number 1534 points to a top view of the size and position of the headrest for the midline front seat, shown in diagonal crosshatch in a three-seat version of the EPC in the AFP. Reference number 1535 points to a top view of the size and position of the seat bottom of the port side seat, shown in diagonal crosshatch in a three-seat version of the EPC in the AFP. Reference number 1536 points to a top view of the size and position of the headrest for the port side seat, shown in diagonal crosshatch in a three-seat version of the EPC in the AFP. It can be seen that this headrest extends aft of the rear hatchline. In FIG. 31, reference number 1537 points to a top view of the size and position of the front extension cargo bin, shown in medium horizontal crosshatch, with this bin attached to the front of the large central Main Cargo Bin. Reference number 1538 points to a top view of the forward port side corner of the large central Main Cargo Bin, shown as transparent and in coarse horizontal crosshatch on top of the EPC and revealing its size and position. Reference number 1539 points to a top view of the size and position of the rear extension cargo bin, shown in medium horizontal crosshatch, with this bin attached to the rear of the large central Main Cargo Bin and fitting inside the space in the rear hatch vacated by flotation module #1. In FIG. 32, reference number 1540 shows a top view of the forward portion of the aforementioned stack of lumber, shown in tine grain and showing its size and position inside the cargo axisymmetric fuselage pod. Reference number 1541 shows a top view of the size and position of the stack of twelve solar panels shown in diagonal crosshatch mounted on the EPC, wherein each such panel is 155.7 cm L×104.65 cm W. Reference number 1542 shows a top view of the edge of the housing of the right hand solenoid-actuated latching pin that is fixed to the structure of the extension module for the cargo axisymmetric fuselage pod. Reference number 1542 has a matching mate that is the port side solenoid latching pin that is symmetrically placed on the opposite side of the extension module. Reference number 1543 points to a top view of the size and position of the stack of plywood, shown in coarse diagonal crosshatch, as it would be lashed inside the cargo axisymmetric fuselage pod. For clarity, the two 208.2-liter (55-gallon) drums as payload are deliberately omitted from this top view drawing. Reference number 1544 points to a side view of the displaced rear hatchline, shown as a dashed vertical line, that is the trailing edge of the 61.0 cm L cylindrical extension of the rear hatch of the AFP that creates the cargo axisymmetric fuselage pod. Reference number 1545 points to a side view of the aft solenoid pin actuator that is standard equipment on the AFP extension piece. This aft solenoid pin actuator is located such that it is 77.47 cm aft of the reference number 1546, which points to the intermediate solenoid pin actuator that is standard equipment on each AFP and that is located 25.4 cm aft of the forward most solenoid pin actuator.

Robotic Delivery Cart (RDC)

Figure 33:
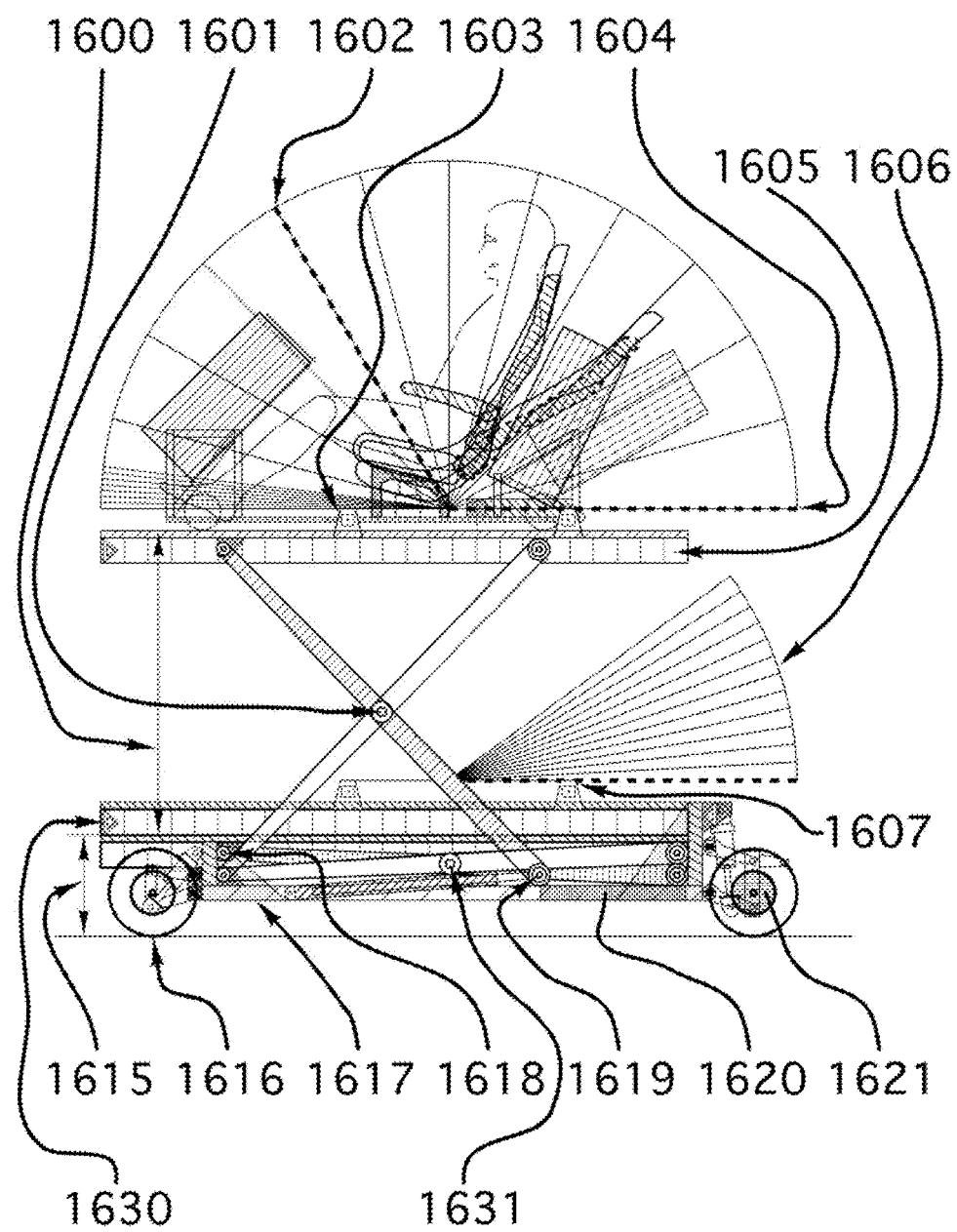
FIG. 33 shows a side view of an exemplary autonomous robotic delivery cart (RDC), its accessories and its fit with an EPC
Figure 34:
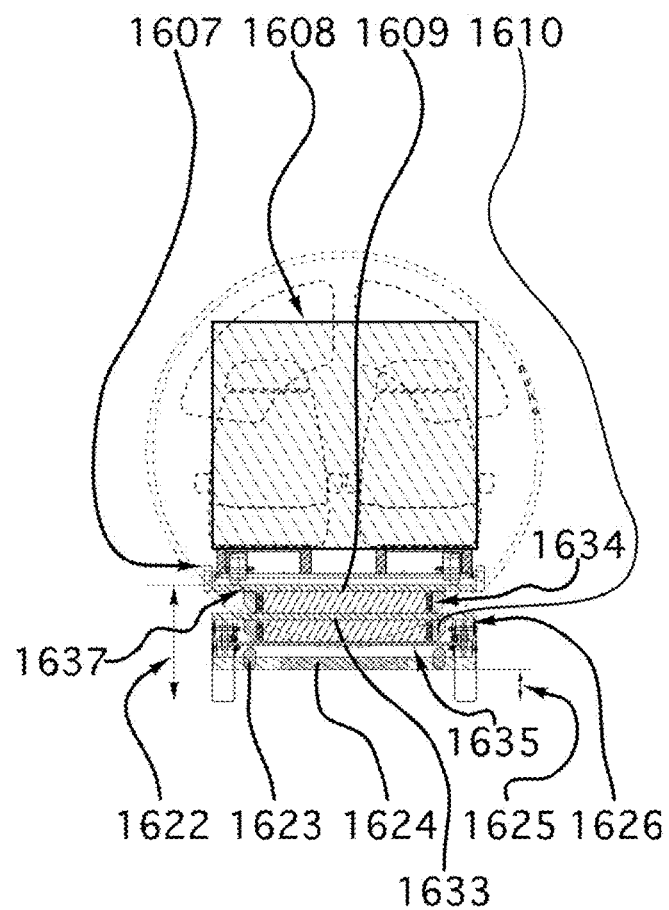
FIG. 34 shows a frontal view of an exemplary autonomous robotic delivery cart (RDC), its accessories and its fit with an EPC
Figure 35:
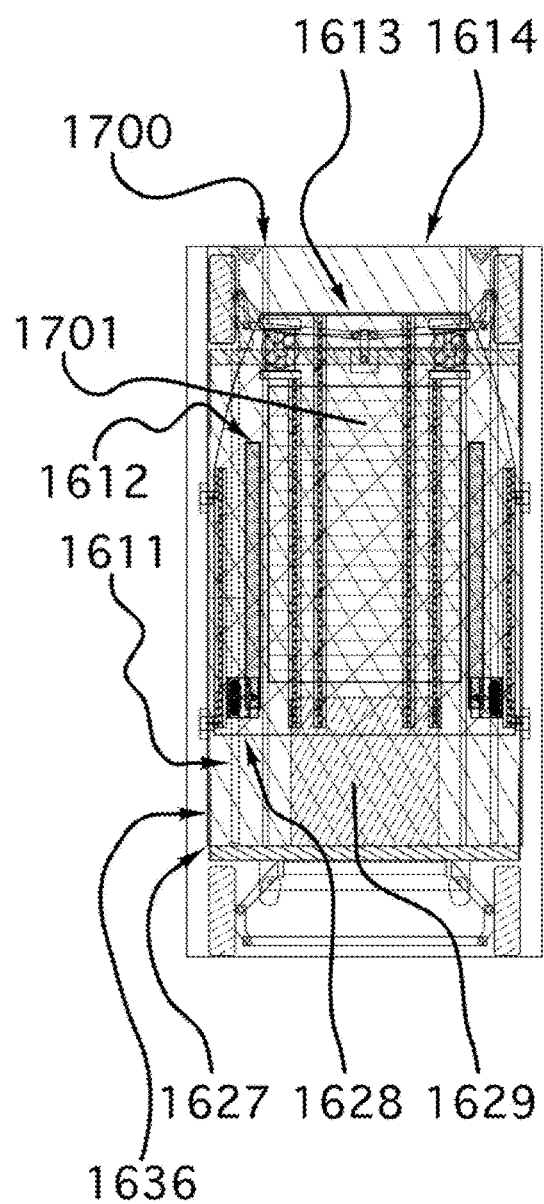
FIG. 35 shows a top view of an exemplary autonomous robotic delivery cart (RDC), its accessories and its fit with an EPC
Figure 36:
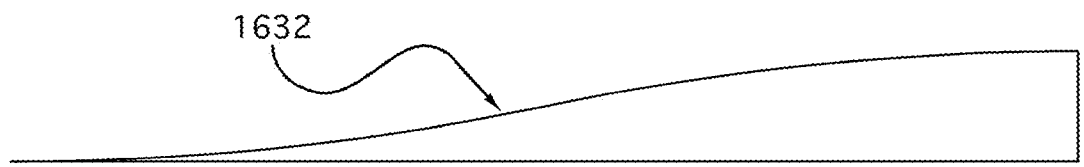
FIG. 36 shows a side view of a ramp for off-loading an EPC from and RDC

FIGS. 33, 34, 35 and 36 depict a standard embodiment of the Robotic Delivery Cart (RDC), an important component to this invention. The RDC is an autonomous electric-powered cart that qualifies as a 40.2 km/hr Neighborhood Electric Vehicle and that is able to use residential streets and bike lanes to carry EPCs with their payload to neighborhood destination doorsteps. It has its own solenoid latching pins that can securely pin-latch to a payload-laden EPC. It has a scissor jack below the deck surface of the RDC that allows it to adjust the height of its surface from very low to as high as most commercial truck docks. For payloads consisting of two passengers, the RDC can be fitted with a retractable rain-roof. FIGS. 33, 34 and 35 show three views of the RDC, with transparent views to reveal underlying components explained where necessary. FIG. 34 shows the frontal view of the RDC, where suspension components are omitted for clarity in depicting the scissor jack. In FIG. 33, reference number 1600 points to a double arrow that depicts the 106.7 cm dimension that is the full vertical range of travel of the surface deck of the RDC achievable with its on-board scissor jack. The tips of this double arrow point to the top surface of the RDC's surface deck in both its fully lifted and fully lowered positions. Reference number 1601 points to a side view of the center of the hinge bolt that joins the two arms of the scissor jack and comprises its central pivot axis. This hinge bolt is shown in its position with the scissor jack in its fully extended up position that lifts the surface deck of the RDC to a 142.24 cm height above ground. As shown, each arm of the scissor jack is 159.18 cm long between centers of its end axles. Reference number 1602 points to the end of a 1.22 m dashed line that depicts a side view of the aft edge of the retractable windscreen/rain canopy with the canopy in its forward windscreen position. The transparent flexible plastic sheeting that comprises the surfaces of this windscreen/rain canopy can collapse into accordion-like folds. In rainy or dusty conditions, this reference number 1602 windscreen/rain canopy can be extended rearward, accordion-like, to provide an arched dome-like covering to fully enclose the passenger-laden EPC. When so extended, the reference number 1602 dashed line moves to and fastens in a horizontal position at the rear of the RDC as shown by reference number 1604 in FIG. 33. Alternatively, to make way for the loading and unloading of an EPC onto the front of the RDC, the bottom of the windscreen/rain canopy may be detached from the front of the RDC and folded, accordion-like, to the rear of the RDC, as shown by reference number 1606. The entire windscreen/rain canopy device attaches to the top of the solenoid mounting blocks on both sides of the RDC's surface deck and can be quickly and easily removed when appropriate. Reference number 1603 points to a side view of the forward edge of the 10.16 cm tall trapezoidal-shaped forward solenoid mounting block that is fastened to the side of the surface deck of the RDC. An identical rear solenoid mounting block is fastened to the side of the surface deck of the RDC at a position 77.47 cm aft of the forward block. These forward and rear solenoid mounting blocks are matched by two identical such blocks that are fastened symmetrically at the same fore-aft locations to the opposite side of the surface deck of the RDC. Reference number 1605 points to a side view of the aft portion of the 8.89 cm H×205.74 cm L battery heavy-duty drawer slide rack, shown in coarse vertical crosshatch, that is fastened to the underside of the surface deck of the RDC. This rack stiffens the surface deck and provides a sturdy set of extensible battery drawer slides for loading and unloading spare SBPs onto the RDC. In FIG. 34, reference number 1607 points to a frontal view of the upper outer corner of the port side solenoid mounting block showing its attachment to the side of the surface deck of the RDC. Reference number 1608 points to a frontal view of a diagonally crosshatched outline of the Main Cargo Bin in its position mounted to the surface of the EPC on four separate 10.16 cm tall latching legs. Showing through this crosshatched outline of the Main Cargo Bin are the dashed lines depicting the outline of two seats as would be carried on an EPC as an alternative payload to the Main Cargo Bin. Reference number 1609 points to a frontal view of the interface of the underside of the RDC's surface deck with the 8.89 cm H×66.04 cm W space that is bordered on either side by heavy duty drawer slides and is normally dedicated to hauling SBPs. Reference number 1609 is shown with the RDC's surface deck positioned such that its top surface is at its standard docking height of 47 cm above ground level. Just below this interface is depicted the alternative, fully lowered position for this interface which is labeled as reference number 1633. When the 1633 interface of the RDC's surface deck and the SBP space below it are in this alternative, fully lowered position, the RDC's surface deck is just 35.56 cm above ground level. This lowered position provides for easy off-loading of EPCs onto a specialized ramp such as the one depicted as reference number 1632. This height is the minimum height attainable for the RDC's surface deck. It is from this 35.56 cm height that the specialized 1.22 m W standard off-loading ramp, reference number 1632, can be used to off-load an EPC onto street level. Reference number 1610 points to a frontal view of a finely crosshatched outline of one of the sheetmetal gussets that stiffens the longitudinal right angle sheetmetal flange that carries the heavy-duty drawer slide on one side of the RDC. These drawer slides are of exactly the same dimensions as those used to carry the SBP inside the SkyQart. Reference number 1634 points to one of these longitudinal right angle sheetmetal flanges, showing its size and position underneath the surface deck of the RDC. Reference number 1611 points to the side of a top view of the shallow tire groove that guides the tires of the EPC on the port side of the surface deck of the RDC. Reference number 1612 points to the forward end of a finely diagonally crosshatched outline that represents the location of the left-hand 91 cm long linear actuator for the scissor jack of the RDC. This outline is shown with its length commensurate with it being fully retracted, as occurs when the scissor jack is raised to its maximum height. An identical linear actuator is shown symmetrically located on the starboard side of the RDC and these two actuators work in tandem to raise and lower the surface deck of the RDC by pulling or pushing on the lower scissor blade axles at the rear of the scissor blades. These blade axles, whose diameter is 12.7 mm, each holds a pair of 7.6 cm diameter by 3.18 cm wide cast polyurethane wheels, each of which has a wheel capacity is 272.2 kg. Reference number 1613 points to a top view of the forward edge of the trapezoidal shaped surface deck of an EPC, shown in coarse diagonal crosshatch, as pin-latched into its preferred position atop the RDC. Reference number 1614 points to a top view of the forward edge of the diagonally crosshatched surface deck of the RDC, showing it to extend over the top of the low-profile front suspension components of the RDC. Reference number 1700 points to the forward edge of a top (transparent) view of the 19.05 mm wide longitudinal heavy-duty drawer slide that is fastened under the port side of the RDC's surface deck. An identical drawer slide is shown symmetrically fastened under the starboard side of the RDC's surface deck. Reference number 1701 points to the middle portion of a top transparent view of the horizontally crosshatched outline of a standard battery pack, whose dimensions are 66.04 cm W×101.6 cm L, and it is shown in the position in which it is typically mounted onto the RDC's drawer slides. In FIG. 33, reference number 1615 points to a double arrow whose 35.56 cm dimension indicates the height above street level of the top of the surface deck of the RDC when in its fully lowered position. Reference number 1616 points to a side view of the bottom of the front tire of the RDC. Reference number 1617 points to a side view of the bottom edge of the stippled large triangular front gusset that reinforces the attachment of the lower beam of the RDC to its front suspension pillar. Reference number 1618 points to a side view of the center of the upper front bearing of the scissor jack, which bearing is fastened by a gusset to the undersurface of the surface deck of the RDC and provides a pivot for one of the scissor jack's arms. Reference number 1619 points to a side view of the center of the rear cross-bolt of the ram of the linear actuator that actuates the scissor jack. Reference number 1620 points to the center of a side transparent view of the finely vertically hatched 5.08 cm H×50.80 cm L×50.80 cm W nominal battery pack for the RDC. Reference number 1621 points to a side view of the hub wheelmotor of one of the rear wheels of the RDC. In FIG. 34, reference number 1622 points to a double arrow that depicts the 47 cm height above ground level of the surface deck of the RDC when positioned for docking at a SkyNest. Reference number 1623 points to a frontal view of the position of the port side linear actuator on the floor of the RDC. An identical starboard linear actuator is depicted in the symmetrical position on the starboard side of the floor of the RDC. Reference number 1624 points to a transparent frontal view of the RDC's 5.08 cm H×50.80 cm W swappable battery pack in its position submerged into the bottom frame of the RDC.

Figure 38:
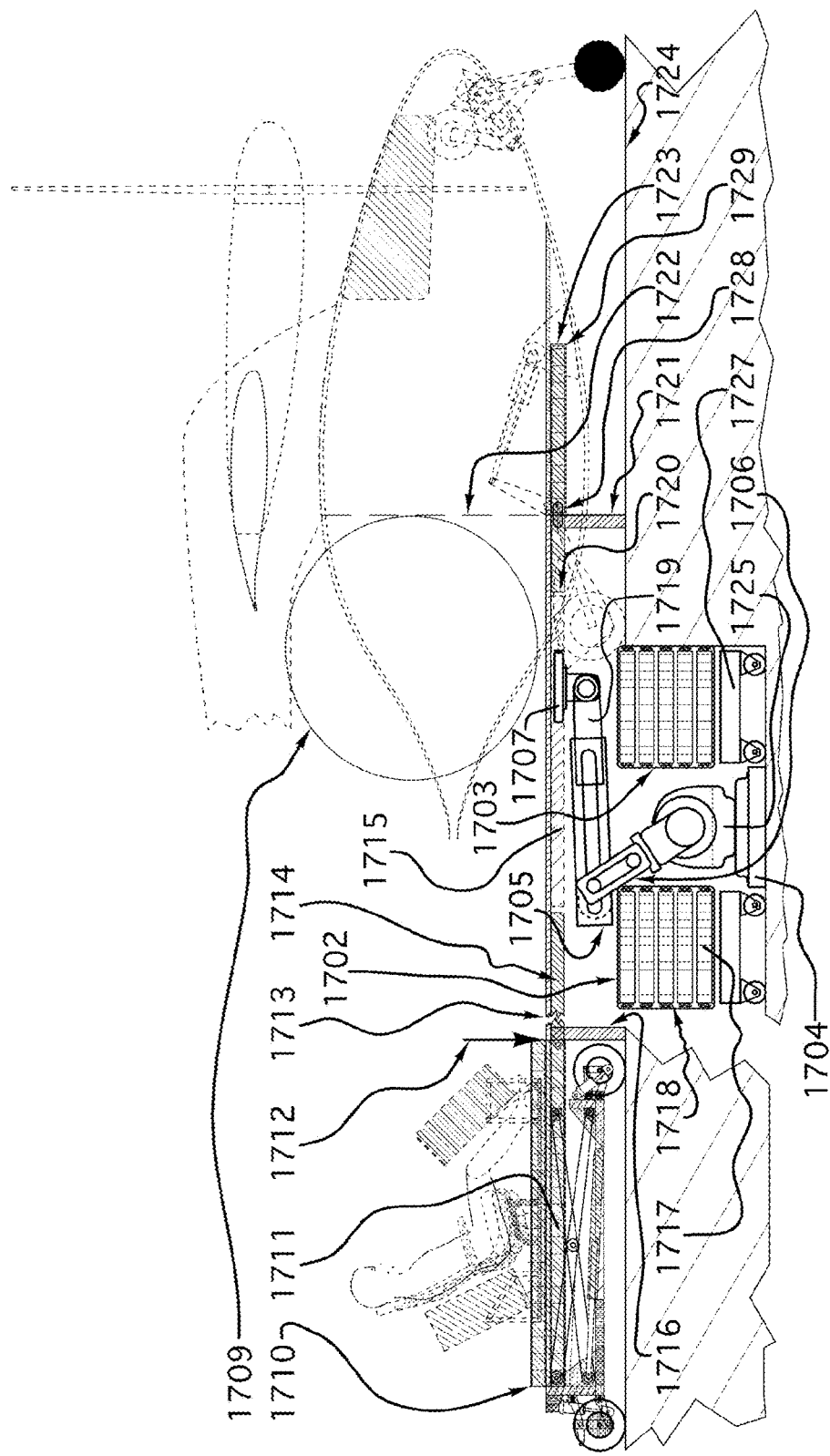
FIG. 38 shows a side view of a SkyQart and an RDC configured as docked at a SkyNest dock and depicting the typical size, fit and position of the equipment at a SkyNest dock service bay

Reference number 1625 points to a double arrow that indicates the 12.70 cm dimension that is the required ground clearance of the RDC. Reference number 1626 points to a frontal view of the upper outer rear wheel of the starboard arm of the scissor jack. Note that this wheel is one of a pair that are mounted on either side of the rear end of the starboard scissor jack arm and that they share a common axle bolt. Two more identical wheels are symmetrically mounted on each side of the rear end of the port side scissor jack arm, sharing a common axle bolt. An identical pair of wheels are mounted on either side of the rear ends of both the left and right lower scissor jack arms. Reference number 1627 points to a top view of the diagonally crosshatched port side rear corner of the surface deck of the RDC. Reference number 1628 points to a top view of the trailing edge of the EPC shown pin-latched in its normal position atop the RDC. Reference number 1629 points to a top view of the finely diagonally hatched 5.08 cm H×50.80 cm L×50.80 cm W battery pack of the RDC. Reference number 1630 points to a side view of the recessed front headlight of the RDC. Reference number 1630 also depicts the position on the RDC where are mounted its DC fast-charging port and a suite of miniaturized equipment required for street use including headlight, turn signal, small horn, forward looking camera, infrared sensors and LIDAR. These are all mounted outboard of the central space that is used for loading SBPs. A similar suite of required equipment including turn signals and brake lights is mounted on the rear of the RDC. Reference number 1631 points to a side view of the central pivot axis of the scissor jack (reference number 1601) except now shown in its fully lowered position. Reference number 1632 points to a side view of the 35.56 cm high specially contoured standard off-loading ramp for the RDC. Reference number 1633 points to the interface of the RDC's surface deck with the below deck space for an SBP, when positioned in its fully lowered position. Reference number 1635 points to a frontal view of the finely diagonally crosshatched underslung transverse steel rod that serves as a brace between the central hinges of the left and right scissor jack blades. Reference number 1636 points to a top view of the finely horizontally crosshatched 4.76 mm thick sheetmetal gusset that joints the left or port side rear horizontal and vertical frame members of the RDC. An identical gusset is shown in a symmetrical position on the starboard rear side of the RDC. Reference number 1637 points to one of the two symmetrically placed 6.86 mm diameter latching pin receptacle holes in the forward edge of the RDC's surface deck. These two receptacle holes straddle the midline and are a nominal interoperable 81.28 cm apart. A specialized double-decker variant of the RDC is shown in FIG. 38, and it has been modified to have a second set of heavy-duty drawer slides attached on top of its surface deck. This second set of drawer slides, along with its scissor jack height adjustability, enable this double decker RDC to both on-load spent SBPs and off-load fully charged SBPs, allowing it to serve as a battery pack shuttle. Alternative embodiments of the RDC may be used, including those of different size and capacity, provided that they interoperate with the other vehicles in the QUAD system.

Dock Standards and Battery Swapping Standards

Figure 37:
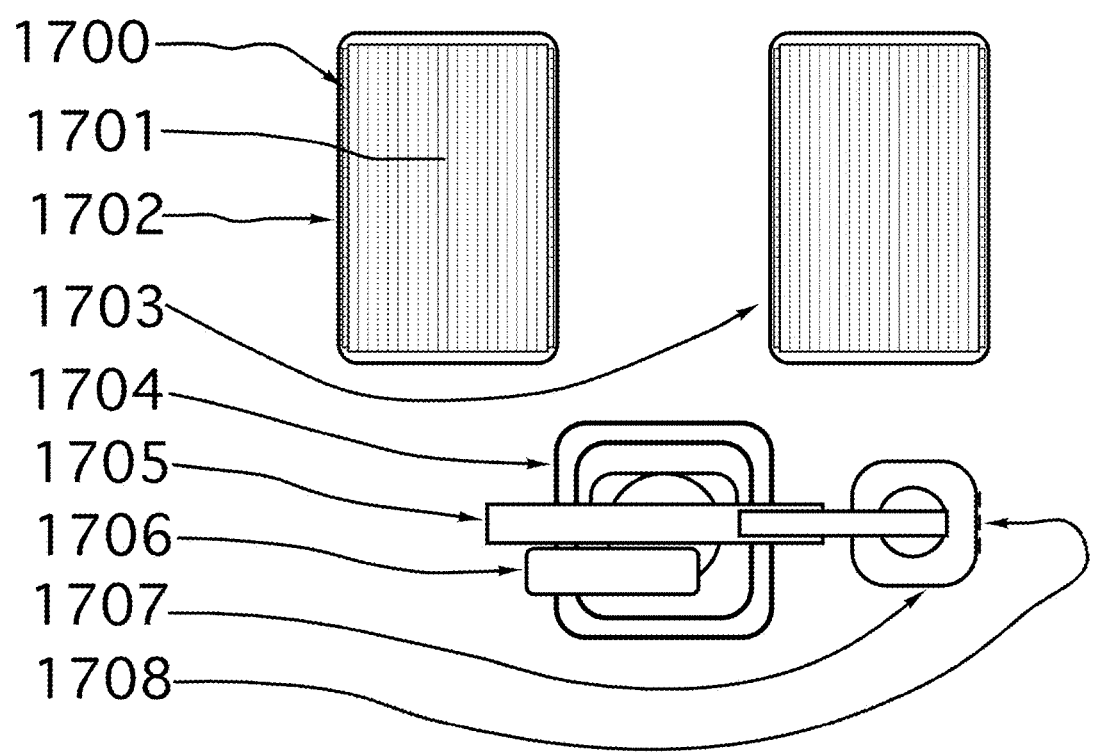
FIG. 37 shows a top view of the typical size and position of the robot arm and battery charging rack in a SkyNest dock service bay

FIGS. 37 and 38 depict the dock standards and battery swapping standards that are two components important to this invention. FIG. 37 shows a top view and FIG. 38 shows a side view of an embodiment of the relevant dock equipment and their positions, with dimensions drawn to scale. Reference number 1700 points to a top view of the SBP's left side heavy-duty drawer slide shown in its location inside of the battery charging rack. It can be seen that there is an identical drawer slide on the right side of the SBP. Reference number 1701 points to a top view of the 66.04 cm W×101.60 cm L SBP as it fits inside the battery charging rack. Reference number 1702 points to a top view of the outer case enclosure of the left-hand battery charging rack. It can be seen that there is an identical right-hand battery charging rack shown in top view as reference number 1703, aligned symmetrically with reference number 1702 in the upper portion of FIG. 37. The top views of the battery charging racks that are labeled as reference numbers 1702 and 1703 are shown in their positions relative to each other and to the central robot arm. Straight below in FIG. 38 and aligned with the FIG. 37 top view of these battery charging racks 1702 and 1703, is a side view of these racks that shows each battery charging rack with its internal stack of five SBPs. These can be seen as the left and right battery charging racks depicted in the lower portion of FIG. 38, as part of the under-dock equipment at the SkyNest. Reference number 1704 is shown in top view in FIG. 37 and in a side view in FIG. 38. It points to the square base plate of the multi-articulated robot arm. This base plate mounts the robot arm to the floor of the service bay under the dock. In FIG. 37 reference number 1705 points to a top view of the upper large extension arm of the battery swapping robot, while in FIG. 38 it points to a side view of that extension arm. Reference number 1705 is attached to reference number 1706. Reference number 1706 points in FIG. 37 to a top view of the main vertical extension arm of the battery swapping robot, while in FIG. 38 it points to a side view of that vertical extension arm. Reference number 1707 points to a top view of the square plate that serves as the gripping hand of the robot arm. This square plate can grip and move SBPs by using either the small suction cups along its edge, which are labeled as reference number 1708, or by use of its internal electro-magnet's magnetic grip on objects that have ferrous surfaces. Reference number 1709 points to a side view of the nearly circular shape of the opening of the rear hatch of the AFP, shown in its fully opened position to be clear of the dock surface. Reference number 1710 points to a side view of the upper rear corner of the specialized gusseted right-angle sheetmetal flange that is mounted onto the top surface deck of the specially modified double-decker RDC. This gusseted right-angle sheetmetal flange is shown in coarse vertical crosshatch. Except for being mounted upside down, this flange is identical to the one shown in FIG. 34 mounted onto the undersurface of the surface deck of the RDC as reference number 1634. This up-side down flange (1710) is one of a pair of such flanges that are 205.74 cm L×8.89 cm H and these flanges are 66.04 cm apart. Each such flange has centered and securely mounted onto its inner face a full 205.74 cm length of the standard 19.05 mm W×76.2 mm H heavy duty drawer slides that fit the SBP. The stiffness of these sheetmetal flanges is reinforced with a series of sheetmetal gussets, one of which is shown as reference number 1610 in FIG. 34. These upper full-length drawer slides are depicted in FIG. 38 as being 205.74 cm long and are shown in a side view with fine diagonal crosshatch. These upper drawer slides are identical to that shown as reference number 1711, which is a side view of an identical diagonally crosshatched full-length SBP drawer slide that is attached to and centered on the inner face of the lower gusseted right angle sheetmetal flange that is attached to the underside of the standard RDC's surface deck. This RDC is shown docked at the street-side edge of the SkyNest dock and the tires of the RDC can be seen to be resting on the street surface. Reference number 1712 points to a downward vertical arrow whose tip indicates the exact plane of the interface between the street-side edge of the SkyNest dock and the front surface of the RDC that is docked there. At the tip of arrow 1712, it can be seen that the top surface of the deck of the RDC is the standard 47 cm above street level and this is exactly the height that makes it flushly aligned with the top surface of the street-side edge of the SkyNest dock. Reference number 1713 points to a jagged edge of a gap shown in the SkyNest dock surface, which indicates an imaginary separation distance between the dock portion overlying the service bay for battery swapping and the dock portion that borders on the street level where RDCs await loading. This gap is actually 4.36 m in order to provide the 7.47 m standard dock width at all SkyNests for the bi-directional movement of passengers that preserves social distancing, and for bidirectional movements of EPCs. Reference number 1714 points to a side view of the segment of heavy-duty battery drawer slides under the dock surface on the street side of the service bay. The purpose of this segment and that opposite drawer slide segment depicted by reference number 1720 on the other side of the service bay, is to leave a gap in the drawer slides above the robot arm so that the arm can pull and fully remove SBPs from the under-dock drawer slides. By so removing SBPs, the robot arm can more quickly move them in 3D into and out of the slots in the battery charging rack and the SkyQart. Reference number 1715 points to a side view of a dashed outline of a 184.15 cm long segment of drawer slide that is normally absent but that can be inserted as an accessory into the gaps between the segments in the under-dock drawer slides so as to effectively create a continuous pair of drawer slides that extend all the way from the SkyQart side of the dock 7.47 m to the street side of the dock. The insertion of reference number 1715 to enable manual movement of SBPs under the dock to and from docked SkyQarts and RDCs occurs only in those instances when the robot arm and battery charging rack are either inoperative, disabled or otherwise unavailable. Reference number 1716 points to a side view of the edge of a sturdy vertical pillar that supports the street side edge of the SkyNest dock. Reference number 1717 points to a side view of an SBP that is stored in the bottommost of the five slots of the left-hand battery charging rack. There are five such SBPs stored in each battery charging rack shown in a side view in FIG. 38. Reference number 1718 points to a side view of the bottom of the left-hand drawer slide of an SBP that is stored in one of the slots of the battery charging rack. Reference number 1719 points to a side view of the distal extension arm of the battery swapping robot, showing its sliding attachment to reference number 1705, the robot's upper large extension arm. Reference number 1720 points to a side view of the segment of the under-dock battery drawer slide on the SkyQart side of the dock, depicting its 45.72 cm extension into the under-dock area from the SkyQart side edge of the dock. Reference number 1721 points to a side view of the edge of a sturdy vertical pillar that supports the dock surface at the edge of the SkyQart side of the dock. Reference number 1722 points to a side view of the dashed line that represents the rear hatchline of the SkyQart, which during docking is positioned in apposition to the SkyQart side of the dock, as shown in FIG. 38. Reference number 1723 points to a side view of the forward edge of the SBP as it is normally positioned inside the SkyQart. Reference number 1724 points to a side view of the paved parking surface that is 47 cm below the dock surface at the SkyQart side of the dock. Reference number 1725 points to a side view of the battery swapping robot's central rotating turret. Reference number 1706 points to a side view of the main vertical extension arm of the battery swapping robot. Reference number 1727 points to a side view of one of the small carts that support and allow movement of the battery charging rack that it supports. Normally, these carts are securely locked in place. Reference number 1728 points to the bottom of a side view of the horizontally crosshatched oval that represents the SkyQart's portion of the DC fast-charging port that mates with and connects to the dock's DC fast-charging port in cases where battery swapping is not in use. Reference number 1729 points to a side view of the bottom of the forward edge of the 99.06 cm L×7.62 cm H×1.91 cm W battery drawer slide that holds the SBP into the belly of the SkyQart. The other components depicted for perspective in FIG. 38 include dashed line outlines of the SkyQart's AFP, main landing gear and wheel fairing, monostrut, nacelle and propeller as well as a passenger-laden EPC that is pin-latched onto the top of the RDC. The RDC is shown with its scissor jack adjusted to position the top of the RDC's surface deck at 47 cm above street level. Note that the main landing gear and wheel fairing nest under the dock during docking and battery swap. Alternative embodiments of the QUAD dock, including those of different dimensions and facilities, are possible provided that they interoperate with the other vehicles of the QUAD system.

Graph of Tolerable Jerk Rate on Take-Off

Figure 39:
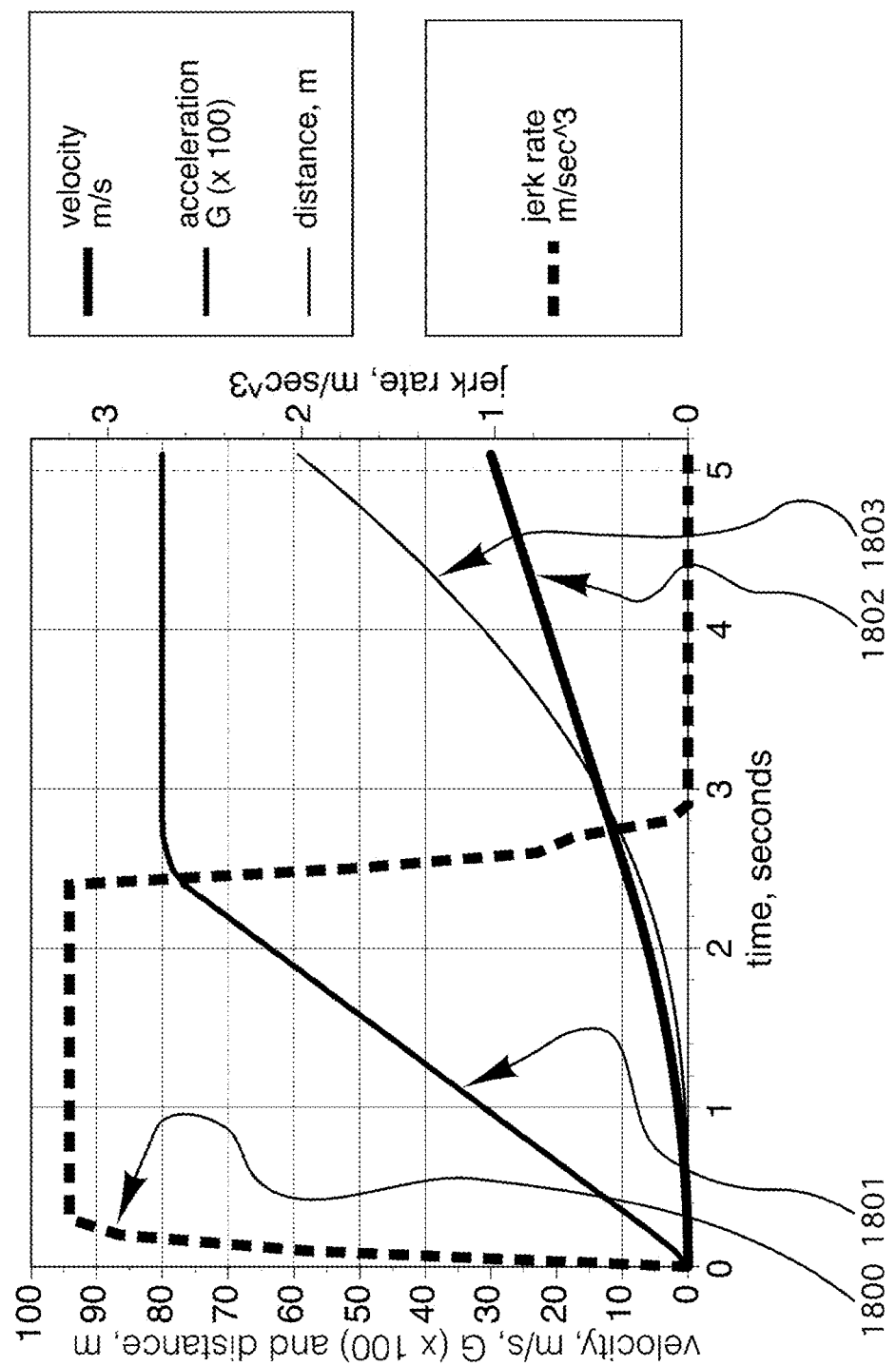
FIG. 39 shows a graph that depicts the typical take-off acceleration, speed, distance and jerk rate for a SkyQart

FIG. 39 depicts a graph of the motion of the SkyQart on take-off. The rate at which SkyQart acceleration increases during the take-off roll and decreases during landing roll can only be as high as will be tolerable to the public fare-paying passenger. The graph in FIG. 39 depicts the range of those accelerations for take-off and the related parameters of motion. The rise and fall of acceleration rates used to model the trajectories of the SkyQart in its standard operations at the SkyNest are called the jerk rates and these are derived from the jerk limits adopted by the industry for amusement park rides. The limit for changes in acceleration used in these models is a modest jerk rate of 3.4 m/sec$^3$. All movements conducted by vehicles in the QUAD system, whether in accelerating or decelerating and whether by SkyQart, EPC or RDC, are constrained at or below the jerk rate of ±3.4 m/sec$^3$. This constraint model for movement is herein named guided rate acceleration change execution or GRACE. The take-off performance modeled in FIG. 39 is the maximum performance expected during conditions of no wind and dry pavement. Such maximum performance is expected to be routine and consistent at all SkyNests and provides the metrics for sizing of SkyNests. In FIG. 39 reference number 1800 points to the dashed line depicting the jerk rate during take-off acceleration. This dashed line can be seen to rise rapidly from brake release at time zero to its peak value of 3.2 m/sec$^3$. Reference number 1800 (the jerk rate) can be seen to remain at this tolerable peak as the acceleration curve, labeled as reference number 1801, increases steadily until it reaches 0.8 G. Reference number 1802 points the tip of its arrow to the point on the aircraft velocity curve where the velocity reaches the SkyQart's liftoff speed of 24 m/sec in 4.34 seconds in a distance of 38.7 m. Reference number 1803 points the tip of its arrow at the point on the take-off distance curve at 4.34 seconds where it reaches a distance of 38.7 m.

The Standard Swappable Battery Pack (SBP)

Figure 40:
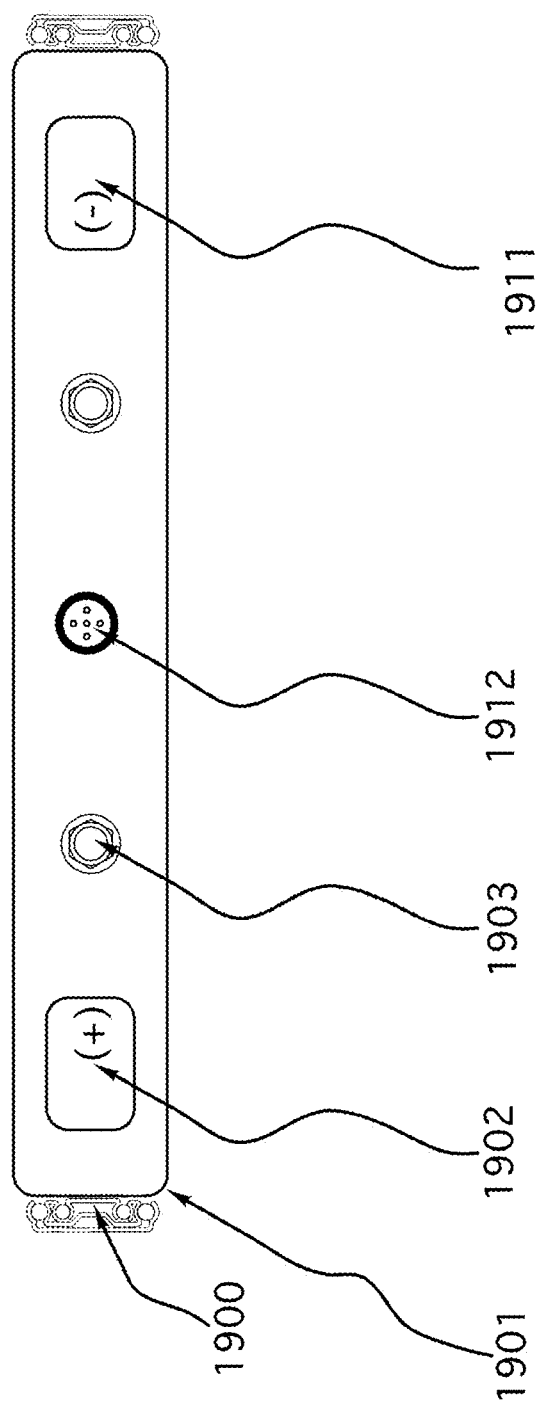
FIG. 40 shows a frontal view of the forward surface of a standard battery pack and its fittings
Figure 41:
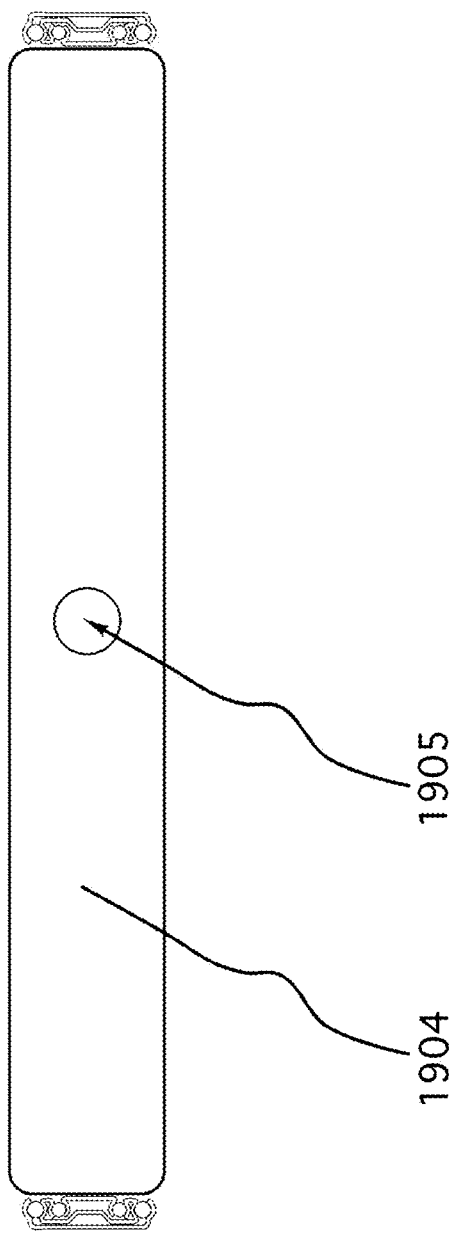
FIG. 41 shows a frontal view of the rear surface of a standard battery pack and its fittings
Figure 42:
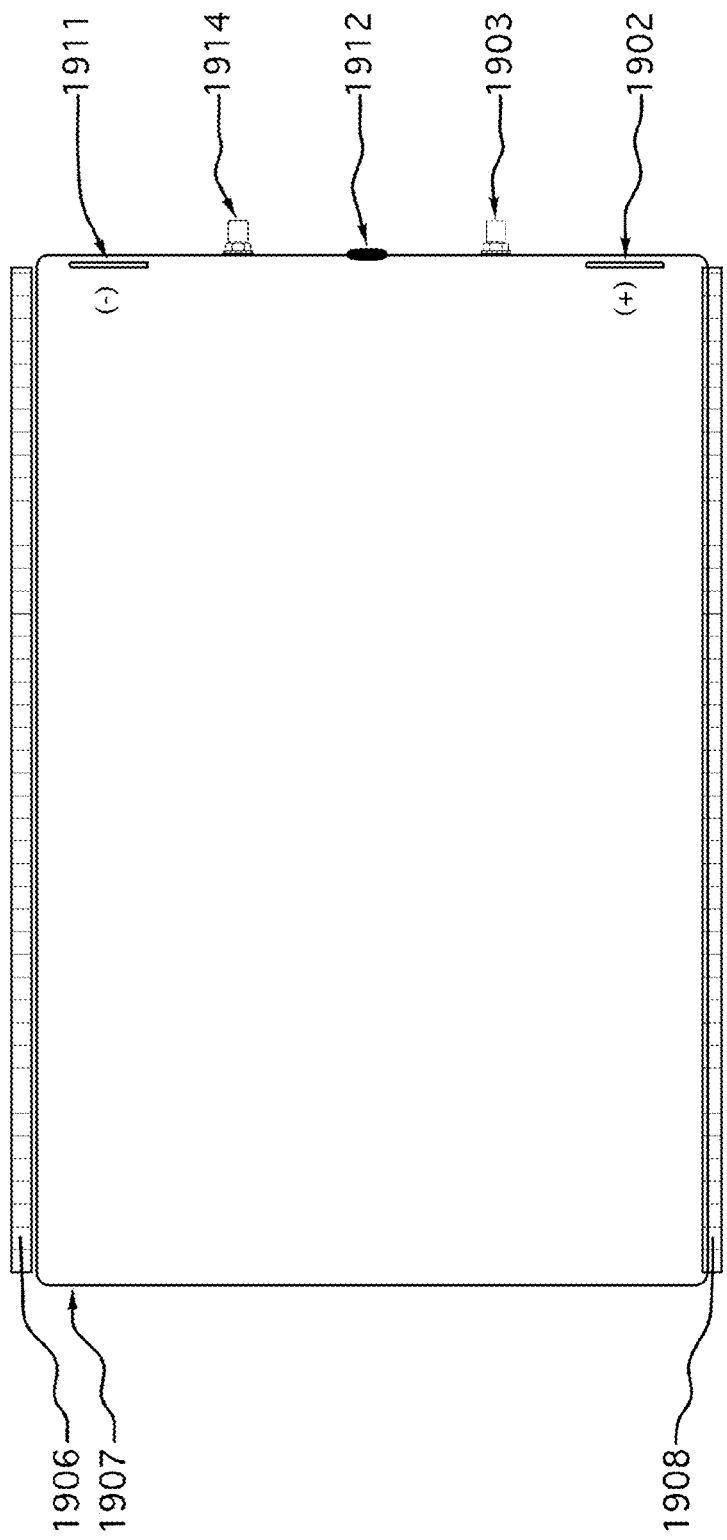
FIG. 42 shows a top view of the standard battery pack and its fittings
Figure 43:
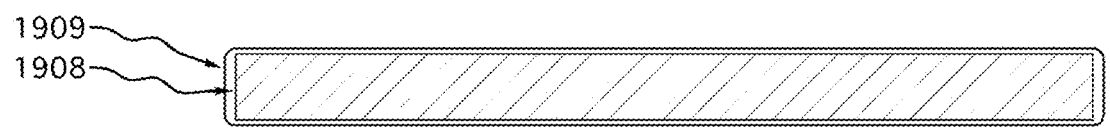
FIG. 43 shows a side view of the standard battery pack and its fittings

FIGS. 40, 41, 42 and 43 together depict an embodiment of the standard swappable battery pack (SBP). The SBP is an important component to this invention in order to provide a uniformly sized, high-quality energy storage device with standardized voltage and connections. It is used in all of the SkyQart aircraft and is made to be quickly swappable and rapidly recharged. It has definable specifications and is drawn to scale in FIGS. 40, 41, 42 and 43, which show its external components in frontal, aft, top and side views. In FIG. 40, reference number 1900 points to a frontal view of the male component of the 1.9 cm wide heavy-duty drawer slide on the side of the SBP, showing its position of attachment to the container of the SBP. Reference number 1901 points to a frontal view of the lower corner of the stainless steel sheetmetal container of the SBP. Reference number 1902 points to a frontal view of the large "+" or positive battery terminal on the right side of the forward face of the SBP. Reference number 1903 points to a frontal view of the center of the starboard cooling port, one of the two cooling ports of the SBP. Reference number 1904 points to a frontal view of the aft face of the SBP. Reference number 1905 points to a frontal view of the midline 3.8 cm diameter smoke vent on the aft face of the SBP. In FIG. 42, reference number 1906 points to a top view of the heavy-duty drawer slide on the port side of the SBP. Reference number 1907 points to a top view of the outline of the container of the SBP. In FIG. 42, reference number 1908 points to a top view of the heavy-duty drawer slide on the starboard side of the SBP. In FIG. 43, reference number 1909 points to a side view of the aft face of the container of the SBP. In FIG. 43, reference number 1908 also points to a side view of the 7.6 cm tall heavy-duty drawer slide on the starboard side of the long edge of the SBP. In FIG. 40, reference number 1911 points to a frontal view of the large "−" or negative battery terminal on the port side of the forward face of the SBP. Reference number 1912 points to a frontal view of the midline five electrical terminal, grommeted battery management system port on the forward face of the SBP. In FIG. 42, reference number 1911 also points to a top view of the recessed "−" or negative battery terminal of the port side of the forward face of the SBP. Reference number 1914 points to a top view of the port side cooling port on the forward face of the SBP. Reference number 1912 also points to a top view of the midline grommeted battery management system port on the forward face of the SBP. Reference number 1903 also points to a top view of the starboard cooling port on the forward face of the SBP. Reference number 1902 also points to a top view of the recessed "+" or positive battery terminal of the right side of the forward face of the SBP. Alternative embodiments of the SBP are possible, and may be adopted by standards organizations in the future, while the standard embodiment of the SBP presented herein is expressly sized to be compatible with the SkyQarts of the QUAD system.

The Crash Cushion

Figure 44:
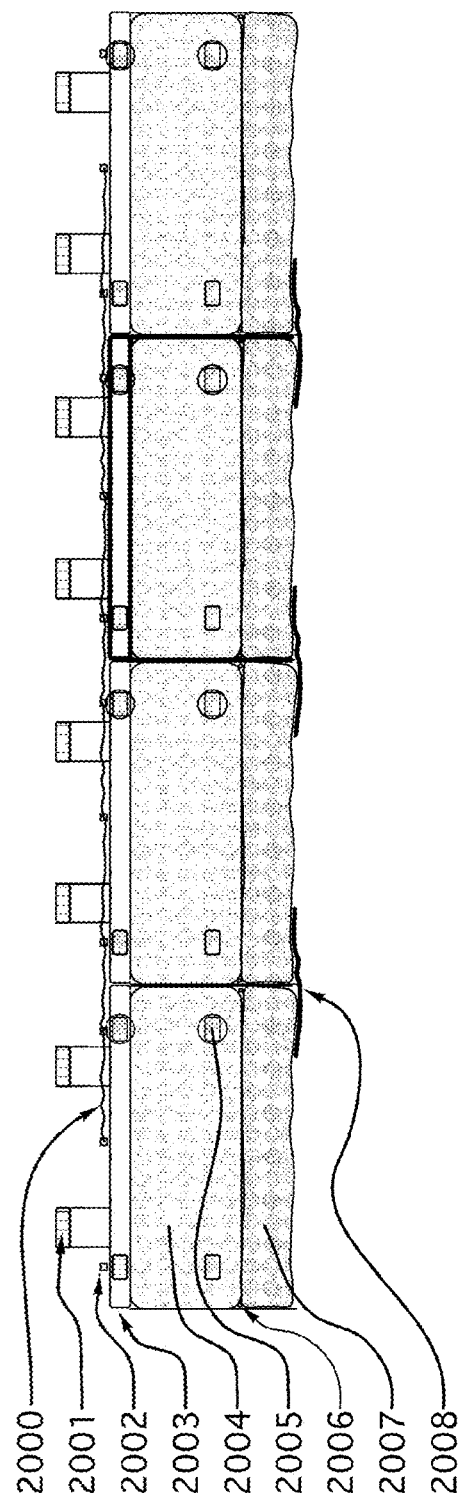
FIG. 44 shows a top view of an exemplary crash cushion
Figure 45:
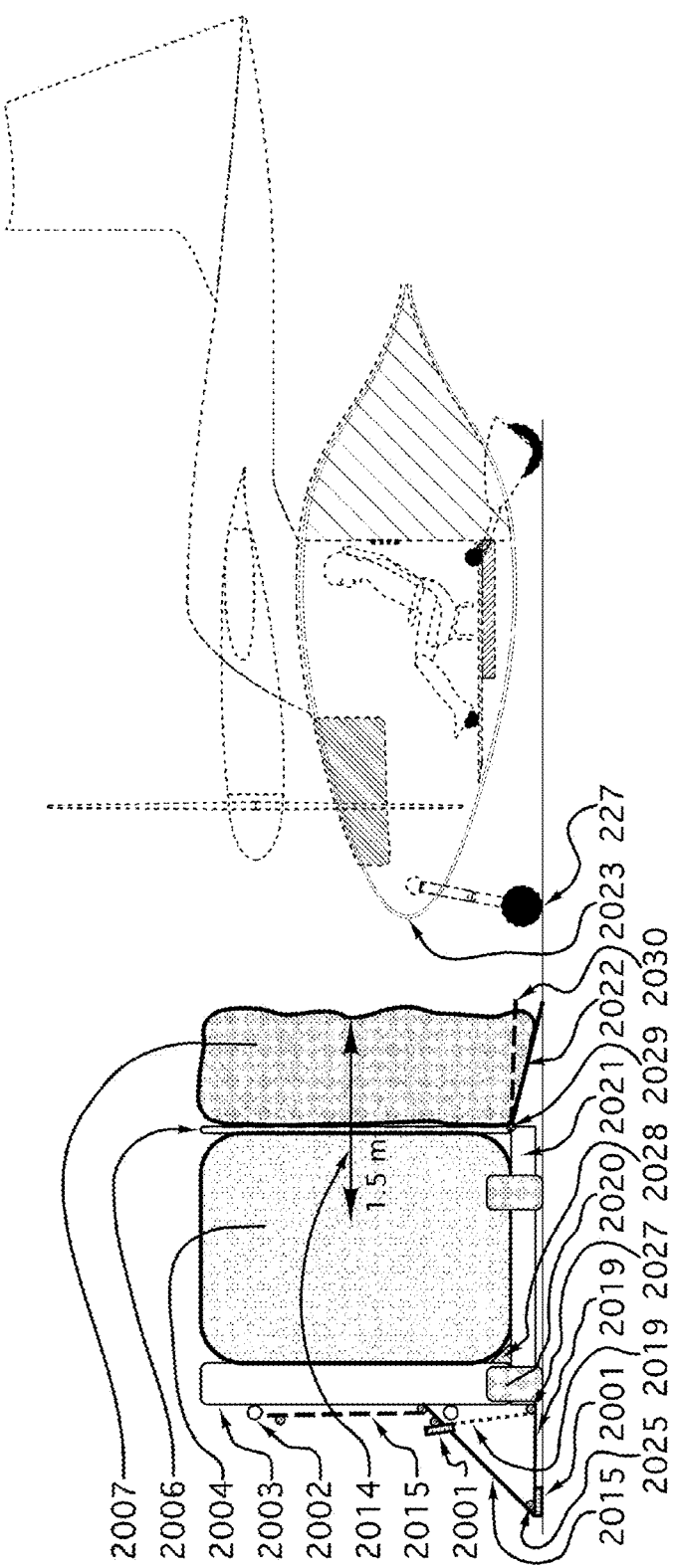
FIG. 45 shows a side view of an exemplary crash cushion

FIGS. 44 and 45 depict the QUAD crash cushion. The crash cushion is an important component to this invention. It a moveable train of cushioned carts placed at the end of the SkyNest's active runway pavement to safely bring to a stop an out-of-control SkyQart. The calculation of the impact forces and deflections of the crash cushion have been provided in the foregoing. The components of the crash cushion are shown in FIGS. 44 and 45 as items labeled by reference number and are drawn to scale. The train of crash cushion carts shown in FIG. 44 is shown at 0.4 times the scale of the FIG. 45 view of the crash cushion cart. Reference number 2000 points to a top view of one of the large elastic bungee bands that joins two crash cushion carts together through steel attachment rungs and helps keep the carts upright during a skid. Reference number 2001 points to a top view of the outline of the rectangular rubber footpad, shown in vertical crosshatch on the undersurface of the lower plate of the crash cushion cart's rear steel brace in its down or extended position. Reference number 2002 points to a top view of one of the nominal 10.16 cm diameter circular steel rungs that aligns and holds the nominal 223.52 cm long large caliber elastic bungee band across the rear junction of two crash cushion carts. There are four such rungs on the backside of each crash cushion cart and each of these rungs is welded onto the vertical rear steel wall of the crash cushion. Reference number 2003 points to a top view of the rear edge of the vertical steel wall that makes up the backside of the crash cushion cart. Reference number 2004 points to a top view of the large airbag that occupies the majority of volume on the crash cushion cart. Reference number 2005 points to a top view of the castoring starboard front tire of the crash cushion cart. A paired identical castoring front tire is also shown on the port side of the crash cushion cart. Reference number 2006 points to a top view of the nominal 50.8 mm diameter rear plastic mast on which the memory foam beanbag is suspended. There are two such masts, one rear and one front, and they are placed nominally 86.36 cm deep to the impact surface of the beanbags so that there will be 36.36 cm of compression and deceleration before the impacting vehicle reaches these frangible masts. Reference number 2007 points to a top view of the wall of memory foam beanbags. Reference number 2008 points to a top view of one of the 0.254 mm flexible load-spreading polyethylene terephthalate (PET) tarps whose tensile strength is 55 Mpa and whose peripheral edges are secured with aramid fiber straps to the impact side of the wall of beanbags on either side of the junction between any two crash cushion carts. Reference number 2007 also points to a side view of the memory foam beanbag wall, which provides the impact side of the crash cushion cart. Reference number 2006 points to a side view of the top of the 50.8 mm diameter frangible plastic mast from which the beanbags are suspended. There are two such masts on each crash cushion cart, one of which is located at the front edge and the other at the rear edge of the cart. Reference number 2004 also points to a side view of the large airbag. Reference number 2003 also points to a side view of the top portion of the steel rear wall of the crash cushion cart. Reference number 2002 also points to a side view of one of the 10.16 cm diameter steel rungs that align and fasten the large caliber elastic bungee bands to the rear wall of the crash cushion cart. Reference number 2014 points to a double ended arrow of 1.5 m nominal length that depicts a nominal distance of the compression of the crash cushion cart's cushioning materials in the case of a 20 m/sec SkyQart collision with the cart. Reference number 2015 points to a side view of a heavy dashed line that depicts the hinged upper rear steel retractable brace in its retracted position. Its attached steel hinge is shown at the bottom of this heavy dashed line. Reference number 2016 also points to a side view of the rectangular rubber footpad that is attached to the underside of the hinged lower rear steel retractable brace shown in its retracted position. Reference number 2015 also points to a side view of a heavy solid line that depicts the hinged upper rear steel retractable brace in its down or extended position where it serves as a diagonal brace for the lower rear steel retractable brace. Reference number 2001 points to a side view of the rectangular rubber footpad that is attached to the underside of the hinged lower rear steel retractable brace shown in its down or extended position, which places the footpad onto the pavement. Reference number 2019 points to a side view of the hinged lower rear steel retractable brace shown in its down or extended position. Reference number 2020 points to a side view of a projection of the port side rear tire of the crash cushion cart. This tire as shown is 25.4 cm wide by 40.64 cm tall and provides 5.08 cm of ground clearance for the crash cushion cart. Reference number 2021 points to a side view of the nominal 17.78 cm tall steel ladder frame that forms the bottom of the crash cushion cart. Reference number 2022 points to a side view of the hinged steel ramp that supports the beanbag wall and eases the collision of the nosewheel of the SkyQart with the crash cushion cart. Reference number 2023 points to a side view of the tip of the nose of the AFP of the SkyQart. Reference number 227 points to a side view of the bottom of the nose tire of the SkyQart. Reference number 2025 points to a side view of the 12.7 mm diameter steel bolt that rigidly attaches the hinged upper rear steel retractable brace to the hinged lower rear steel retractable brace. Reference number 2019 also points to a side view of the hinged lower rear steel retractable brace, shown as a dotted line in its retracted position on the backside of the crash cushion cart. Reference number 2027 points to a side view of the hinge that joins the hinged lower rear steel retractable brace to the steel rear wall of the crash cushion cart. Reference number 2028 points to a side view of the triangular steel gusset that joins the bottom of the steel rear wall of the crash cushion cart to the steel ladder frame of the crash cushion cart. Reference number 2029 points to a side view of the hinge of the sloped ramp made of a steel plate. Reference number 2030 points to a side view of a heavy dashed line that depicts this sloped steel ramp in its up or retracted position as would occur during re-location of the crash cushion cart. The exact dimensions, cushions and weights provided for this embodiment of the crash cushion cart system may vary in other embodiments that still conform to this crash cushion concept and process.

The entirety of the following references are hereby incorporated by reference herein:

[1] https://ww2.arb.ca.gov/sites/default/files/classic/enf/advs/advs369.pdf California's neighborhood electric vehicle regulations in detail.

[2] https://incompliancemag.com/article/incorporating-lightning-protection-into-vtol-and-hybrid-propulsion-vehicle-designs/The description of integrating lightning protection into electric aircraft.

[3] https://www.ezwoodshop.com/lumber-dimensions.html The description of the dimensions of standard lumber.

[4] http://donsnotes.com/reference/size-humans.html The standards for size for humans.

[5] https://ems.stryker.com/en/ambulance-cots A Stryker litter is 204.47 cm L×58.42 cm W and will fit onto the EPC if slid forward maximally, and if a slight carve out is made into the rear hatch. The litter collapses down to 160.02 cm L which helps it to fit onto the EPC.

[6] http://payload.eaa62.org/technotes/tail.htm The formulae for calculating tail volumes.

[7] https://www.mcmaster.com/6603a33 The heavy duty drawer slide type used for mounting the SBP, with 272.16 kg capacity per pair.

[8] https://www.ncbi.nlm.nih.gov/pmc/articles/PMC543775I/ The adverse health effects of noise. WHO recommends 45 dB $L_{den}$ as the exposure limit.

[9] https://payload.nps.gov/asis/planyourvisit/upload/camp-groundregs2013-2.pdf The US National Park noise limits for generators which limit generator noise to no more than 60 dBA at a 15.24 m sideline. That is equivalent to 51.6 dB at a 40 meter sideline.

[10] https://payload.wcc.nres.usda.gov/climate/windrose.html The official US data for local prevailing winds and wind rose orientation.

[11] http://www.euronoise2018.eu/docs/papers/449_Euronoise2018.pdf The description and specification of the poro-elastic road surface.

[12] http://physicstasks.eu/1984/braking-vehicle The explanation of acceleration down or up a ramp.

[13] https://payload.raisedfloor.co.uk/work/multi-storey-car-park-constructed-luton-airport/The engineering guide for steel beam construction of stadium like structures.

[14] http://www.dtic.mil/dtic/tr/fulltext/u2/a801336.pdf This paper by Hicks and Hubbard in 1947 confirms that a 7-bladed prop turning slowly results in reduced noise, and that the noise of seven blade prop of adequate take-off thrust can be no more than 35 dBA of noise at a 40 m sideline.

[15] https://payload.amazon.com/Pack-Non-Marking-Soft-Tread-Polyurethane-Casters/dp/B011RDY7O6 The tire for the EPC is 12.7 cm diameter×3.175 cm wide as a non-marking, soft caster type with 204.12 kg capacity.

[16] https://payload.tlxtech.com/solenoids/one-inch-stroke-shot-bolt-solenoid An example of a sturdy solenoid with a 2.54 cm stroke.

[17] https://us.sunpower.com/solar-resources/sunpower®-x-series-residential-dc-x22-370 The specifications for the SunPower solar panels as 22.7% efficiency with 370 watts and dimensions of 155.7 cm×104.65 cm×4.572 cm at 18.6 kg.

[18] https://payload.rwmcasters.com/products/wheels/urethane-on-iron-wheels/The scissor jack for the RDC uses tires that are 7.62 cm diameter and 3.175 cm wide as high capacity cast polyurethane wheels on 12.7 mm axles from a source above. Each can accommodate a 272.16 kg load.

[19] https://payload.bluegiant.com/Files/Architects/Loading-dock-System-Guide.aspx Given on page 3 of this weblink are the range of specifications and standards for commercial truck docks.

[20] https://www.grainger.com/product/GRArNGER-AP-PROVED-12-Light-Medium-Duty-Sawtooth-1NWV1 An example of a tire suitable for the RDC: 30.48 cm OD and with 11.43 cm hub width, this tire is 9.21 cm wide and specified as a 4.10/3.5-6 tire.

[21] https://pushevs.com/2017/03/20/tesla-leapfrog-competition/The energy density by volume for the current Tesla car batteries.

[22] http://www.bsharp.org/physics/skidmarks The physics of skidding.

[23] https://www.amazon.com/Chill-Sack-Bag-Furniture-Charcoal/dp/B00P21UAHK/ref=asc_df_B00P21UAHK/?tag=hyprod-20&linkCode=df0&hvadid=19224544-6453&hvpos=&hvnetw=g&hvrand=10251932198627-587180& hvpone=&hvptwo=&hvqmt=&hvdev=c&hvd-vcmdl=&hvlocint=&hvlocphy=9032308&h An example of a large memory foam beanbag.

[24] https://www.bigairbag.com/revolution/An example of the large inflatable airbag with customizable internal baffles, external vent windows, internal blowers and anchoring system, that can be used on the crash cushion cart.

[25] http://onlinepubs.trb.org/Onlinepubs/nchrp/nchrp_rpt_157.pdf A 1975 Goodyear study of crash impact tolerances.

[26] http://citeseerx.ist.psu.edu/viewdoc/download?doi=10.1.1.212.5449&rep=rep1&type=pdfA comprehensive paper on crash impact analysis and human tolerances.

[27] https://pdfs.semanticscholar.org/269d/34eeb08f2de3a2d-30f4db4bb10a43f6053fb.pdf This paper compares several types of linear shock absorber and motion control devices useful for the active main landing gear.

[28]http://www.laserguidance.com/landing_z.html A description of a laser guidance system for landing.

What is claimed is:

1. An ultra-quiet, multi-modal, on-demand passenger and cargo transportation system comprising:
   a) a plurality of very small airports herein named Sky-Nests, each comprising:
      i) an occupied area within a perimeter that is no larger than 5 ha; and
      ii) a dock facility comprising docking stations; and
      iii) autonomous robotic electric payload carts configured to latch onto and haul a payload of passengers or cargo along said dock facility to and from said plurality of docking stations at said SkyNests; and
      wherein for noise reduction, a plurality of SkyQarts, each of which is an ultra-quiet electric-powered aircraft configured to operate at said SkyNest, and wherein said SkyNest is configured for flight operations conducted by ultra-quiet electric-powered aircraft that are configured to haul to and from said plurality of docking stations said payload of passengers or cargo that is latched onto one of the electric payload carts; and
   wherein a community noise level impact of flight operations along said perimeter of said SkyNest is maintained below 55 dBA $LA_{eq}$, 5 s;
      a robotic delivery cart comprising a surface deck, and
      wherein the robotic delivery cart comprises a scissor jack that is configured to move said surface deck of said robotic delivery cart up and down to on-load or off-load an electric payload cart; and
      a truck docking station that comprises a commercial truck dock or a truck bed at which said robotic delivery cart can use said scissor jack to move said surface deck to align with the commercial truck dock or truck bed.

2. The ultra-quiet, multi-modal, on-demand passenger and cargo transportation system of claim 1, further comprising an energy-absorbing crash cushion configured at an end of said paved surface.

3. The ultra-quiet, multi-modal, on-demand passenger and cargo transportation system of claim 1, further comprising a fence that is at least 2 m tall and configured around said perimeter of said SkyNest.

4. The ultra-quiet, multi-modal, on-demand passenger and cargo transportation system of claim 1, wherein for noise reduction, said plurality of SkyQarts take off from the paved surface and then climbs out along a curved traffic pattern having a radius of curvature of at least 94 m (308.4 ft); and
   wherein, for noise reduction, said plurality of SkyQarts land onto the paved surface after descending along a curved traffic pattern having a radius of curvature of at least 94 m (308.4 ft).

5. The ultra-quiet, multi-modal, on-demand passenger and cargo transportation system of claim 1, wherein the dock facility comprising:
   a dock battery charging station comprising:
   a battery charger; and
   a robot arm to autonomously robotically interchange said charged battery with a depleted battery from one of said plurality of SkyQarts.

6. The ultra-quiet, multi-modal, on-demand passenger and cargo transportation system of claim 1, wherein the docking stations comprise adjacent aircraft docking stations at which a first SkyQart of the plurality of SkyQarts having wingtips that tilt upward and a second SkyQart of the plurality of SkyQarts having wingtips that tilt downward are docked, wherein said adjacent aircraft docking stations are spaced a distance to receive the first and the second SkyQarts with overlapping wingtip configurations, wherein at a first aircraft docking station, said first SkyQart is docked and wherein at a second and adjacent aircraft docking station to said first aircraft docking station, said second SkyQart is docked; and wherein the distance between the first and second aircraft docking stations would not accommodate simultaneous docking of SkyQarts with the same wingtip configuration.

7. The ultra-quiet, multi-modal, on-demand passenger and cargo transportation system of claim 1, comprising a paved surface for take-off and landing having a length no longer than 200m.

8. The ultra-quiet, multi-modal, on-demand passenger and cargo transportation system of claim 7, further comprising a paved surface heater to heat said paved surface and prevent icing of said paved surface.

9. The ultra-quiet, multi-modal, on-demand passenger and cargo transportation system of claim 7, wherein said paved surface for take-off and landing comprises a poro-elastic road surface (PERS) configured to reduce tire noise.

10. An ultra-quiet, multi-modal, on-demand passenger and cargo transportation system comprising:
    a) a plurality of very small airports herein named Sky-Nests, each comprising:
       i) an occupied area within a perimeter that is no larger than 5 ha; and
       wherein said SkyNest is configured for flight operations conducted by ultra-quiet electric-powered aircraft, herein named SkyQarts, that are configured to haul to and from said docking stations a payload of passengers or cargo that is latched onto an autonomous robotic electric payload cart; and
       ii) a dock facility having docking stations;
       wherein a community noise level impact of flight operations along said perimeter of said SkyNest is maintained below 55 dBA $LA_{eq}$, 5 s;
    b) said autonomous robotic electric payload carts configured to latch onto and haul a payload of passengers or cargo along a dock surface of said dock facility to and from said docking stations,
    c) electric powered autonomous robotic delivery carts, each comprising a surface deck; and
       wherein each of the plurality of autonomous robotic delivery carts are configured to haul one of said autonomous robotic electric payload carts on said surface deck, wherein the autonomous robotic electric payload cart autonomously docks and latches onto said surface deck of the autonomous robotic delivery cart with a piggyback transportation function; and
    d) each of said SkyQarts comprising:
       a cabin; and
       a cabin floor,
       wherein each of the SkyQarts is configured to haul one or more autonomous robotic electric payload carts and take-off and land with said autonomous robotic electric payload carts therein; and
       wherein each of the autonomous robotic electric payload carts is configured to autonomously dock and latch into said cabin of the SkyQart.

11. The ultra-quiet, multi-modal, on-demand passenger and cargo transportation system of claim 10, wherein said docking station has a dock height and wherein the said dock height and a height of said surface deck of said autonomous robotic delivery cart and a height of said cabin floor of any one of the SkyQarts are substantially the same, within ±2 mm or less; and wherein said autonomous robotic delivery carts are autonomous having an autonomous control system to control docking of said autonomous robotic delivery cart to one of said SkyQarts with a positional precision of ±2.0 mm or less; and wherein each of the said SkyQarts has a hatch that opens to provide access for docking of an autonomous robotic delivery cart to deliver or remove an autonomous robotic electric payload cart into or from the SkyQart's cabin by rolling said autonomous robotic electric payload cart from the surface deck of the autonomous robotic delivery cart onto said cabin floor and vice-versa; and wherein the autonomous robotic delivery carts each have a precision positioning system to control docking of said autonomous robotic delivery cart to said SkyQart or to said cart docking station at a dock with a positional precision of ±2.0 mm; and wherein said autonomous robotic delivery cart is automatically controlled to deliver an autonomous robotic electric payload cart to a dock from a station or from a dock to a station; and wherein said station is a home, a place of business, a truck dock, truck or other vehicle or a bus stop.

12. The ultra-quiet, multi-modal, on-demand passenger and cargo transportation system of claim 11, wherein the payload comprises at least one passenger.

13. The ultra-quiet, multi-modal, on-demand passenger and cargo transportation system of claim 12, wherein said surface deck of the autonomous robotic electric payload cart has a seat-track latching system configured to latch a passenger seat thereto.

14. The ultra-quiet, multi-modal, on-demand passenger and cargo transportation system of claim 13, wherein the autonomous robotic electric payload carts are configured to roll on the surface deck of the autonomous robotic delivery carts and wherein said autonomous robotic electric payload cart comprises a latch sensor that detects when said electric payload cart is securely latched to said autonomous robotic delivery cart.

15. The ultra-quiet, multi-modal, on-demand passenger and cargo transportation system of claim 14, wherein the plurality of autonomous robotic delivery cart comprises a scissor jack to change a height of its surface deck for docking and loading or unloading of one of the autonomous robotic electric payload carts.

16. An ultra-quiet, multi-modal, on-demand passenger and cargo transportation system comprising:

a) a plurality of very small airports herein named Sky-Nests, each comprising:
  i) a paved surface for take-off and landing having a length no longer than 200 m; and
  ii) an occupied area within a perimeter that is no larger than 5 ha; and
  iii) a dock facility comprising docking stations for electric-powered land and air vehicles; and
wherein a community noise level impact of flight operations along said perimeter of said SkyNest is maintained below 55 dBA $LA_{eq}$, 5 s;

b) autonomous robotic electric payload carts configured to latch onto and haul a payload of passengers or cargo along said dock facility to and from said docking stations;

c) a plurality of autonomous robotic electric-powered aircraft, each of which being named a SkyQart and each comprising:
  i) an on-board electrical power source;
  ii) a propeller that is driven by an electric motor that is powered by said on-board electric power source;
  iii) a payload capacity of at least 120 kg; and
  iv) a take-off and landing distance on a horizontal surface of less than 60 m at sea level in zero wind; and
  v) a quiet take-off, wherein take-off from a horizontal surface produces a noise of no more than 55 dBA LAeq, 5 s as measured at a 40 m sideline distance along the azimuth of maximum noise from an unobstructed vantage at a height of 1m above said horizontal surface;
wherein each of said SkyQarts comprises a fuselage with an interior cabin therein and an interior cabin floor; and
wherein each SkyQart is configured to haul one of said autonomous robotic electric payload carts within said cabin and to take-off from a first SkyNest and land at a second SkyNest with said autonomous robotic electric payload cart in the cabin; and
wherein said SkyNest is configured for flight operations conducted by said SkyQarts, that are configured to haul to and from said docking stations said payload of passengers or cargo that is latched onto one of the autonomous robotic electric payload carts.

17. The ultra-quiet, multi-modal, on-demand passenger and cargo transportation system of claim 16, wherein said SkyQart comprises an empennage with a twin boom configuration comprising two separate vertical tail surfaces whose laminar flow airfoil is structurally attached to an aft portion of said SkyQart's respective tailcone; and
wherein a fixed horizontal tail surface has a laminar flow airfoil that is attached at a top of the twin vertical tail surfaces and wherein said horizontal tail surface has a moveable elevator control surface comprising said wing flaps; and
wherein the two separated fixed vertical tail surfaces, one port and one starboard, each of which is structurally attached to a rear portion of a port and a starboard tailcone, respectively, and each of which has a moveable rudder control surface comprising said wing flaps.

18. The ultra-quiet, multi-modal, on-demand passenger and cargo transportation system of claim 17, wherein each SkyQart comprises:
a) a propeller that is driven by an electric motor, herein called a propeller motor,
wherein the propeller is an ultra-quiet propeller comprising:
  i) at least three blades; and
  ii) a diameter of at least 1.83M; and
wherein said ultra-quiet propeller maintains a propeller blade tip speed of less than 152.4 m/sec; and
b) a trailing edge wing flaps system comprising wing flaps, wherein said wing flaps are ultra-fast-acting, herein called fast flaps, and wherein to enable short landings, said fast flaps can be fully retracted in less than 0.5 seconds from a fully extended position.

19. The ultra-quiet, multi-modal, on-demand passenger and cargo transportation system of claim 18, wherein a wheelie on take-off is prevented by a combination of components on each SkyQart, comprising:

said propeller whose thrust axis is at least 60 cm or more above a center of gravity of said SkyQart; and a fuselage pod;

wherein said on-board electrical power source comprises a swappable battery pack having a mass, and wherein said standard battery pack is located below the cabin floor of fuselage pod in order to apply a downward force that helps prevent a wheelie; and wherein an active main landing gear is configured to rotate the main landing gear leg upward when the indicated airspeed becomes a lift-off speed of 24 m/sec so as to increase the fuselage pitch angle during take-off in order to increase wing lift and thereby induce lift-off; and wherein a wing having said wing flaps extended during take-off produces a nose-down pitching moment that prevents wheelies by keeping the nose tire on the pavement during take-off; and wherein a forward location of the nose tire extends the wheelbase and moves the center of gravity forward to increase weight on the nose tire; and wherein a horizontal tail coefficient is large enough with said forward location of said SkyQart's center of gravity to induce a nose-up lift-off when the indicated airspeed becomes a lift-off speed of 24 m/sec; and wherein an autonomous control system that has a sensor for fuselage pitch angle detects the onset of a wheelie and modulates the thrust of the main landing gear tires in order to prevent it.

\* \* \* \* \*